US012676680B2

(12) United States Patent
Howe et al.

(10) Patent No.: US 12,676,680 B2
(45) Date of Patent: *Jul. 7, 2026

(54) DIGITAL AMPLITUDE NOISE SHIFT KEYING TO COMMUNICATE INFORMATION

(71) Applicant: The Boeing Company, Arlington, VA (US)

(72) Inventors: Wayne Richard Howe, Irvine, CA (US); Jeffrey H. Hunt, Los Angeles, CA (US)

(73) Assignee: The Boeing Company, Arlington, VA (US)

( * ) Notice: Subject to any disclaimer, the term of this patent is extended or adjusted under 35 U.S.C. 154(b) by 270 days.

This patent is subject to a terminal disclaimer.

(21) Appl. No.: 18/361,036

(22) Filed: Jul. 28, 2023

(65) Prior Publication Data

US 2024/0204883 A1 Jun. 20, 2024

Related U.S. Application Data

(63) Continuation-in-part of application No. 18/334,739, filed on Jun. 14, 2023, now Pat. No. 12,476,710, which is a continuation-in-part of application No. 18/067,516, filed on Dec. 16, 2022, now Pat. No. 12,401,425, and a continuation-in-part of application No. 18/067,547, filed on Dec. 16, 2022, now Pat. No. 12,407,420.

(51) Int. Cl.
*H04B 10/69* (2013.01)
*H04B 10/54* (2013.01)

(52) U.S. Cl.
CPC ....... *H04B 10/6973* (2013.01); *H04B 10/541* (2013.01)

(58) Field of Classification Search
CPC .......................... H04B 10/541; H04B 10/6973
USPC ........................................................... 398/115
See application file for complete search history.

(56) References Cited

U.S. PATENT DOCUMENTS

| 1,309,031 | A | 7/1919 | Hettinger |
| 3,404,403 | A | 10/1968 | Vallese et al. |

(Continued)

FOREIGN PATENT DOCUMENTS

| CA | 3077841 A1 | 10/2020 |
| CN | 111756470 A | 10/2020 |

(Continued)

OTHER PUBLICATIONS

Yu et al; Plasma optical modulators for intense lasers; Jun. 2016, Nature communications, pp. 1-7. (Year: 2016).*

(Continued)

*Primary Examiner* — Amritbir K Sandhu
(74) *Attorney, Agent, or Firm* — Yee & Associates, P.C.

(57) ABSTRACT

A method, apparatus, and system for communicating information. A communications system comprises a computer system and a communications manager. The communications manager is in the computer system. The communications manager is configured to identify digital information for transmission. The communications manager is configured to transmit noise signals with different noise amplitudes that thereby modulate the noise signals to correspond to the digital information.

27 Claims, 77 Drawing Sheets

(56) References Cited

U.S. PATENT DOCUMENTS

| | | | |
|---|---|---|---|
| 3,719,829 A | 3/1973 | Vaill | |
| 6,087,992 A | 7/2000 | Anderson | |
| 6,087,993 A | 7/2000 | Anderson et al. | |
| 6,377,436 B1 | 4/2002 | Margolin | |
| 6,650,297 B2 | 11/2003 | Anderson et al. | |
| 6,657,594 B2 | 12/2003 | Anderson | |
| 6,674,970 B1 | 1/2004 | Anderson | |
| 7,456,791 B2 | 11/2008 | Pellet | |
| 7,613,074 B1 | 11/2009 | Blackmon et al. | |
| 7,965,241 B2 | 6/2011 | Marquis | |
| 8,922,436 B2 | 12/2014 | Stone et al. | |
| 10,069,564 B2 | 9/2018 | Hening et al. | |
| 10,211,522 B2 | 2/2019 | Anderson | |
| 10,630,383 B2 | 4/2020 | Zhang et al. | |
| 10,763,963 B2 * | 9/2020 | Jia | H04B 10/2507 |
| 11,024,950 B2 | 6/2021 | Hening et al. | |
| 2007/0215946 A1 | 9/2007 | Eastlund | |
| 2014/0288539 A1 * | 9/2014 | Bischoff | A61F 9/00825 |
| | | | 606/4 |
| 2018/0167144 A1 | 6/2018 | Howlader et al. | |
| 2018/0175936 A1 | 6/2018 | Jia et al. | |
| 2018/0233876 A1 | 8/2018 | Schulz et al. | |
| 2018/0263103 A1 * | 9/2018 | Exton | B64C 23/005 |
| 2019/0068413 A1 * | 2/2019 | Xu | H04B 10/6972 |
| 2019/0094185 A1 | 3/2019 | Athanassiadis | |
| 2019/0379459 A1 * | 12/2019 | Kim | H04B 10/564 |
| 2020/0091994 A1 | 3/2020 | Kalita et al. | |
| 2021/0384981 A1 * | 12/2021 | Dolgin | H04B 10/25 |
| 2022/0390553 A1 * | 12/2022 | Englesbe | G01S 13/0209 |
| 2023/0198624 A1 | 6/2023 | Franklin | |
| 2024/0146321 A1 | 5/2024 | Miyata | |
| 2024/0204878 A1 * | 6/2024 | Howe | H04B 10/54 |
| 2024/0244738 A1 * | 7/2024 | Walczak | H01S 3/2383 |
| 2024/0244739 A1 | 7/2024 | Widder et al. | |
| 2024/0267126 A1 | 8/2024 | Howe et al. | |
| 2025/0365074 A1 | 11/2025 | Howe et al. | |

FOREIGN PATENT DOCUMENTS

| | | | | |
|---|---|---|---|---|
| CN | 113489495 A | 10/2021 | | |
| CN | 113534321 A | 10/2021 | | |
| CN | 117529975 A | 2/2024 | | |
| CN | 111756470 B * | 5/2024 | | H04K 1/02 |
| EP | 3370352 A1 * | 9/2018 | | H04B 10/5161 |
| GB | 124833 A | 4/1919 | | |
| JP | 3562029 B2 | 9/2004 | | |
| WO | 2010111089 A2 | 9/2010 | | |
| WO | 2017063662 A1 | 4/2017 | | |
| WO | 2017210871 A1 | 12/2017 | | |

OTHER PUBLICATIONS

Kumar et al., "Detection and analysis of low-frequency electromagnetic emissions from ns laser induced breakdown of air," Proceedings of SPIE—The International Society for Optical Engineering, May 2012, vol. 8434, 7 pages.

Office Action, dated May 14, 2025, regarding U.S. Appl. No. 18/067,516, 44 pages.

Extended European Search Report, dated Aug. 26, 2025, regarding EP Application No. 25159385.1, 10 pages.

Notice of Allowance, dated Aug. 18, 2025, regarding U.S. Appl. No. 18/334,739, 26 pages.

Zhao Yang et al: "Photoacoustic communication system based on detecting laser-generated sound by optical fiber underwater acoustic sensor", Optics and Lasers in Engineering, Elsevier, Amsterdam, NL, vol. 177, Feb. 29, 2024 (Feb. 29, 2024), XP087483956, ISSN: 0143-8166, DOI: 10.1016/J.OPTLASENG.2024.108134 [retrieved on Feb. 29, 2024] * the whole document *.

Antipov A A et al: "Microwave Generation in an Optical Breakdown Plasma Created by Modulated Laser Radiation", Soviet Journal of Quantum Electronics, American Institute of Physics, New York, NY I us, vol. 6, Jun. 1, 1990 (Jun. 1, 1990), pp. 664-666, XP000174924,

ISSN: 0049-1748, DOI: 10.1070/QE1990V020N06ABEH006676.

European Patent Office, Extended Search Report, dated Nov. 11, 2024, regarding Application No. EP24180478.0, 12 pages.

European Patent Office, Extended Search Report, dated Oct. 25, 2024, regarding Application No. EP24180480.6, 10 pages.

Alshershby et al., Reconfigurable Plasma Antenna Produced in Air by Laser-induced Filaments: Passive Radar Application, 2012 International Conference on Optoelectronics and Microelectronics (ICOM), Aug. 23-25, 2012, Changchun, China, 8 pages.

Brelet et al., "Radiofrequency plasma antenna generated by femtosecond laser filaments in air," Applied Physics Letters , vol. 101, Issue 26, Dec. 27, 2012, 4 pages.https://aip.scitation.org/doi/abs/10.1063/1.4773492.

Choe et al., "Radiation characteristics of femtosecond laser-induced plasma channel Vee antenna," Physics of Plasmas, vol. 22, Issue 6, 10.1063/1.4922083, Published Online Jun. 4, 2015, 10 pages.

Dai et al., "Demonstration of 17 Meter Standoff THz Wave Generation," Nonlinear Optics: Materials, Fundamentals and Applications 2009, Honolulu, Hawaii, Jul. 12-17, 2009, 4 pages.

Harilal et al., "Lifecycle of laser-produced air sparks," Physics of Plasmas, vol. 22, Issue 6, 10.1063/1.4922076, Published Online Jun. 3, 2015, 35 pages.https://aip.scitation.org/doi/10.1063/1.4922076.

Howe et al., "Analog Amplitude Noise Modulation to Communicate Information," filed Jun. 14, 2023, U.S. Appl. No. 18/334,739, 208 pages.

Howe et al., "Pulse Noise Modulation to Encode Data," filed Dec. 16, 2022, U.S. Appl. No. 18/067,547, 98 pages.

Howe et al., "Radio Frequency Communications Using Laser Optical Breakdowns," filed Dec. 16, 2022, U.S. Appl. No. 18/067,516, 100 pages.

Kumar et al., "A reconfigurable plasma antenna," Journal of Applied Physics, vol. 107, Issue 5, 10.1063/1.3318495, Journal of Applied Physics > vol. 107, Issue 5, 10.1063/1.3318495, 10 pages. https://doi.org/10.1063/1.3318495, 2010.

Kumar et al., "Effect of laser intensity on radio frequency emissions from laser induced breakdown of atmospheric air," Journal of Applied Physics, vol. 119, Issue 21, 214904, Jun. 7, 2016, 9 pages.https://doi.org/10.1063/1.4953211.

Kumar et al., "Radio frequency emissions from laser induced material breakdown," 10th Asia Plasma and Fusion Association Conference, International Conference Series, Journal of Physics, Conference Series 823, (2017), 012008, 7 pages.

Kumar et al., "RF emissions from laser breakdown of target materials," 2013 International Conference on Microwave and Photonics (ICMAP), Dec. 13-15, 2013, 4 pages.doi: 10.1109/ICMAP.2013.6733512.

Kumar et al., "Spectral selective radio frequency emissions from laser induced breakdown of target materials," Applied Physics Letters, vol. 105, Issue 6, 10.1063/1.4893279, Published Online Aug. 13, 2014, 6 pages.https://doi.org/10.1063/1.4893279.

Mechain et al., "A virtual antenna produced in air by intense femtosecond laser pulses," European Symposium on Optics and Photonics for Defence and Security, Nov. 3, 2005, Bruges, Belgium, 7 pages.https://www.spiedigitallibrary.org/conference-proceedings-of-spie/5989/59890S/A-virtual-antenna-produced-in-air-by-intense-femtosecond-laser/10.1117/12.631202.short.

Pearlman et al., "Emission of rf radiation from laser-produced plasmas," Journal of Applied Physics, vol. 49, Issue 1, 457 (1978), Published Online Aug. 12, 2008, 4 pages.https://doi.org/10.1063/1.324360.

Stallings, "Spread Spectrum," Data and Computer Communications 7th Edition, Chapter 9, Feb. 2007, 28 pages. http://williamstallings.com/DCC/DCC7e.html.

Theberge et al., "Broadband and long lifetime plasma-antenna in air initiated by laser-guided discharge," Applied Physics Letters, vol. 111, Issue 7, Aug. 14, 2017, 5 pages.https://aip.scitation.org/doi/10.1063/1.4985045.

Wang et al., "Effect of laser energy and polarization on RF emission characteristics of laser induced air plasma," Eleventh International Conference on Information Optics and Photonics (CIOP 2019), 2019, Xi'an, China, Proceedings of SPIE vol. 11209, 8 pages.https://www.spiedigitallibrary.org/conference-proceedings-of-spie.

(56)                 References Cited

OTHER PUBLICATIONS

Antipov A A et al: "Microwave Generation in an Optical Breakdown Plasma Created by Modulated Laser Radiation", Soviet Journal of Quantum Electronics, American Institute of Physics, New York, NY, US, vol. 6, Jun. 1, 1990 (Jun. 1, 1990), pp. 664-666, XP000174924, ISSN: 0049-1748, DOI: 10.1070/QE1990V020N06ABEH006676.

European Patent Office Extended Search Report, dated Apr. 25, 2024, regarding Application No. EP23205184.7, 10 pages.

Griffiths et al., "Scalable visible light communications with a micro-LED array projector and high-speed smartphone camera," Optics Express, vol. 27, No. 11, May 27, 2019, pp. 15585-15594, https://opg.optica.org/oe/fulltext.cfm?uri=oe-27-11-15585&id=412698.

Li et al., "Optical Computing using hybrid encoded shadow casting," Rapid Communications, Applied Optics, vol. 25, No. 16, Aug. 15, 1986, 4 pages.

Zong Si-Guang et al: "Study of opto-acoustic communication between air and underwater carrier", Proceedings of SPIE; [Proceedings of SPIE ISSN 0277-786X vol. 10524], SPIE, US, vol. 10697, Feb. 20, 2018 (Feb. 20, 2018), pp. 106975S-106975S, XP060102900, DOI: 10.1117/12.2315446, ISBN: 978-1-5106-1533-5.

Office Action, dated Apr. 23, 2025, regarding U.S. Appl. No. 18/334,739, 87 pages.

Office Action, dated Apr. 4, 2025, regarding U.S. Appl. No. 18/067,547, 70 pages.

Budinger et al; Quaternary Pulse Position Modulation Electronics for Free-Space Laser Communication; 1991; NASA Techincal Memorandum 104502; pp. 1-21. (Year: 1991).

Li; Design of Digital Pulse-Position Modulation System based on minimum distance method—2022; International conference on Neural networks; pp. 1-8. (Year: 2022).

Office Action, dated Jan. 29, 2026, regarding U.S. Appl. No. 18/475,548, 86 pages.

Notice of Allowance, dated Apr. 21, 2026, regarding U.S. Appl. No. 18/475,548, 24 pages.

Office Action, dated Apr. 21, 2026, regarding U.S. Appl. No. 18/639,004, 77 pages.

* cited by examiner

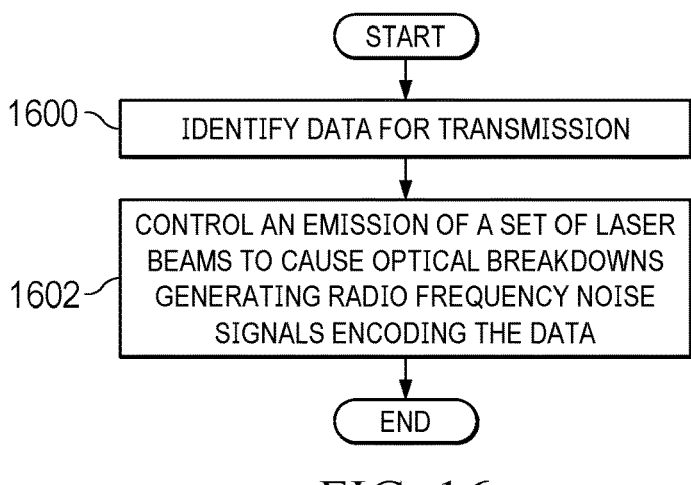

START

1600 — IDENTIFY DATA FOR TRANSMISSION

1602 — CONTROL AN EMISSION OF A SET OF LASER BEAMS TO CAUSE OPTICAL BREAKDOWNS GENERATING RADIO FREQUENCY NOISE SIGNALS ENCODING THE DATA

END

FIG. 16

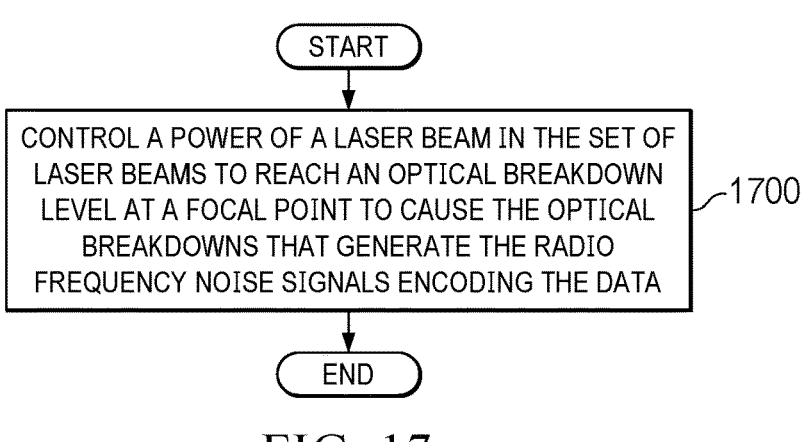

START

CONTROL A POWER OF A LASER BEAM IN THE SET OF LASER BEAMS TO REACH AN OPTICAL BREAKDOWN LEVEL AT A FOCAL POINT TO CAUSE THE OPTICAL BREAKDOWNS THAT GENERATE THE RADIO FREQUENCY NOISE SIGNALS ENCODING THE DATA — 1700

END

FIG. 17

START

1800 — CONTROL A POWER OF A LASER BEAM IN THE SET OF LASER BEAMS TO REACH AN OPTICAL BREAKDOWN LEVEL AT AN INTERSECTION POINT TO CAUSE THE OPTICAL BREAKDOWNS THAT GENERATE THE RADIO FREQUENCY NOISE SIGNALS ENCODING THE DATA

END

FIG. 18

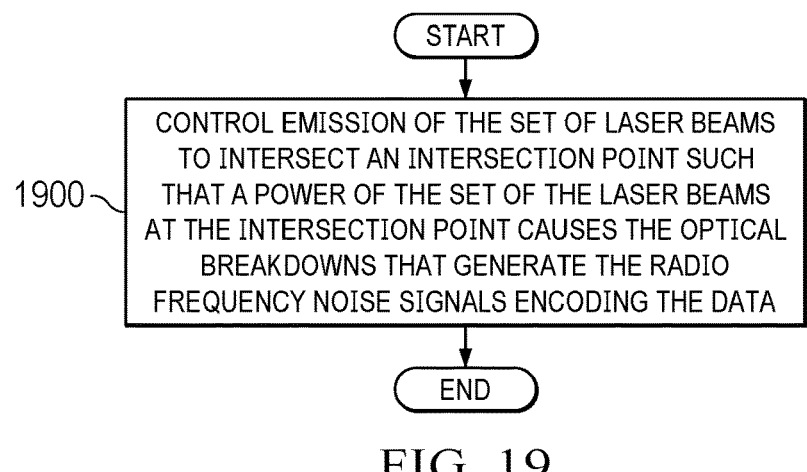

1900

CONTROL EMISSION OF THE SET OF LASER BEAMS TO INTERSECT AN INTERSECTION POINT SUCH THAT A POWER OF THE SET OF THE LASER BEAMS AT THE INTERSECTION POINT CAUSES THE OPTICAL BREAKDOWNS THAT GENERATE THE RADIO FREQUENCY NOISE SIGNALS ENCODING THE DATA

FIG. 19

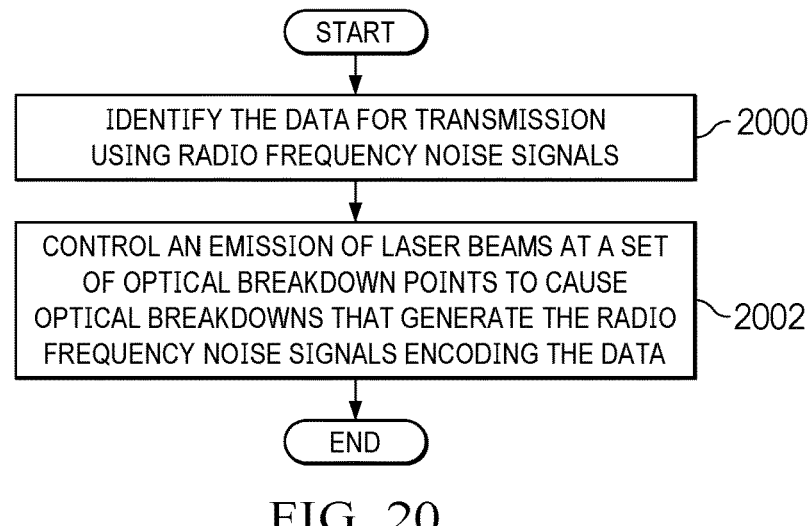

IDENTIFY THE DATA FOR TRANSMISSION USING RADIO FREQUENCY NOISE SIGNALS — 2000

CONTROL AN EMISSION OF LASER BEAMS AT A SET OF OPTICAL BREAKDOWN POINTS TO CAUSE OPTICAL BREAKDOWNS THAT GENERATE THE RADIO FREQUENCY NOISE SIGNALS ENCODING THE DATA — 2002

FIG. 20

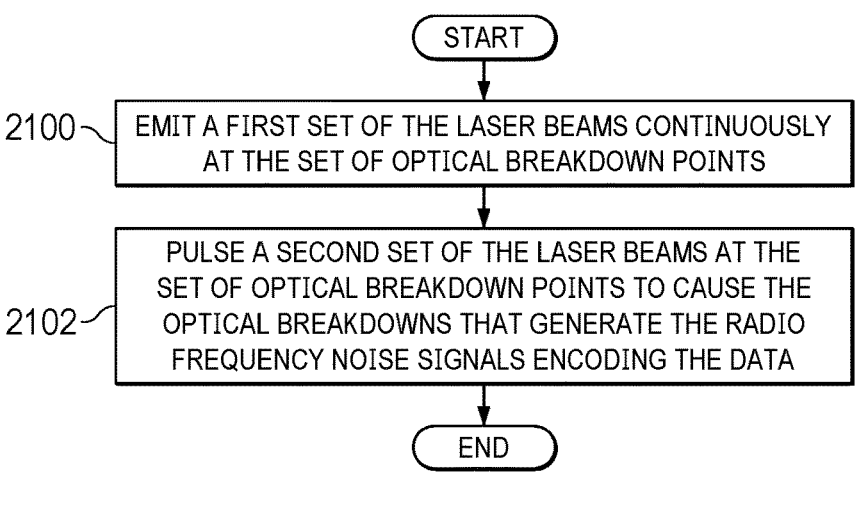

2100 — EMIT A FIRST SET OF THE LASER BEAMS CONTINUOUSLY AT THE SET OF OPTICAL BREAKDOWN POINTS

PULSE A SECOND SET OF THE LASER BEAMS AT THE SET OF OPTICAL BREAKDOWN POINTS TO CAUSE THE OPTICAL BREAKDOWNS THAT GENERATE THE RADIO FREQUENCY NOISE SIGNALS ENCODING THE DATA — 2102

FIG. 21

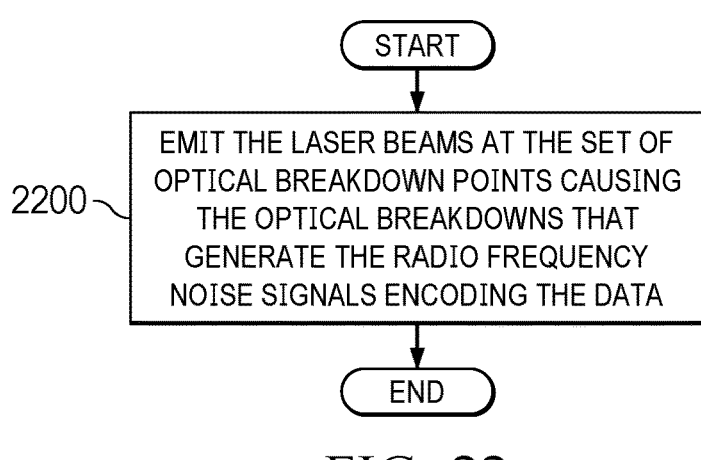

2200 ~

START

EMIT THE LASER BEAMS AT THE SET OF OPTICAL BREAKDOWN POINTS CAUSING THE OPTICAL BREAKDOWNS THAT GENERATE THE RADIO FREQUENCY NOISE SIGNALS ENCODING THE DATA

END

FIG. 22

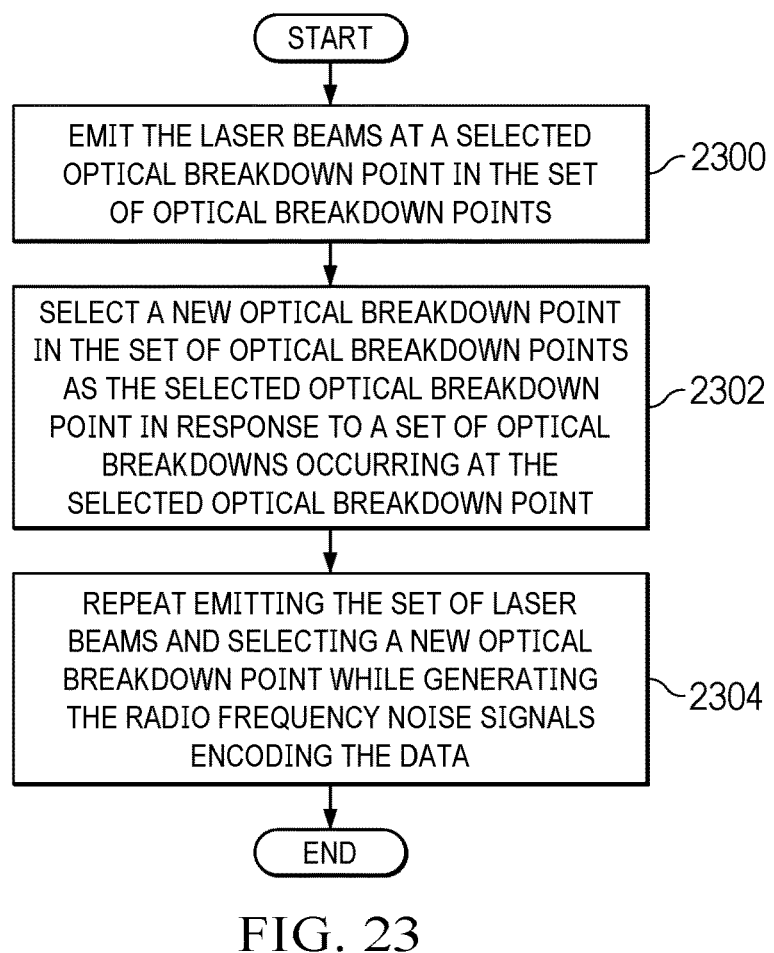

START

EMIT THE LASER BEAMS AT A SELECTED OPTICAL BREAKDOWN POINT IN THE SET OF OPTICAL BREAKDOWN POINTS — 2300

SELECT A NEW OPTICAL BREAKDOWN POINT IN THE SET OF OPTICAL BREAKDOWN POINTS AS THE SELECTED OPTICAL BREAKDOWN POINT IN RESPONSE TO A SET OF OPTICAL BREAKDOWNS OCCURRING AT THE SELECTED OPTICAL BREAKDOWN POINT — 2302

REPEAT EMITTING THE SET OF LASER BEAMS AND SELECTING A NEW OPTICAL BREAKDOWN POINT WHILE GENERATING THE RADIO FREQUENCY NOISE SIGNALS ENCODING THE DATA ~ 2304

END

FIG. 23

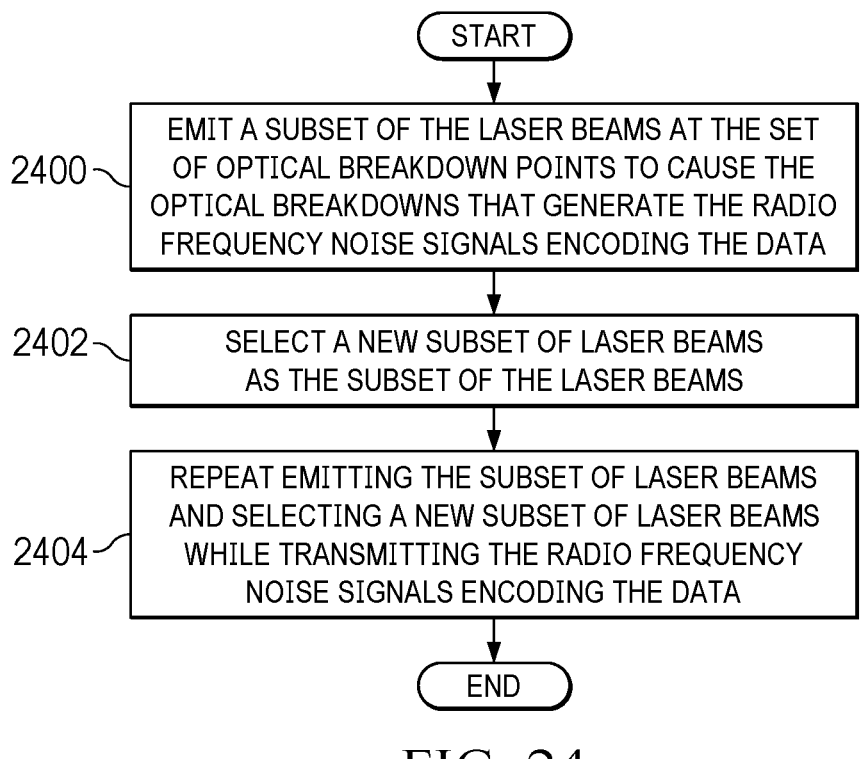

START

2400 — EMIT A SUBSET OF THE LASER BEAMS AT THE SET OF OPTICAL BREAKDOWN POINTS TO CAUSE THE OPTICAL BREAKDOWNS THAT GENERATE THE RADIO FREQUENCY NOISE SIGNALS ENCODING THE DATA

2402 — SELECT A NEW SUBSET OF LASER BEAMS AS THE SUBSET OF THE LASER BEAMS

2404 — REPEAT EMITTING THE SUBSET OF LASER BEAMS AND SELECTING A NEW SUBSET OF LASER BEAMS WHILE TRANSMITTING THE RADIO FREQUENCY NOISE SIGNALS ENCODING THE DATA

END

FIG. 24

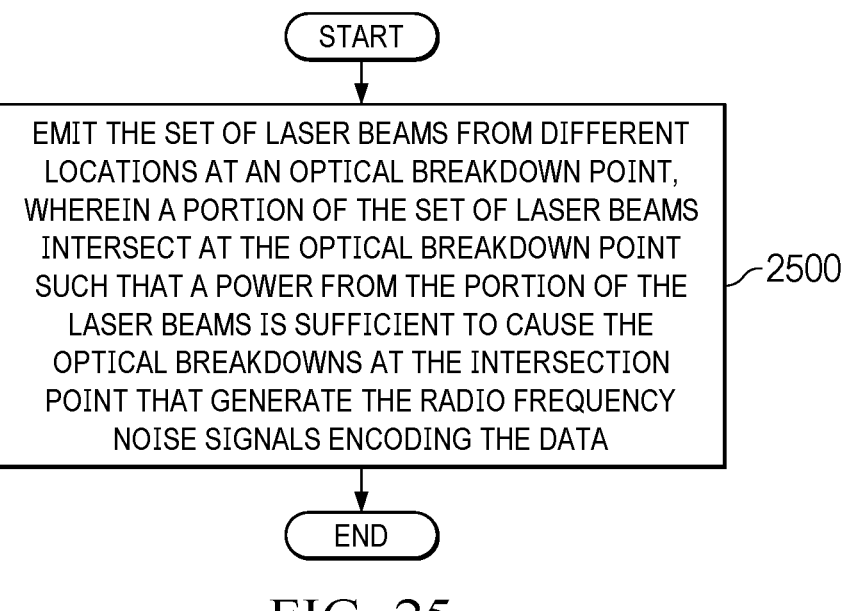

START

EMIT THE SET OF LASER BEAMS FROM DIFFERENT LOCATIONS AT AN OPTICAL BREAKDOWN POINT, WHEREIN A PORTION OF THE SET OF LASER BEAMS INTERSECT AT THE OPTICAL BREAKDOWN POINT SUCH THAT A POWER FROM THE PORTION OF THE LASER BEAMS IS SUFFICIENT TO CAUSE THE OPTICAL BREAKDOWNS AT THE INTERSECTION POINT THAT GENERATE THE RADIO FREQUENCY NOISE SIGNALS ENCODING THE DATA — 2500

END

CONTROL EMISSION OF A SET OF LASER BEAMS FROM A LASER BEAM GENERATOR TO CAUSE OPTICAL BREAKDOWNS THAT GENERATE THE PULSES OF THE RADIO FREQUENCY NOISE SIGNALS THAT ENCODE THE DATA

GENERATE A CARRIER RADIO FREQUENCY NOISE SIGNAL — 3000

MODULATE THE CARRIER NOISE SIGNAL TO FORM THE PULSES OF THE NOISE SIGNALS — 3002

TRANSMIT THE PULSES OF NOISE SIGNALS — 3004

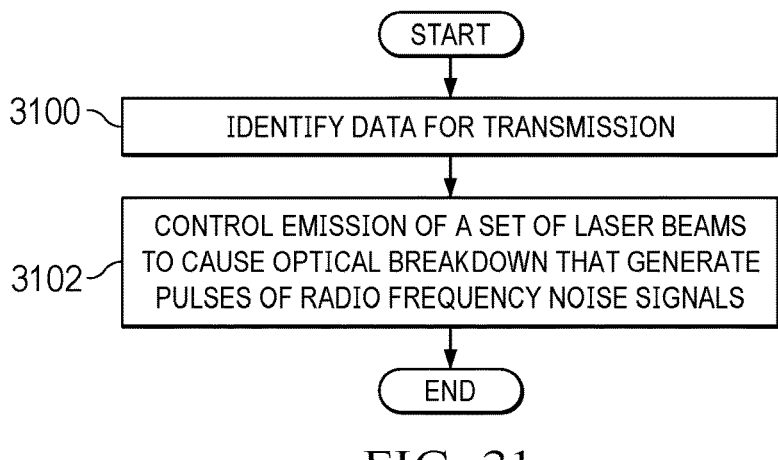

START

3100 — IDENTIFY DATA FOR TRANSMISSION

3102 — CONTROL EMISSION OF A SET OF LASER BEAMS TO CAUSE OPTICAL BREAKDOWN THAT GENERATE PULSES OF RADIO FREQUENCY NOISE SIGNALS

END

FIG. 31

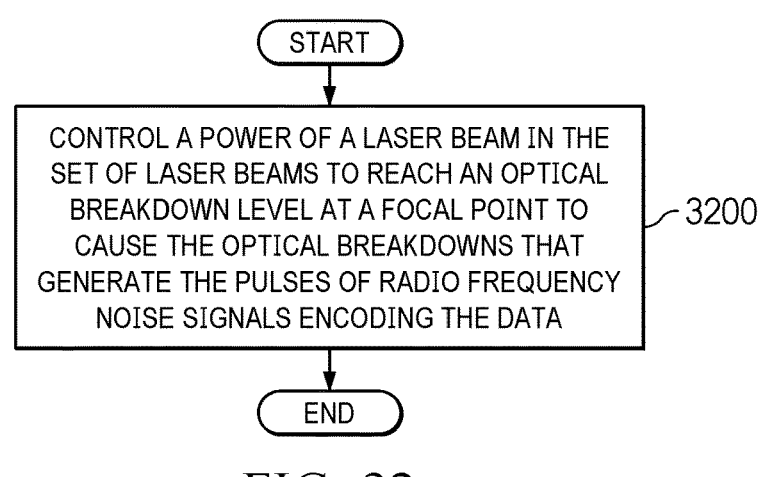

START

CONTROL A POWER OF A LASER BEAM IN THE SET OF LASER BEAMS TO REACH AN OPTICAL BREAKDOWN LEVEL AT A FOCAL POINT TO CAUSE THE OPTICAL BREAKDOWNS THAT GENERATE THE PULSES OF RADIO FREQUENCY NOISE SIGNALS ENCODING THE DATA — 3200

END

FIG. 32

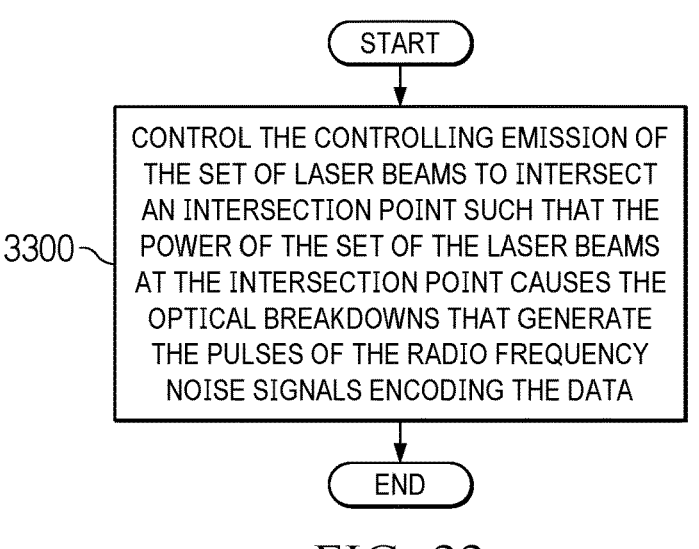

START

CONTROL THE CONTROLLING EMISSION OF THE SET OF LASER BEAMS TO INTERSECT AN INTERSECTION POINT SUCH THAT THE POWER OF THE SET OF THE LASER BEAMS AT THE INTERSECTION POINT CAUSES THE OPTICAL BREAKDOWNS THAT GENERATE THE PULSES OF THE RADIO FREQUENCY NOISE SIGNALS ENCODING THE DATA

3300 —

END

FIG. 33

3400 — RECEIVE PULSES OF NOISE SIGNALS

3402 — DECODE THE DATA ENCODED IN THE PULSES OF THE NOISE SIGNALS USING A SET OF CHARACTERISTICS OF THE PULSES OF THE NOISE SIGNALS

RECEIVE SIGNALS IN A FREQUENCY RANGE THAT INCLUDES THE PULSES OF THE NOISE SIGNALS ENCODING THE DATA — 3500

IDENTIFY THE PULSES OF THE NOISE SIGNALS IN THE FREQUENCY RANGE — 3502

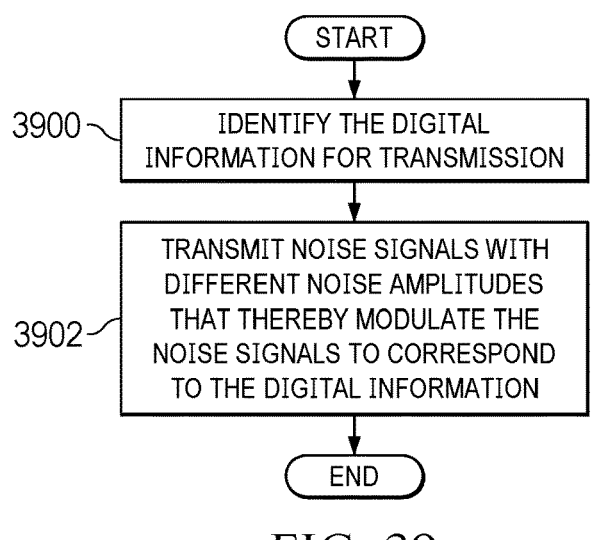

3900 — IDENTIFY THE DIGITAL INFORMATION FOR TRANSMISSION

3902 — TRANSMIT NOISE SIGNALS WITH DIFFERENT NOISE AMPLITUDES THAT THEREBY MODULATE THE NOISE SIGNALS TO CORRESPOND TO THE DIGITAL INFORMATION

FIG. 39

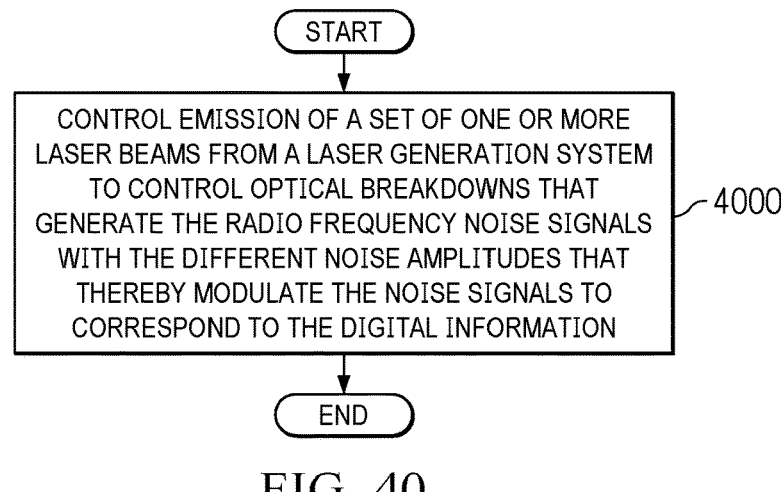

CONTROL EMISSION OF A SET OF ONE OR MORE LASER BEAMS FROM A LASER GENERATION SYSTEM TO CONTROL OPTICAL BREAKDOWNS THAT GENERATE THE RADIO FREQUENCY NOISE SIGNALS WITH THE DIFFERENT NOISE AMPLITUDES THAT THEREBY MODULATE THE NOISE SIGNALS TO CORRESPOND TO THE DIGITAL INFORMATION — 4000

FIG. 40

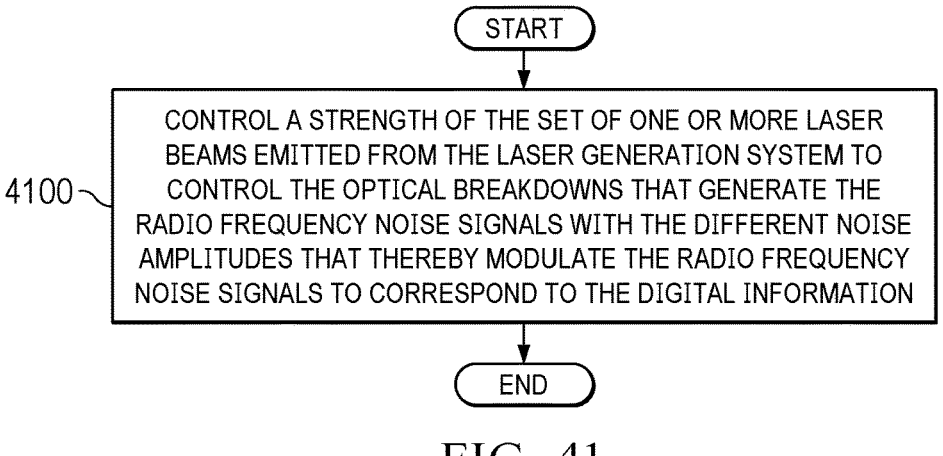

4100 — CONTROL A STRENGTH OF THE SET OF ONE OR MORE LASER BEAMS EMITTED FROM THE LASER GENERATION SYSTEM TO CONTROL THE OPTICAL BREAKDOWNS THAT GENERATE THE RADIO FREQUENCY NOISE SIGNALS WITH THE DIFFERENT NOISE AMPLITUDES THAT THEREBY MODULATE THE RADIO FREQUENCY NOISE SIGNALS TO CORRESPOND TO THE DIGITAL INFORMATION

FIG. 41

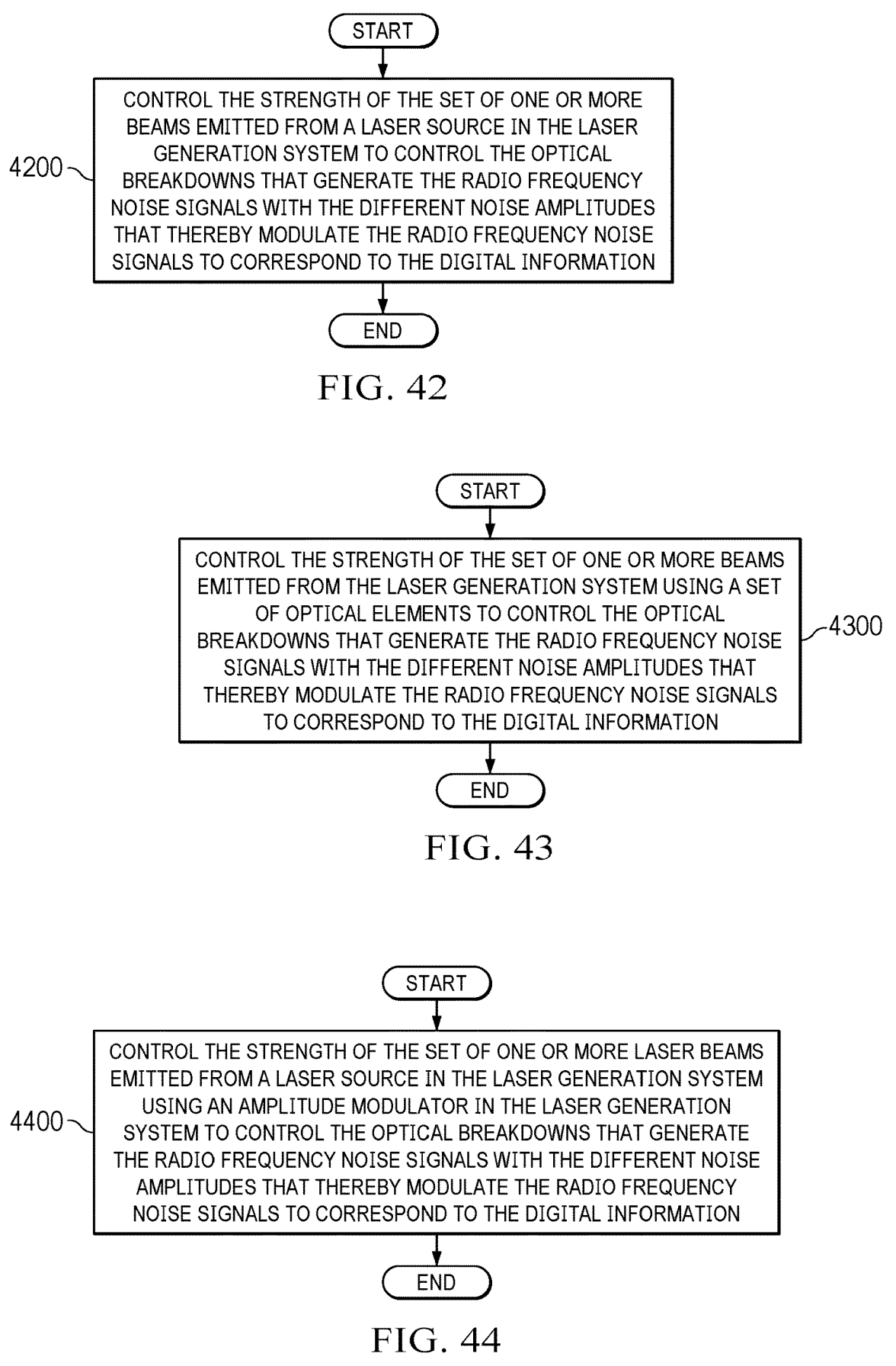

START

4200 → CONTROL THE STRENGTH OF THE SET OF ONE OR MORE BEAMS EMITTED FROM A LASER SOURCE IN THE LASER GENERATION SYSTEM TO CONTROL THE OPTICAL BREAKDOWNS THAT GENERATE THE RADIO FREQUENCY NOISE SIGNALS WITH THE DIFFERENT NOISE AMPLITUDES THAT THEREBY MODULATE THE RADIO FREQUENCY NOISE SIGNALS TO CORRESPOND TO THE DIGITAL INFORMATION

END

FIG. 42

START

CONTROL THE STRENGTH OF THE SET OF ONE OR MORE BEAMS EMITTED FROM THE LASER GENERATION SYSTEM USING A SET OF OPTICAL ELEMENTS TO CONTROL THE OPTICAL BREAKDOWNS THAT GENERATE THE RADIO FREQUENCY NOISE SIGNALS WITH THE DIFFERENT NOISE AMPLITUDES THAT THEREBY MODULATE THE RADIO FREQUENCY NOISE SIGNALS TO CORRESPOND TO THE DIGITAL INFORMATION → 4300

END

FIG. 43

START

4400 → CONTROL THE STRENGTH OF THE SET OF ONE OR MORE LASER BEAMS EMITTED FROM A LASER SOURCE IN THE LASER GENERATION SYSTEM USING AN AMPLITUDE MODULATOR IN THE LASER GENERATION SYSTEM TO CONTROL THE OPTICAL BREAKDOWNS THAT GENERATE THE RADIO FREQUENCY NOISE SIGNALS WITH THE DIFFERENT NOISE AMPLITUDES THAT THEREBY MODULATE THE RADIO FREQUENCY NOISE SIGNALS TO CORRESPOND TO THE DIGITAL INFORMATION

END

FIG. 44

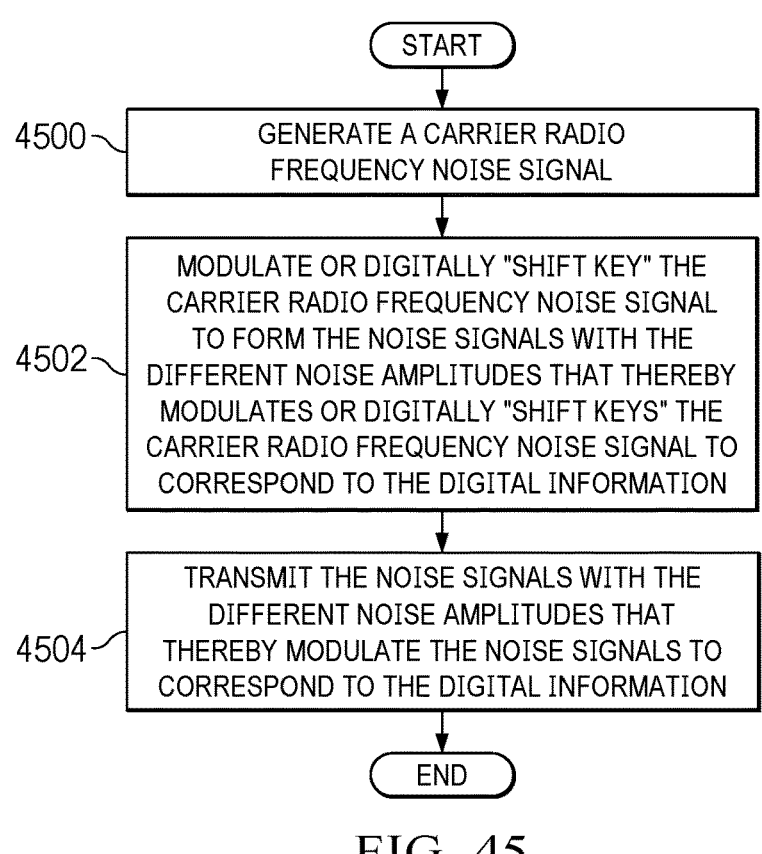

START

4500   GENERATE A CARRIER RADIO
FREQUENCY NOISE SIGNAL

4502   MODULATE OR DIGITALLY "SHIFT KEY" THE
CARRIER RADIO FREQUENCY NOISE SIGNAL
TO FORM THE NOISE SIGNALS WITH THE
DIFFERENT NOISE AMPLITUDES THAT THEREBY
MODULATES OR DIGITALLY "SHIFT KEYS" THE
CARRIER RADIO FREQUENCY NOISE SIGNAL TO
CORRESPOND TO THE DIGITAL INFORMATION

4504   TRANSMIT THE NOISE SIGNALS WITH THE
DIFFERENT NOISE AMPLITUDES THAT
THEREBY MODULATE THE NOISE SIGNALS TO
CORRESPOND TO THE DIGITAL INFORMATION

END

FIG. 45

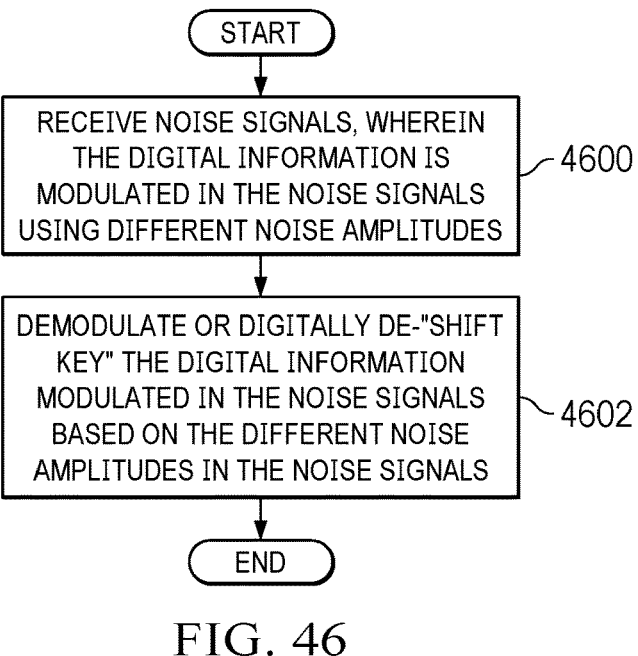

START

RECEIVE NOISE SIGNALS, WHEREIN
THE DIGITAL INFORMATION IS
MODULATED IN THE NOISE SIGNALS
USING DIFFERENT NOISE AMPLITUDES   4600

DEMODULATE OR DIGITALLY DE-"SHIFT
KEY" THE DIGITAL INFORMATION
MODULATED IN THE NOISE SIGNALS
BASED ON THE DIFFERENT NOISE
AMPLITUDES IN THE NOISE SIGNALS   4602

END

FIG. 46

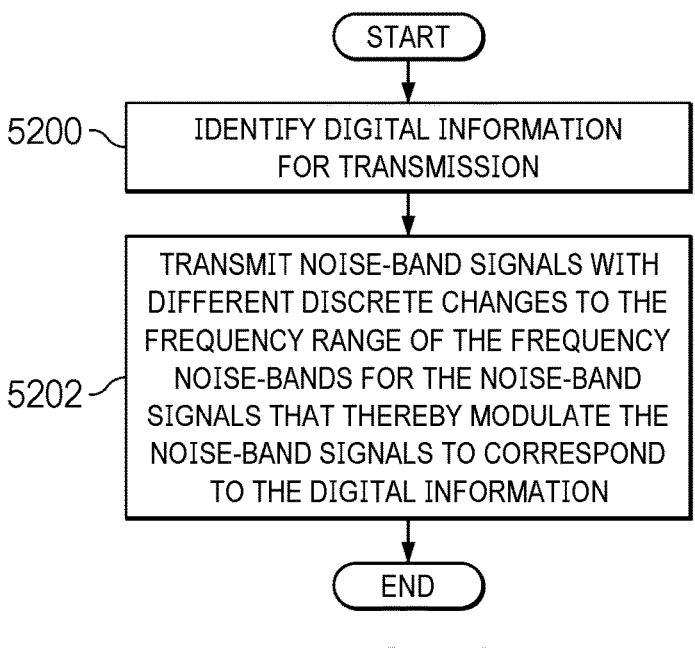

5200 — IDENTIFY DIGITAL INFORMATION FOR TRANSMISSION

5202 — TRANSMIT NOISE-BAND SIGNALS WITH DIFFERENT DISCRETE CHANGES TO THE FREQUENCY RANGE OF THE FREQUENCY NOISE-BANDS FOR THE NOISE-BAND SIGNALS THAT THEREBY MODULATE THE NOISE-BAND SIGNALS TO CORRESPOND TO THE DIGITAL INFORMATION

FIG. 52

START

CONTROL EMISSION OF A SET OF ONE OR MORE LASER BEAMS FROM A LASER GENERATION SYSTEM TO CONTROL OPTICAL BREAKDOWNS THAT GENERATE RADIO FREQUENCY NOISE-BAND SIGNALS HAVING DIFFERENT DISCRETE CHANGES OF THE FREQUENCY NOISE-BANDS FOR THE NOISE-BAND SIGNALS THAT THEREBY MODULATE THE RADIO FREQUENCY NOISE-BAND SIGNALS TO CORRESPOND TO THE DIGITAL INFORMATION — 5300

END

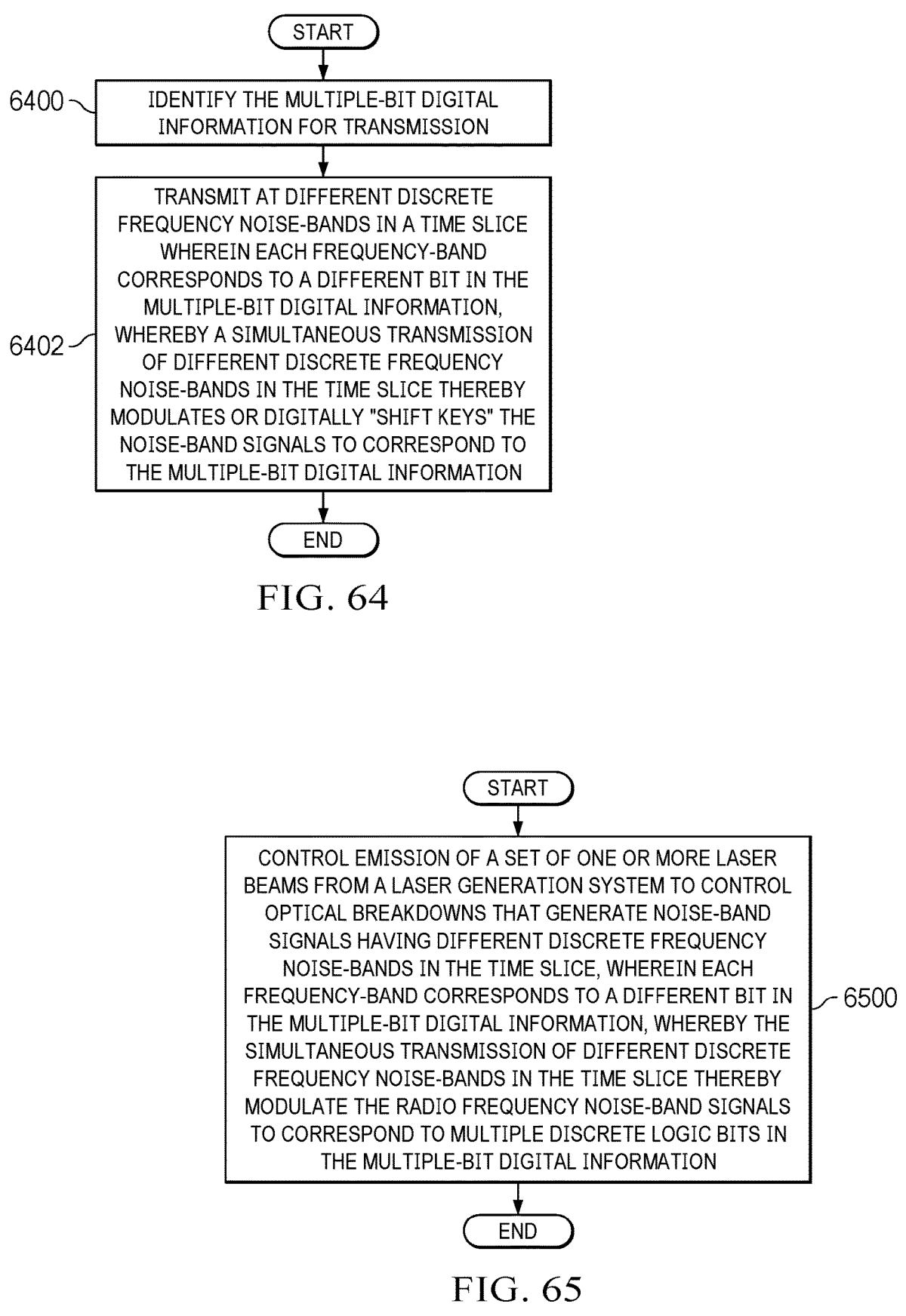

START

6400 ~ IDENTIFY THE MULTIPLE-BIT DIGITAL
INFORMATION FOR TRANSMISSION

6402 ~ TRANSMIT AT DIFFERENT DISCRETE
FREQUENCY NOISE-BANDS IN A TIME SLICE
WHEREIN EACH FREQUENCY-BAND
CORRESPONDS TO A DIFFERENT BIT IN THE
MULTIPLE-BIT DIGITAL INFORMATION,
WHEREBY A SIMULTANEOUS TRANSMISSION
OF DIFFERENT DISCRETE FREQUENCY
NOISE-BANDS IN THE TIME SLICE THEREBY
MODULATES OR DIGITALLY "SHIFT KEYS" THE
NOISE-BAND SIGNALS TO CORRESPOND TO
THE MULTIPLE-BIT DIGITAL INFORMATION

END

FIG. 64

START

CONTROL EMISSION OF A SET OF ONE OR MORE LASER
BEAMS FROM A LASER GENERATION SYSTEM TO CONTROL
OPTICAL BREAKDOWNS THAT GENERATE NOISE-BAND
SIGNALS HAVING DIFFERENT DISCRETE FREQUENCY
NOISE-BANDS IN THE TIME SLICE, WHEREIN EACH
FREQUENCY-BAND CORRESPONDS TO A DIFFERENT BIT IN
THE MULTIPLE-BIT DIGITAL INFORMATION, WHEREBY THE
SIMULTANEOUS TRANSMISSION OF DIFFERENT DISCRETE
FREQUENCY NOISE-BANDS IN THE TIME SLICE THEREBY
MODULATE THE RADIO FREQUENCY NOISE-BAND SIGNALS
TO CORRESPOND TO MULTIPLE DISCRETE LOGIC BITS IN
THE MULTIPLE-BIT DIGITAL INFORMATION     ~ 6500

END

FIG. 65

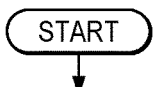

6600 ~

CONTROL THE EMISSION OF THE SET OF ONE OR MORE LASER BEAMS FROM THE LASER GENERATION SYSTEM TO CONTROL THE OPTICAL BREAKDOWNS WITHIN THE TIME SLICE THAT GENERATE THE RADIO FREQUENCY NOISE-BAND SIGNALS WITH DIFFERENT DISCRETE CHANGES OF CENTER POINT OF THE FREQUENCY NOISE-BANDS FOR THE RADIO FREQUENCY NOISE-BAND SIGNALS, WHEREIN DIFFERENT DISCRETE CHANGES OF THE CENTER POINT OF THE DIFFERENT DISCRETE FREQUENCY NOISE-BANDS FOR THE RADIO FREQUENCY NOISE-BAND SIGNALS IN THE TIME SLICE CORRESPOND TO THE MULTIPLE DISCRETE LOGIC BITS IN THE MULTIPLE-BIT DIGITAL INFORMATION

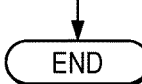

FIG. 66

CONTROL THE EMISSION OF THE SET OF ONE OR MORE LASER BEAMS FROM THE LASER GENERATION SYSTEM TO CONTROL THE OPTICAL BREAKDOWNS THAT GENERATE THE RADIO FREQUENCY NOISE-BAND SIGNALS IN THE TIME SLICE BY VARYING A WIDTH OF THE DIFFERENT DISCRETE FREQUENCY NOISE-BANDS FOR THE RADIO FREQUENCY NOISE-BAND SIGNALS IN THE TIME SLICE, WHEREIN DIFFERENT WIDTHS OF THE FREQUENCY NOISE-BANDS FOR THE RADIO FREQUENCY NOISE-BAND SIGNALS IN THE TIME SLICE CORRESPOND TO DIFFERENT SETS OF MULTIPLE DISCRETE LOGIC BITS AND THEREBY MODULATE THE RADIO FREQUENCY NOISE-BAND SIGNALS TO CORRESPOND TO THE MULTIPLE-BIT DIGITAL INFORMATION

~ 6700

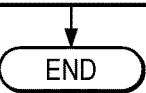

FIG. 67

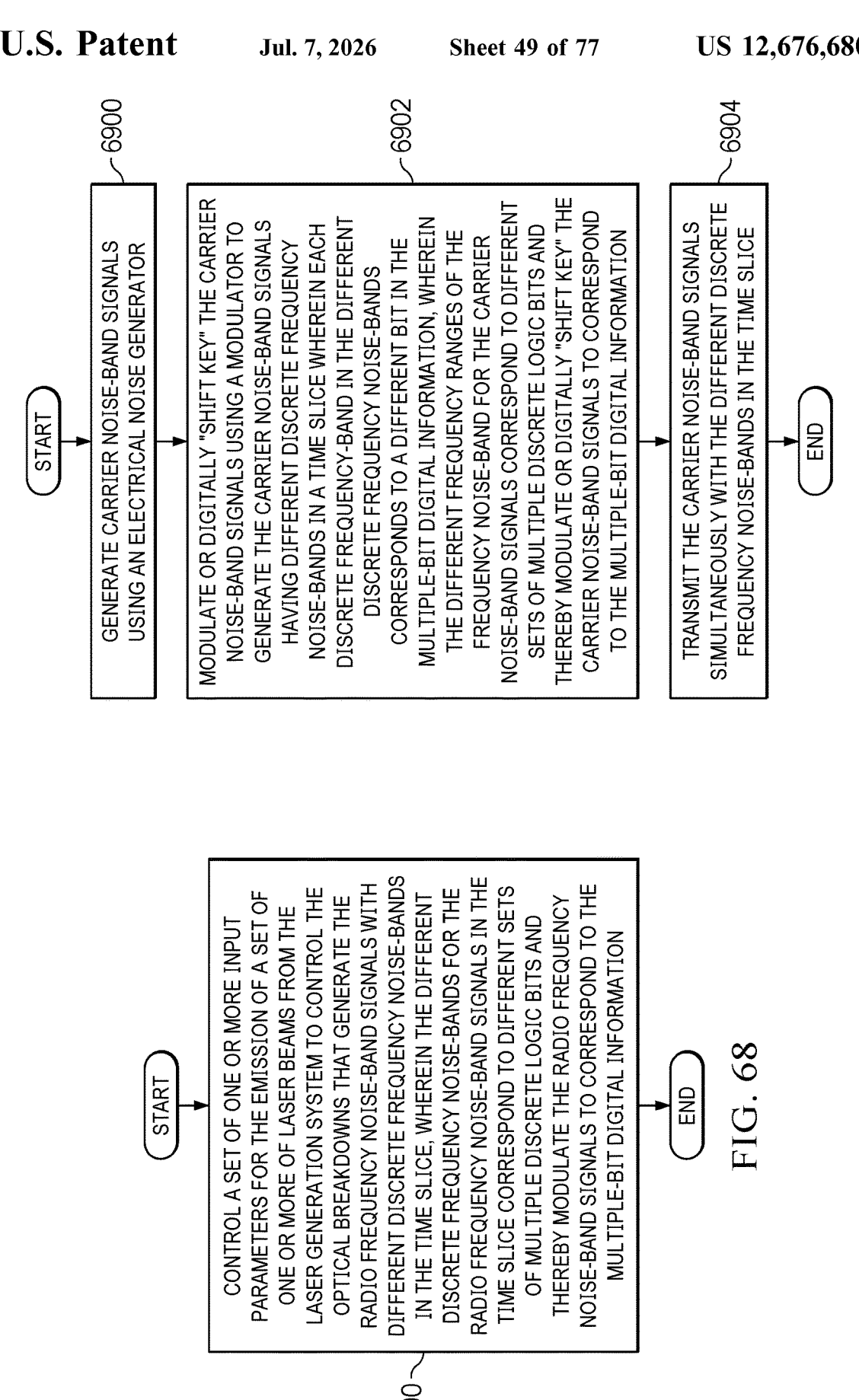

START

GENERATE CARRIER NOISE-BAND SIGNALS USING AN ELECTRICAL NOISE GENERATOR

6900

MODULATE OR DIGITALLY "SHIFT KEY" THE CARRIER NOISE-BAND SIGNALS USING A MODULATOR TO GENERATE THE CARRIER NOISE-BAND SIGNALS HAVING DIFFERENT DISCRETE FREQUENCY NOISE-BANDS IN A TIME SLICE WHEREIN EACH DISCRETE FREQUENCY-BAND IN THE DIFFERENT DISCRETE FREQUENCY NOISE-BANDS CORRESPONDS TO A DIFFERENT BIT IN THE MULTIPLE-BIT DIGITAL INFORMATION, WHEREIN THE DIFFERENT FREQUENCY RANGES OF THE FREQUENCY NOISE-BAND FOR THE CARRIER NOISE-BAND SIGNALS CORRESPOND TO DIFFERENT SETS OF MULTIPLE DISCRETE LOGIC BITS AND THEREBY MODULATE OR DIGITALLY "SHIFT KEY" THE CARRIER NOISE-BAND SIGNALS TO CORRESPOND TO THE MULTIPLE-BIT DIGITAL INFORMATION

6902

TRANSMIT THE CARRIER NOISE-BAND SIGNALS SIMULTANEOUSLY WITH THE DIFFERENT DISCRETE FREQUENCY NOISE-BANDS IN THE TIME SLICE

6904

END

FIG. 69

START

CONTROL A SET OF ONE OR MORE INPUT PARAMETERS FOR THE EMISSION OF A SET OF ONE OR MORE OF LASER BEAMS FROM THE LASER GENERATION SYSTEM TO CONTROL THE OPTICAL BREAKDOWNS THAT GENERATE THE RADIO FREQUENCY NOISE-BAND SIGNALS WITH DIFFERENT DISCRETE FREQUENCY NOISE-BANDS IN THE TIME SLICE, WHEREIN THE DIFFERENT DISCRETE FREQUENCY NOISE-BANDS FOR THE RADIO FREQUENCY NOISE-BAND SIGNALS IN THE TIME SLICE CORRESPOND TO DIFFERENT SETS OF MULTIPLE DISCRETE LOGIC BITS AND THEREBY MODULATE THE RADIO FREQUENCY NOISE-BAND SIGNALS TO CORRESPOND TO THE MULTIPLE-BIT DIGITAL INFORMATION

END

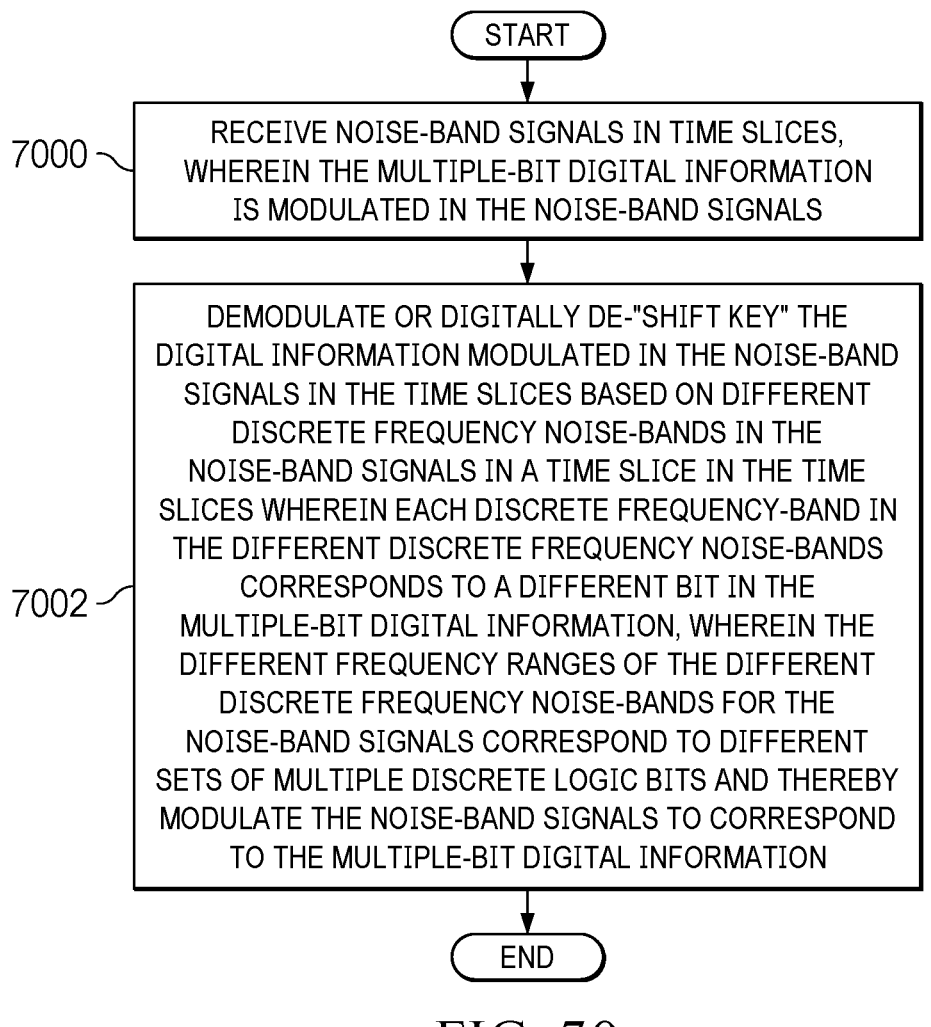

START

7000 — RECEIVE NOISE-BAND SIGNALS IN TIME SLICES, WHEREIN THE MULTIPLE-BIT DIGITAL INFORMATION IS MODULATED IN THE NOISE-BAND SIGNALS

7002 — DEMODULATE OR DIGITALLY DE-"SHIFT KEY" THE DIGITAL INFORMATION MODULATED IN THE NOISE-BAND SIGNALS IN THE TIME SLICES BASED ON DIFFERENT DISCRETE FREQUENCY NOISE-BANDS IN THE NOISE-BAND SIGNALS IN A TIME SLICE IN THE TIME SLICES WHEREIN EACH DISCRETE FREQUENCY-BAND IN THE DIFFERENT DISCRETE FREQUENCY NOISE-BANDS CORRESPONDS TO A DIFFERENT BIT IN THE MULTIPLE-BIT DIGITAL INFORMATION, WHEREIN THE DIFFERENT FREQUENCY RANGES OF THE DIFFERENT DISCRETE FREQUENCY NOISE-BANDS FOR THE NOISE-BAND SIGNALS CORRESPOND TO DIFFERENT SETS OF MULTIPLE DISCRETE LOGIC BITS AND THEREBY MODULATE THE NOISE-BAND SIGNALS TO CORRESPOND TO THE MULTIPLE-BIT DIGITAL INFORMATION

END

FIG. 70

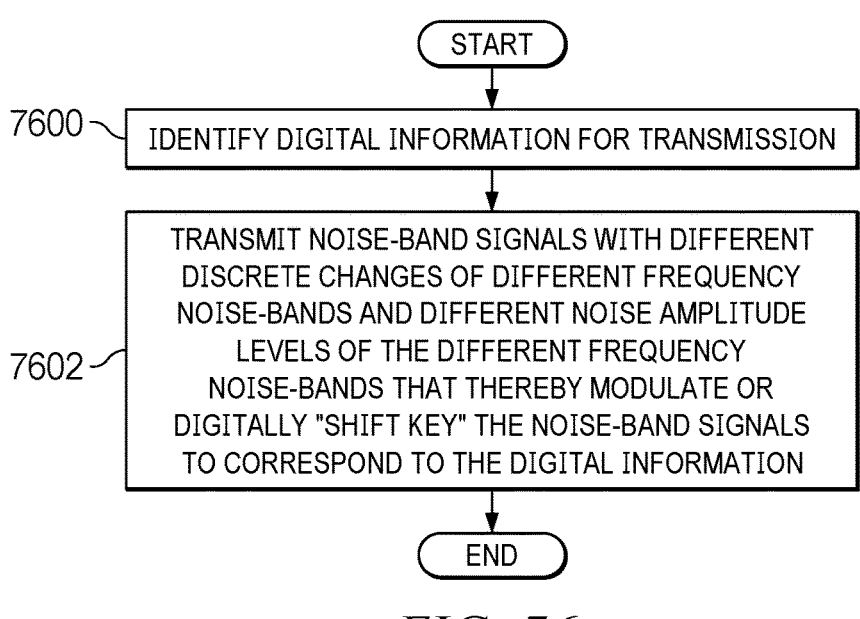

START

7600 — IDENTIFY DIGITAL INFORMATION FOR TRANSMISSION

7602 — TRANSMIT NOISE-BAND SIGNALS WITH DIFFERENT DISCRETE CHANGES OF DIFFERENT FREQUENCY NOISE-BANDS AND DIFFERENT NOISE AMPLITUDE LEVELS OF THE DIFFERENT FREQUENCY NOISE-BANDS THAT THEREBY MODULATE OR DIGITALLY "SHIFT KEY" THE NOISE-BAND SIGNALS TO CORRESPOND TO THE DIGITAL INFORMATION

END

FIG. 76

START

CONTROL AN EMISSION OF A SET OF ONE OR MORE LASER BEAMS FROM THE LASER GENERATION SYSTEM TO CONTROL OPTICAL BREAKDOWNS THAT GENERATE THE RADIO FREQUENCY NOISE-BAND SIGNALS WITH THE DIFFERENT DISCRETE CHANGES OF THE DIFFERENT FREQUENCY NOISE-BANDS AND THE DIFFERENT NOISE AMPLITUDE LEVELS OF THE DIFFERENT FREQUENCY NOISE-BANDS THAT THEREBY MODULATE OR DIGITALLY "SHIFT KEY" THE RADIO FREQUENCY NOISE-BAND SIGNALS TO  CORRESPOND TO THE DIGITAL INFORMATION — 7700

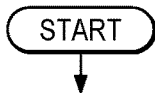

END

FIG. 77

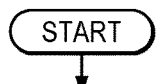

77A00 CONTROL THE EMISSION OF THE SET OF ONE OR MORE LASER BEAMS FROM THE LASER GENERATION SYSTEM TO CONTROL THE OPTICAL BREAKDOWNS THAT GENERATE THE RADIO FREQUENCY NOISE-BAND SIGNALS BY VARYING ONE OR MORE FREQUENCY LOCATIONS OF ONE OR MORE CENTER POINTS OF THE DIFFERENT FREQUENCY NOISE-BANDS FOR THE RADIO FREQUENCY NOISE-BAND SIGNALS AND VARYING THE DIFFERENT NOISE AMPLITUDE LEVELS OF THE DIFFERENT FREQUENCY NOISE-BANDS OF THE RADIO FREQUENCY NOISE-BAND SIGNALS THAT THEREBY MODULATES OR DIGITALLY "SHIFT KEYS" THE RADIO FREQUENCY NOISE-BAND SIGNALS TO CORRESPOND TO THE DIGITAL INFORMATION

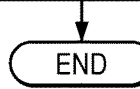

FIG. 77A

CONTROL THE EMISSION OF THE SET OF ONE OR MORE LASER BEAMS FROM THE LASER GENERATION SYSTEM TO CONTROL THE OPTICAL BREAKDOWNS THAT GENERATE THE RADIO FREQUENCY NOISE-BAND SIGNALS BY VARYING ONE OR MORE WIDTHS OF THE DIFFERENT FREQUENCY NOISE-BANDS FOR THE RADIO FREQUENCY NOISE-BAND SIGNALS AND VARYING THE DIFFERENT NOISE AMPLITUDE LEVELS OF THE DIFFERENT FREQUENCY NOISE-BANDS FOR THE RADIO FREQUENCY NOISE-BAND SIGNALS THAT THEREBY MODULATES OR DIGITALLY "SHIFT KEYS" THE RADIO FREQUENCY NOISE-BAND SIGNALS TO CORRESPOND TO THE DIGITAL INFORMATION — 7800

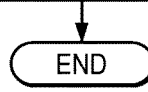

FIG. 78

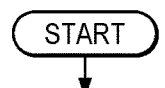

7900 ~

CONTROL A SET OF ONE OR MORE INPUT PARAMETERS FOR THE EMISSION OF A SET OF ONE OR MORE OF LASER BEAMS FROM THE LASER GENERATION SYSTEM TO CONTROL THE OPTICAL BREAKDOWNS THAT GENERATE THE RADIO FREQUENCY NOISE-BAND SIGNALS WITH THE DIFFERENT DISCRETE CHANGES OF THE DIFFERENT FREQUENCY NOISE-BANDS AND THE DIFFERENT NOISE AMPLITUDE LEVELS OF THE DIFFERENT NOISE AMPLITUDES OF THE DIFFERENT FREQUENCY NOISE-BANDS THAT THEREBY MODULATES OR DIGITALLY "SHIFT KEYS" THE RADIO FREQUENCY NOISE-BAND SIGNALS TO CORRESPOND TO THE DIGITAL INFORMATION

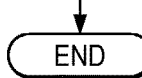

FIG. 79

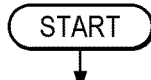

CONTROL ONE OR MORE COLORS OF THE SET OF ONE OR MORE LASER BEAMS EMITTED FROM THE LASER GENERATION SYSTEM TO CONTROL THE OPTICAL BREAKDOWNS THAT GENERATE THE RADIO FREQUENCY NOISE-BAND SIGNALS BY VARYING A WIDTH OF THE DIFFERENT FREQUENCY NOISE-BANDS FOR THE RADIO FREQUENCY NOISE-BAND SIGNALS AND VARYING A NOISE AMPLITUDE LEVEL OF THE DIFFERENT FREQUENCY NOISE-BANDS FOR THE RADIO FREQUENCY NOISE-BAND SIGNALS THAT THEREBY MODULATE OR DIGITALLY "SHIFT KEY" THE RADIO FREQUENCY NOISE-BAND SIGNALS TO CORRESPOND TO THE DIGITAL INFORMATION

~ 8000

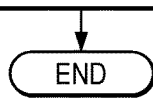

FIG. 80

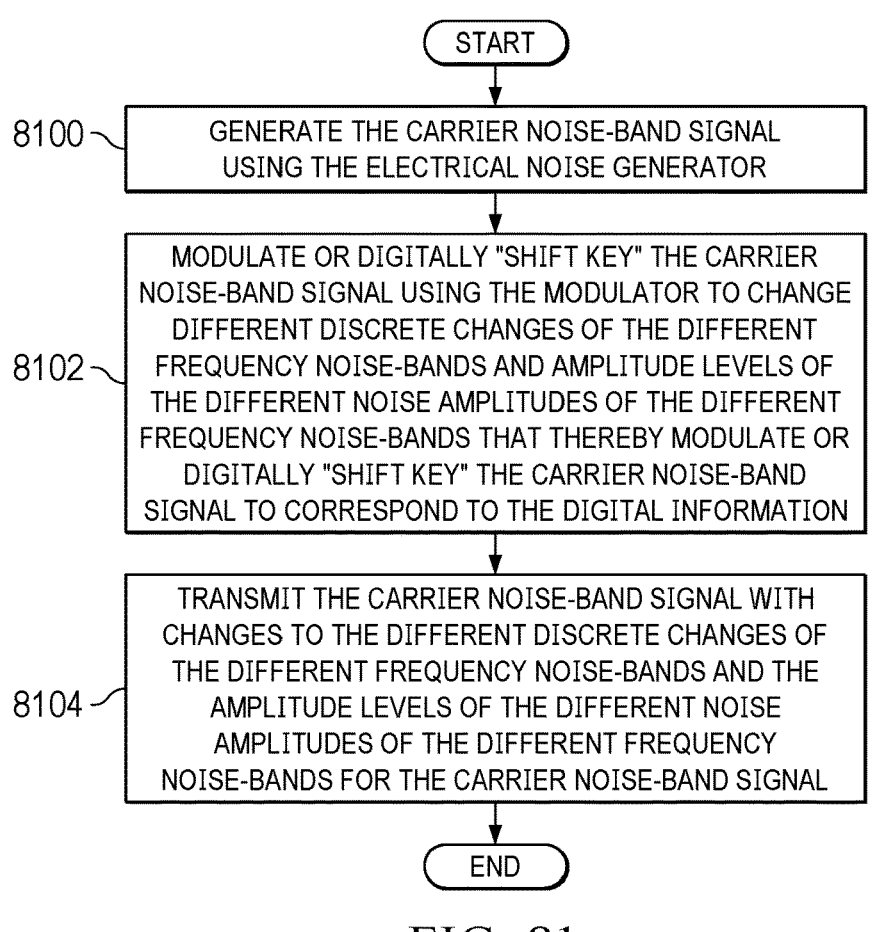

START

8100 — GENERATE THE CARRIER NOISE-BAND SIGNAL USING THE ELECTRICAL NOISE GENERATOR

8102 — MODULATE OR DIGITALLY "SHIFT KEY" THE CARRIER NOISE-BAND SIGNAL USING THE MODULATOR TO CHANGE DIFFERENT DISCRETE CHANGES OF THE DIFFERENT FREQUENCY NOISE-BANDS AND AMPLITUDE LEVELS OF THE DIFFERENT NOISE AMPLITUDES OF THE DIFFERENT FREQUENCY NOISE-BANDS THAT THEREBY MODULATE OR DIGITALLY "SHIFT KEY" THE CARRIER NOISE-BAND SIGNAL TO CORRESPOND TO THE DIGITAL INFORMATION

8104 — TRANSMIT THE CARRIER NOISE-BAND SIGNAL WITH CHANGES TO THE DIFFERENT DISCRETE CHANGES OF THE DIFFERENT FREQUENCY NOISE-BANDS AND THE AMPLITUDE LEVELS OF THE DIFFERENT NOISE AMPLITUDES OF THE DIFFERENT FREQUENCY NOISE-BANDS FOR THE CARRIER NOISE-BAND SIGNAL

END

FIG. 81

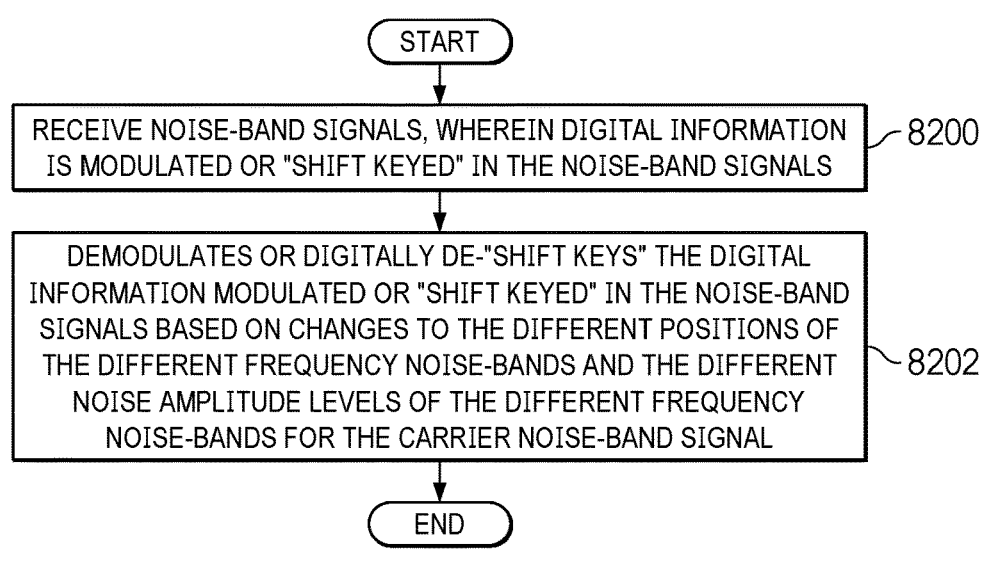

START

RECEIVE NOISE-BAND SIGNALS, WHEREIN DIGITAL INFORMATION IS MODULATED OR "SHIFT KEYED" IN THE NOISE-BAND SIGNALS ⌐ 8200

DEMODULATES OR DIGITALLY DE-"SHIFT KEYS" THE DIGITAL INFORMATION MODULATED OR "SHIFT KEYED" IN THE NOISE-BAND SIGNALS BASED ON CHANGES TO THE DIFFERENT POSITIONS OF THE DIFFERENT FREQUENCY NOISE-BANDS AND THE DIFFERENT NOISE AMPLITUDE LEVELS OF THE DIFFERENT FREQUENCY NOISE-BANDS FOR THE CARRIER NOISE-BAND SIGNAL ⌐ 8202

END

FIG. 82

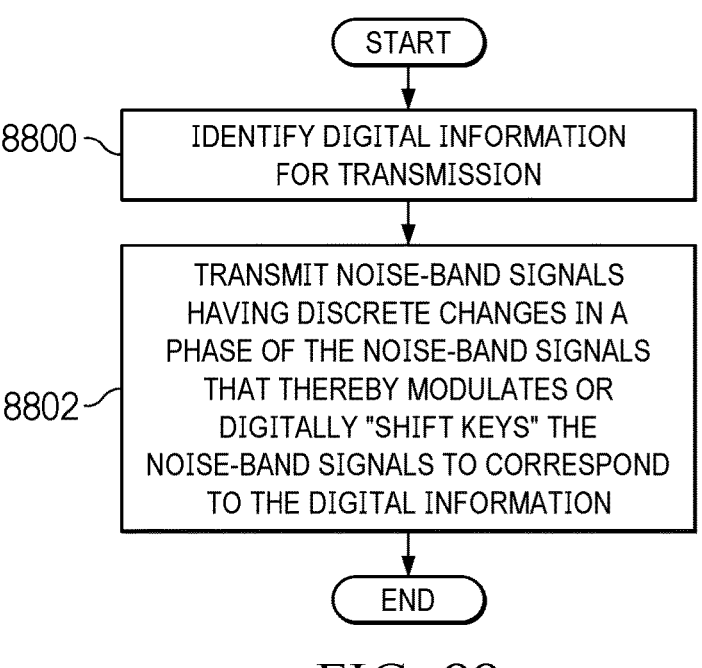

8800 — IDENTIFY DIGITAL INFORMATION FOR TRANSMISSION

8802 — TRANSMIT NOISE-BAND SIGNALS HAVING DISCRETE CHANGES IN A PHASE OF THE NOISE-BAND SIGNALS THAT THEREBY MODULATES OR DIGITALLY "SHIFT KEYS" THE NOISE-BAND SIGNALS TO CORRESPOND TO THE DIGITAL INFORMATION

FIG. 88

START

CONTROL EMISSION OF A SET OF ONE OR MORE LASER BEAMS FROM A LASER GENERATION SYSTEM TO CONTROL OPTICAL BREAKDOWNS THAT GENERATE THE RADIO FREQUENCY NOISE-BAND SIGNALS WITH THE DISCRETE CHANGES IN THE PHASE OR PHASE-SHIFTS OF THE RADIO FREQUENCY NOISE-BAND SIGNALS FROM VARYING A CENTER POINT OF THE RADIO FREQUENCY NOISE-BAND SIGNALS THAT THEREBY MODULATES OR DIGITALLY "SHIFT KEYS" THE RADIO FREQUENCY NOISE-BAND SIGNALS TO CORRESPOND TO THE DIGITAL INFORMATION — 8900

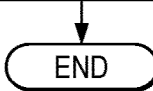

FIG. 89

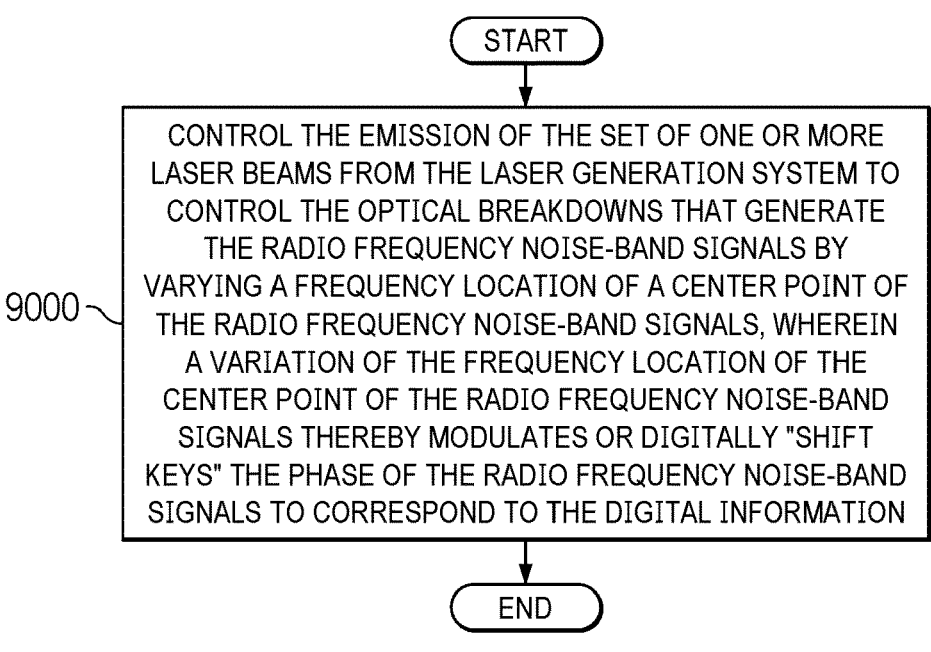

START

9000 ~ CONTROL THE EMISSION OF THE SET OF ONE OR MORE LASER BEAMS FROM THE LASER GENERATION SYSTEM TO CONTROL THE OPTICAL BREAKDOWNS THAT GENERATE THE RADIO FREQUENCY NOISE-BAND SIGNALS BY VARYING A FREQUENCY LOCATION OF A CENTER POINT OF THE RADIO FREQUENCY NOISE-BAND SIGNALS, WHEREIN A VARIATION OF THE FREQUENCY LOCATION OF THE CENTER POINT OF THE RADIO FREQUENCY NOISE-BAND SIGNALS THEREBY MODULATES OR DIGITALLY "SHIFT KEYS" THE PHASE OF THE RADIO FREQUENCY NOISE-BAND SIGNALS TO CORRESPOND TO THE DIGITAL INFORMATION

END

FIG. 90

START

CONTROL INPUT PARAMETERS FOR AN EMISSION OF A SET OF ONE OR MORE LASER BEAMS FROM THE LASER GENERATION SYSTEM TO CONTROL OPTICAL BREAKDOWNS THAT GENERATE THE RADIO FREQUENCY NOISE-BAND SIGNALS BY VARYING A FREQUENCY LOCATION OF A CENTER POINT OF THE RADIO FREQUENCY NOISE-BAND SIGNALS, WHEREIN A VARIATION OF THE FREQUENCY LOCATION OF THE CENTER POINT OF THE RADIO FREQUENCY NOISE-BAND SIGNALS THEREBY MODULATES OR DIGITALLY "SHIFT KEYS" THE PHASE OF THE RADIO FREQUENCY NOISE-BAND SIGNALS TO CORRESPOND TO THE DIGITAL INFORMATION ⌐ 9100

END

FIG. 91

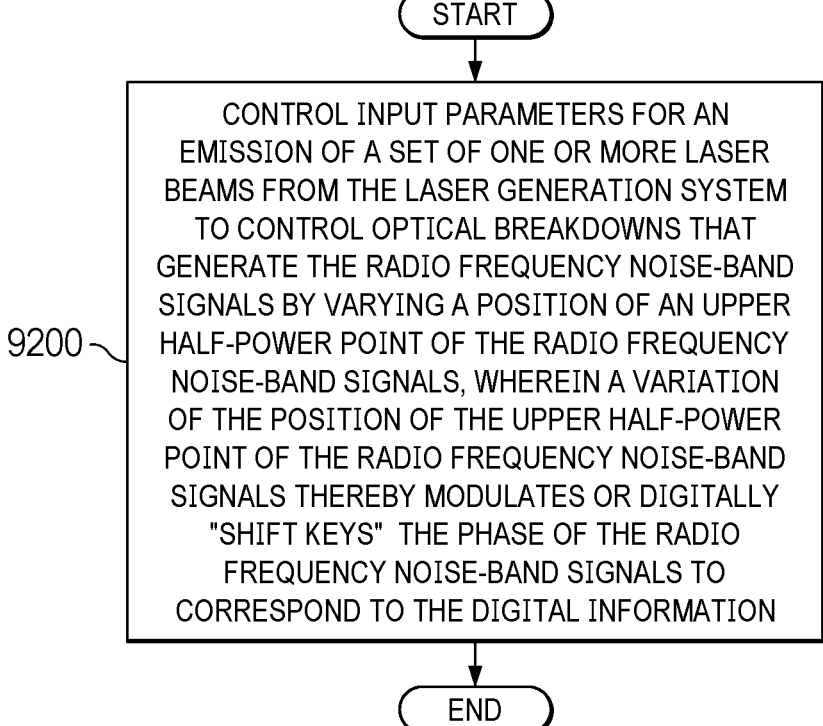

9200

START

CONTROL INPUT PARAMETERS FOR AN EMISSION OF A SET OF ONE OR MORE LASER BEAMS FROM THE LASER GENERATION SYSTEM TO CONTROL OPTICAL BREAKDOWNS THAT GENERATE THE RADIO FREQUENCY NOISE-BAND SIGNALS BY VARYING A POSITION OF AN UPPER HALF-POWER POINT OF THE RADIO FREQUENCY NOISE-BAND SIGNALS, WHEREIN A VARIATION OF THE POSITION OF THE UPPER HALF-POWER POINT OF THE RADIO FREQUENCY NOISE-BAND SIGNALS THEREBY MODULATES OR DIGITALLY "SHIFT KEYS" THE PHASE OF THE RADIO FREQUENCY NOISE-BAND SIGNALS TO CORRESPOND TO THE DIGITAL INFORMATION

END

FIG. 92

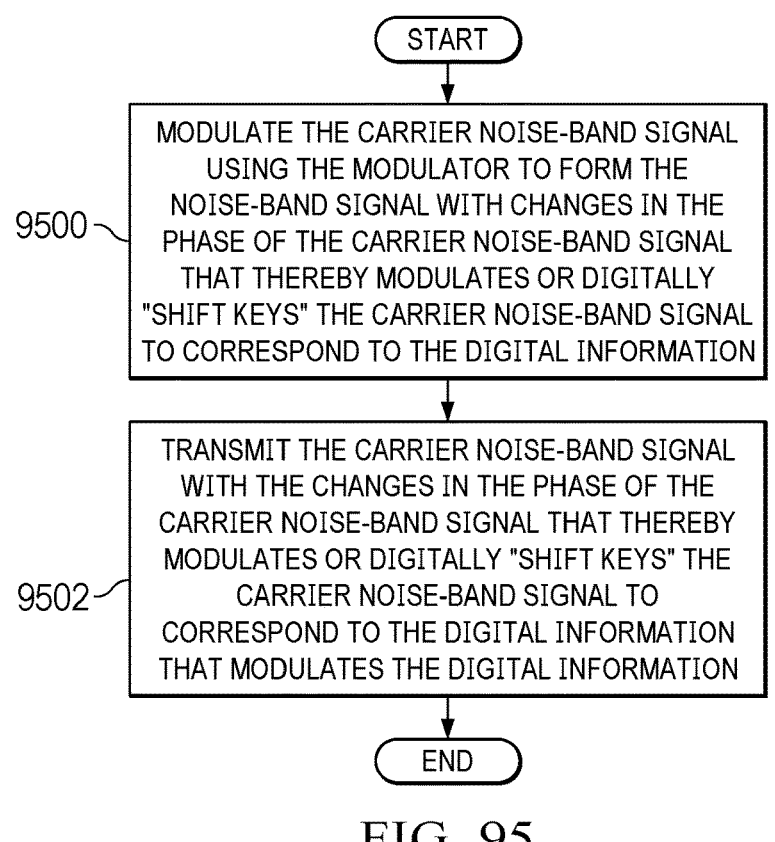

START

9500 — MODULATE THE CARRIER NOISE-BAND SIGNAL USING THE MODULATOR TO FORM THE NOISE-BAND SIGNAL WITH CHANGES IN THE PHASE OF THE CARRIER NOISE-BAND SIGNAL THAT THEREBY MODULATES OR DIGITALLY "SHIFT KEYS" THE CARRIER NOISE-BAND SIGNAL TO CORRESPOND TO THE DIGITAL INFORMATION

9502 — TRANSMIT THE CARRIER NOISE-BAND SIGNAL WITH THE CHANGES IN THE PHASE OF THE CARRIER NOISE-BAND SIGNAL THAT THEREBY MODULATES OR DIGITALLY "SHIFT KEYS" THE CARRIER NOISE-BAND SIGNAL TO CORRESPOND TO THE DIGITAL INFORMATION THAT MODULATES THE DIGITAL INFORMATION

END

FIG. 95

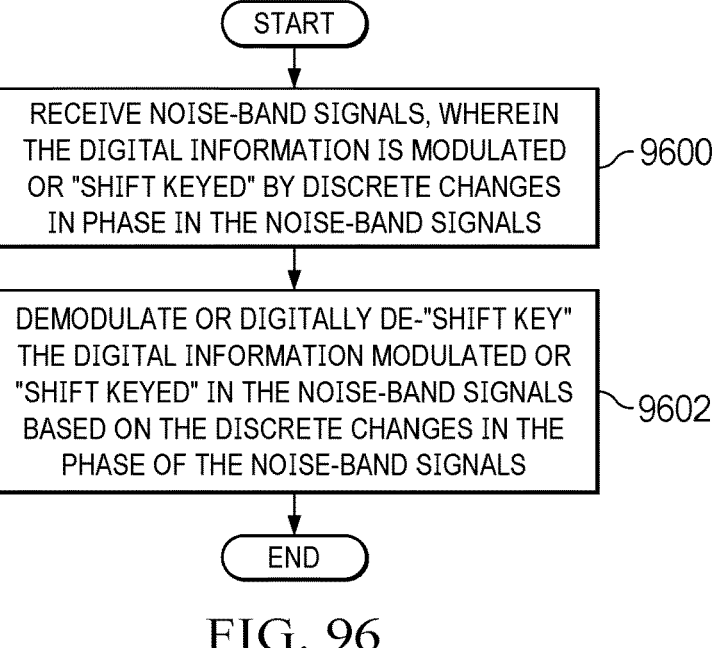

START

RECEIVE NOISE-BAND SIGNALS, WHEREIN THE DIGITAL INFORMATION IS MODULATED OR "SHIFT KEYED" BY DISCRETE CHANGES IN PHASE IN THE NOISE-BAND SIGNALS — 9600

DEMODULATE OR DIGITALLY DE-"SHIFT KEY" THE DIGITAL INFORMATION MODULATED OR "SHIFT KEYED" IN THE NOISE-BAND SIGNALS BASED ON THE DISCRETE CHANGES IN THE PHASE OF THE NOISE-BAND SIGNALS — 9602

END

FIG. 96

DIGITAL AMPLITUDE NOISE SHIFT KEYING TO COMMUNICATE INFORMATION

CROSS-REFERENCE TO RELATED APPLICATIONS

This application is a Continuation-in-Part (CIP) of U.S. patent application entitled "Analog Amplitude Noise Modulation to Communicate Information," Ser. No. 18/334,739, filed Jun. 14, 2023, now 12,476,710, issued Nov. 18, 2025, which is a Continuation-in-Part (CIP) of U.S. patent application entitled "Radio Frequency Communications Using Laser Optical Breakdowns," Ser. No. 18/067,516, filed Dec. 16, 2022, now 12,401,425, issued Aug. 26, 2025, and is a Continuation-in-Part (CIP) of U.S. patent application entitled "Pulse Noise Modulation to Encode Data," Ser. No. 18/067,547, filed Dec. 16, 2022, now 12,407,420, issued Sep. 2, 2025, all of which are incorporated herein by reference in their entirety.

BACKGROUND INFORMATION

1. Field

The present disclosure relates generally to communications and in particular, to methods, apparatuses, systems, and computer program products for communicating information using radio frequency (RF), optical, and/or other signals within the electromagnetic spectrum without physical antenna structures.

2. Background

Wireless communications using radio frequency (RF) signals, optical, and/or other signals within the electromagnetic spectrum are common and widespread. Radio frequency signals are commonly used in computer networks, for example, in the form of Wi-Fi signals that provide communications links between various computing devices.

Radio frequency signals are also used for communications between various clients such as ships, aircraft, land vehicles, buildings, and other physical locations. These communications can include data and/or information such as position information, voice messages, voice communications, and other types of information and/or data. For example, other types of information and/or data can include digital and analog signaling.

Communications using radio frequency transmissions are facilitated using physical antennas. The transmission or reception of radio frequency signals occurs between antennas. The use of physical antennas can be less convenient or reliable than desired.

In addition, radio frequency communications can be implemented using a carrier signal or carrier wave modulated by at least one of a modulation signal, a message signal, or an information signal that modulates or digitally "shift keys" the carrier wave.

The terms "shift key", "shift keys", "shift keying" and similar terms are terms of art used in the communications technology field to describe digital modulation techniques that represent digital data as variations of a carrier wave or carrier signal. The terms de-"shift key" or de-"shift keying" are terms used to describe demodulation of digital data. In these examples, shift keying is a form of modulation. Classical carrier signals use at least one of periodic waves, repeating waveforms, pseudo-random waveforms, or other predictable waveforms such as sinusoidal, cosinusoidal, square-waves, sawtooth, or other repeatable carriers which are then modulated in various ways by the message signal, modulation signal, and/or information signal.

Communications have been attempted using lasers, gas-filled tubes, electric arcs, high-voltage electrodes, high-voltage fields, field exciter members, and other mechanisms to create and maintain "plasma antennas" including plasma columns, plasma filaments, plasma structures, plasma channels, laser-induced plasma filaments (LIPF), arrays of focusing and defocusing cycles of plasma, and/or bounded or unbounded ionized air or water columns to emulate the shapes and/or conductance of physical antennas. These devices may be continuous wave or pulsed devices. Previous communication approaches attempt to input, impel, induce, impute, impress upon, influence, and/or modulate an RF or other signal onto the plasma or conductive plasma column with a coupling device, such as an RF coupler, an electromagnetic or capacitive coupling device, an electro-optical crystal, electro-optic modulators such as beams of light, and/or other influencing device. In effect, previous approaches attempt to treat plasma or the plasma column as a conductor or a classical physical conducting antenna, such as a monopole or dipole device. These approaches use conventional modulation of periodic, repeating, sinusoidal, and/or pseudo-random carrier waveforms, such as amplitude-, frequency-, and/or phase-modulation, to generate, induce, impel, influence, and/or control the plasma's amplitude-, frequency-, or phase-modulated electromagnetic fields that radiate from the plasma or plasma column.

Therefore, it would be desirable to have methods, systems, and apparatuses that take into account at least some of the issues discussed above, as well as other possible issues. For example, it would be desirable to have methods and apparatus that overcome a technical problem with radio frequency communications using physical antennas. It would also be desirable to have systems, methods, and apparatuses that overcome the limitations of periodic and/or predictable carriers. It would also be desirable to have systems, methods, and apparatuses that overcome the limitations of plasma antennas and coupled modulation.

SUMMARY

An embodiment of the present disclosure provides a communications system comprises a computer system and a communications manager. The communications manager is in the computer system. The communications manager is configured to identify digital information for transmission. The communications manager is configured to transmit noise signals with different noise amplitudes that thereby modulate the noise signals to correspond to the digital information.

Another embodiment of the present disclosure provides a communications system comprising a receiver configured to receive noise signals, in which digital information in the noise signals is demodulated using different noise amplitudes. The receiver is configured to demodulate the digital information previously modulated in the noise signals based on different noise amplitudes in the noise signals.

Yet another embodiment of the present disclosure provides a method for communicating digital information. The digital information is identified for transmission. Noise signals are transmitted with different noise amplitudes that thereby modulate the noise signals to correspond to the digital information.

Still another embodiment of the present disclosure provides a method for communicating digital information. Noise signals are received. The digital information in the noise signals is demodulated using different noise amplitudes. The digital information modulated in the noise signals is demodulated based on the different noise amplitudes in the noise signals.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of a flowchart of a process for transmitting data in accordance with an illustrative embodiment;

FIG. 17 is an illustration of a flowchart for controlling the emission of laser beams in points in accordance with an illustrative embodiment;

FIG. 18 is an illustration of a flowchart for controlling the emission of laser beams in intersecting points in accordance with an illustrative embodiment;

FIG. 19 is an illustration of a flowchart for controlling the emission of laser beams in points in accordance with an illustrative embodiment;

FIG. 20 is an illustration of a flowchart of a process for transmitting data in accordance with an illustrative embodiment;

FIG. 21 is an illustration of a flowchart for controlling the emission of laser beams in points in accordance with an illustrative embodiment;

FIG. 22 is an illustration of a flowchart for controlling the emission of the laser beams in points in accordance with an illustrative embodiment;

FIG. 23 is an illustration of a flowchart for controlling the emission of laser beams in points in accordance with an illustrative embodiment;

FIG. 24 is an illustration of a flowchart for controlling the emission of laser beams in points in accordance with an illustrative embodiment;

FIG. 25 is an illustration of a flowchart for controlling the emission of laser beams in points in accordance with an illustrative embodiment;

FIG. 31 is an illustration of a flowchart for communicating data in accordance with an illustrative embodiment;

FIG. 32 is an illustration of a flowchart of a process for controlling the emission of a set of one or more beams in accordance with an illustrative embodiment;

FIG. 33 is an illustration of a flowchart of a process for controlling the emission of a set of one or more beams in accordance with an illustrative embodiment;

FIG. 39 is an illustration of a flowchart for communicating digital information in accordance with an illustrative embodiment;

FIG. 40 is an illustration of a flowchart of a process for transmitting radio frequency noise signals using a laser generation system in accordance with an illustrative embodiment;

FIG. 41 is an illustration of a flowchart of a process for controlling emission of a set of one or more laser beams in accordance with an illustrative embodiment;

FIG. 42 is an illustration of a flowchart of a process for controlling emission of a set of one or more laser beams in accordance with an illustrative embodiment;

FIG. 43 is an illustration of a flowchart of a process for controlling emission of a set of one or more laser beams in accordance with an illustrative embodiment;

FIG. 44 is an illustration of a flowchart of a process for controlling emission of a set of one or more laser beams in accordance with an illustrative embodiment;

FIG. 45 is an illustration of a flowchart of a process for transmitting noise signals in accordance with an illustrative embodiment;

FIG. 46 is an illustration of a flowchart of process for communicating digital information in accordance with an illustrative embodiment;

FIG. 52 is an illustration of a flowchart for communicating digital information in accordance with an illustrative embodiment;

FIG. 53 is an illustration of a flowchart of a process for transmitting noise signals using a laser generation system in accordance with an illustrative embodiment;

FIG. 64 is an illustration of a flowchart for communicating multiple-bit digital information in accordance with an illustrative embodiment;

FIG. 65 is an illustration of a flowchart of a process for transmitting noise signals using a laser generation system in accordance with an illustrative embodiment;

FIG. 66 is an illustration of a flowchart of a process for controlling emission of a set of one or more laser beams in accordance with an illustrative embodiment;

FIG. 67 is an illustration of a flowchart of a process for controlling emission of a set of one or more laser beams in accordance with an illustrative embodiment;

FIG. 68 is an illustration of a flowchart of a process for controlling emission of a set of one or more laser beams in accordance with an illustrative embodiment;

FIG. 69 is an illustration of a flowchart of a process for transmitting noise signals using a noise transmitter in accordance with an illustrative embodiment;

FIG. 70 is an illustration of a flowchart of process for communicating multiple-bit digital information in accordance with an illustrative embodiment;

FIG. 76 is an illustration of a flowchart for communicating digital information in accordance with an illustrative embodiment;

FIG. 77 is an illustration of a flowchart of a process for transmitting noise signals using a laser generation system in accordance with an illustrative embodiment;

FIG. 77A is an illustration of a flowchart of a process for controlling emission of a set of one or more laser beams in accordance with an illustrative embodiment;

FIG. 78 is an illustration of a flowchart of a process for controlling emission of a set of one or more laser beams in accordance with an illustrative embodiment;

FIG. 79 is an illustration of a flowchart of a process for controlling emission of a set of one or more laser beams in accordance with an illustrative embodiment;

FIG. 80 is an illustration of a flowchart of a process for controlling emission of a set of one or more laser beams in accordance with an illustrative embodiment;

FIG. 81 is an illustration of a flowchart of a process for transmitting noise signals using a noise transmitter in accordance with an illustrative embodiment;

FIG. 82 is an illustration of a flowchart of process for communicating multiple-bit digital information in accordance with an illustrative;

FIG. 88 is an illustration of a flowchart for communicating digital information in accordance with an illustrative embodiment;

FIG. 89 is an illustration of a flowchart of a process for transmitting noise signals using a laser generation system in accordance with an illustrative embodiment;

FIG. 90 is an illustration of a flowchart of a process for controlling emission of a set of one or more laser beams in accordance with an illustrative embodiment;

FIG. 91 is an illustration of a flowchart of a process for controlling emission of a set of one or more laser beams in accordance with an illustrative embodiment;

FIG. 92 is an illustration of a flowchart of a process for controlling emission of a set of one or more laser beams in accordance with an illustrative embodiment;

FIG. 95 is an illustration of a flowchart of process for communicating digital information in accordance with an illustrative embodiment;

FIG. 96 is an illustration of a flowchart of process for communicating digital information in accordance with an illustrative embodiment;

DETAILED DESCRIPTION

Figure 1A:
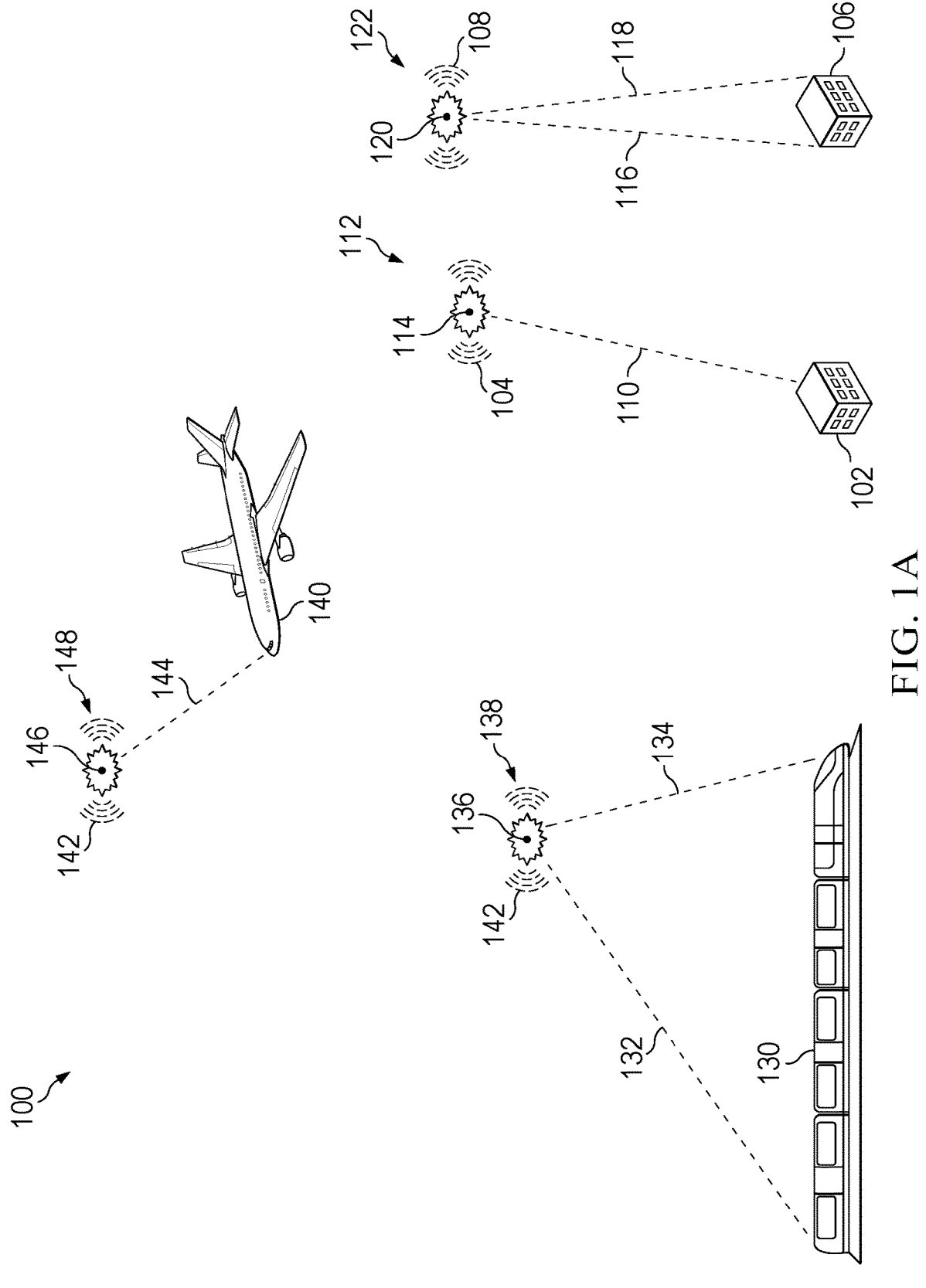
FIG. 1A is a pictorial representation of platforms that can transmit radio frequency signals using non-physical antennas in which illustrative embodiments may be implemented.

The illustrative embodiments recognize and take into account one or more different considerations as described herein. For example, currently used physical antennas for transmitting radio frequency signals are subject to damage or destruction from various causes. For example, adverse weather conditions such as a hurricane or tornado can damage or destroy antennas such as transmission towers for land-based communications. As another example, these physical antennas are also subject to damage or destruction from kinetic attacks.

In other considerations, currently used "plasma antennas" require an ionized column of air or water which is not readily relocatable or easily repositioned. Plasma antennas also require a coupling mechanism to modulate the ionized plasma column as if it were a traditional conductive antenna. Plasma antennas also must use traditional modulation techniques of sinusoidal, pseudorandom, and/or other repeating carrier signals which may be easily detected and decoded.

As used herein, the phrase "and/or" when used with a list of items means different combinations of one or more of the listed items can be used and only one of each item in the list can be needed. In other words, "and/or" when used with a list of items means any combination of items and number of items can be used from the list, but not all of the items in the list are required. The item can be a particular object, thing, or a category. For example, without limitation, item A, item B, and/or item " can mean solely item A, solely item B, solely item C, both items A and B, both items B and C, both items A and C, or all three items A and B and C.

Thus, the illustrative embodiments provide a method, apparatus, system, and computer program product for transmitting radio frequency signals without hardware such as transmission towers and physical antenna structures. In one or more illustrative examples we provide a non-physical radio frequency antenna that is impervious to adverse environmental conditions and kinetic attack. These illustrative embodiments provide a method, apparatus, system, and computer program product for transmitting radio frequency signals without plasma antennas and/or ionized columns of air or water, without coupling mechanisms, and without the need for periodic, repeating, sinusoidal, and/or pseudorandom carrier waves with classical modulation schemes based on these periodic, repeating, sinusoidal, and/or pseudorandom carrier waves. Further, these non-physical radio frequency antennas can be more difficult to detect.

These transmitters can be positioned away from airplanes, transport, installations, buildings, or other physical locations that are subject to attack or undesired environmental conditions.

In the illustrative examples, radio frequency transmissions are transmitted by using laser beams that induce, cause, and/or control optical breakdowns to generate and control the radio frequency transmissions. In this illustrative example, the optical breakdowns create plasma that generates the radio frequency signals including radio frequency noise. These optical breakdown points where the optical breakdowns occur are the points of origination for transmitting the radio frequency signals and/or radio frequency noise. These optical breakdown points also may be used for transmission in the range of light frequencies, either visible and/or non-visible light.

With reference now to the figures and, in particular, with reference to FIG. 1A, a pictorial representation of platforms that can transmit radio frequency signals using non-physical antennas is depicted in which illustrative embodiments may be implemented. As depicted, radio frequency signals can be transmitted from various platforms as depicted in this figure.

As depicted, ground station 102 can transmit radio frequency signals 104 without using a physical antenna. In a similar fashion, ground station 106 can also transmit radio frequency signals 108 without using a physical antenna.

In this example, laser beams are used by these ground stations to transmit the radio frequency signals. For example, ground station 102 emits laser beam 110 in a manner that causes optical breakdown 112 at optical breakdown point 114. Radio frequency signals 104 are generated at and transmitted from optical breakdown point 114.

In this example, ground station 106 emits laser beam 116 and laser beam 118 at optical breakdown point 120 to cause optical breakdown 122. In this example, two laser beams are used to cause optical breakdown 122 that results in transmission of radio frequency signals 108.

This type of transmission can be used from other platforms such as train 130. In this example, train 130 emits laser beam 132 and laser beam 134 from different physical locations on train 130 at optical breakdown point 136. The intersection of these two laser beams at optical breakdown point 136 causes optical breakdown 138. As a result, radio frequency signals 142 are transmitted in response to optical breakdown 138 at optical breakdown point 136.

As another example, airplane 140 transmits radio frequency signals 142 using laser beam 144. As depicted, laser beam 144 is emitted from airplane 140 at optical breakdown point 146. Optical breakdown 148 occurs at optical breakdown point 146 which results in the transmission of radio frequency signals 142.

Figure 1B:
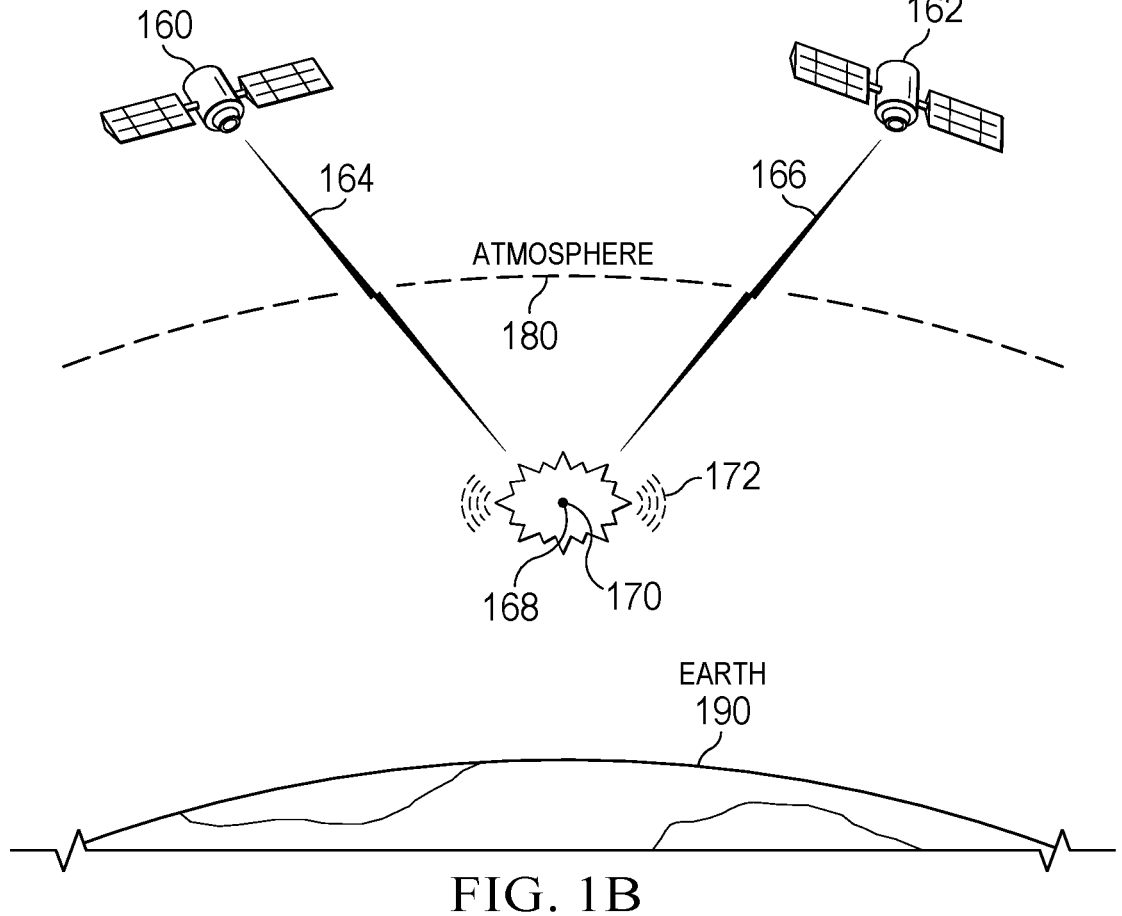
FIG. 1B is a pictorial representation of platforms that can transmit radio frequency signals using non-physical antennas from space in which illustrative embodiments may be implemented.

Turning now to FIG. 1B, a pictorial representation of platforms that can transmit radio frequency signals using non-physical antennas from space in which illustrative embodiments may be implemented. As another example, in FIG. 1B, satellite 160 emits laser 164 from space into the atmosphere 180 above earth 190 while satellite 162 emits laser 166 from space into the atmosphere 180 such that laser 164 and laser 166 intersect at optical breakdown point 168 causing optical breakdown 170 which results in radio frequency signals 172 originating and emanating from optical breakdown point 168.

Figure 1C:
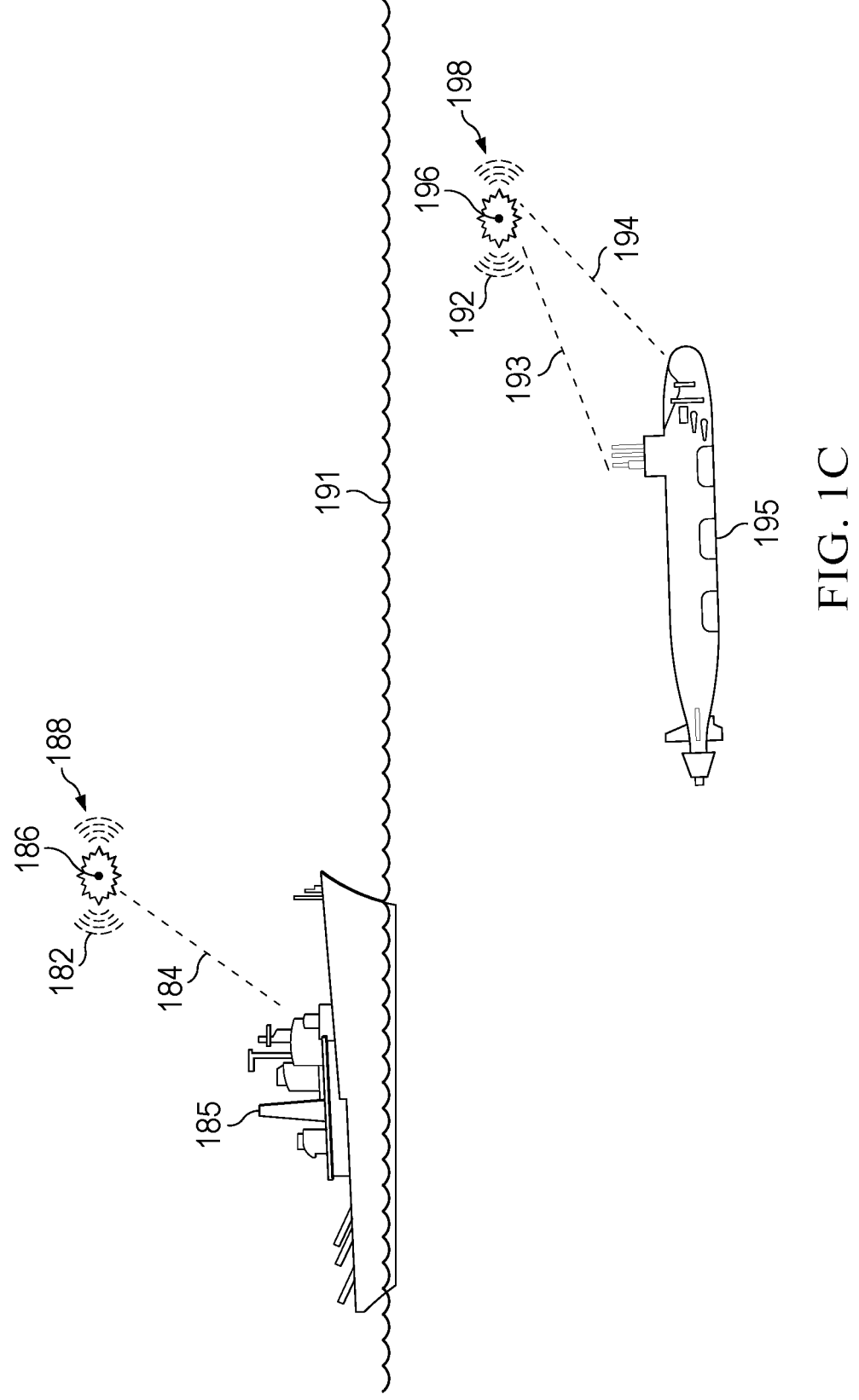
FIG. 1C is a pictorial representation of platforms that can transmit radio frequency signals using non-physical antennas on, in, or under water in which illustrative embodiments may be implemented.

Turning now to FIG. 1C, a pictorial representation of platforms that can transmit radio frequency signals using non-physical antennas on, in, or under water 191 in which illustrative embodiments may be implemented. In this example, ship 185 emits laser beam 184 from ship 185 in a manner that at least one of causes or controls optical breakdown 188 at optical breakdown point 186. As a result, radio frequency signals 182 as well as light emissions are transmitted in response to optical breakdown 188 at optical breakdown point 186.

As another example, submarine 195 emits laser beam 193 and laser beam 194 from different physical locations on submarine 195. The intersection of these two laser beams at optical breakdown point 196 causes optical breakdown 198 which results in the transmission of radio frequency signals 192 as well as underwater light emissions, including visible and non-visible light frequencies.

As depicted, these radio frequency signals are generated without using physical antennas to transmit signals. Further, these radio frequency signals are transmitted at physical locations away from the platforms. As a result, identifying the platforms generating these radio frequency signals can be more difficult because antennas for transmitting the radio frequency signals are not visible. Further, tracking the physical location of where the radio frequency signals are generated does not provide identification of the platform or the platform physical location, nor the physical location of the communications system, computer system, communications manager, or the laser origination points in these examples.

The physical locations of these optical breakdowns are considered radio frequency source emitters that can be in remote physical locations from the platforms emitting the laser beams. As a result, identifying the physical locations of the platforms becomes more difficult with the absence of physical antennas. Note that these optical breakdowns are distinguished from "plasma antennas" or ionized air or water columns.

Illustration of the different platforms in radio frequency communications environment 100 are only provided as examples of platforms that can implement this type of radio frequency signal transmission. In other illustrative examples, other platforms in addition to or in place of these platforms can be used. For example, this type of radio frequency generation can be implemented in a surface ship, a car or truck, a cruise missile, an aerial vehicle, a tank, a submersible sensor, or some other suitable type of platform in other illustrative examples.

Figure 2:
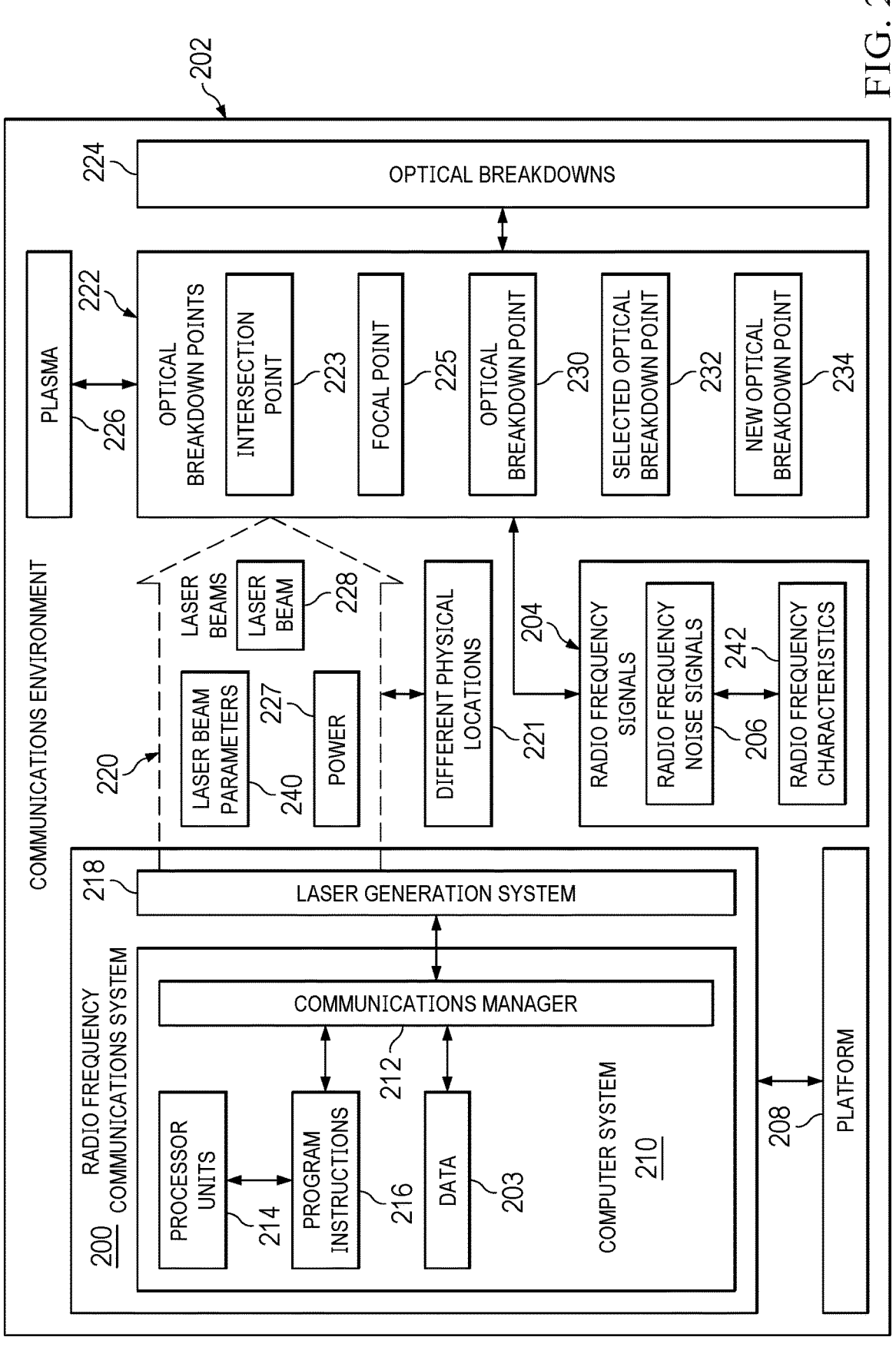
FIG. 2 is an illustration of a block diagram of a radio frequency communications environment in accordance with an illustrative embodiment.

With reference now to FIG. 2, an illustration of a block diagram of a radio frequency communications environment is depicted in accordance with an illustrative embodiment. In this illustrative example, radio frequency communications system 200 in communications environment 202 can communicate data 203 by using radio frequency signals 204 in the form of radio frequency noise signals 206.

Data 203 can take a number of different forms. For example, data 203 can be a document, a spreadsheet, sensor data, an image, a video, and email message, a text message, a webpage, a table, a data structure, serial data, commands, or other types of data that is to be transmitted or communicated. Data can also be analog or digital information and/or data. Analog and digital information and/or data can include, for example, music and audio.

In one illustrative example, a noise signal is a signal with irregular fluctuations that are or appear to be at least one of random, non-predictable, or non-deterministic.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data. Thus, a noise signal can be non-predictable.

In this example, radio frequency noise signals 206 are electromagnetic noise signals that can have a frequency from around 20 kHz to above the Terahertz range. Radio frequency noise signals can include signals with frequencies such as extremely low frequency (ELF), high frequency (HF), and other types of frequencies. These noise signals can also include microwave noise signals and Terahertz noise signals. Electromagnetic noise signals can also be optical noise in the visible range, infrared, ultraviolet X-rays and other types of noise signals that can be used as modulated noise. For example, lasers used at optical breakdown also may transmit various ranges of noisy light in addition to noisy broadband radio frequencies. Modulating this noisy light with different techniques such as pulse noise modulation is included in this disclosure.

In this illustrative example, radio frequency communications system 200 is associated with platform 208. Platform 208 is an object that can transmit radio frequency noise signals 206 using radio frequency communications system 200.

Platform 208 can take a number of different forms. For example, platform 208 can be one of a mobile platform, a stationary platform, a land-based structure, an aquatic-based structure, and a space-based structure. More specifically, the platform can be a surface ship, a tank, a personnel carrier, a train, an airplane, a commercial airplane, a spacecraft, a space station, a satellite, a submarine, an automobile, a ground station, a power plant, a bridge, a dam, a house, a manufacturing facility, a building, and other suitable platforms.

In this illustrative example, radio frequency communications system 200 comprises computer system 210 and communications manager 212. In this example, communications manager 212 is located in computer system 210.

As used herein, "a number of" when used with reference to items, means one or more items. For example, "a number of different forms" is one or more different forms.

Communications manager 212 can be implemented in software, hardware, firmware or a combination thereof. When software is used, the operations performed by communications manager 212 can be implemented in program instructions configured to run on hardware, such as a processor unit. When firmware is used, the operations performed by communications manager 212 can be implemented in program instructions and data and stored in persistent memory to run on a processor unit.

When hardware is employed, the hardware may include circuits that operate to perform the operations in communications manager 212. The circuits used to implement communications manager 212 can take other forms in addition to or in place of a processor unit.

In the illustrative examples, the hardware used to implement communications manager 212 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform a number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 210, those data processing systems are in communication with each other using a communications medium. The communications medium may be a network. The data processing systems may be selected from at least one of a computer, a server computer, a tablet, or some other suitable data processing system.

As depicted, computer system 210 includes a number of processor units 214 that are capable of executing program instructions 216 implementing processes in the illustrative examples. In other words, program instructions 216 are computer-readable program instructions.

As used herein, a processor unit in the number of processor units 214 is a hardware device and is comprised of hardware circuits such as those on an integrated circuit that respond and process instructions and program code that operate a computer. When the number of processor units 214 executes program instructions 216 for a process, the number of processor units 214 can be one or more processor units that are on the same computer or on different computers. In other words, the process can be distributed between processor units 214 on the same or different computers in a computer system 210.

Further, the number of processor units 214 can be of the same type or different type of processor units. For example, a number of processor units 214 can be selected from at least one of a single core processor, a dual-core processor, a multi-processor core, a general-purpose central processing unit (CPU), a graphics processing unit (GPU), a digital signal processor (DSP), or some other type of processor unit.

As depicted, radio frequency communications system 200 can also include laser generation system 218. In other examples, laser generation system 218 can be considered a separate component controlled by radio frequency communications system 200.

In this example, laser generation system 218 is a hardware system that can emit a set of laser beams 220. The operation of laser generation system 218 can be controlled by communications manager 212.

In this example, the set of laser beams 220 can be emitted from different physical locations 221. For example, laser generation system 218 can be comprised of laser units that are positioned in different physical locations. Each physical location can have one or more laser units for laser generation system 218 in this illustrative example.

Communications manager 212 can identify data 203 for transmission using radio frequency noise signals 206. Communications manager 212 controls an emission of a set of laser beams 220. In this example, communications manager 212 directs or steers the set of laser beams 220 at a set of optical breakdown points 222. In this example, the set of optical breakdown points 222 can be selected from at least one of intersection point 223 or focal point 225.

As used herein, "a set of" when used with reference to items, means one or more items. For example, "a set of optical breakdown points 222" is one or more of optical breakdown points 222. In another example, a "set of laser beams" means one or more laser beams.

In this example, intersection point 223 can be a physical location where two or more laser beams intersect. This physical location can be where an optical breakdown occurs from the intersection of two or more laser beams when the power 227 of two or more intersecting laser beams is sufficient to cause an optical breakdown. Focal point 225 can be a physical location where the laser beam is focused to cause an optical breakdown to occur at that physical location.

This emission of the set of laser beams 220 is controlled by communications manager 212 to cause optical breakdowns 224 at the set of optical breakdown points 222 that generate radio frequency noise signals 206 encoding data 203. In this illustrative example, plasma 226 occurs at optical breakdown points 222 in response to optical breakdowns 224 by the set of laser beams 220. This plasma generated by optical breakdowns 224 causes radio frequency noise signals 206 to be transmitted at the set of optical breakdown points 222.

In this example, power 227 of laser beam 228 in the set of laser beams 220 at optical breakdown point 230 in the set of optical breakdown points 222 can be controlled using different mechanisms. For example, power 227 can be controlled by at least one of a shutter, a lens, a deformable lens, a microelectromechanical systems mirror, an attenuator, a controlling optics, an optical filter, an amplitude modulator in a laser beam generator, or other device.

In this illustrative example, communications manager 212 can control the emission of the set of laser beams 220 by laser generation system 218 in a number of different ways. For example, communications manager 212 can control laser generation system 218 to emit a first number of the set of laser beams 220 continuously at the set of optical breakdown points 222. Communications manager 212 can control laser generation system 218 to pulse a second number of the set of laser beams 220 at the set of optical breakdown points 222 to cause optical breakdowns 224 that generate radio frequency noise signals 206 encoding data 203. The laser beam can be pulsed by turning the laser beam on and off. In another example, a laser beam can be pulsed by varying the power of the laser beam. In other words, the power can be pulsed by increasing and decreasing the power of the laser beam.

In another illustrative example, communications manager 212 can control laser generation system 218 to emit the set of laser beams 220 at the set of optical breakdown points 222 causing optical breakdowns 224 that generate radio frequency noise signals 206 encoding data 203.

In this example, the emission of the set of laser beams 220 can be performed in a number of different ways. The set of laser beams can be emitted as at least one of pulsed or continuous. For example, one laser beam can be continuous while another laser beam is pulsed. Further, the laser beams can be originated from different directions at the set of optical breakdown points 222.

The direction at which a laser beam is emitted can move or sweep back such that an optical breakdown point is included during the movement of the laser beam. In other words, during the sweeping of the laser beam the laser beam can intersect with another laser beam. The intersection of this laser beam with another laser beam emitted the optical breakdown point can cause the optical breakdown at that optical breakdown point.

In another illustrative example, communications manager 212 can control laser generation system 218 to emit the set of laser beams 220 at selected optical breakdown point 232 in the set of optical breakdown points 222. Communications manager 212 can select new optical breakdown point 234 in the set of optical breakdown points as the selected optical breakdown point. Communications manager 212 can repeat emitting the set of laser beams 220 and selecting the new optical breakdown point while generating radio frequency noise signals 206 encoding data 203.

In yet another illustrative example, communications manager 212 can control laser generation system 218 to emit the set of laser beams 220 from different physical locations 221 at optical breakdown point 230. In this example, a portion of the set of laser beams 220 intersect at optical breakdown point 230 such that power 227 from the portion of the set of laser beams 220 is sufficient to cause optical breakdowns 224 at intersection point 223 that generate radio frequency noise signals 206 encoding data 203.

As another example, communications manager 212 can control laser generation system 218 to emit the set of laser beams 220 at optical breakdown point 230. In this example, optical breakdowns 224 occur in response to all of the set of laser beams 220 intersecting at optical breakdown point 230.

In controlling the emission of the set of laser beams 220, communications manager 212 can change a set of laser beam parameters 240 for the set of laser beams 220 to encode data 203 into radio frequency noise signals 206 or visible and/or non-visible light. Laser beam parameters 240 include but are not limited to pulse durations, pulse repetition rate, beam diameter, beam profile (temporal and spatial), optical focal length, pulse shape, power, frequency, wavelength, directivity, gain, efficiency, and physical properties of propagation media such as index of refraction. In this example, changing the set of laser beam parameters 240 changes a set of radio frequency characteristics 242 for radio frequency noise signals 206 or visible and/or non-visible light. The set radio frequency characteristics 242 for radio frequency noise signals 206 can be selected from at least one of a timing, an optical breakdown point, an amplitude of the radio frequency noise signals, a frequency band, a relative phase, or other characteristics for radio frequency noise signals 206.

In yet another illustrative example, communications manager 212 can control laser generation system 218 to emit a subset of the set of laser beams 220 at the set of optical breakdown points 222 to cause the optical breakdowns 224 that generates radio frequency noise signals 206 encoding data 203. Communications manager 212 can select a new subset of the set of laser beams 220 as the subset of laser beams 220. Communications manager 212 can repeat emitting of the subset of the set of laser beams 220 and selecting the new subset of the set of laser beams 220 while transmitting radio frequency noise signals 206 encoding the data 203.

Thus, one or more illustrative examples enable transmitting radio frequency noise signals using radio frequency source emitters that do not require physical structures. As a result, one or more illustrative examples can overcome an issue with the vulnerability present in using physical source emitters such as antennas. In the illustrative examples, the optical breakdown points for the optical breakdowns are radio frequency source emitters.

Further, these radio frequency source emitters can be moved almost instantaneously to different physical locations by repositioning the laser beams such that the laser beams point at different optical breakdown points. Attacks at these radio frequency source physical locations are attacks at the optical breakdown points where the plasma is generated. As a result, kinetic attacks against these physical locations are useless because the laser modulation sources are remote from the physical locations of these radio frequency source emitters.

The illustration of communications environment 202 to in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 212 is shown as being implemented using program instructions 216 run on a number of processor units 214 in computer system 210, communications manager 212 can be implemented in other hardware instead of or in addition to the number of processor units 214. For example, computer system 210 may use other hardware in addition to or in place of the number of processor units 214.

For example, other types of hardware circuits capable of performing the operations for communications manager 212 can be used. This other hardware can be at least one of a circuit system, an integrated circuit, an application-specific integrated circuit (ASIC), a programmable logic device, or some other suitable type of hardware configured to perform a number of operations.

Figure 3:
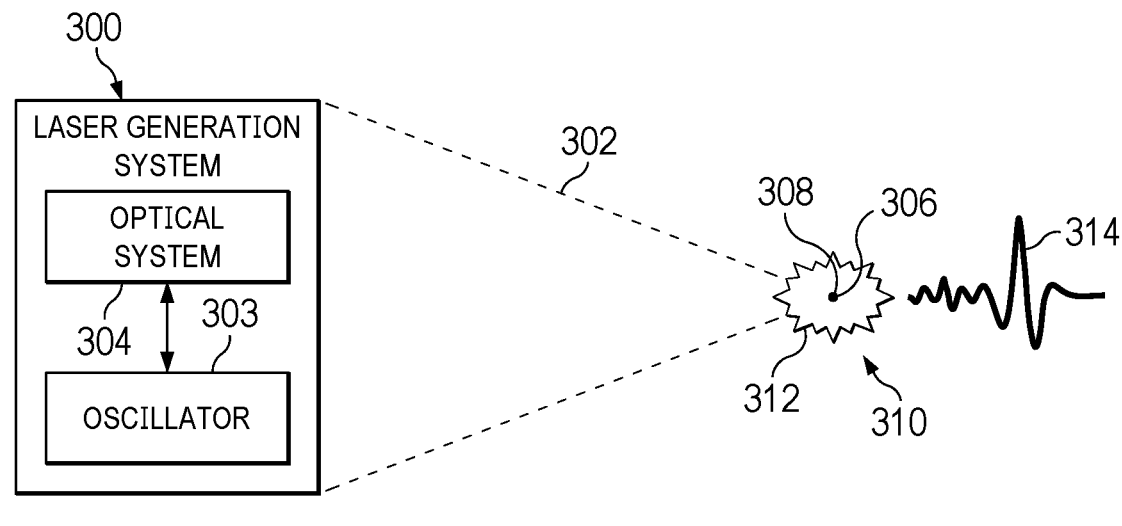
FIG. 3 is an illustration of radio frequency noise generation using a laser beam in accordance with an illustrative embodiment.

Turning next to FIG. 3, an illustration of radio frequency noise generation using a laser beam is depicted in accordance with an illustrative embodiment. This depicted example in FIG. 3 illustrates how a single laser beam can be used to generate radio frequency signals.

In this illustrative example, laser generation system 300 is an example of laser generation system 218 in FIG. 2. Laser generation system 300 emits laser beam 302.

As depicted, laser generation system 300 comprises a number of different components. In this example, laser generation system 300 includes oscillator 303 and optical system 304.

Oscillator 303 generates coherent light for emitting laser beam 302. In this example, optical system 304 can focus laser beam 302. Optical system 304 includes at least one of a lens, a mirror, or other optical element that can change the focus of laser beam 302.

In this example, the focus of laser beam 302 is controlled such that the power at focal point 306 is an optical breakdown point 308 where optical breakdown 310 occurs. As depicted in this example, optical breakdown 310 results in the generation of plasma 312. Plasma 312 resulting from optical breakdown 310 causes the generation of radio frequency noise signal 314. Thus, this example illustrates how a single laser beam can be used to generate radio frequency signals.

Figure 4:
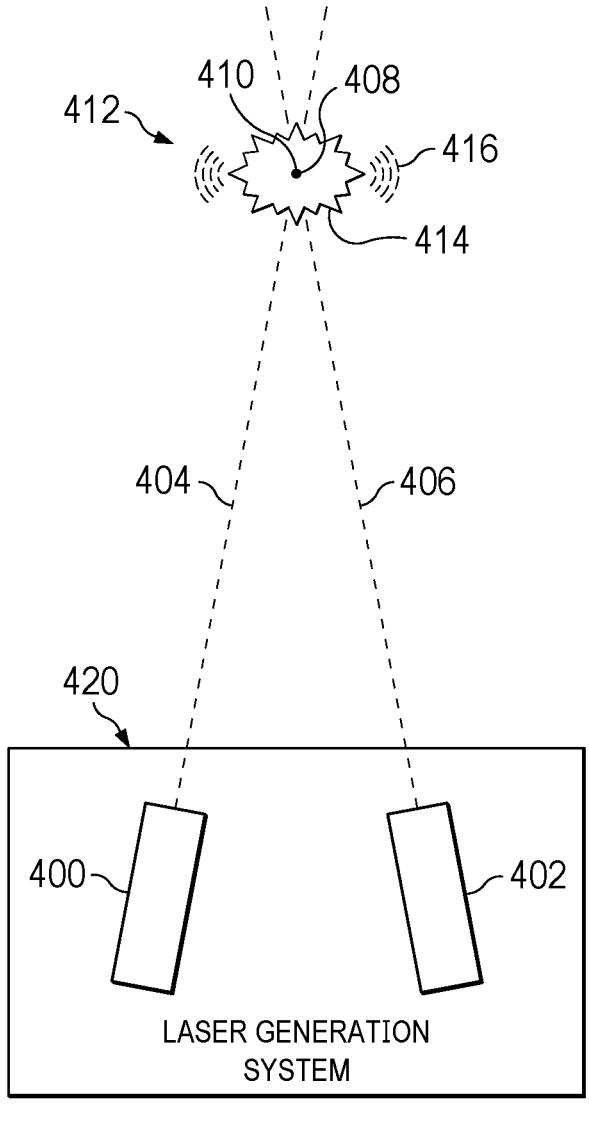
FIG. 4 is an illustration of radio frequency noise generation using a plurality of laser beams in accordance with an illustrative embodiment.

Turning next to FIG. 4, an illustration of radio frequency noise generation using a plurality of laser beams is depicted in accordance with an illustrative embodiment. In this illustrative example, laser generation system 420 comprises laser unit 400 and laser unit 402. Laser generation system 420 is an example of an implementation for laser generation system 218 in FIG. 2.

In this illustrative example, laser unit 400 generates first laser beam 404. Laser unit 402 generates second laser beam 406.

In this example, first laser beam 404 and second laser beam 406 are emitted in directions from these laser beam units to intersect at optical breakdown point 408. These two laser beams are emitted along different paths that intersect at optical breakdown point 408. This optical breakdown point where the two laser beams intersect each other is intersection point 410.

In this example, the intersection of first laser beam 404 and second laser beam 406 results in optical breakdown 412. This optical breakdown generates plasma 414. As depicted in this example, optical breakdown 412 results in radio frequency noise signals 416.

As depicted in the example, optical breakdown 412 occurs where first laser beam 404 and second laser beam 406 intersect at intersection point 410. In this example, the power for first laser beam 404 and second laser beam 406 individually is not sufficient to cause an optical breakdown.

The illustration of the two laser units for laser generation system 420 in FIG. 4 is provided as an example of one implementation for generating radio frequency noise signals. This illustration is not meant to limit the manner in which other illustrative examples can be implemented. In another example, one or more laser units in addition to laser unit 400 and laser unit 402 can be used to generate additional laser beams. The laser beams can also intersect at intersection point 410 to cause optical breakdown 412.

Figure 5:
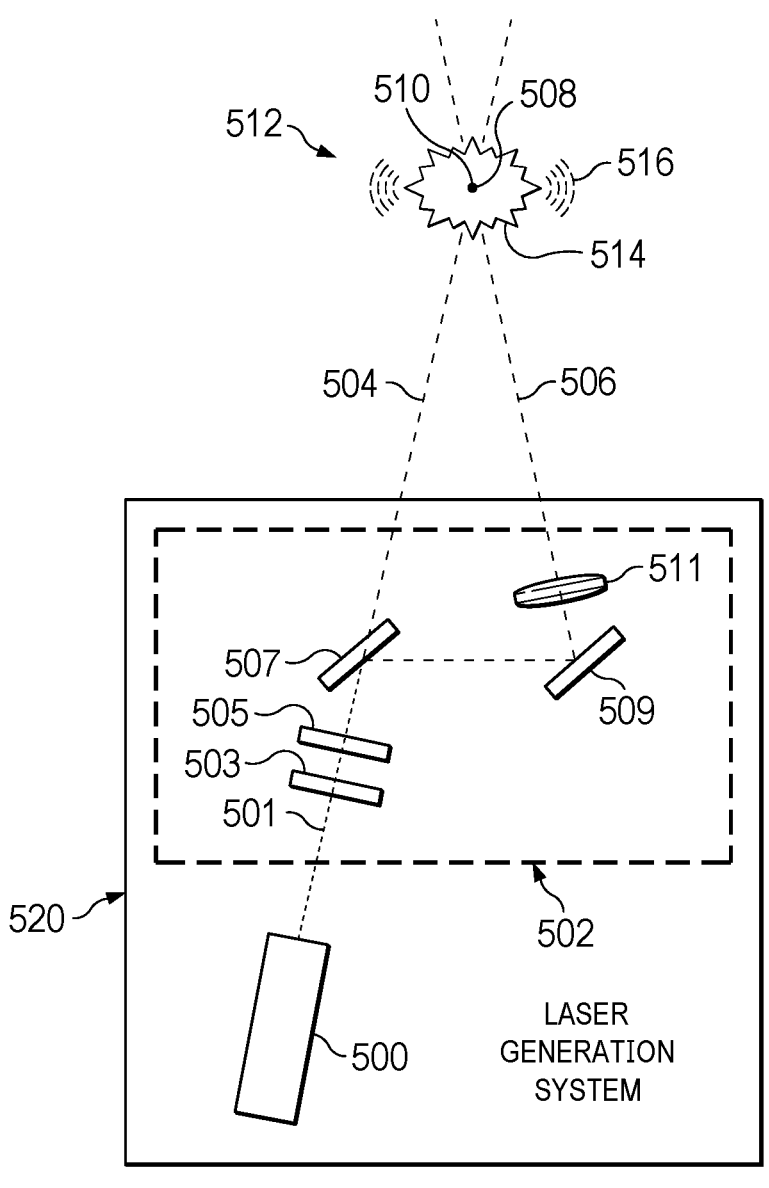
FIG. 5 is an illustration of radio frequency noise generation using a plurality of laser beams in accordance with an illustrative embodiment.

Turning next to FIG. 5, an illustration of radio frequency noise generation using a plurality of laser beams is depicted in accordance with an illustrative embodiment. In this illustrative example, laser generation system 520 comprises laser unit 500 and optical system 502. Laser generation system 520 is an example of an implementation for laser generation system 218 in FIG. 2.

In this example, laser unit 500 emits first laser beam 504 and second laser beam 506. In this example, laser unit 500 generates initial laser beam 501 that is split into two laser beams, first laser beam 504 and second laser beam 506 by optical system 502.

As depicted, optical system 502 comprises a number of different components. In this depicted example, optical system 502 comprises shutter 503, variable attenuator 505, beam splitter 507, mirror 509, and lens 511.

The components depicted are example components that can be used in optical system 502 and can change in other illustrative examples. For example, one or more of lens 511, variable attenuator 505, and shutter 503 may be omitted in other illustrative examples. In yet other illustrative examples, other components may be added such as a lens located before beam splitter 507.

As depicted, initial laser beam 501 is split into two laser beams by beam splitter 507. Mirror 509 can be used to direct second laser beam 506 in different directions. Further, mirror 509 can be used to provide focus to increase the power of second laser beam 506 at a focal point such as optical breakdown point 508. Lens 511 also can be used to provide focus to increase the power of second laser beam 506 at optical breakdown point 508.

In this example, first laser beam 504 and second laser beam 506 are emitted in directions to intersect at optical breakdown point 508, which is intersection point 510 in this example. Optical breakdown 512 occurs at this intersection of first laser beam 504 and second laser beam 506, generating plasma 514 that results in the generation of radio frequency noise signals 516.

In this example, the power of first laser beam 504 and second laser beam 506 are sufficient to cause optical breakdown 512 at the intersection of the laser beams. Optical breakdowns do not occur in other physical locations where these laser beams do not intersect each other in this example.

Figure 6:
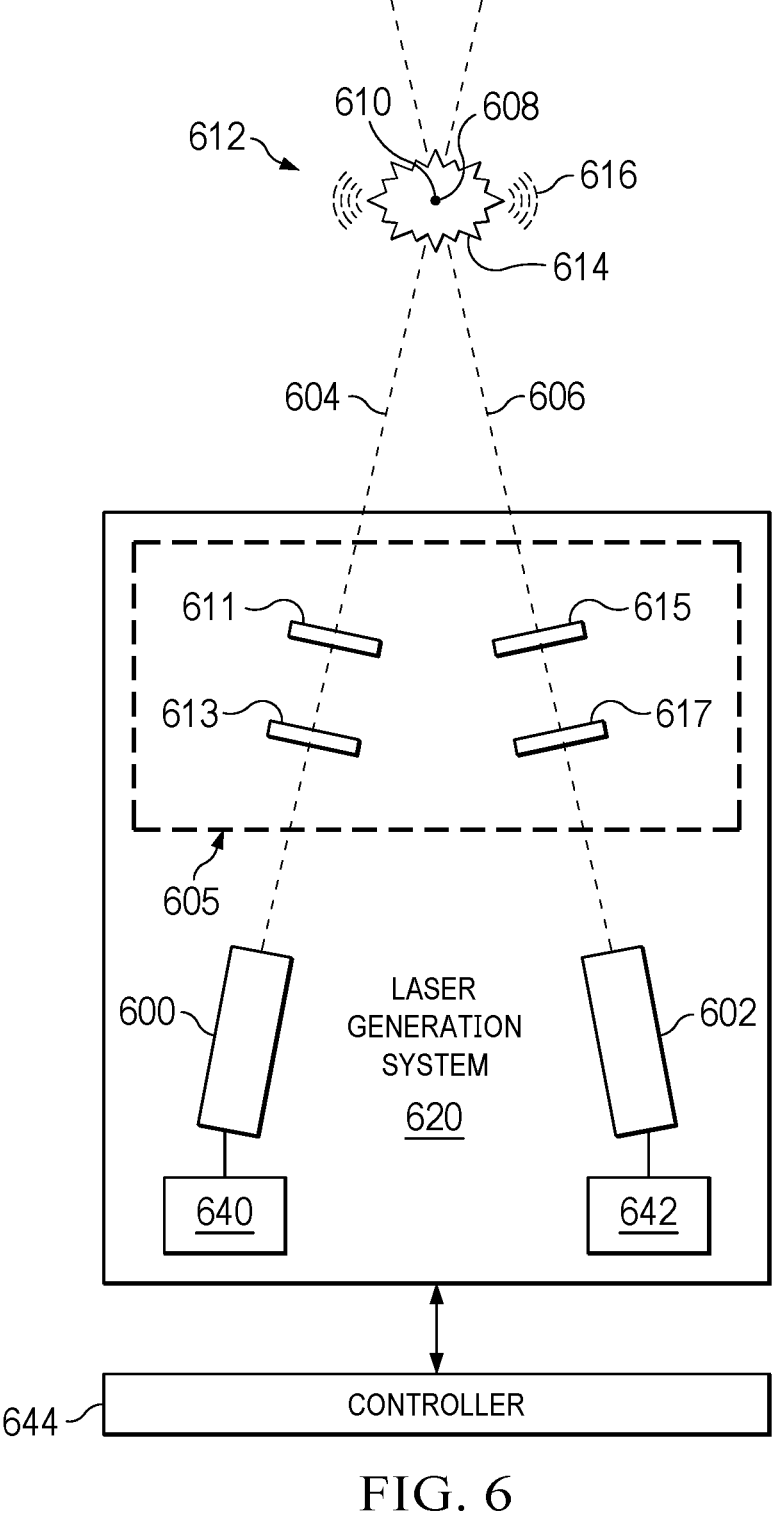
FIG. 6 is an illustration of a diagram for controlling radio frequency noise generation in accordance with an illustrative embodiment.

With reference now to FIG. 6, an illustration of a diagram for controlling radio frequency noise generation is depicted in accordance with an illustrative embodiment. In this illustrative example, the operation of laser generation system 620 is controlled by controller 644. As depicted, laser generation system comprises laser unit 600, laser unit 602, first power source 640, second power source 642, and optical system 605. In this example, controller 644 can control the operation of laser generation system 620.

In this example, laser generation system 620 is an example of an implementation for laser generation system 218 in FIG. 2. Controller 644 is an example a component that can be implemented in communications manager 212 in FIG. 2.

In this illustrative example, controller 644 can control the emission of first laser beam 604 and second laser beam 606 from laser generation system 620. In this illustrative example, laser unit 600 generates first laser beam 604 using power supplied by first power source 640. Laser unit 602 generates second laser beam 606 using power supplied by second power source 642.

In this example, first laser beam 604 and second laser beam 606 are emitted in directions that have paths that intersect at optical breakdown point 608, which is intersection point 610. Optical breakdown 612 occurs at this intersection of first laser beam 604 and second laser beam 606, generating plasma 614 that results in the transmission of radio frequency noise signals 616.

In this example, controller 644 can control the emission of these laser beams such that at least one of first laser beam 604 or second laser beam 606 is pulsed. This pulsing can include at least one of turning a laser beam on and off for increasing and decreasing the power of the laser beam. This pulsing of one or both of first laser beam 604 and second laser beam 606 can be controlled to control the timing of radio frequency noise generation.

When pulsed, optical breakdown 612 occurs when both laser beams intersect at intersection point 610. When one laser beam is turned off, and intersection is not present between both laser beams and optical breakdown 612 does not occur. By controlling the timing of when first laser beam 604 and second laser beam 606 intersect at intersection point 610, controller 644 can control the generation of radio frequency noise signals in a manner that encodes at least one of information or data.

For example, data can be encoded in radio frequency noise signals based on the timing of when radio frequency noise signals are generated. As another example, the timing of the laser beams can be used to control the duration of radio frequency noise signals. This duration can also be used to encode data into the radio frequency noise signals.

In this illustrative example, controller 644 can control whether a laser unit emits a continuous laser beam or a pulsed laser beam using components such as first power source 640 and second power source 642. These power sources can be turned on and off to turn the laser beams on and off. With this pulsing, optical breakdowns occur when both laser beams are on and intersect at intersection point 610.

In this example, the pulsing can also include increasing and decreasing the power in one or both of first laser beam 604 and second laser beam 606. In this example, decreasing the power of one or both laser beams can prevent the occurrence of an optical breakdown because of insufficient power being present when first laser beam 604 and second laser beam 606 intersect at intersection point 610. Optical breakdown 612 occurs when the power present from both laser beams intersecting at intersection point 610 is high enough for an optical breakdown.

As another example, the pulsing of the laser beams can also be controlled using optical elements in optical system 605. These optical elements can be controlled by controller 644 to pulse one or more of first laser beam 604 and second laser beam 606.

For example, variable attenuator 611 and shutter 613 can be operated to pulse first laser beam 604. For example, shutter 613 can be used to selectively emit first laser beam 604. Variable attenuator 611 can be used to change the power of first laser beam 604. In similar fashion, the emission of second laser beam 606 can also be pulsed using variable attenuator 615 and shutter 617.

Thus, the emission of first laser beam 604 and second laser beam 606 from laser generation system 620 can be controlled by controller 644 such that both laser beams are continuous, one laser beam is continuous while the other laser beam is pulsed, or both laser beams are pulsed. This control can be performed to achieve optical breakdowns to transmit radio frequency noise signals in a manner that encodes data into the radio frequency signals.

The illustration of laser generation system 620 is an example of one implementation and is not meant to limit the manner in which other illustrative examples can be implemented. For example, in other illustrative examples one or more laser units can be present in addition to laser unit 600 and laser unit 602.

Figure 7:
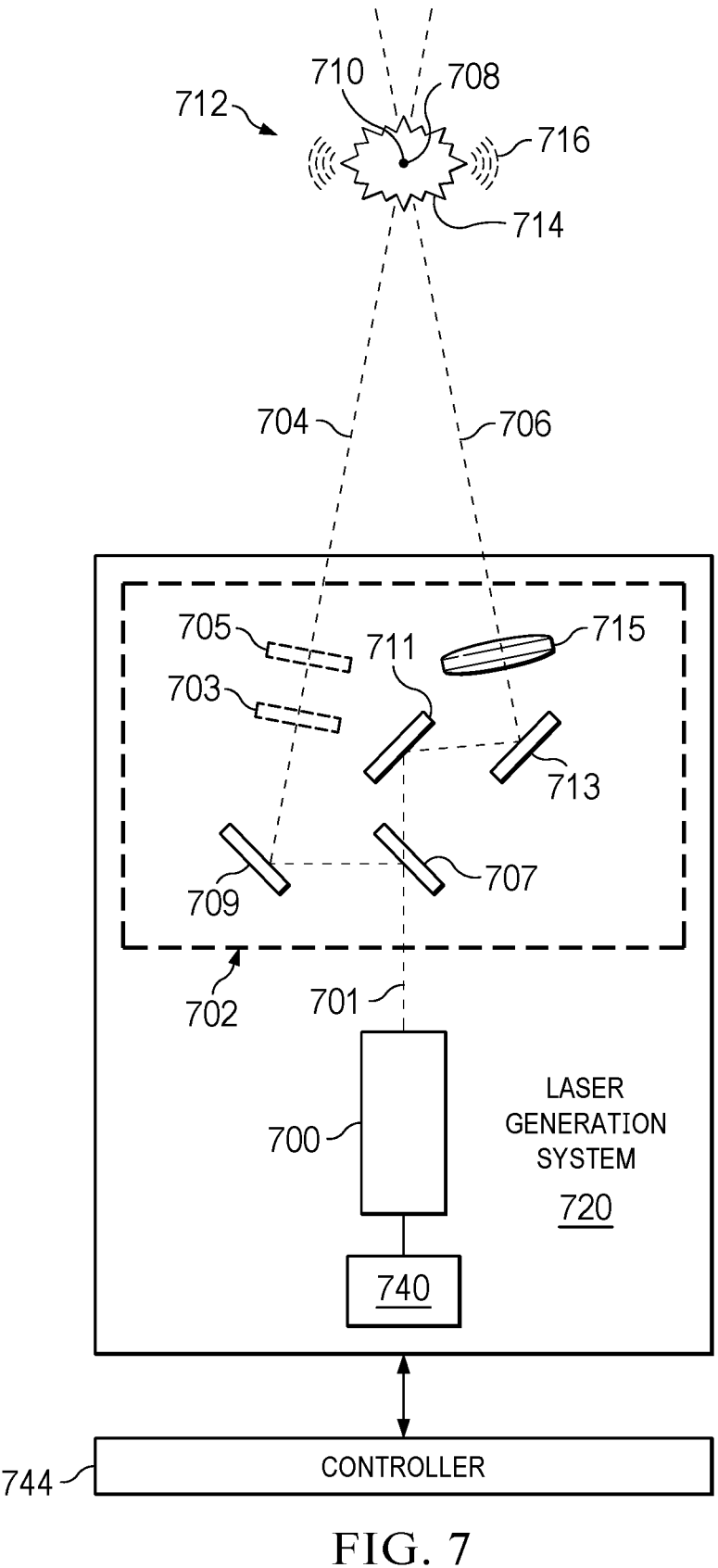
FIG. 7 is an illustration of a diagram for controlling radio frequency noise generation in accordance with an illustrative embodiment.

With reference next to FIG. 7, an illustration of a diagram for controlling radio frequency noise generation is depicted in accordance with an illustrative embodiment. In this illustrative example, laser generation system 720 is controlled by controller 744. As depicted, laser generation system 720 comprises laser unit 700, power source 740, and optical system 702.

Laser generation system 720 is an example of an implementation for laser generation system 218 in FIG. 2. Controller 744 is an example of the components that can be implemented in communications manager 212 in FIG. 2.

In this illustrative example, controller 744 controls the emission of first laser beam 704 and second laser beam 706 from laser generation system 720. In this illustrative example, laser unit 700 generates first laser beam 704 and second laser beam 706 using power supplied by power source 740. In this example, laser unit 700 generates initial laser beam 701 that is split into two laser beams, first laser beam 704 and second laser beam 706 by optical system 702.

As depicted, optical system 702 comprises a number of different components. In this example, optical system 702 comprises shutter 703, variable attenuator 705, beam splitter 707, and mirror 709, mirror 711, mirror 713, and lens 715 as other components that can be located in optical system 702. The components depicted are example components that can be used in optical system 702 and these components can change in other illustrative examples. For example, one or more lens 715, variable attenuator 705, and shutter 703 may be omitted in other illustrative examples. In yet other illustrative examples, other components may be included such as a lens located before beam splitter 707.

As depicted, initial laser beam 701 is split into two laser beams by beam splitter 707. In this example, first laser beam 704 and second laser beam 706 are emitted in directions to intersect at optical breakdown point 708, which is intersection point 710 in this example. Optical breakdown 712 occurs at this intersection of first laser beam 704 and second laser beam 706. Optical breakdown 712 generates radio frequency signal 716 through plasma 714 occurring from optical breakdown 712.

In this example, the power of the first laser beam 704 and second laser beam 706 are sufficient to cause optical breakdown 712 at the intersection of the laser beams. Optical breakdowns do not occur in other physical locations where these laser beams do not intersect each other in this example.

In this example, controller 744 can control the emission of these laser beams such that at least one of first laser beam 704 or second laser beam 706 is pulsed. This pulsing can include at least one of turning a laser beam on and off for increasing and decreasing the power of the laser beam. This pulsing of one or both of first laser beam 704 and second laser beam 706 can be controlled to control the timing of radio frequency noise generation.

In this example, first laser beam 704 can be pulsed by controller 744 controlling the operation of at least one of variable attenuator 705 or shutter 703. Variable attenuator 705 can be used to change the power of first laser beam 704. Shutter 703 can turn laser beam on and off with respect to emissions of laser beams from laser generation system 720. In this example, both laser beams can be pulsed at the same time by controlling power source 740. In another illustrative example, components within laser unit 700 such as an amplitude modulator can be controlled to pulse the power of initial laser beam 701 resulting in a pulsing of both first laser beam 704 and second laser beam 706.

By controlling the timing of when first laser beam 704 and second laser beam 706 intersect at intersection point 710, controller 744 can control the generation of radio frequency noise signals in a manner that encodes data.

In yet another illustrative example, controller 744 can control the physical location of optical breakdown point 708 by moving one or both of first laser beam 704 and second laser beam 706. This movement of optical breakdown point 708 can be controlled using at least one of mirror 709 or mirror 713. By moving the physical location of optical breakdown point 708, the phase of radio frequency noise signal can be changed to encode data.

The illustration of example implementations for laser generation system 218 in FIG. 2 and in FIGS. 3-7 have been provided as an example of some illustrative examples and are not meant to limit the manner in which other laser generation systems can be implemented. For example, a laser generation system can include both a first laser unit and a second laser unit with an optical system. In yet another illustrative example, one or more laser units can be present that emit laser beams in addition to the ones depicted at different optical breakdown points. With this example, two or more optical breakdowns can occur from laser beams emitted from a laser generation system.

In yet another illustrative example, different laser beams can be emitted at different times at the same optical breakdown point. As a result, optical breakdowns can be generated from different combinations of laser beams at the same optical breakdown point.

The illustrative embodiments also recognize and take into account that current techniques for transmitting data involves the use of carrier wave forms. For example, many techniques use only periodic, sinusoidal, or other repetitive or predictable carrier wave forms that are modulated to encode data. These types of waveforms can be detected in noise through various techniques including the denoiser technology which can detect sinusoidal carriers at 20 dB to 40 dB below a noise floor.

As a result, interception and decoding of signals can occur using current transmission techniques. Further, when the sinusoidal carriers can be detected, security issues can arise. For example, information can be inserted into transmissions, jamming attacks can occur, or other issues with using single sinusoidal, periodic, or other repetitive carriers to transmit data.

Thus, the illustrative embodiments provide a method, apparatus, and system for transmitting data. In the illustrative examples, this data can be transmitted using various modulation techniques that modulate noise signals. The use of noise signals is in contrast to the use of a sinusoidal, periodic, repetitive, or predictable carrier that can be detected.

Figure 8:
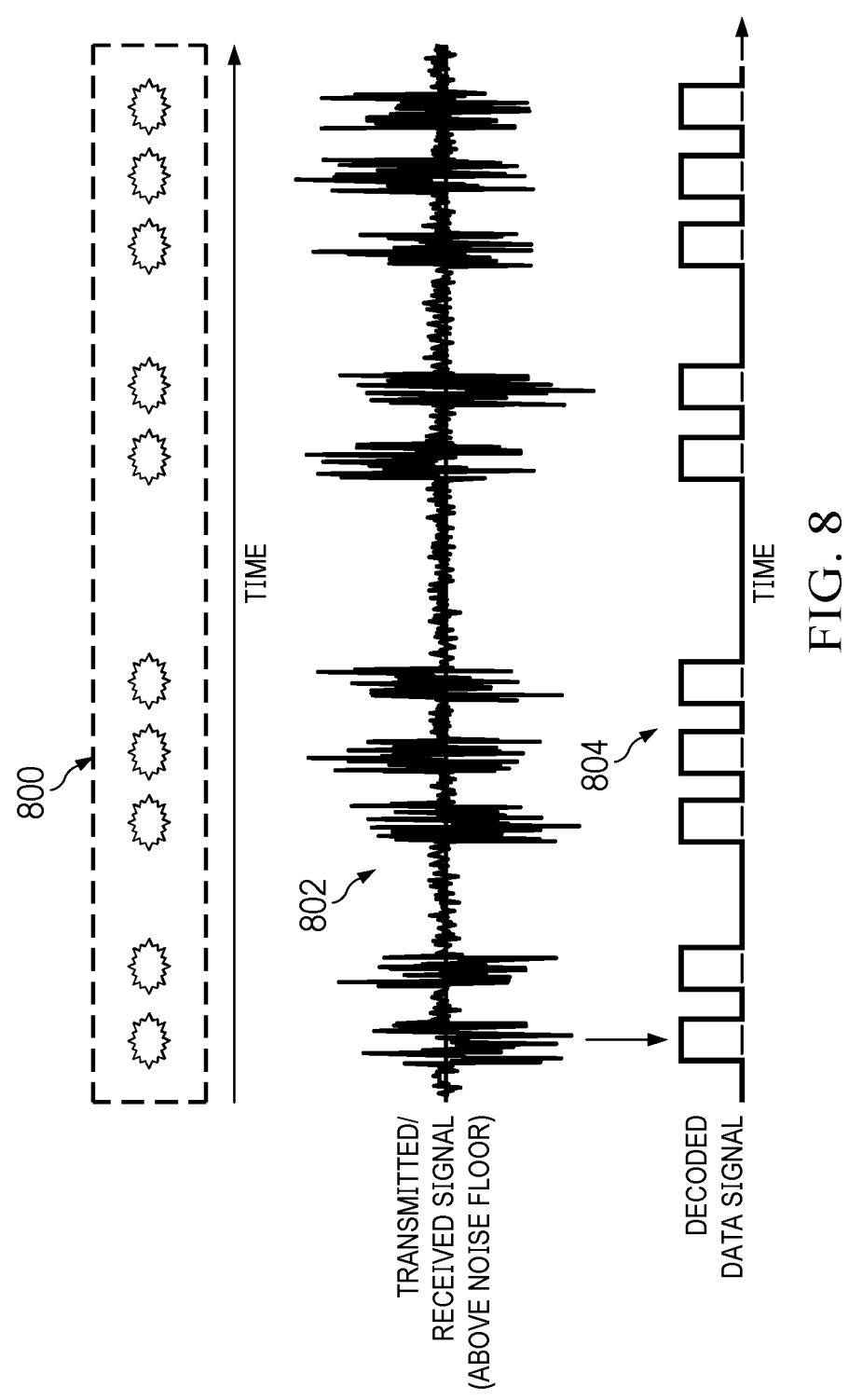
FIG. 8 is an illustration of data transmission using pulse code noise modulation or pulse noise modulation in accordance with an illustrative embodiment.

Turning to FIG. 8, an illustration of data transmission using pulse code noise modulation (also called pulse noise modulation) is depicted in accordance with an illustrative embodiment. In this illustrative example, pulse code noise modulation or pulse noise modulation can be performed using a radio frequency communication system such as radio frequency communications system 200 in FIG. 2.

In this illustrative example, optical breakdowns are generated over time. These optical breakdowns result in the generation of plasma 800 that causes radio frequency noise signals 802 to be transmitted.

The timing of these optical breakdowns can be selected to encode data such that the generation of radio frequency noise signals 802 encode the data. In this example, pulses are present in radio frequency noise signals 802 with timing that corresponds to the timing of optical breakdowns that generated plasma 800. These pulses of radio frequency noise signals 802 are timed to encode data. This type of encoding of data can be referred to as pulse noise modulation. As depicted, radio frequency noise signals 802 can be received and decoded to obtain decoded data signal 804.

This illustration of using radio frequency noise signals generated by optical breakdowns to communicate data is presented as one example of how pulses of radio frequency noise signals can encode data. This illustration is not meant to limit the manner in which other illustrative examples can be implemented.

For example, the pulses of radio frequency noise signals can be generated using other techniques in addition to or in place of laser-induced optical breakdowns. A transmitter system can use a noise signal as a carrier signal and a modulator to modulate the carrier signal such that pulses of radio frequency noise are transmitted that encode the data.

In still other illustrative examples, other types of noise signals in addition to or in place of radio frequency electromagnetic noise signals can be used. For example, noise signals can be used for transmitting data encoded in pulses and can be selected from at least one of electromagnetic frequency noise signals, radio frequency noise signals, microwave frequency signals, audio frequency noise signals, ultrasonic frequency noise signals, ultra-low frequency noise signals, very low frequency noise signals, underwater frequency noise signals, optical frequency noise signals, or other types of noise signals. These different types of noise signals can be used for various applications including speech communication, music, or other types of information for data that that are encoded in the noise signals.

Figure 9:
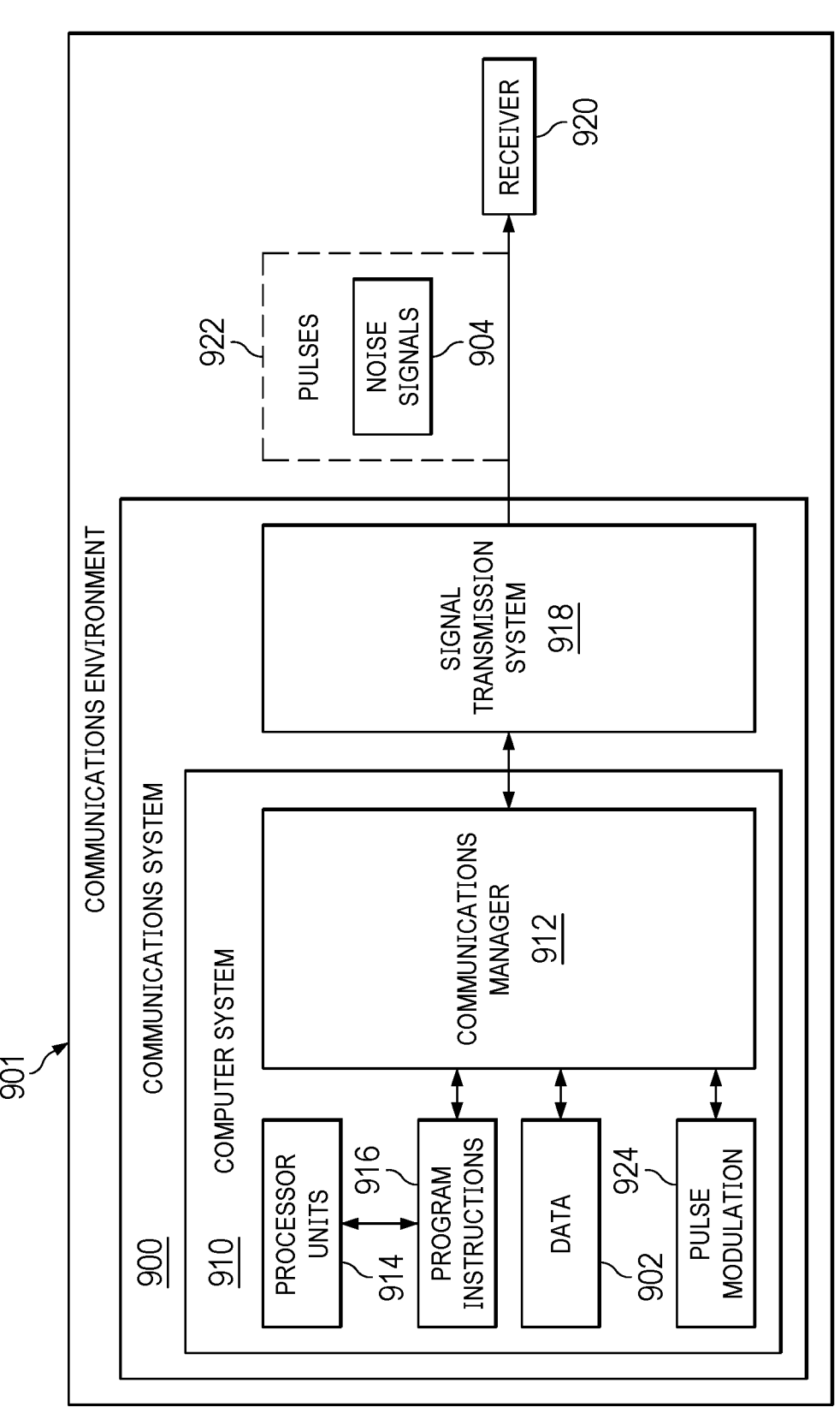
FIG. 9 is an illustration of a block diagram of a communication system in accordance with an illustrative embodiment.

With reference next to FIG. 9, an illustration of a block diagram of a communication system is depicted in accordance with an illustrative embodiment. In this illustrative example, communications system 900 in communications environment 901 operates to transmit data 902 encoded in noise signals 904.

In one illustrative example, a noise signal is a signal with irregular fluctuations that are or appear to be random, non-predictable, or non-deterministic. A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data. In this example, the noise in noise signals 904 can be selected from at least one of nondeterministic noise, pseudo random noise, or some other suitable type of noise signal.

In the illustrative example, signals can have characteristics selected from at least one of amplitude, frequency, bandwidth, timing, phase, or other characteristics. In this illustrative example, noise signals 904 can be noise signals in which at least one of these characteristics are not controlled to encode the data. In other words, at least one or more of these characteristics meet one or more standard tests for statistical randomness in noise signals 904.

In these examples, noise signals 904 do not include carrier waves that are periodic. These types of signals can be, for example, sinusoidal, sawtooth, square, or other types of signals. Noise signals 904 also do not include periodic or sinusoid-based carrier signals that employ spread spectrum, frequency-hopping signals, and radar "chirps" that are based on periodic signals such as sinusoids or sawtooths. These and other types of signals that do not meet one or more standard tests for statistical randomness are not considered noise signals 904 in this example. However, "spread noise spectrum", frequency-hopping noise signals, and noise-based radar bursts that use noise as the basis of their carrier signals are considered noise signals 904 in this example.

As depicted, communications system 900 comprises computer system 910 and communications manager 912 located in computer system 910.

Communications manager 912 can be implemented in software, hardware, firmware or a combination thereof. When software is used, the operations performed by communications manager 912 can be implemented in program instructions configured to run on hardware, such as a processor unit. When firmware is used, the operations performed by communications manager 912 can be implemented in program instructions and data and stored in persistent memory to run on a processor unit.

When hardware is employed, the hardware may include circuits that operate to perform the operations in communications manager 912.

The circuits used to implement communications manager 912 can take other forms in addition to or in place of a processor unit.

In the illustrative examples, the hardware used to implement communications manager 912 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 910 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 910, those data processing systems are in communication with each other using a communications medium. The communications medium may be a network. The data processing systems may be selected from at least one of a computer, a server computer, a tablet, or some other suitable data processing system.

As depicted, computer system 910 includes a number of processor units 914 that are capable of executing program instructions 916 implementing processes in the illustrative examples. In other words, program instructions 916 are computer-readable program instructions.

As used herein, a processor unit in the number of processor units 914 is a hardware device and is comprised of hardware circuits such as those on an integrated circuit that respond and process instructions and program code that operate a computer. When the number of processor units 914 executes program instructions 916 for a process, the number of processor units 914 can be one or more processor units that are on the same computer or on different computers. In other words, the process can be distributed between processor units 914 on the same or different computers in a computer system 910.

Further, the number of processor units 914 can be of the same type or different type of processor units. For example, a number of processor units 914 can be selected from at least one of a single core processor, a dual-core processor, a multi-processor core, a general-purpose central processing unit (CPU), a graphics processing unit (GPU), a digital signal processor (DSP), or some other type of processor unit.

As depicted, communications system 900 can also include signal transmission system 918. In other examples, signal transmission system 918 can be considered a separate component controlled by communications system 900.

In this depicted example, signal transmission system 918 is a hardware system that can transmit noise signals 904. The operation of signal transmission system 918 can be controlled by communications manager 912.

In this illustrative example, noise signals 904 are received by receiver 920. Receiver 920 is also depicted as part of communications system 900. In yet other illustrative examples, receiver 920 may be a separate component from communications system 900.

Receiver 920 is a hardware system and can include processes implemented in hardware or software that decode data 902 that is encoded in pulses 922 of noise signals 904.

In this illustrative example, communications manager 912 identifies data 902 for transmission. In response to identifying data 902, communications manager 912 transmits pulses 922 of noise signals 904 encoding data 902. In one illustrative example, data 902 can be encoded in pulses 922 of noise signals 904 using at least one of a timing of the pulses 922, an amplitude of the pulses 922, duration of pulses 922, or other characteristic for pulses 922. In this manner, communications manager 912 can perform pulse noise modulation through the modulation of noise signals 904 to encode data 902.

For example, communications manager 912 can control the operation of signal transmission system 918 to perform pulse modulation 924. With pulse modulation 924, pulses 922 can encode data 902 through the timing of pulses 922 which are noise pulses or pulses of noise in this example.

For example, the presence of a noise pulse or pulse of noise can be considered a "1" and the absence of a noise pulse or pulse of noise can be considered a "0" which can be selected in time to encode data 902. The timing of the presence or absence of pulses 922 of noise can occur using various time periods.

For example, the timing can be based on whether a noise pulse or pulse of noise is present or absent at each period of time. The period of time can be, for example, a microsecond, a millisecond, two milliseconds, or some other period of time during which a pulse is absent or present for encoding data 902 in pulses 922 of noise.

Figure 10:
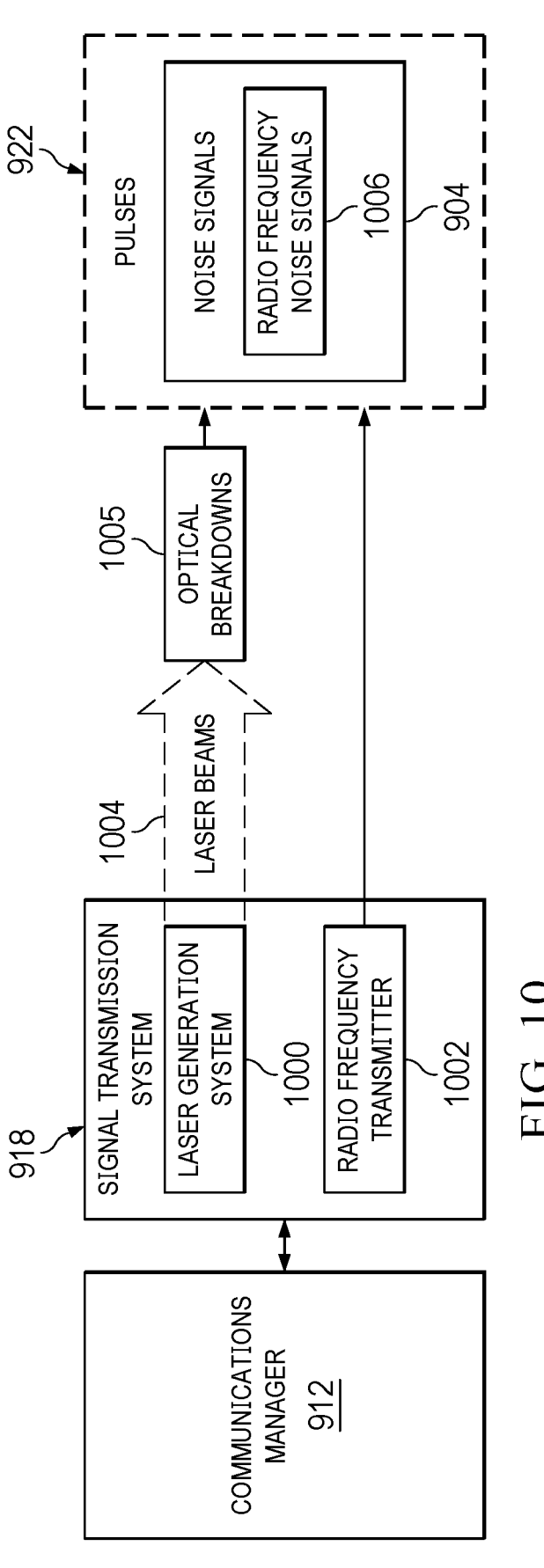
FIG. 10 is an illustration of a transmitter in accordance with an illustrative embodiment.

With reference next to FIG. 10, an illustration of a transmitter is depicted in accordance with an illustrative embodiment. In the illustrative examples, the same reference numeral may be used in more than one figure. This reuse of a reference numeral in different figures represents the same element in the different figures. In this illustrative example, examples of components that can be used to implement signal transmission system 918 in FIG. 9 are depicted.

As depicted in this illustrative example, signal transmission system 918 can include a number of different components that can be controlled to transmit noise signals 904. More specifically, these components can be controlled to generate pulses 922 of noise signals 904. These components can include at least one of laser generation system 1000 or radio frequency transmitter 1002.

In this illustrative example, laser generation system 1000 is a hardware system that emits a set of laser beams 1004. Communications manager 912 can control the emission of the set of laser beams 1004 from laser generation system 1000 to cause optical breakdowns 1005.

In this example, optical breakdowns 1005 result in the generation of noise signals 904 in the form of radio frequency noise signals 1006. In this example, pulses 922 of radio frequency noise signals 1006 can be generated based on the timing of optical breakdowns 1005. In this illustrative example, each optical breakdown in optical breakdowns 1005 can be a pulse in pulses 922 of radio frequency noise signals 1006.

In this example, radio frequency transmitter 1002 is a hardware system and can transmit pulses 922 of noise signals 904 in the form of radio frequency noise signals 1006. For example, radio frequency transmitter 1002 can transmit pulses 922 of noise signals 904 in the form of radio frequency noise signals 1006 transmitted from a physical hardware antenna instead of using lasers and optical breakdowns to produce the radio frequency noise signals 1006.

Figure 11:
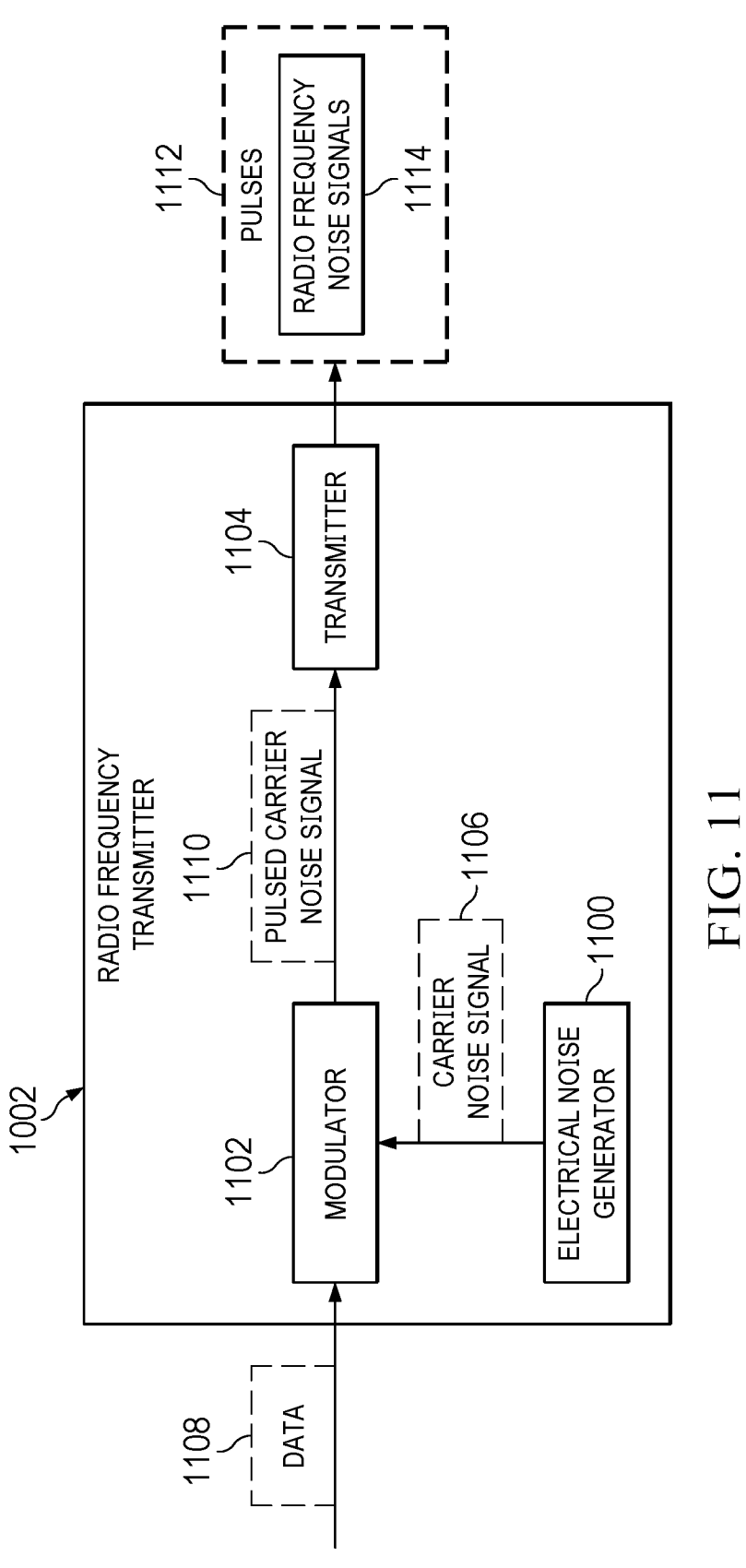
FIG. 11 is an illustration of a block diagram of a radio frequency transmitter in accordance with an illustrative embodiment.

Turning next to FIG. 11, an illustration of a block diagram of a radio frequency transmitter is depicted in accordance with an illustrative embodiment. This figure illustrates example components that can be used to implement radio frequency transmitter 1002. As depicted in this example, radio frequency transmitter 1002 comprises electric noise generator 1100, modulator 1102, and transmitter 1104.

As depicted, electric noise generator 1100 generates carrier noise signal 1106. Electric noise generator 1100 is connected to modulator 1102 and sends carrier noise signal 1106 to modulator 1102.

As depicted, modulator 1102 receives data 1108 that is to be transmitted. In this example, modulator 1102 modulates or digitally "shift keys" carrier noise signal 1106 to create pulsed carrier noise signal 1110 that encodes data 1108. This data is encoded in pulses in pulsed carrier noise signal 1110. In this example the modulation occurs by modulator 1102 turning carrier noise signal 1106 on and off to form pulsed carrier noise signal 1110.

Transmitter 1104 transmits pulsed carrier noise signal 1110 as pulses 1112 of radio frequency noise signals 1114. In this example, transmitter 1104 includes a physical antenna that is used to transmit pulses 1112 of radio frequency noise signals 1114. In other illustrative examples, the antenna can be a separate component from the hardware used to generate radio frequency noise signals 1114.

Figure 12:
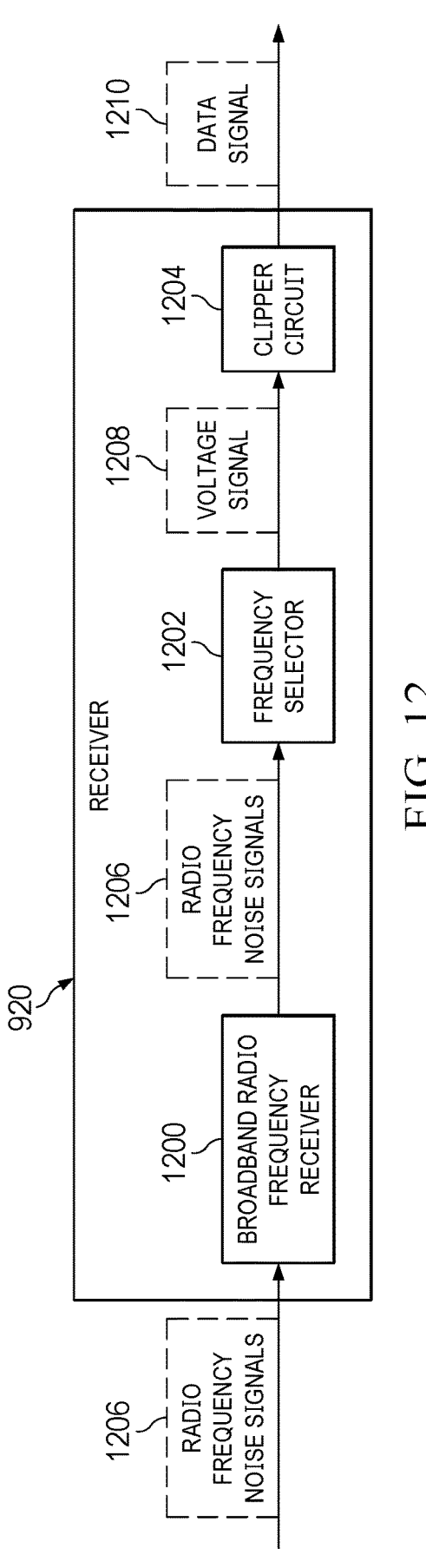
FIG. 12 is an illustration of a block diagram of a receiver in accordance with an illustrative embodiment.

Turning next to FIG. 12, an illustration of a block diagram of a receiver is depicted in accordance with an illustrative embodiment. An example of components that can be used to implement receiver 920 are shown in this figure. As depicted, receiver 920 is a hardware system. As depicted, receiver 920 comprises broadband radio frequency receiver 1200, frequency selector 1202, and clipper circuit 1204.

In this illustrative example, broadband radio frequency receiver 1200 receives radio frequency noise signals 1206. Broadband radio frequency receiver 1200 is connected to frequency selector 1202 and sends the received signals to frequency selector 1202.

Frequency selector 1202 outputs voltage signal 1208 from the frequencies selected in radio frequency noise signals 1206. In this illustrative example, the selection of frequencies by frequency selector 1202 can be performed using at least one of a bandpass filter, a band-reject filter, an envelope follower, an envelope detector, a low-pass filter, a rectified low pass filter, multiple bandpass filters tuned to different frequencies, or some other suitable type of circuit.

Frequency selector 1202 is connected to clipper circuit 1204. Voltage signal 1208 is received by clipper circuit 1204, which shapes voltage signal 1208. In this illustrative example, clipper circuit 1204 prevents voltage signal 1208 from exceeding a selected voltage level. Clipper circuit 1204 outputs data signal 1210. In this example, data signal 1210 is in an analog or digital signal and contains pulses that can be used re-create the data transmitted in radio frequency noise signals 1206.

Thus, one or more illustrative examples enable communicating data using noise carrier signals. In one illustrative example, these noise carrier signals or carrier noise signals can be modulated to encode data. The modulation can be pulse noise modulation or pulse code noise modulation in which a noise signal is transmitted in pulses. The timing of the pulses selected encodes data in these pulses of noise signals.

In this illustrative example, the modulation and demodulation of these pulses of noise signals do not depend on a single frequency or periodic waveform as the basis for the carrier wave as compared to current techniques that use a sinusoidal, periodic, or predictable carrier. As result, increased security can be present and interference with the sinusoidal carriers can be reduced.

In one illustrative example, the pulse code noise modulation or pulse noise modulation can be a broadband noise radio frequency carrier signal encoding the data. The generation of the pulses of radio frequency noise signals can be performed using a laser generation system that generates radio frequency signals through optical breakdowns. In another example, the generation of the radio frequency noise signals can be performed using a physical electromagnetic receipt transmitter having a physical antenna.

The illustration of communications environment 901 and the different components in FIGS. 9-12 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 912 is shown as being implemented using program instructions 916 run on a number of processor units 914 in computer system 910, communications manager 912 can be implemented in other hardware instead of or in addition to the number of processor units 914. For example, computer system 910 may use other hardware in addition to or in place of the number of processor units 914.

For example, other types of hardware circuits capable of performing the operations for communications manager 912 can be used. This other hardware can be at least one of a circuit system, an integrated circuit, an application-specific integrated circuit (ASIC), a programmable logic device, or some other suitable type of hardware configured to perform a number of operations.

As another example, the illustration of laser generation system 1000 and radio frequency transmitter 1002 are provided as examples of some implementations of components that can transmit pulses 922 of noise signals 904. As another example, radio frequency transmitter 1002 that generates electrical noise in electric noise generator 1100 as carrier noise signal 1106 to be modulated and transmitted as radio frequency noise signals 1114 in pulses 1112 can be transmitted on any type of physical, hardware antenna, or both. Examples of antenna types include, for example, whip antennas, dipole antennas, microwave antennas, metamaterial antennas, directional antennas, omnidirectional antennas, and any other type of physical antenna.

Figures 13, 14:
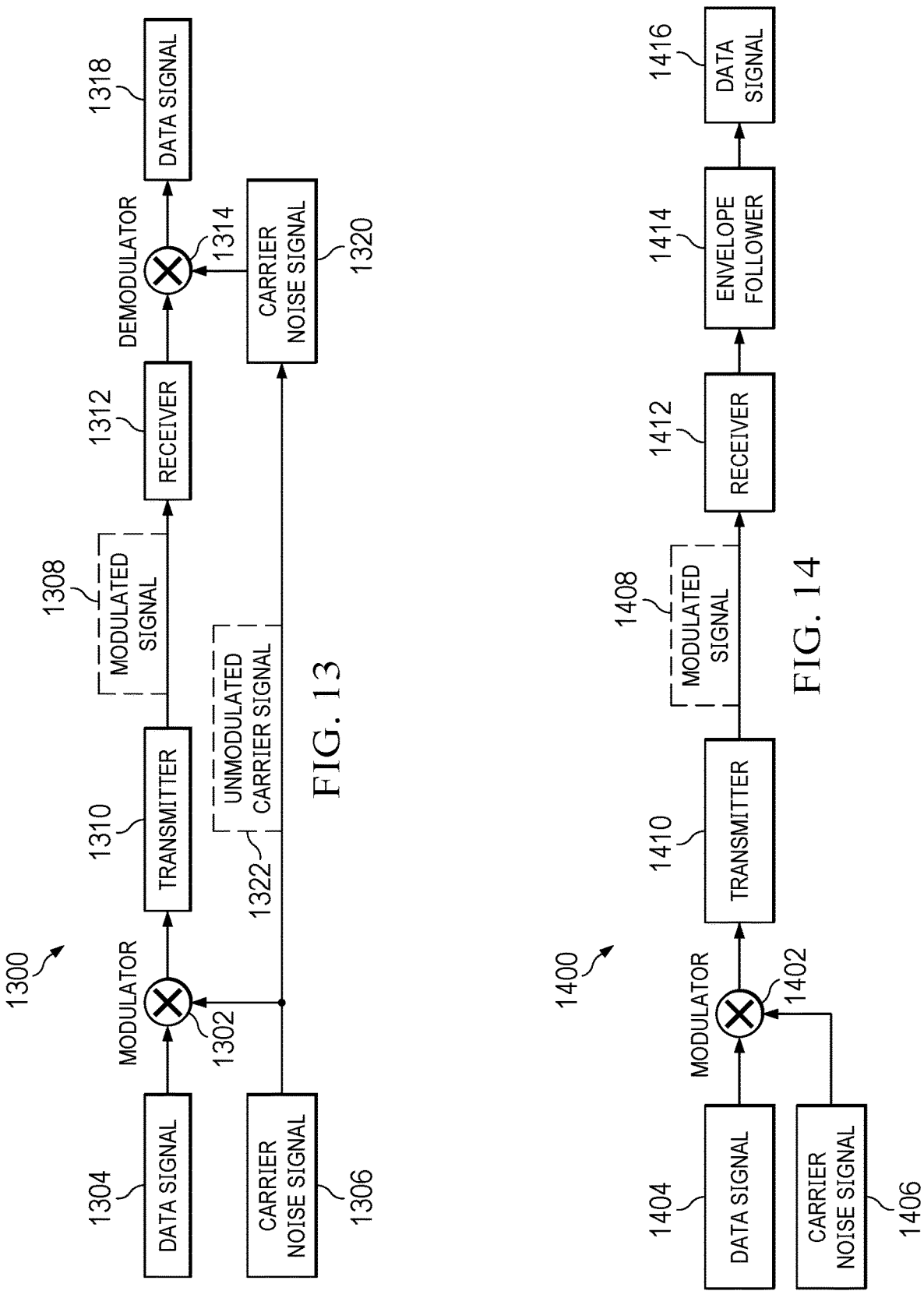
FIG. 13 is an illustration of a communications system for transmitting and receiving electromagnetic noise signals in accordance with an illustrative embodiment.
FIG. 14 is an illustration of a block diagram of a communications system for transmitting and receiving electromagnetic noise signals in accordance with an illustrative embodiment.

Turning next to FIG. 13, an illustration of a communications system for transmitting and receiving electromagnetic noise signals is depicted in accordance with an illustrative embodiment. In this illustrative example, communications system 1300 can transmit or receive electromagnetic noise signals encoding data using electromagnetic noise signals. Examples of electromagnetic noise signals may include electromagnetic ranges of ULF (Ultra Low Frequency), VLF (Very Low Frequency), 20 KHz to 300 KHz, HF (High Frequency), UHF (Ultra High Frequency), millimeter wave and microwave ranges, EHF (Extremely High Frequencies) up through Gigahertz frequencies and above Terahertz frequencies, and including the optical spectrum. Examples of applications or uses include noise carrier communications for modulation of audio, voice, and video communications, as well as noise-based radar, noise-based precision navigation and timing such as noise-based global positioning systems, noise-based spread spectrum using frequency bands of noise instead of sinusoidal-based carrier spread spectrum, noise-based frequency band-hopping using frequency-hopping of frequency bands of noise instead of using sinusoidal or periodic-based carrier frequency-hopping, as well as Signals Intelligence (SI) waveforms such as Low Probability of Intercept/Low Probability of Detect (LPI/LPD) and other clandestine signaling where detection and interception of messages using noise carriers will be difficult.

As depicted, modulator 1302 receives data signal 1304 and carrier noise signal 1306. In this illustrative example, carrier noise signal 1306 can be generated by an electric noise generator.

Modulator 1302 modulates or digitally "shift keys" carrier noise signal 1306 to generate modulated signal 1308. In this example, modulated signal 1308 comprises pulses of carrier noise signal 1306. For example, modulated signal 1308 can be generated by turning modulator 1302 on and off to send pulses of carrier noise signal 1306 to transmitter 1310 for transmission as modulated signal 1308. The generation of the pulses is based on the data in data signal 1304. In this manner, the data in data signal 1304 can be encoded in modulated signal 1308.

Transmitter 1310 transmits modulated signal 1308 to receiver 1312. In one illustrative example, receiver 1312 can be a broadband radio frequency receiver when modulated signal 1308 is a radio frequency signal. When other types of signals are used, receiver 1312 is selected to detect the signals transmitted by transmitter 1310.

Modulated signal 1308 detected by receiver 1312 is sent to demodulator 1314. In this example, demodulator 1314 demodulates or digitally de-"shift keys" the modulated or "shift keyed" signal 1308 using carrier noise signal 1320 to generate data signal 1318, which contains the same data in data signal 1304 in this depicted example.

As depicted, the demodulation of modulated signal 1308 is performed using carrier noise signal 1320. In this illustrative example, carrier noise signal 1306 is not predictable as compared to current techniques using sinusoidal wave forms for carrier signals.

As depicted, carrier noise signal 1320 can be obtained by demodulator 1314 in the form of unmodulated carrier noise signal 1322 being transmitted to demodulator 1314. In this manner, carrier noise signal 1320 used to demodulate modulated signal 1308 can be the same carrier signal as carrier noise signal 1306. Unmodulated carrier noise signal 1322 can be an in-band or out-of-band copy of carrier noise signal 1306.

With reference now to FIG. 14, an illustration of a block diagram of a communications system for transmitting and receiving electromagnetic noise signals is depicted in accordance with an illustrative embodiment. Communications system 1400 can transmit or receive electromagnetic noise signals encoding data using electromagnetic noise signals.

In this illustrative example, communications system 1400 can transmit or receive electromagnetic noise signals encoding data using electromagnetic noise signals.

As depicted, modulator 1402 receives data signal 1404 and carrier noise signal 1406. In this illustrative example, carrier noise signal 1406 can be generated by an electric noise generator.

Modulator 1402 modulates or digitally "shift keys" carrier noise signal 1406 to generate modulated signal 1408. In this example, modulator 1402 can be an on/off modulator. As an on/off modulator, modulator 1402 sends carrier noise signal 1406 transmitter 1410 for transmission when modulator 1402 is turned on and does not send carrier noise signal 1406 to transmitter 1410 when modulator 1402 is turned off. As result, modulated signal 1408 comprises pulses of carrier noise signal 1406. These pulses are generated to encode data signal 1404. In other words, the timing of these pulses can be generated to encode the data. For example, the timing in these depicted examples can be time for pulses to perform pulse code noise modulation or pulse noise modulation.

For example, modulated signal 1408 can be generated by turning modulator 1402 on and off to send pulses of carrier noise signal 1406 to transmitter 1410 for transmission as modulated signal 1408.

Transmitter 1410 transmits modulated signal 1408 to receiver 1412. In one illustrative example, receiver 1412 can be a broadband radio frequency receiver when modulated signal 1408 is a radio frequency signal. When other types of signals are used, receiver 1412 is selected to detect the signals transmitted by transmitter 1410.

In this example, modulated signal 1408 detected by receiver 1412 is sent to envelope follower 1414. As depicted, envelope follower 1414 can also be referred to as an envelope detector. Envelope follower 1414 can detect amplitude variations in modulated signal 1408 and create a signal having a shape that resembles those variations. This example, modulated signal 1408 contains pulses of noise. As a result, envelope follower 1414 can generate a signal with the shape of the noise pulses to form data signal 1416. Envelope follower 1414 can be a selected from at least one of a low pass filter, a bandpass filter, an envelope detector, a peak detector, or a diode detector that follows and outputs the overall shape of at least one of the amplitudes or pulses as currently used.

The illustrative examples of communication systems in FIG. 13 and in FIG. 14 are presented as examples of some implementations for communications system 900 in FIG. 9. These illustrations are not meant to limit the manner in which other illustrative examples can be implemented. For example, a clipper circuit as is known in the art can be placed after envelope follower 1414 in FIG. 14 to convert rough envelopes of pulses into square wave pulses.

Figure 15A:
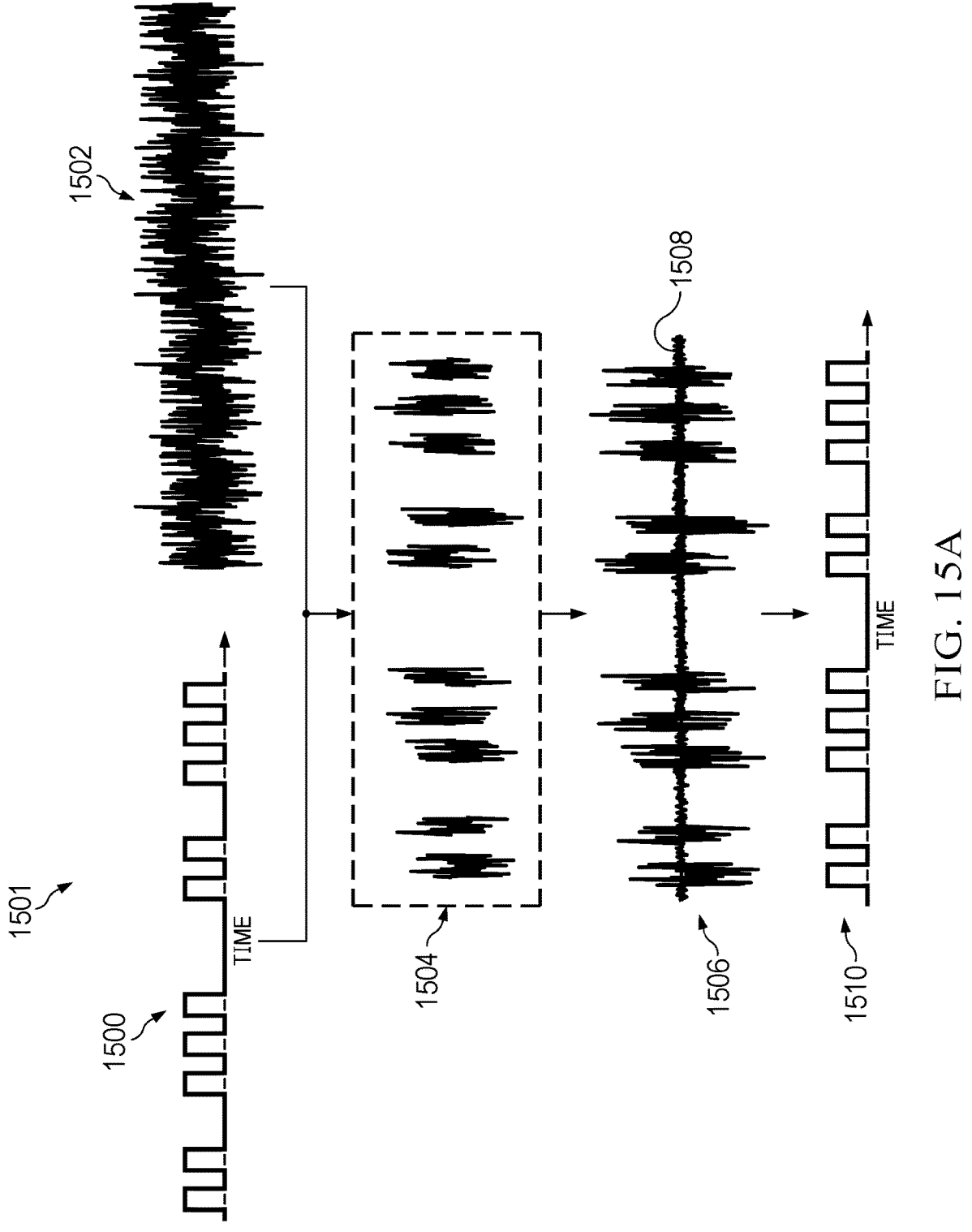
FIG. 15A is an illustration of a data flow of signals transmitting data using modulated noise signals in accordance with an illustrative embodiment.

Turning now to FIG. 15A, an illustration of a data flow of signals transmitting data using modulated noise signals is depicted in accordance with an illustrative embodiment. In this illustrative example, data signal 1501 is an example of signals in communications system 1400 in FIG. 14.

In this illustrative example, data signal 1500 is used to modulate carrier noise signal 1502. Data signal 1500 is an example of data signal 1404 and carrier noise signal 1502 is an example of carrier noise signal 1406 in FIG. 14.

The modulation of carrier noise signal 1502 forms modulated signal 1504, which encodes the data in data signal 1500. Modulated signal 1504 is an example of modulated signal 1408 in FIG. 14. As depicted in this example, modulated signal 1504 is a modulated noise signal comprising pulses of carrier noise signal 1502.

Received signal 1506 is an example of the signal received by a receiver. As depicted, received signal 1506 also includes noise 1508 in addition to the pulses of carrier noise signal 1502 in modulated signal 1504. In this example, noise 1508 is background noise or other noise in addition to the pulses in the carrier noise in modulated signal 1504.

As depicted, received signal 1506 can be processed and decoded using a component such as envelope follower 1414 in FIG. 14. Other components such as a bandpass filter, low-pass filter, band reject filter, clipper circuit, or other circuits can be used to generate output data signal 1510. In this example, output data signal 1510 is the same as or close enough to data signal 1500 such that the same data used to generate data signal 1500 can be obtained from output data signal 1510.

As discussed previously, the set of characteristics for noise signals can be selected from at least one of a timing, an amplitude, a frequency band, a relative phase, or other characteristics for carrier noise signals. For pulse noise modulation the carrier noise may be of different frequency characteristics that the transmitter and receiver will share. For pulse noise modulation the carrier noise signals will vary in amplitude, duration, and timing to modulate the message signal. For reception of these pulse noise modulated signals the receivers in FIG. 12 and FIG. 14 use various types of techniques to receive and demodulate the original data signal.

Figure 15B:
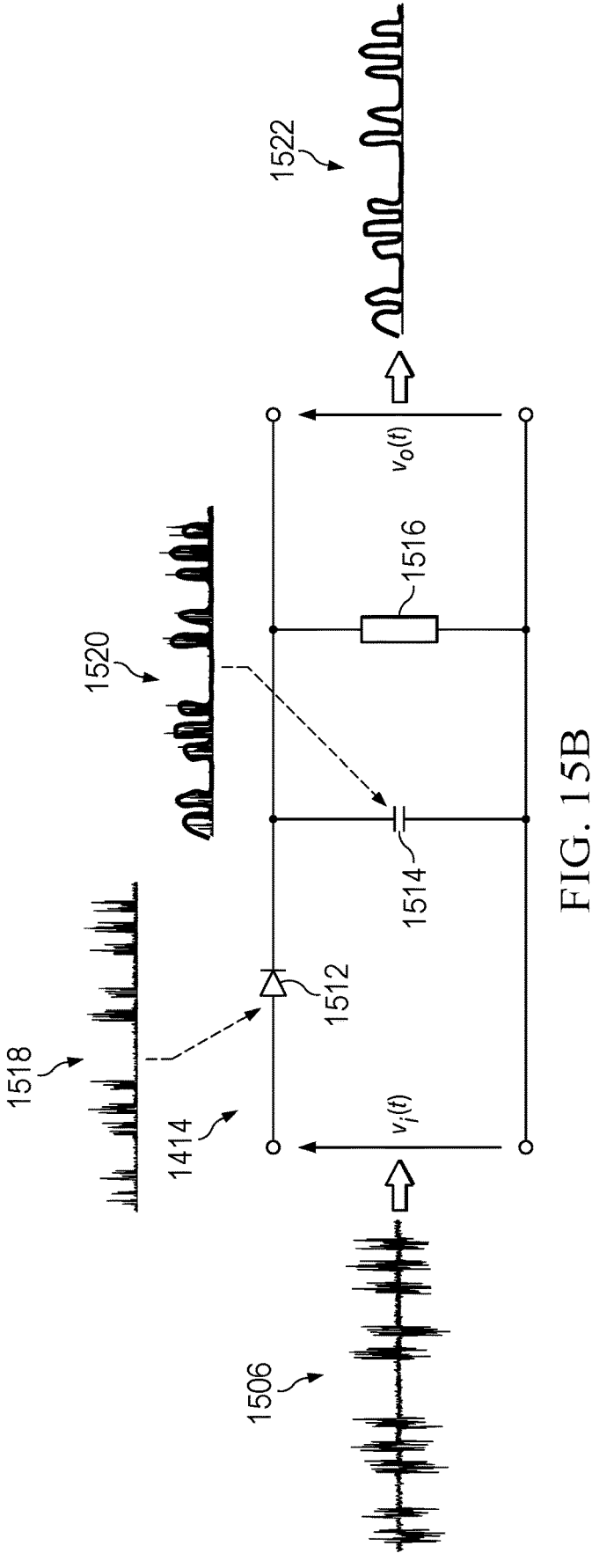
FIG. 15B is an illustration of an envelope follower circuit using a diode detector with a low pass filter in accordance with an illustrative embodiment.

Turning now to FIG. 15B, an illustration of an envelope follower circuit using a diode detector with a low pass filter in accordance with an illustrative embodiment. In this figure, an illustration of a simple circuit for envelope follower 1414 is shown. In this illustrative example, envelope follower 1414 is comprised of a diode 1512 to rectify the input signal, capacitor 1514 to provide a low pass filter to smooth out the noisy rectified signal and produce a lower frequency envelope. An optional resistor 1516 or inductive coil may be provided to affect the tuning or resonance of the circuit. Here, received signal 1506 of carrier pulses of noise is inputted to the envelope follower 1414 circuit. As received signal 1506 travels through diode 1512 the diode acts as a rectifier and converts the AC noise signal into a DC noise signal 1518 as shown by the dashed arrow from DC noise signal 1518 to the output of diode 1512. From there the rectified DC noise signal 1518 travels across capacitor 1514 which acts as a low pass filter to smooth the signal into an envelope signal 1520. The actual envelope signal, envelope signal 1520, is shown by the line the follows the outline or envelope of the noise bursts from DC noise signal 1518. The envelope signal 1520 then travels across optional resistor 1516 or coil and exits at the output as the envelope followed signal 1522.

In this illustrative example it is clear that the envelope followed signal 1522 is beginning to look like the received signal 1506.

Figure 15C:
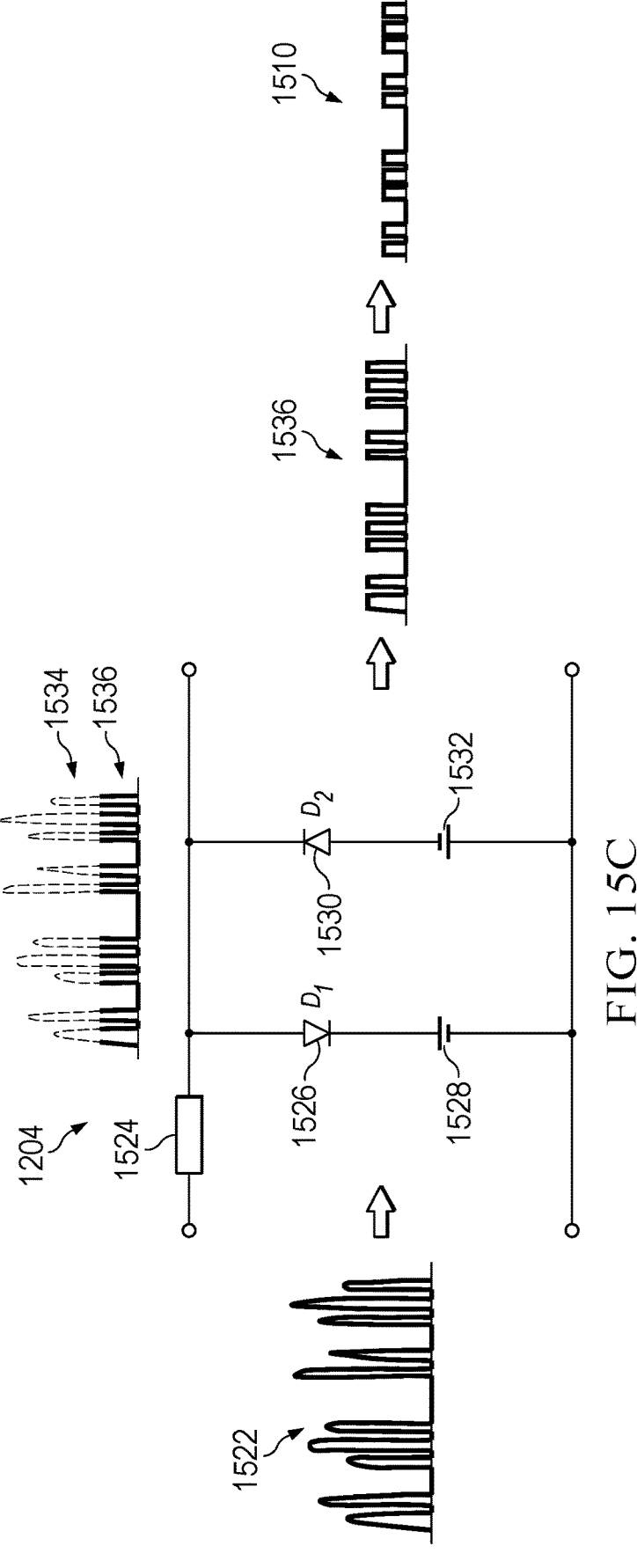
FIG. 15C is an illustration of a clipper circuit in accordance with an illustrative embodiment.

With reference to FIG. 15C, an illustration of a clipper circuit in accordance with an illustrative embodiment. In this figure, clipper circuit 1204 is also referred to as a slicer or amplitude selector. In this illustrative example, clipper circuit 1204 is comprised of optional input resistor 1524, and a bidirectional clipping circuit comprised of diode D1 1526, bias voltage 1528, diode D2 1530, and bias voltage 1532. This and many other known methods of clipping can be used. Single directional clipping may be used as well as bidirectional or any other type of clipping circuit.

In this illustrative example, envelope followed signal 1522 from FIG. 15B has been amplified to be a stronger signal and is inputted into clipper circuit 1204. Envelope followed signal 1522 travels through optional input resistor 1524 which may be an impedance matching circuit.

This signal then travels across one or more illustrative diode D1 1526 and diode D2 1530. Various types of diodes may be used. A single diode may be used, or a transistor circuit may be used with the purpose of clipping off the top of envelope followed signal 1522 such that top part of signal 1534 is clipped off and bottom part of signal 1536 remains. The level at which top part of the signal 1534 is clipped off is determined by the diode D1 1526 and diode D2 1530 as well as by the bias voltage 1528 and 1532.

Thus, bottom part of signal 1536 remaining is output at the output. This bottom part of the signal 1536 can be transferred through another stage of clipping until it becomes output data signal 1510 which is extremely similar to the original data signal 1500.

As can be seen in this illustrative example, the pulses of carrier noise signal 1502 encode data in data signal 1500. In other words, the timing in generating pulses of carrier noise signal 1502 is used to encode the data.

Thus, the different illustrative examples use pulse modulation of a noise signal that can be generated using a laser generator or a transmitter. With a laser generator, optical breakdowns are used to create the pulses of noise signals. With a physical transmitter, an electronic noise source generates a carrier noise signal that is modulated to create pulses of the carrier noise signal based on the data to be transmitted. These pulses of the carrier noise signals form the pulses of noise signal encoding data that can be transmitted using a physical antenna.

In this illustrative example, FIGS. 16-27 are flowcharts illustrating operations that can be performed to generate radio frequency noise signals encoding data in which a physical antenna is unnecessary.

With reference first to FIG. 16, a flowchart of a process for transmitting data is depicted in accordance with an illustrative embodiment. The process in FIG. 16 can be implemented in hardware, software, or both. When implemented in software, the process can take the form of program instructions that are run by one of more processor units located in one or more hardware devices in one or more computer systems. For example, the process can be implemented in communications manager 212 in computer system 210 in FIG. 2.

The process begins by identifying data for transmission (operation 1600). The process controls an emission of a set of laser beams to cause optical breakdowns generating radio frequency noise signals encoding the data (operation 1602). The process terminates thereafter.

In operation 1602, the emission of the set of laser beams can be controlled in number of different ways. For example, the laser beams can be emitted continuously or pulsed. Further, direction at which the laser beams are directed can also be changed. For example, the set of laser beams can be directed towards a set of optical breakdown points. The optical breakdown points can be selected from at least one of an intersection point or focal point. These optical breakdown points are physical locations where optical breakdowns occur. These optical breakdowns are physical locations where plasma is generated that generates the radio frequency noise signals.

The manner in which the optical breakdowns occur can be used to encode the data in the radio frequency noise signals. For example, the timing of the occurrence of optical breakdowns generates time pulses used to encode data. In this manner, different types of data encoding such as pulse noise modulation can be used to encode data based on when radio frequency noise signals are generated.

As another example, the set of laser beams can be moved or swept such that the optical breakdowns occur in different physical locations resulting in the frequency of a phase change in the optical breakdowns that can be used to encode data. As another example, the power of the laser beams can be changed to change the amplitude of the radio frequency noise signals two encode data. In this manner, different types of data encoding such as pulse noise modulation can be used to encode data based on when radio frequency noise signals are generated.

Turning next to FIG. 17, an illustration of a flowchart for controlling the emission of laser beams is depicted in points with an illustrative embodiment. The process illustrated in FIG. 17 is an example of one implementation for operation 1602 in FIG. 16.

The process controls a power of a laser beam in the set of laser beams to reach an optical breakdown level at a focal point to cause the optical breakdowns that generate the radio frequency noise signals encoding the data (operation 1700). The process terminates thereafter.

With reference next to FIG. 18, an illustration of a flowchart for controlling the emission of laser beams is depicted at intersecting points with an illustrative embodiment. The process illustrated in FIG. 18 is another example of an implementation for operation 1602 in FIG. 16.

The process controls a power of a laser beam in the set of laser beams to reach an optical breakdown level at an intersecting point to cause the optical breakdowns that generate the radio frequency noise signals encoding the data (operation 1800). The process terminates thereafter.

In FIG. 19, an illustration of a flowchart for controlling the emission of laser beams is depicted in points with an illustrative embodiment. The process illustrated in FIG. 19 is yet another example of an implementation for operation 1602 in FIG. 16.

The process controls emission of the set of laser beams to intersect an intersection point such that a power of the set of the laser beams at the intersection point causes the optical breakdowns that generate the radio frequency noise signals encoding the data (operation 1900). The process terminates thereafter.

Turning next to FIG. 20, a flowchart of a process for transmitting data is depicted in accordance with an illustrative embodiment. The process in FIG. 20 can be implemented in hardware, software, or both. When implemented in software, the process can take the form of program instructions that are run by one of more processor units located in one or more hardware devices in one or more computer systems. For example, the process can be implemented in communications manager 212 in computer system 210 in FIG. 2.

The process begins by identifying the data for transmission using radio frequency noise signals (operation 2000). The process controls an emission of laser beams at a set of optical breakdown points to cause optical breakdowns that generate the radio frequency noise signals encoding the data (operation 2002). The process terminates thereafter.

In this example, the set of optical breakdown points can be at different physical locations when more than one optical breakdown point is present in the set of optical breakdown points. In one example, radio frequency transmissions can be transmitted from multiple physical locations when the set of optical breakdowns is caused by the set of lasers being directed at more than one optical breakdown point.

In FIG. 21, an illustration of a flowchart for controlling the emission of laser beams is depicted in points with an illustrative embodiment. The process illustrated in FIG. 21 is yet another example of an implementation for operation 2002 in FIG. 20.

The process begins by emitting a first set of the laser beams continuously at the set of optical breakdown points (operation 2100). The process pulses a second set of the laser beams at the set of optical breakdown points to cause the optical breakdowns that generate the radio frequency noise signals encoding the data (operation 2102). The process terminates thereafter.

In operation 2102, the pulsing can occur by turning the second set of laser beams on and off. In other examples, the pulsing can provide increasing decreasing the power to the second set of laser beams. In this example, the optical breakdowns occur in response to sufficient power in the laser beams at the set of optical breakdown points. In this example, the pulsing can control the timing of when radio frequency noise signals are transmitted.

Further in operation 2102, a power of a laser beam at the optical breakdown point can be controlled at by at least one of a shutter, a lens, a deformable lens, a microelectromechanical systems mirror, an attenuator, a controlling optics, an optical filter, an amplitude modulator in a laser beam generator, or other suitable components.

With reference now to FIG. 22, an illustration of a flowchart for controlling the emission of the laser beams is depicted in points with an illustrative embodiment. The process illustrated in FIG. 21 is yet another example of an implementation for operation 2002 in FIG. 20.

The process emits the laser beams at the set of optical breakdown points causing the optical breakdowns that generate the radio frequency noise signals encoding the data (operation 2200). The process terminates thereafter.

Turning next to FIG. 23, an illustration of a flowchart for controlling the emission of laser beams is depicted in points with an illustrative embodiment. The process illustrated in FIG. 23 is example of an implementation for operation 2200 in FIG. 22.

The process begins by emitting the laser beams at a selected optical breakdown point in the set of optical breakdown points (operation 2300). The process selects a new optical breakdown point in the set of optical breakdown points as the selected optical breakdown point in response to a set of optical breakdowns occurring at the selected optical breakdown point (operation 2302).

The process repeats emitting the set of laser beams and selecting a new optical breakdown point while generating the radio frequency noise signals encoding the data (operation 2304) the process terminates thereafter. In operation 2304, the process repeats operations 2300 and operation 2302 any number of times while transmitting the radio frequency noise signals. Operation at 2304 enables transmitting the radio frequency signals from different physical locations through the selection of different optical breakdown points. As result, identifying the origination of the radio frequency signals can be made more difficult.

With reference next to FIG. 24, an illustration of a flowchart for controlling the emission of laser beams is depicted in points with an illustrative embodiment. The process illustrated in FIG. 24 is another example of an implementation for operation 2002 in FIG. 20.

The process begins by emitting a subset of the laser beams at the set of optical breakdown points to cause the optical breakdowns that generate the radio frequency noise signals encoding the data (operation 2400). The process selects a new subset of laser beams as the subset of the laser beams (operation 2402).

The process repeats emitting the subset of laser beams and selecting a new subset of laser beams while transmitting the radio frequency noise signals encoding the data (operation 2404). The process terminates thereafter. By using different subsets of the laser beams, identifying a physical location from which the laser beams originate can be made more difficult when the laser beams are emitted from different physical locations.

In FIG. 25, an illustration of a flowchart for controlling the emission of laser beams is depicted in points with an illustrative embodiment. The process illustrated in FIG. 25 is an example of an implementation for operation 2002 in FIG. 20.

The process emits the set of laser beams from different physical locations at an optical breakdown point, wherein a portion of the set of laser beams intersect at the optical breakdown point such that a power from the portion of the laser beams is sufficient to cause the optical breakdowns at the intersection point that generate the radio frequency noise signals encoding the data (operation 2500). The process terminates thereafter.

Figure 26:
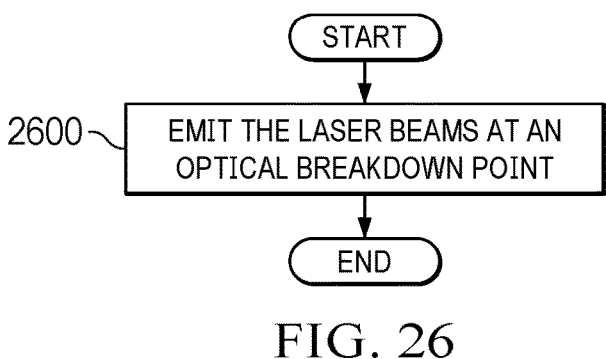
FIG. 26 is an illustration of a flowchart for controlling the emission of laser beams in points in accordance with an illustrative embodiment.

With reference to FIG. 26, an illustration of a flowchart for controlling the emission of laser beams is depicted in points with an illustrative embodiment. The process illustrated in FIG. 26 is an example of an implementation for operation 2002 in FIG. 20.

The process emits the laser beams at an optical breakdown point (operation 2600). The process terminates thereafter. In operation 2600, the optical breakdowns occur in response to all of the laser beams intersecting at the optical breakdown point.

Figure 27:
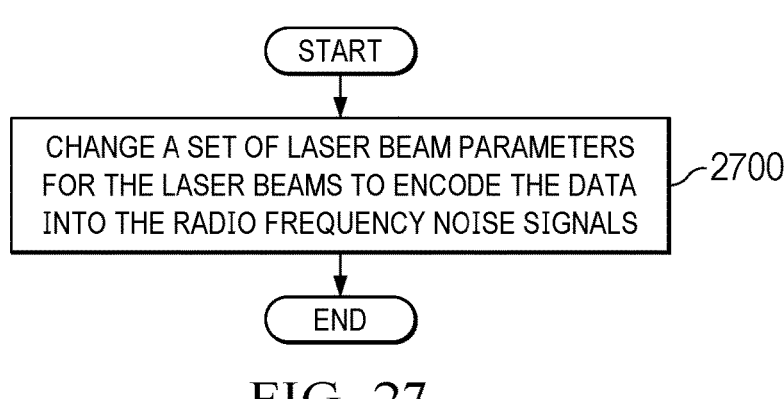
FIG. 27 is an illustration a flowchart for controlling laser beams in accordance with an illustrative embodiment.

With reference now to FIG. 27, an illustration a flowchart for controlling laser beams is depicted in accordance with an illustrative embodiment. The process illustrated in this figure is an example of an additional operation that can be performed with the operations in FIG. 20.

The process changes a set of laser beam parameters for the laser beams to encode the data into the radio frequency noise signals (operation 2700). The process terminates thereafter. In operation of 2700, changing the set of laser beam parameters changes a set of radio frequency characteristics for the radio frequency noise signals. The set of radio frequency characteristics is selected from at least one of a timing, an optical breakdown point, an amplitude of the radio frequency noise signals, or other characteristics of the radio frequency noise signals.

Figure 28:
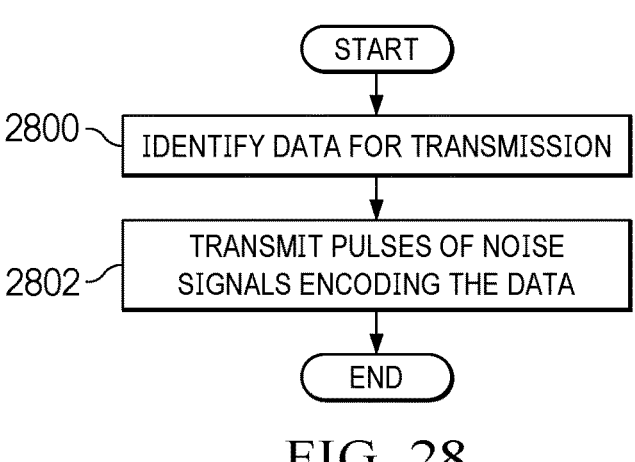
FIG. 28 is an illustration of a flowchart for communicating data in accordance with an illustrative embodiment.

In this illustrative example, FIGS. 28-35 are flowcharts illustrating operations that can be performed to encode data in noise signals. Turning first to FIG. 28, an illustration of a flowchart for communicating data is depicted in accordance with an illustrative embodiment. The process in FIG. 28 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by identifying data for transmission (operation 2800). The process transmits pulses of noise signals encoding the data (operation 2802). The process terminates thereafter. The pulses of noise signals can be selected from at least one of electromagnetic frequency signals, radio frequency signals, microwave frequency signals, audio frequency signals, ultrasonic frequency signals, ultra-low frequency signals, very low frequency signals, underwater frequency signals, or optical frequency signals.

In operation 2802, the pulses of radio frequency noise signals can be transmitted in a number of different ways. For example, these pulses of noise signals can be radio frequency noise signals transmitted from a physical antenna. In another illustrative example, the pulses of noise signals can be transmitted using optical breakdowns generated by laser beams. The optical breakdowns can be controlled to generate pulses of noise signals in the form of radio frequency noise signals.

The noise signals can be generated using at least one of a laser generation system that emits lasers to cause optical breakdown that generates the noise signal or an electric noise generator. The noise in the noise signal can be selected from at least one of nondeterministic noise or pseudo random noise.

Figure 29:
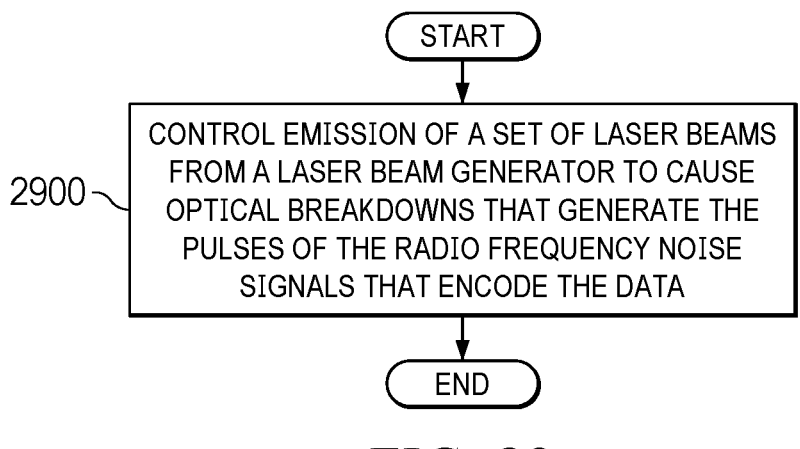
FIG. 29 is an illustration of a flowchart for transmitting pulses of noise signals in accordance with an illustrative embodiment.

Turning to FIG. 29, an illustration of a flowchart for transmitting pulses of noise signals is depicted in accordance with an illustrative embodiment. This flowchart is an example of an implementation for operation 2802 in FIG. 28. In this example, the pulses of noise signals can be pulses of radio frequency noise signals.

The process controls emission of a set of laser beams from a laser beam generator to cause optical breakdowns that generate the pulses of the radio frequency noise signals that encode the data (operation 2900). The process terminates thereafter.

Figure 30:
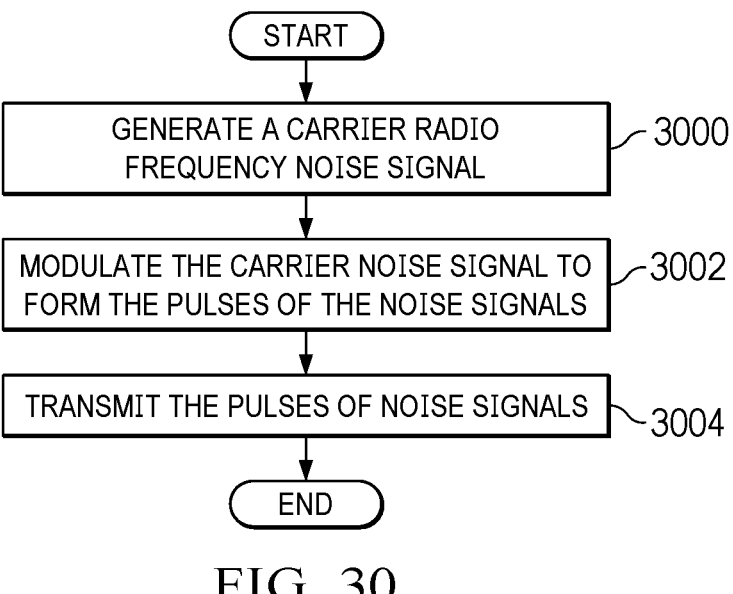
FIG. 30 is another illustration of a flowchart for transmitting pulses of noise signals in accordance with an illustrative embodiment.

With reference next to FIG. 30, another illustration of a flowchart for transmitting pulses of noise signals is depicted in accordance with an illustrative embodiment. This flowchart is an example of an implementation for operation 2802 in FIG. 28.

The process begins by generating a carrier radio frequency noise signal (operation 3000). The process modulates or digitally "shift keys" the carrier noise signal to form the pulses of the noise signals (operation 3002). In operation 3002, the pulses encode the data.

The process transmits the pulses of noise signals (operation 3004). The process terminates thereafter.

Turning now to FIG. 31, an illustration of a flowchart for communicating data is depicted in accordance with an illustrative embodiment. The process in FIG. 31 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by identifying data for transmission (operation 3100). The process controls emission of a set of laser beams to cause optical breakdown that generate pulses of radio frequency noise signals (operation 3102). The process terminates thereafter. In operation 3100, the data can be encoded in the pulses of the radio frequency noise signals.

With reference to FIG. 32, an illustration of a flowchart of a process for controlling the emission of a set of laser beams is depicted in accordance with an illustrative embodiment. The process in this flowchart is an example of an implementation for operation 3102 in FIG. 31.

The process controls a power of a laser beam in the set of laser beams to reach an optical breakdown level at a focal point to cause the optical breakdowns that generate the pulses of radio frequency noise signals encoding the data (operation 3200). The process terminates thereafter.

Turning next to FIG. 33, an illustration of a flowchart of a process for controlling the emission of a set of laser beams is depicted in accordance with an illustrative embodiment. The process in this flowchart is an example of an implementation for operation 3102 in FIG. 31.

The process controls the controlling emission of the set of laser beams to intersect an intersection point such that the power of the set of the laser beams at the intersection point causes the optical breakdowns that generate the pulses of the radio frequency noise signals encoding the data (operation 3300). The process terminates thereafter.

Figure 34:
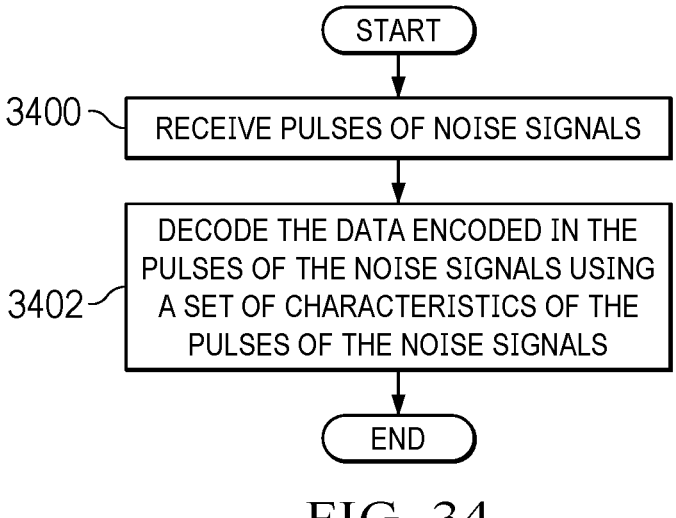
FIG. 34 is an illustration of a flowchart for communicating data in accordance with an illustrative embodiment.

In FIG. 34, an illustration of a flowchart for communicating data is depicted in accordance with an illustrative embodiment. The process in FIG. 34 can be implemented in hardware, software, or both. When implemented in software, the process can take the form of program instructions that are run by one of more processor units located in one or more hardware devices in one or more computer systems. For example, the process can be implemented in communications manager 912 in computer system 910 in FIG. 9.

The process begins by receiving pulses of noise signals (operation 3400). In operation 3400, data is encoded in the pulses of noise signals.

The process decodes the data encoded in the pulses of the noise signals using a set of characteristics of the pulses of the noise signals (operation 3402). The process terminates thereafter. In operation 3402, the set of characteristics comprises at least one of a timing of the pulses of noise, an amplitude of the pulses of noise, a duration of the pulses of noise, or some other characteristic.

Figure 35:
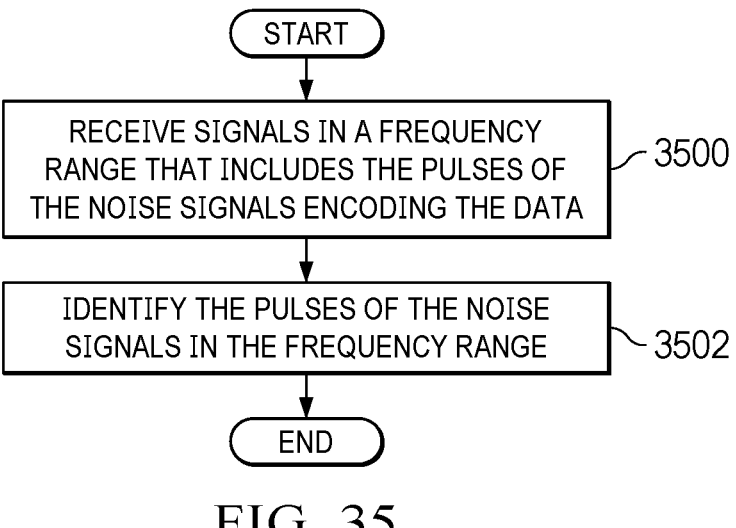
FIG. 35 is an illustration of a flowchart for decoding data in accordance with an illustrative embodiment.

With reference now to FIG. 35, an illustration of a flowchart for decoding data is depicted in accordance with an illustrative embodiment. The process depicted in this flowchart is an example of an implementation for operation 3402 in FIG. 34.

The process begins by receiving signals in a frequency range that includes the pulses of the noise signals encoding the data (operation 3500). In operation 3500, the signals in the frequency range can be received using at least one of a bandpass filter, a notch filter, a band reject filter, a low-pass filter, or a high-pass filter.

The process identifies the pulses of the noise signals in the frequency range (operation 3502). The process terminates thereafter. In operation 3502, the pulses of the noise signals in the frequency range can be identified using an envelope detector.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, the illustrative examples provide a method, apparatus, and system for transmitting radio frequency signals using a transmission system in which a physical antenna is absent. Optical breakdowns are generated by laser beams in which the optical breakdowns create plasma. The plasma results in radio frequency noise signals. The optical breakdowns can be controlled to encode data in the radio frequency noise signals. The physical locations of these optical breakdowns are radio frequency source emitters in the depicted examples.

Further, these radio frequency source emitters can be moved to different physical locations by repositioning the laser beams such that the laser beams point at different optical breakdown points. Attacks at these physical locations are in essence attacks at the optical breakdown points where the plasma is generated.

As a result, kinetic attacks against these physical locations are useless because no physical infrastructure is present at the physical locations. Further, the laser modulation sources are remote from the physical locations of these radio frequency source emitters. These optical breakdowns can occur at a physical location that is remote from the laser source.

Further, the illustrative examples can encode data using noise signals. The use of noise signals is in contrast to the use of sinusoidal signals as a carrier signal to encode data. With the encoding of data in pulses of noise signals, issues with detection and interference in transmitting data encoded using sinusoidal carriers can be reduced.

The following figures provide examples of some types of noise modulation that can be performed in accordance with one or more illustrative examples. Some examples of noise modulation that can be performed include digital amplitude noise shift keying, digital frequency noise shift keying, digital simultaneous multi-frequency center point noise-band shift keying, digital multi-frequency-amplitude/band shift keying, digital doppler noise shift keying, and digital phase-differential noise shift keying.

Figure 36:
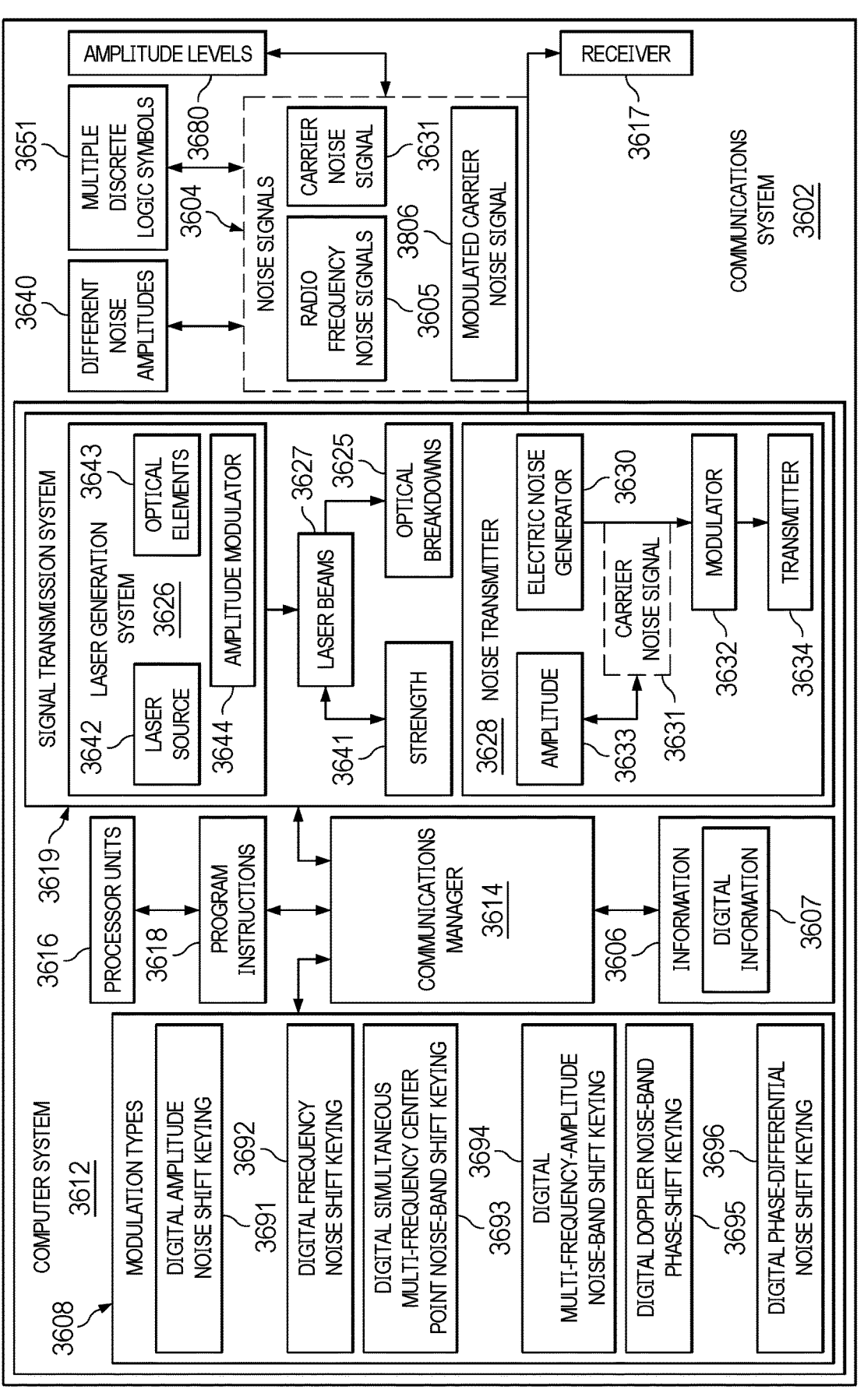
FIG. 36 is an illustration of a block diagram of a communication system in accordance with an illustrative embodiment.

With reference next to FIG. 36, an illustration of a block diagram of a communication system is depicted in accordance with an illustrative embodiment. In this illustrative example, communications system 3602 operates to modulate noise signals 3604 to correspond to information 3606. Noise signals 3604 are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

The modulation performed can be selected from a set of modulation types 3608. As depicted, communications system 3602 comprises computer system 3612, communications manager 3614, and signal transmission system 3619.

In the illustrative example, communications manager 3614 can be implemented in software, hardware, firmware, or a combination thereof. When software is used, the operations performed by communications manager 3614 can be implemented in program instructions configured to run on hardware, such as a processor unit. When firmware is used, the operations performed by communications manager 3614 can be implemented in program instructions and data and stored in persistent memory to run on a processor unit.

When hardware is employed, the hardware may include circuits that operate to perform the operations in communications manager 3614. The circuits used to implement communications manager 3614 can take other forms in addition to or in place of a processor unit.

Computer system 3612 is a physical hardware system and includes one or more data processing systems. When more than one data processing system is present in computer system 3612, those data processing systems are in communication with each other using a communications medium. The communications medium can be a network. The data processing systems can be selected from at least one of a computer, a server computer, a tablet computer, or some other suitable data processing system.

As depicted, computer system 3612 includes a number of processor units 3616 that are capable of executing program instructions 3618 implementing processes in the illustrative examples. In other words, program instructions 3618 are computer-readable program instructions.

As used herein, a processor unit in the number of processor units 3616 is a hardware device and is comprised of hardware circuits such as those on an integrated circuit that respond to and process instructions and program code that operate a computer. When the number of processor units 3616 executes program instructions 3618 for a process, the number of processor units 3616 can be one or more processor units that are in the same computer or in different computers. In other words, the process can be distributed between processor units 3616 on the same or different computers in computer system 3612.

Further, the number of processor units 3616 can be of the same type or different type of processor units. For example, the number of processor units 3616 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, modulation types 3608, for example, include digital amplitude noise shift keying 3691, digital frequency noise shift keying 3692, digital simultaneous multi-frequency center point noise-band shift keying 3693, digital multi-frequency-amplitude noise-band shift keying 3694, digital doppler noise-band phase-shift keying 3695, and digital phase-differential noise shift keying 3696.

In this example, noise signals 3604 can be transmitted to receiver 3617 from signal transmission system 3619. In this illustrative example, noise signals 3604 are received by receiver 3617. Receiver 3617 is also depicted as part of communications system 3602. In yet other illustrative examples, receiver 3617 may be a separate component from communications system 3602.

Receiver 3617 is a hardware system and can include processes implemented in hardware or software that recover information 3606 from noise signals 3604.

In this illustrative example, signal transmission system 3619 can take a number of different forms. For example, signal transmission system 3619 can be implemented using at least one of laser generation system 3626 or noise transmitter 3628. Laser generation system 3626 can be implemented using laser generation systems as depicted in FIGS. 2-7. With laser generation system 3626, noise signals 3604 take the form of radio frequency noise signals 3605.

As depicted, noise transmitter 3628 can include electric noise generator 3630, modulator 3632, and transmitter 3634. In one illustrative example, noise transmitter 3628 can be implemented using a noise transmitter such as radio frequency transmitter 1002 as depicted in FIG. 10 and FIG. 11. In other illustrative examples, other types of noise transmitters can be used to transmit other types of noise signals 3604.

In the illustrative examples, the noise generator can be implemented to generate electrical noise and other forms other than radio frequency noise signals. As result, noise signals 3604 can take different forms and can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

When using digital amplitude noise shift keying 3691, communications manager 3614 identifies information 3606 in the form of digital information 3607 for transmission. Communications manager 3614 transmits noise signals 3604 with different noise amplitudes 3640 thus modulating or "shift keying" the noise signals 3604 to correspond to digital information 3607. In other words, different noise amplitudes 3640 of noise signals 3604 can have amplitude levels 3680 that represent multiple discrete logic symbols 3651 for digital information 3607. For example, different noise amplitudes 3640 can comprise two discrete amplitude levels in which a first discrete amplitude level corresponds to a logic 0 and a second discrete amplitude level corresponds to a logic 1.

In another example, different noise amplitudes 3640 comprise four discrete amplitude levels in which a first discrete amplitude level represents a logic "00," a second discrete amplitude level represents a logic "01," a third discrete amplitude level represents a logic "10," and a fourth discrete amplitude level represents a logic "11." In yet another illustrative example, different noise amplitudes 3640 comprise multiple discrete amplitude levels in which the multiple discrete amplitude levels represent multiple discrete logic symbols 3651 which are not limited to just 2 logical bits per symbol.

In one illustrative example, noise signals 3604 take the form of radio frequency noise signals 3605. With this example, laser generation system 3626 is configured to emit a set of one or more laser beams 3627. As result, in transmitting noise signals 3604, communications manager 3614 controls emission of the set of one or more laser beams 3627 from laser generation system 3626 to at least one of cause or control optical breakdowns 3625 that generate radio frequency noise signals 3605 with different noise amplitudes 3640 that thereby modulate radio frequency noise signals 3605 to correspond to digital information 3607. In other words, digital information 3607 is at least one of encoded, transferred, transformed, or modulated into radio frequency noise signals 3605 based on different amplitudes for radio frequency noise signals 3605.

In controlling the emission of the set of one or more laser beams 3627, communications manager 3614 can control strength 3641 of the set of one or more laser beams 3627 emitted from laser generation system 3626 to at least one of cause or control optical breakdowns 3625 that generate radio frequency noise signals 3605 with different noise amplitudes 3640 that thereby modulate radio frequency noise signals 3605 to correspond to digital information 3607.

Communications manager 3614 can control strength 3641 of the set of one or more laser beams 3627 in a number of different ways. For example, strength 3641 of the set of one or more laser beams 3627 can be performed by controlling strength 3641 of the set of one or more laser beams 3627 emitted from laser source 3642 in laser generation system 3626. For example, current, voltage, or power control can be used with laser diodes in laser source 3642 to change strength 3641. In another example, pump source can be adjusted for laser source 3642 to change strength 3641.

In another illustrative example, communications manager 3614 can control strength 3641 of the set of one or more laser beams 3627 using a set of optical elements 3643 to cause optical breakdowns 3625 that generate radio frequency noise signals 3605 with different noise amplitudes 3640 that thereby modulate radio frequency noise signals 3605 to correspond to the digital information 3607. In this example, optical elements 3643 can include various fixed or adjustable elements such as a mirror, a lens, a focal focusing lens, or other optical element that can be adjusted to change strength 3641.

In yet another illustrative example, communications manager 3614 can control strength 3641 of the set of one or more laser beams 3627 using amplitude modulator 3644 in laser generation system 3626. In this example, amplitude modulator 3644 can modulate the amplitude, power, or intensity of the set of one or more laser beams 3627 emitted by laser source 3642.

In another illustrative example, communications manager 3614 can transmit digital information 3607 using noise transmitter 3628 in signal transmission system 3619. With this example, electric noise generator 3630 is configured to generate a carrier noise signal 3631, which can be modulated or digitally shift keyed to form modulated carrier noise signal 3806.

With this example, in generating noise signals 3604, communications manager 3614 generates carrier noise signal using electric noise generator 3630. Communications manager 3614 modulates or digitally "shift keys" amplitude 3633 of carrier noise signal 3631 using modulator 3632 to vary carrier noise signal 3631 with different noise amplitudes 3640 that thereby modulates or digitally "shift keys" carrier noise signal 3631 to at least one of correspond or correlate, directly or indirectly, to digital information 3607. Communications manager 3614 transmits this carrier noise signal 3631 with different noise amplitudes 3640 as noise signals 3604 using transmitter 3634.

In this illustrative example, receiver 3617 is configured to receive noise signals 3604, in which digital information 3607 is modulated in noise signals 3604 using different noise amplitudes 3640. Receiver 3617 is configured to demodulate digital information 3607 modulated in noise signals 3604 based on different noise amplitudes 3640 in noise signals 3604.

Figure 37:
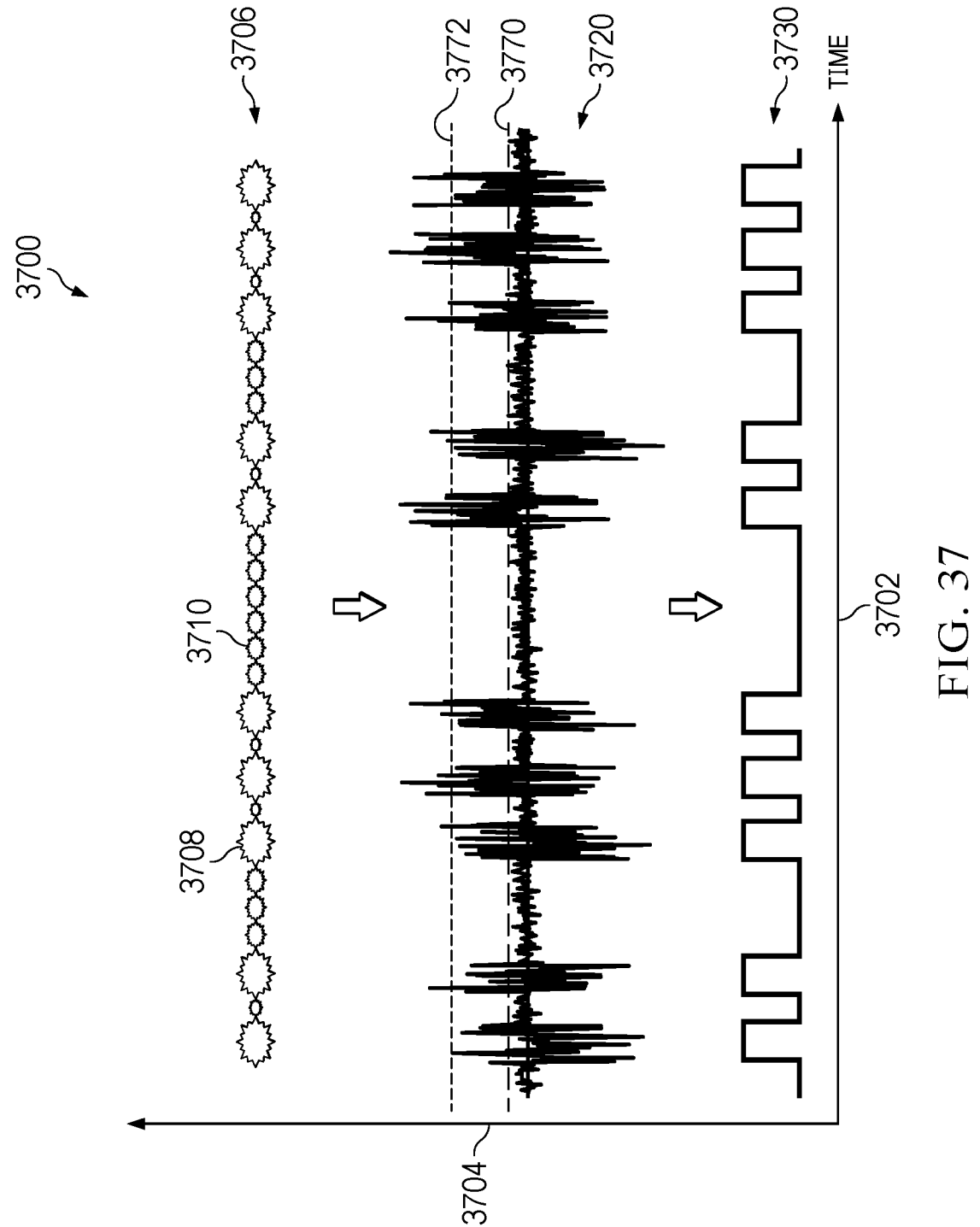
FIG. 37 is an illustration of information flow for transmitting digital information with digital amplitude noise shift keying using a laser generation system in accordance with an illustrative embodiment.

Turning next to FIG. 37, an illustration of information flow for transmitting digital information with digital amplitude noise shift keying using a laser generation system is depicted in accordance with an illustrative embodiment. In this example, information flow 3700 can be implemented using laser generation system 3626 in signal transmission system 3619 for communications system 3602 in FIG. 36. In this example, x-axis 3702 represents time for optical breakdowns, noise signals, and digital signals while y-axis 3704 represents a strength or amplitude for noise signals in information flow 3700.

As depicted, optical breakdowns 3706 are generated with varying amplitude based on the digital information 3607 to be transmitted. As previously described, these optical breakdowns are plasma generated using laser generation system 3626. Each optical breakdown in optical breakdowns 3706 is a plasma event generated by the set of one or more laser beams 3627 emitted by laser generation system 3626 in FIG. 36.

In this illustrative example, different optical breakdowns in optical breakdowns 3706 have different sizes, strengths, amplitudes, or powers. For example, optical breakdown 3708 is larger in size, strength, amplitude, or power than optical breakdown 3710. The sizes, amplitudes, strengths, or powers of optical breakdowns 3706 is controlled through controlling amplitude, power, or strength 3641 of the set of one or more laser beams 3627. As depicted, the optical breakdowns are generated such that individual laser pulses in the optical breakdowns 3706 have different noise amplitudes with respect to each other. The different noise amplitudes for a result of the modulation of noise signals to correspond to digital information.

The result of these optical breakdowns is radio frequency noise signals 3720 which are an example of radio frequency noise signals 3605 depicted in FIG. 36. As depicted, these radio frequency signals have different noise amplitudes with discrete amplitude levels that correspond to the digital information being transmitted. In this example, two discrete noise levels are present in radio frequency noise signals 3720.

Digital signals 3730 can be recovered in response to receiver 3617 receiving radio frequency noise signals 3720 and radio frequency noise signals 3605 as depicted in FIG. 36. Thus, laser generation system 3626 is an example of one manner in which signal transmission system 3619 can transmit digital information 3607 in noise signals comprising radio frequency noise signals with varying amplitude.

In this example, the different noise amplitudes comprise two discrete amplitude levels in which first discrete amplitude level 3770 corresponds to a logic 0 and second discrete amplitude level 3772 corresponds to a logic 1. Alternatively, these could be inverted so that first discrete amplitude level 3770 corresponds to a logic 1 and second discrete amplitude level 3772 corresponds to a logic 0.

Figure 38:
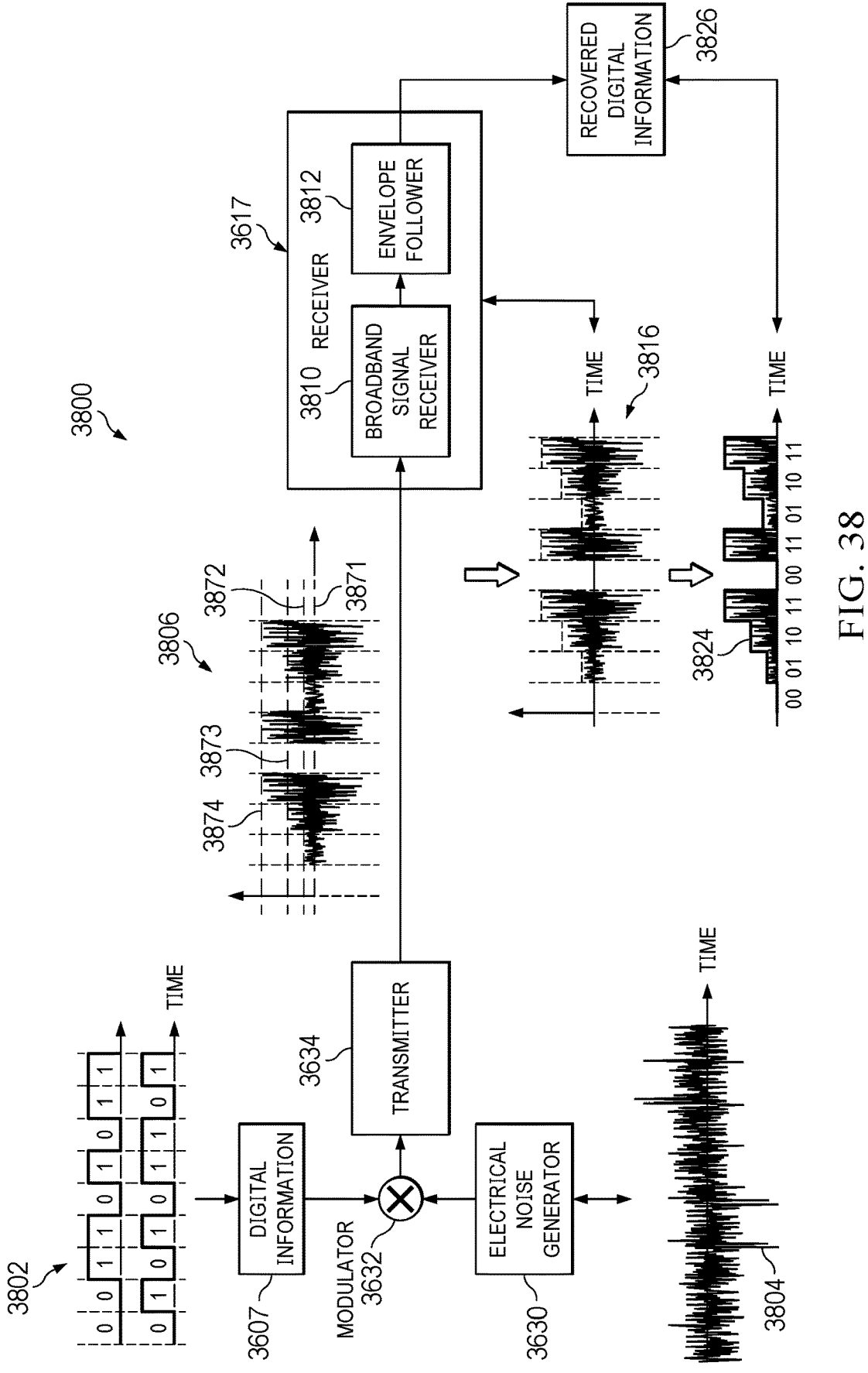
FIG. 38 is an illustration information flow for demonstrating transmitting digital information with digital amplitude noise shift keying using a noise transmitter in accordance with an illustrative embodiment.

Turning next to FIG. 38, an illustration information flow for demonstrating transmitting digital information with digital amplitude noise shift keying using a noise transmitter is depicted in accordance with an illustrative embodiment. In this example, information flow 3800 can be implemented using noise transmitter 3628 in signal transmission system 3619 for communications system 3602 in FIG. 36.

As depicted in this example, digital input signal 3802 is an example of digital information 3607 that is to be transmitted using digital amplitude noise shift keying. In this example, electric noise generator 3630 generates carrier noise signal 3804. Modulator 3632 is an amplitude modulator that modulates or digitally "shift keys" carrier noise signal 3804 with digital input signal 3802. This modulation causes carrier noise signal 3804 to vary in amplitude 3633 of carrier noise signal 3804 in a manner that results in carrier noise signal 3804 with different noise amplitudes 3640 that is transmitted by transmitter 3634. This carrier noise signal with different noise amplitudes 3640 is transmitted by transmitter 3634 as modulated carrier noise signal 3806. Modulated carrier noise signal 3806 has different noise amplitudes. This modulated carrier noise signal has an amplitude that varies with different noise amplitudes in a manner that corresponds to or correlates with, directly or indirectly, with digital input signal 3802.

As depicted in this example, modulated carrier noise signal 3806 has four discrete amplitude levels. In this example, first discrete amplitude level 3871 represents a logic "00," second discrete amplitude level 3872 represents a logic "01," third discrete amplitude level 3873 represents a logic "10," and fourth discrete amplitude level 3874 represents a logic "11."

As depicted, receiver 3617 includes broadband signal receiver 3810 and envelope follower 3812. Broadband signal receiver 3810 is a hardware device that is configured to receive and process signals across a wide range of frequencies. In this example, broadband signal receiver 3810 receives modulated carrier noise signal 3806 with different noise amplitudes.

This reception of modulated carrier noise signal 3806 results in received signal 3816. As depicted, envelope follower 3812 can detect amplitude variations in received signal 3816 to generate a signal having a shape that resembles, corresponds, or correlates to, directly or indirectly, those variations. In this example, the signal is recovered digital information signal 3824 for recovered digital information 3826. In this example, envelope follower 3812 is implemented using envelope follower 1414 as depicted in FIG. 14 and FIG. 15B. As depicted in this example, recovered digital information signal 3824 for recovered digital information 3826 has the same or similar shape as digital input signal 3802 for digital information 3607.

Illustration of this example is not meant to limit the manner in which other illustrative examples can be implemented. For example, in another illustrative example, modulated carrier noise signal 3806 can have some other number of discrete amplitude levels. For example, modulated carrier noise signal 3806 can have other numbers of discrete amplitude levels such as 5, 8, or some other number of discrete amplitude levels.

Turning now to FIG. 39, an illustration of a flowchart for communicating digital information is depicted in accordance with an illustrative embodiment. The process in FIG. 39 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 36.

The process begins by identifying the digital information for transmission (operation 3900). The process transmits noise signals with different noise amplitudes that thereby modulate the noise signals to correspond to the digital information (operation 3902). The process terminates thereafter.

In operation 3902, the different noise amplitudes in the digital information are used to modulate the noise signals to correspond to or correlate to, directly or indirectly, the digital information.

Turning next to FIG. 40, an illustration of a flowchart of a process for transmitting radio frequency noise signals using a laser generation system is depicted in accordance with an illustrative embodiment. This flowchart is an example of an implementation for operation 3902 in FIG. 39. In this example, the noise signals take the form of radio frequency noise signals.

The process controls emission of a set of one or more laser beams from a laser generation system to control optical breakdowns that generate the radio frequency noise signals with the different noise amplitudes that thereby modulate the noise signals to correspond to the digital information (operation 4000). The process terminates thereafter.

In other words, the discrete amplitudes of the digital information are used to control the emissions of the set of laser beams to at least one of cause or control optical breakdowns that generate at least one of the radio frequency noise signals or optical signals including at least one of visible or non-visible light.

The different amplitudes of the digital information are used to control these emissions which thereby modulate or digitally "shift keys" the radio frequency noise signals to correspond to or correlate with, directly or indirectly, the digital information. In other words, the control of the emissions of the set of one or more laser beams does not necessarily correlate exactly to the amplitude for digital information. In alternative examples, the control of the emissions of the set of the one or more laser beams may be modified in such a way that the final output noise modulated signal most closely corresponds to original digital input signal such that it may be received with minimum distortion by a receiver 3617 in FIG. 36.

Next in FIG. 41, an illustration of a flowchart of a process for controlling emission of a set of one or more laser beams is depicted in accordance with an illustrative embodiment. The process in this figure is an example of an implementation for operation 4000 in FIG. 40.

The process controls a strength of the set of one or more laser beams emitted from the laser generation system to control the optical breakdowns that generate the radio frequency noise signals with the different noise amplitudes that thereby modulate the radio frequency noise signals to correspond to the digital information (operation 4100). The process terminates thereafter.

With reference now to FIG. 42, an illustration of a flowchart of a process for controlling emission of a set of one or more laser beams is depicted in accordance with an illustrative embodiment. The process in this figure is an example of an implementation for operation 4100 in FIG. 41.

The process controls the strength of the set of one or more beams emitted from a laser source in the laser generation system to control the optical breakdowns that generate the radio frequency noise signals with the different noise amplitudes that thereby modulate the radio frequency noise signals to correspond to the digital information (operation 4200). The process terminates thereafter.

Turning next to FIG. 43, an illustration of a flowchart of a process for controlling emission of a set of one or more laser beams is depicted in accordance with an illustrative embodiment. The process in this figure is an example of an implementation for operation 4100 in FIG. 41.

The process controls the strength of the set of one or more beams emitted from the laser generation system using a set of optical elements to control the optical breakdowns that generate the radio frequency noise signals with the different noise amplitudes that thereby modulate the radio frequency noise signals to correspond to the digital information (operation 4300). The process terminates thereafter.

With reference now to FIG. 44, an illustration of a flowchart of a process for controlling emission of a set of one or more laser beams is depicted in accordance with an illustrative embodiment. The process in this figure is an example of an implementation for operation 4100 in FIG. 41.

The process controls the strength of the set of one or more laser beams emitted from a laser source in the laser generation system using an amplitude modulator in the laser generation system to control the optical breakdowns that generate the radio frequency noise signals with the different noise amplitudes that thereby modulate the radio frequency noise signals to correspond to the digital information (operation 4400). The process terminates thereafter.

With reference now to FIG. 45, an illustration of a flowchart of a process for transmitting noise signals is depicted in accordance with an illustrative embodiment. The process in this figure is an example of an implementation for operation 3902 in FIG. 39.

The process generates a carrier radio frequency noise signal (operation 4500). The process modulates or digitally "shift keys" the carrier radio frequency noise signal to form the noise signals with the different noise amplitudes that thereby modulates or digitally "shift keys" the carrier radio frequency noise signal to correspond to the digital information (operation 4502).

The process transmits the noise signals with the different noise amplitudes that thereby modulate the noise signals to correspond to the digital information (operation 4504). The process terminates thereafter.

Turning next to FIG. 46, an illustration of a flowchart of process for communicating digital information is depicted in accordance with an illustrative embodiment. The process in FIG. 46 can be implemented in hardware, software, or both. When implemented in software, the process can take the form of program instructions that are run by one or more processor units located in one or more hardware devices in one or more computer systems. For example, the process can be implemented in receiver 3617 in FIG. 36.

The process begins by receiving noise signals, wherein the digital information is modulated in the noise signals using different noise amplitudes (operation 4600). The process demodulates or digitally de-"shift keys" the digital information modulated in the noise signals based on the different noise amplitudes in the noise signals (operation 4602). The process terminates thereafter.

Some features of the illustrative examples for modulating digital information 3607 using digital amplitude noise shift keying 3691 in communications system 3602 are described in the following clauses. These clauses are examples of features and are not intended to limit other illustrative examples.

1. A communications system comprising:
a computer system; and
a communications manager in the computer system, wherein the communications manager is configured to:
identify digital information for transmission; and
transmit noise signals with different noise amplitudes that thereby modulate the noise signals to correspond to the digital information.

2. The communications system of claim 1, wherein the different noise amplitudes comprise amplitude levels that represent multiple discrete logic symbols.

3. The communications system of clause 1, wherein the different noise amplitudes comprise two discrete amplitude levels in which a first discrete amplitude level corresponds to a logic 0 and a second discrete amplitude level corresponds to a logic 1.

4. The communications system of clause 1, wherein the different noise amplitudes comprise four discrete amplitude levels in which a first discrete amplitude level represents a logic "00," a second discrete amplitude level represents a logic "01," a third discrete amplitude level represents a logic "10," and a fourth discrete amplitude level represents a logic "11."

5. The communications system of clause 1, wherein the different noise amplitudes comprise multiple discrete amplitude levels in which the multiple discrete amplitude levels represent multiple discrete logic symbols.

6. The communications system of clause 1, wherein the noise signals are radio frequency noise signals, and further comprising:
a laser generation system configured to emit a set of one or more laser beams, wherein in transmitting the noise signals, the communications manager is configured to:
control an emission of the set of one or more laser beams from the laser generation system to control optical breakdowns that generate the radio frequency noise signals with the different noise amplitudes that thereby modulate the radio frequency noise signals to correspond to the digital information.

7. The communications system of clause 6, wherein in controlling the emission of the set of one or more laser beams, the communications manager is configured to:
control a strength of the set of one or more laser beams emitted from the laser generation system to control the optical breakdowns that generate the radio frequency noise signals with the different noise amplitudes that thereby modulate the radio frequency noise signals to correspond to the digital information.

8. The communications system of clause 7, wherein in controlling the strength of the set of one or more laser beams, the communication manager is configured to:
control the strength of the set of one or more laser beams emitted from a laser source in the laser generation system to control the optical breakdowns that generate the radio frequency noise signals with the different noise amplitudes that thereby modulate the radio frequency noise signals to correspond to the digital information.

9. The communications system of clause 7, wherein in controlling the strength of the set of one or more laser beams, the communications manager is configured to:
control the strength of the set of one or more laser beams emitted from the laser generation system using a set of optical elements to control the optical breakdowns that generate the radio frequency noise signals with the different noise amplitudes that thereby modulate the radio frequency noise signals to correspond to the digital information.

10. The communications system of clause 7, wherein in controlling the strength of the set of one or more laser beams, the communication manager is configured to:
control the strength of the set of one or more laser beams emitted from the laser generation system using an amplitude modulator in the laser generation system to control the optical breakdowns that generate the radio frequency noise signals with the different noise amplitudes that thereby modulate the noise signals to correspond to the digital information.

11. The communications system of clause 1, further comprising:
an electric noise generator configured to generate a carrier noise signal;
a modulator;
a transmitter, wherein in generating the noise signals, the communications manager is configured to:
generate the carrier noise signal using the electric noise generator; and
modulate an amplitude of the carrier noise signal using the modulator to vary the carrier noise signal with the different noise amplitudes that thereby modulates the carrier noise signal to correspond to the digital information.

12. The communications system of clause 1, wherein the noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

13. A communications system comprising:
a receiver configured to:
receive noise signals, in which digital information is modulated in the noise signals using different noise amplitudes; and
demodulate the digital information previously modulated in the noise signals based on different noise amplitudes in the noise signals.

14. A method for communicating digital information, the method comprising:
identifying the digital information for transmission; and
transmitting noise signals with different noise amplitudes that thereby modulate the noise signals to correspond to the digital information.

15. The method of clause 14, wherein different noise amplitudes comprise discrete amplitude levels that represent multiple discrete logic symbols.

16. The method of clause 14, wherein different noise amplitudes comprise two discrete amplitude levels in which a first discrete amplitude level corresponds to a logic 0 and a second discrete amplitude level corresponds to a logic 1.

17. The method of clause 14, wherein different amplitudes comprise four discrete amplitude levels in which a first discrete amplitude level represents a logic "00," a second discrete amplitude level represents a logic "01," a third discrete amplitude level represents a logic "10," and a fourth discrete amplitude level represents a logic "11."

18. The method of clause 14, wherein the different noise amplitudes comprise multiple discrete amplitude levels in which the multiple discrete amplitude levels represent multiple discrete logic symbols.

19. The method of clause 14, wherein the noise signals are radio frequency noise signals, and wherein said transmitting the noise signals comprises:

controlling emission of a set of one or more laser beams from a laser generation system to control optical breakdowns that generate the radio frequency noise signals with the different noise amplitudes that thereby modulate the noise signals to correspond to the digital information.

20. The method of clause 19, wherein said controlling the emission of the set of one or more laser beams comprises:

controlling a strength of the set of one or more laser beams emitted from the laser generation system to control the optical breakdowns that generate the radio frequency noise signals with the different noise amplitudes that thereby modulate the radio frequency noise signals to correspond to the digital information.

21. The method of clause 20, wherein said controlling the strength of the set of one or more beams comprises:

controlling the strength of the set of one or more beams emitted from a laser source in the laser generation system to control the optical breakdowns that generate the radio frequency noise signals with the different noise amplitudes that thereby modulate the radio frequency noise signals to correspond to the digital information.

22. The method of clause 20, wherein said controlling the strength of the set of one or more beams comprises:

controlling the strength of the set of one or more beams emitted from the laser generation system using a set of optical elements to control the optical breakdowns that generate the radio frequency noise signals with the different noise amplitudes that thereby modulate the radio frequency noise signals to correspond to the digital information.

23. The method of clause 20, wherein said controlling the strength of the set of one or more beams comprises:

controlling the strength of the set of one or more laser beams emitted from a laser source in the laser generation system using an amplitude modulator in the laser generation system to control the optical breakdowns that generate the radio frequency noise signals with the different noise amplitudes that thereby modulate the radio frequency noise signals to correspond to the digital information.

24. The method of clause 14, wherein said transmitting the noise signals comprises:

generating a carrier radio frequency noise signal;

modulating the carrier radio frequency noise signal to form the noise signals with the different noise amplitudes that thereby modulates the carrier radio frequency noise signal to correspond to the digital information; and transmitting the noise signals with the different noise amplitudes that thereby modulate the noise signals to correspond to the digital information.

25. The method of clause 14, wherein the noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

26. A method for communicating digital information, the method comprising:

receiving noise signals, wherein the digital information is modulated in the noise signals using different noise amplitudes; and demodulating the digital information modulated in the noise signals based on the different noise amplitudes in the noise signals.

27. The method of clause 26, wherein a receiver receives the noise signals and demodulates the noise signals.

Figure 47:
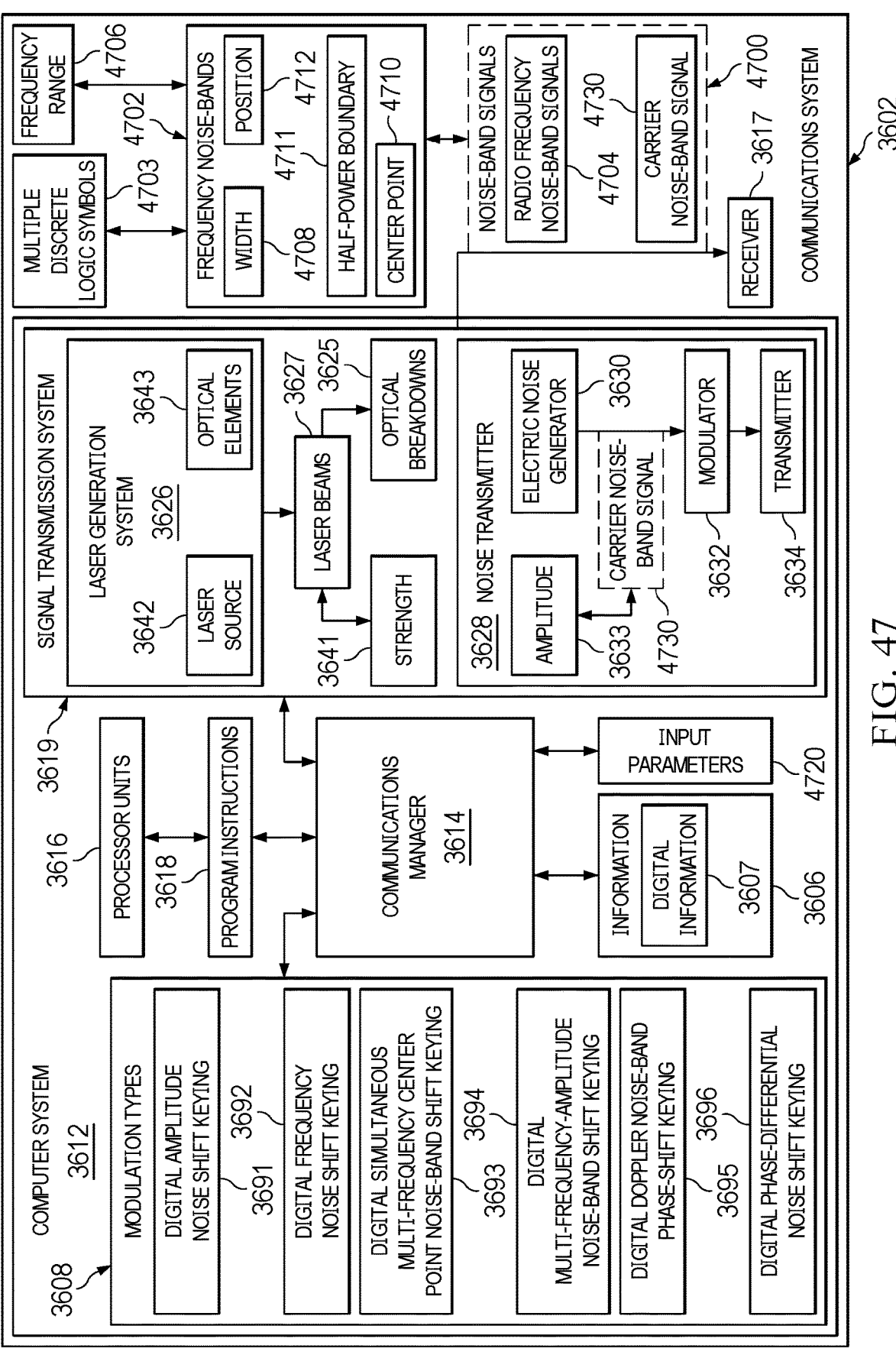
FIG. 47 is an illustration of a block diagram of a communication system for transmitting noise signals using digital frequency noise modulation in accordance with an illustrative embodiment.

Turning now to FIG. 47, an illustration of a block diagram of a communication system for transmitting noise signals using digital frequency noise modulation is depicted in accordance with an illustrative embodiment. In this illustrative example, communications system 3602 operates to modulate or "shift key" noise-band signals 4700 to correspond to information 3606 using digital frequency noise shift keying 3692. Noise-band signals 4700 can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, optical frequency noise signals including at least one of visible or non-visible light, or other types of noise signals.

In this example, communications manager 3614 identifies digital information 3607 for transmission. Additionally, communications manager 3614 transmits noise-band signals 4700 with different discrete changes to frequency range 4706 of frequency noise-bands 4702 of noise-band signals 4700 that thereby modulate noise-band signals 4700 to correspond to digital information 3607 identified for transmission. Different discrete changes to frequency range 4706 of frequency noise-bands 4702 means that the changes to frequency range 4706 of frequency noise-bands 4702 have a shift that is considered to be instantaneous without gradual or continuous variation. For example, a change in width 4708 of a frequency noise-band or position 4712 of frequency noise-bands 4702 occurs from one noise-band to another noise-band in frequency noise-bands 4702 with a sufficiently clear shift in these parameters such that electrical devices such as a receiver receiving noise-band signals with frequency noise-band having a discrete change can determine the point where the change occurs for use in identifying digital information in these signals.

In these examples, a discrete change means a change where a distinct and detectable variation or difference in the noise-band signal which corresponds to discrete digital information is present. This type of change is in contrast to a gradual change which typically corresponds to analog information.

For example, a discrete change in the frequency of a noise-band means that a receiver can determine or detect that a distinct variation or difference in the noise-band signal frequency has occurred which corresponds to discrete digital information. In another example, a discrete change in the amplitude of a noise-band means that a receiver can determine or detect that a distinct variation or difference in the noise-band signal amplitude has occurred which corresponds to discrete digital information.

In yet another example, a discrete change in the center-point of a noise-band means that a receiver can determine or detect that a distinct variation or difference in the center point of the noise-band signal has occurred which corresponds to discrete digital information. In another example, a discrete change in the bandwidth or width of a noise-band means that a receiver can determine or detect that a distinct variation or difference in the bandwidth or width of the noise-band signal has occurred which corresponds to discrete digital information. In another example, a discrete change in the slope, boundary, or half-power point of a noise-band means that a receiver can determine or detect that a distinct variation or difference in the slope, boundary, or half-power point of the noise-band signal has occurred which corresponds to discrete digital information.

In other words, different discrete changes to frequency range 4706 of frequency noise-bands 4702 means that frequency range 4706 is changed for one or more of frequency noise-bands 4702. These changes are made to have frequency noise-bands 4702 correspond to digital information 3607. These different discrete changes made to frequency noise-bands 4702 of noise-band signals 4700 cause the different discrete changes to frequency range 4706 of frequency noise-bands 4702 correspond to or correlate to, either directly or indirectly, the same or similar pattern as digital information 3607.

In other words, the control of the different discrete changes to frequency range 4706 of frequency noise-bands 4702 do not necessarily correlate exactly to the varying digital information 3607. In alternative examples, the control of the different discrete changes to frequency range 4706 of frequency noise-bands 4702 may be modified in such a way that the final output noise-modulated signal most closely corresponds to digital information 3607 such that it may be received with minimum distortion by a receiver 3617 in FIG. 47.

In this example, frequency noise-bands 4702 are a grouping, cluster, subset, or segmentation of noise-band signals 4700. For example, frequency noise-bands 4702 can be at least one of "clusters of noise," "noise spectra," noise spectrum," "a frequency band of noise," "a pass-band of noise," "a band-pass of noise," "a frequency range of noise," or a "noise frequency range" which can have a lower half-power boundary and an upper half-power boundary. Frequency noise-bands 4702 for noise-band signals 4700 can be changed in a manner that corresponds to digital information 3607. For example, noise-band signals 4700 can be modulated such that frequency noise-bands 4702 changes in at least one of width 4708 (bandwidth or frequency bandwidth), position 4712, center point 4710, or half-power boundary 4711.

For example, the width 4708 of frequency noise-bands 4702 can be changed by using different discrete changes to frequency range 4706 of frequency noise-bands 4702. In this example, a change in a frequency noise-band in frequency noise-bands 4702 means that the boundaries of frequencies encompassed by the frequency noise-bands can change such that width of that frequency noise-band changes in at least one of size or range.

In this example, different frequency noise-bands in frequency noise-bands 4702 can have different initial and final times for time duration, and lower and upper frequency bounds for frequency ranges. These can be modified or changed to designate digital information. In this manner, noise-band signals 4700 can be modulated to have different discrete changes of frequency noise-bands 4702 of noise-band signals 4700 in a manner that causes noise-band signals 4700 to correspond to or correlate to, either directly or indirectly, digital information 3607.

In these examples, the different discrete changes of frequency noise-bands 4702 of noise-band signals 4700 represent multiple discrete logic symbols 4703. For example, the different discrete changes can be at least one of position 4712 or width 4708 of the frequency noise-bands 4702.

In one illustrative example, a first discrete change of frequency noise-bands 4702 of noise-band signals 4700 corresponds to a logic 0. A second discrete change of frequency noise-bands 4702 of noise-band signals 4700 corresponds to a logic 1.

In another illustrative example, the different discrete changes of the frequency noise-bands of the noise-band signals comprise four different discrete changes of frequency noise-bands 4702 of the noise-band signals 4700. A first discrete change of the frequency noise-bands 4702 represents a logic "00," a second discrete change of the frequency noise-bands represents a logic "01," a third discrete change of the frequency noise-bands 4702 represents a logic "10," and a fourth discrete change of frequency noise-bands 4702 represents a logic "11." These discrete changes can be position 4712 or width 4708 of frequency noise-bands 4702 of the noise-band signals 4700.

In one illustrative example, this transmission can be performed by laser generation system 3626. With this example, communications manager 3614 controls an emission of a set of one or more laser beams 3627 from laser generation system 3626 to at least one of cause or control optical breakdowns 3625 that generate noise-band signals 4700 in the form of radio frequency noise-band signals 4704 with different discrete changes to frequency range 4706 of frequency noise-bands 4702 for radio frequency noise-band signals 4704 that thereby modulate the radio frequency noise-band signals 4704 to correspond to or correlate to, directly or indirectly, the digital information 3607. In this example, at least one of width 4708, position 4712, half-power boundary 4711, or center point 4710, of frequency noise-bands 4702 can be varied to have different discrete changes to cause radio frequency noise-band signals 4704 to correspond to digital information 3607. Position 4712 for each of frequency noise-bands 4702 can be identified using center point 4710 of each of frequency noise-bands 4702. The change of a beginning frequency boundary or frequency range and an ending frequency boundary or frequency range in frequency noise-bands 4702 can result in different discrete changes for at least one of width 4708 or position 4712 of frequency noise-bands 4702. In this example, the beginning of the frequency boundary or frequency range can be referred to as an initial or lower boundary of the frequency boundary or frequency range. The ending of the frequency boundary or range can be referred to as a final, higher, or upper boundary of the frequency boundary or frequency range. Thus, in this example, the different discrete changes are present between the ranges of frequencies of frequency noise-bands 4702 for noise-band signals 4700 that thereby modulate noise-band signals 4700 to correspond to digital information 3607.

In one illustrative example, communications manager 3614 controls the emission of the set of one or more laser beams 3627 by controlling the emission of the set of one or more laser beams 3627 from laser generation system 3626 to at least one of cause or control optical breakdowns 3625 that generate radio frequency noise-band signals 4704 by varying a frequency location of center point 4710 of frequency noise-bands 4702 for radio frequency noise-band signals 4704. In these examples, center point 4710 can be different for different ones of frequency noise-bands 4702. The particular frequency location of center point 4710 for a frequency noise-band can correlate to a discrete logic symbol in multiple discrete logic symbols 4703 for that frequency noise-band. The frequency location of center point 4710 can be different for a particular frequency noise-band relative to other center points for other frequency noise-bands. These differences in the positions of the center points for the different frequency bands correlate to different discrete logic symbols in multiple discrete logic symbols 4703. In this example, a variation of the frequency location of center point 4710 of frequency noise-bands 4702 for radio frequency noise-band signals 4704 thereby modulates or digitally "shift keys" radio frequency noise-band signals 4704 to correspond to digital information 3607.

Thus, in this example, center point 4710 can be moved back and forth in frequency noise-bands 4702 to modulate radio frequency noise-band signals 4704 to correspond to digital information 3607. In other words, the modulation of center point 4710 of frequency noise-bands 4702 for radio frequency noise-band signals 4704 is an example of one manner in which frequency noise-bands 4702 can be modulated to at least one of cause or control radio frequency noise-band signals 4704 to correspond to digital information 3607.

In another illustrative example, communications manager 3614 can control the emission of the set of one or more laser beams 3627 from laser generation system 3626 to at least one of cause or control optical breakdowns 3625 that generate radio frequency noise-band signals 4704 by varying width 4708 of frequency noise-bands 4702 for radio frequency noise-band signals 4704. In this example, a variation in width 4708 thereby modulates or digitally "shift keys" radio frequency noise-band signals 4704 to correspond to digital information 3607. In other words, the width of radio frequency noise-band signals 4704 in frequency noise-bands 4702 can be increased and decreased to modulate radio frequency noise-band signals 4704 to correspond to digital information 3607. In these examples, the change in width 4708 can occur by changing the boundaries start (initial and/or lower) and end (final and/or upper) frequencies in a frequency noise-band.

In another example, communications manager 3614 controls a set of one or more input parameters 4720 for the emission of a set of one or more of laser beams 3627 from the laser generation system 3626 to at least one of cause or control optical breakdowns 3625 that generate radio frequency noise-band signals 4704 by varying frequency noise-bands 4702 to result in the different discrete changes in frequency noise-bands 4702. In this example, the different discrete changes to frequency range 4706 of frequency noise-bands 4702 of radio frequency noise-band signals 4704 thereby modulates or digitally "shift keys" radio frequency noise-band signals 4704 to correspond to or correlate with, directly or indirectly, digital information 3607.

With this example, the set of one or more input parameters 4720 can take a number of different forms. For example, the set of one or more input parameters 4720 can for example be selected from one or more of, a mirror orientation, a deformable mirror position, a lens position, lens, a deformable lens position or some other element that can be positioned in a manner that changes an optical path length (OPL) for the set of one or more laser beams 3627. In this example, the path length change can be both the optical path length and/or the physical path length. Another input parameter that can be changed in this example is the index of refraction (IoR). The optical path length is inversely proportional to the index of refraction.

These changes to input parameters 4720 can change frequency noise-bands 4702 of radio frequency noise-band signals 4704. For example, changes can be made to at least one of width 4708 (bandwidth or frequency bandwidth) or position 4712 of frequency noise-bands 4702 for radio frequency noise-band signals 4704. In other words, different noise-bands can have different changes in at least one of position 4712 or width 4708.

In another example, communications manager 3614 can control noise transmitter 3628 in signal transmission system 3619 to transmit digital information 3607. For example, in generating noise-band signals 4700, communications manager 3614 can generate carrier noise-band signal 4730 using electric noise generator 3630. Communications manager 3614 can modulate carrier noise-band signal 4730 using modulator 3632 to change frequency noise-bands 4702 of carrier noise-band signal 4730.

In this example, different discrete changes can be made to frequency noise-bands 4702. These different discrete changes to frequency range 4706 of frequency noise-bands 4702 for carrier noise-band signal 4730 thereby modulate carrier noise-band signal 4730 to correspond to digital information 3607.

In this example, communications manager 3614 transmits carrier noise-band signal 4730 with different discrete changes to frequency range 4706 of frequency noise-bands 4702. In this example, these changes cause carrier noise-band signal 4730 to correspond to or correlate with, directly or indirectly, digital information 3607. This type of modulation of carrier noise-band signal 4730 can cause the different discrete changes that can be at least one of width 4708 or position 4712 of frequency noise-bands 4702 for carrier noise-band signal 4730.

Figure 48:
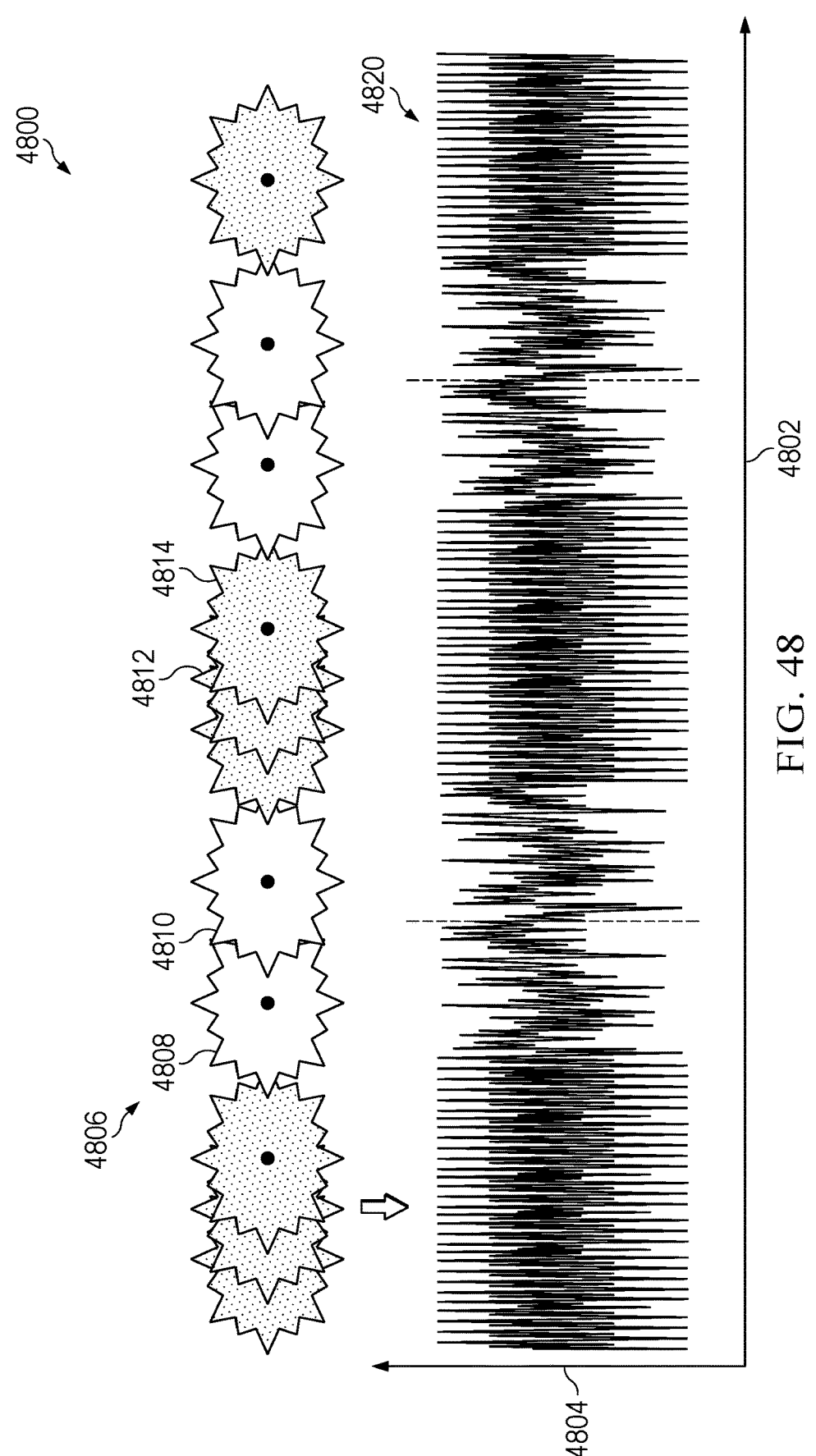
FIG. 48 is an illustration of information flow for transmitting digital information with digital frequency noise modulation using a laser generation system in accordance with an illustrative embodiment.

Turning to FIG. 48, an illustration of information flow for transmitting digital information with digital frequency noise modulation or digital frequency noise shift keying using a laser generation system is depicted in accordance with an illustrative embodiment. In this example, information flow 4800 can be implemented using laser generation system 3626 in signal transmission system 3619 for communications system 3602 in FIG. 47. In this example, x-axis 4802 represents time for optical breakdowns and noise signals while y-axis 4804 represents a strength of optical breakdowns and noise signals in information flow 4800.

As depicted, optical breakdowns 4806 are generated with varying frequency based on the digital information to be transmitted. As previously described, these optical breakdowns are plasma generated using laser generation system 3626. Each optical breakdown in optical breakdowns 4806 is a plasma event generated by the set of one or more laser beams 3627 emitted by laser generation system 3626 in FIG. 47.

As in this illustrative example, different optical breakdowns in optical breakdowns 4806 occur at different times that are not necessarily periodic because different timings, different intensities, and different frequencies or colors of different lasers may be used to affect the optical breakdowns 4806, which in turn generate the different frequency-bands of radio frequency noise. In these examples, the different RF noise frequencies can be generated using a laser generator having at least one of different lasers, different pulses, different focal lengths, or different intensities.

In this example, the variation frequency can occur from the timing of laser pulses that generate optical breakdowns 4806. For example, optical breakdown 4808 and optical breakdown 4810 occurs at a slower interval as compared to optical breakdown 4812 and optical breakdown 4814.

As depicted, these radio frequency signals have varying frequencies of noise or noise-bands that are modulated through the frequency of optical breakdowns 4806 to at least one of corresponding to or correlating with, directly or indirectly, the digital information being transmitted. In this example, the different discrete changes in the frequency of radio frequency noise signals are a change in the frequency range that can include at least one of a change in the center point frequency location or width of radio frequency noise signals 4820.

Figure 49:
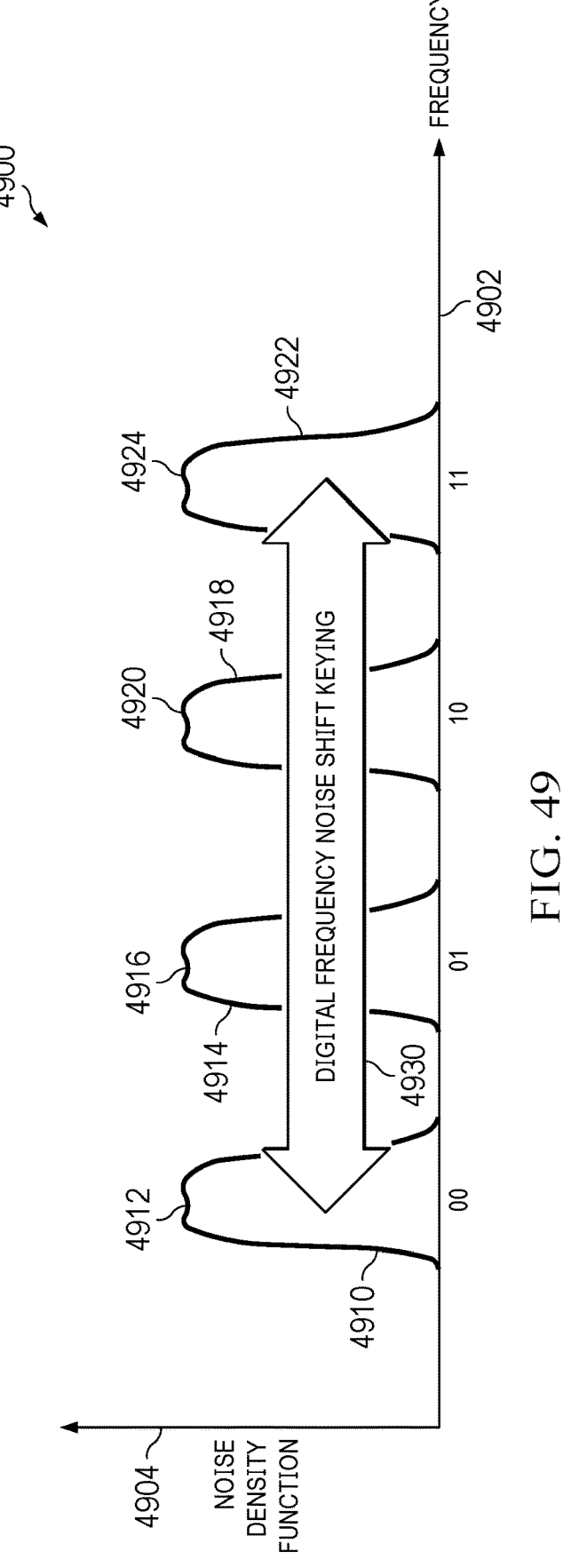
FIG. 49 is an illustration of frequency noise modulation of radio frequency signals through changing a frequency location of a center point of radio frequency noise-band signals in accordance with an illustrative embodiment.

Turning next to FIG. 49, an illustration of frequency noise modulation of radio frequency signals through changing a frequency location of a center point of radio frequency noise-band signals is depicted in accordance with an illustrative embodiment. In this illustrative example, in graph 4900, x-axis 4902 denotes frequency and y-axis 4904 denotes noise density, noise power density, or noise density function.

As depicted, four frequency noise-bands of noise-band signals are depicted with different discrete variations illustrated by the different center points. In this illustrative example, first frequency noise-band 4910 has first center point 4912; second frequency noise-band 4914 has second center point 4916; third frequency noise-band 4918 has third center point 4920; fourth frequency noise-band 4922 has fourth center point 4924. The center points have different discrete frequency changes relative to each other.

These different discrete frequency changes in the center points can be performed using digital frequency noise shift keying 4930. The different center points correlate to different digital information. In this example, the digital information is in the form of multiple discrete logic symbols such as different patterns of logic "0s" and logic "1s."

For example, first frequency noise-band 4910 with first center point 4912 corresponds to logical "00;" second frequency noise-band 4914 with second center point 4916 corresponds to "01." Further in this example third frequency noise-band 4918 with third center point 4920 corresponds to "10" and fourth frequency noise-band 4922 with fourth center point 4924 corresponds to "11."

Thus, in this example, digital frequency noise shift keying 4930 occurs by changing the frequency location of the center point of radio frequency signals to different frequency locations resulting in different discrete changes to the frequency range of these frequency noise-bands. The amount of change in frequency location can be used to at least one of cause or control radio frequency noise-band signals to correspond to the digital signals being transmitted.

The illustration of four patterns for multiple discrete logic symbols in this figure is only presented as an example and not meant to limit the manner in which other illustrative examples can be implemented. For example, in another illustrative example, two frequency locations can be present for center points resulting in a "0" or logic "1." In another example, 16 frequency locations can be used for center points resulting in 16 patterns of multiple discrete logic symbols. Other numbers of frequency noise-bands and center points can be used in other examples.

Figure 50:
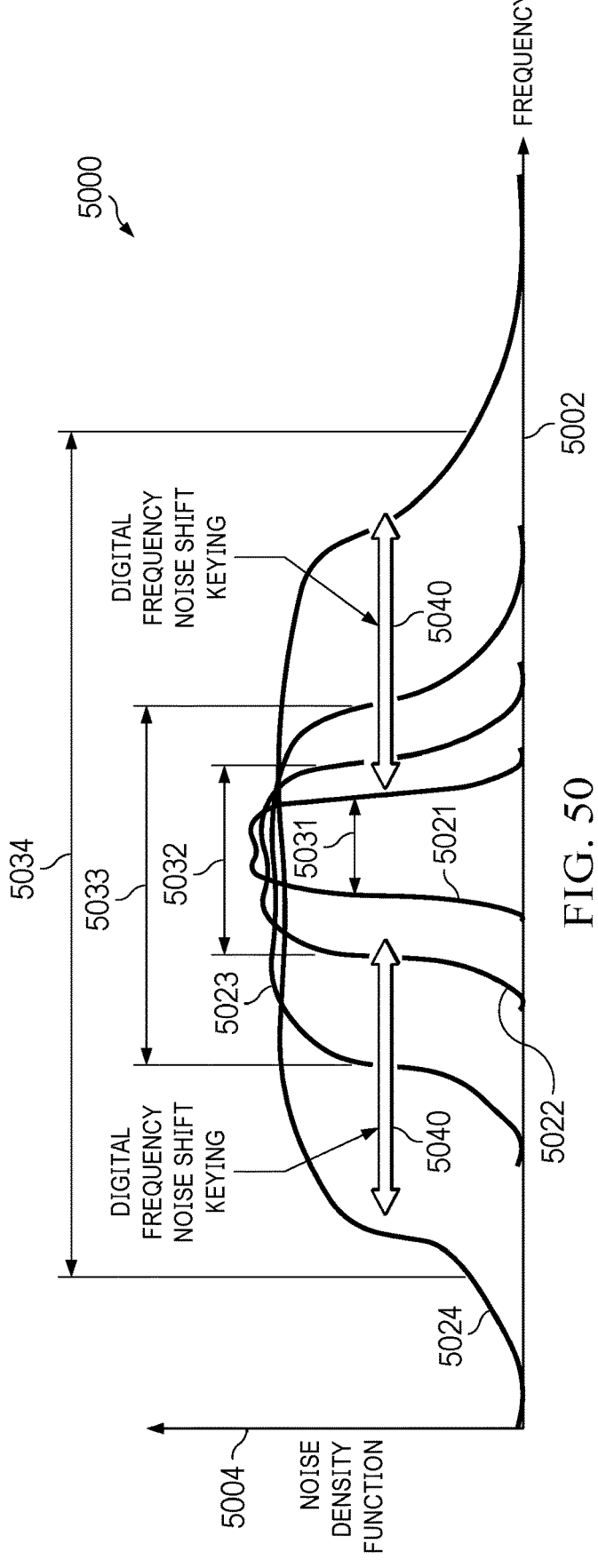
FIG. 50 is an illustration of frequency modulation of radio frequency signals through changing a width or bandwidth of noise-band signals in accordance with an illustrative embodiment.

In FIG. 50, an illustration of frequency modulation of radio frequency signals through changing a width or bandwidth of noise-band signals is depicted in accordance with an illustrative embodiment. In this illustrative example, in graph 5000, x-axis 5002 denotes frequency and y-axis 5004 denotes noise density function.

As depicted, radio frequency noise-band for radio frequency noise-band signals have different discrete changes in the form of different widths. First frequency noise-band 5021 has first width 5031; second frequency noise-band 5022 has second width 5032; third frequency noise-band 5023 has third width 5033; and fourth frequency noise-band 5024 has fourth width 5034.

In this example, digital frequency noise shift keying 5040 can be used to modulate frequency ranges of these frequency noise-bands of the frequency noise-band signals to different widths that correspond to digital signals being transmitted. In these examples, the different widths correspond to multiple discrete logic symbols that correspond to the digital signals.

In this example, a quadrature bit pattern is present for the multiple discrete logic symbols. First width 5031 corresponds to "00;" second width 5032 corresponds to "10;" third width 5033 corresponds to "10;" and fourth width 5034 corresponds to "11." Other widths can be used to correspond to at least one of different bit patterns or symbols that correspond to higher than quadrature symbols, such as 8 bits, 16 bits, or higher.

Figure 51:
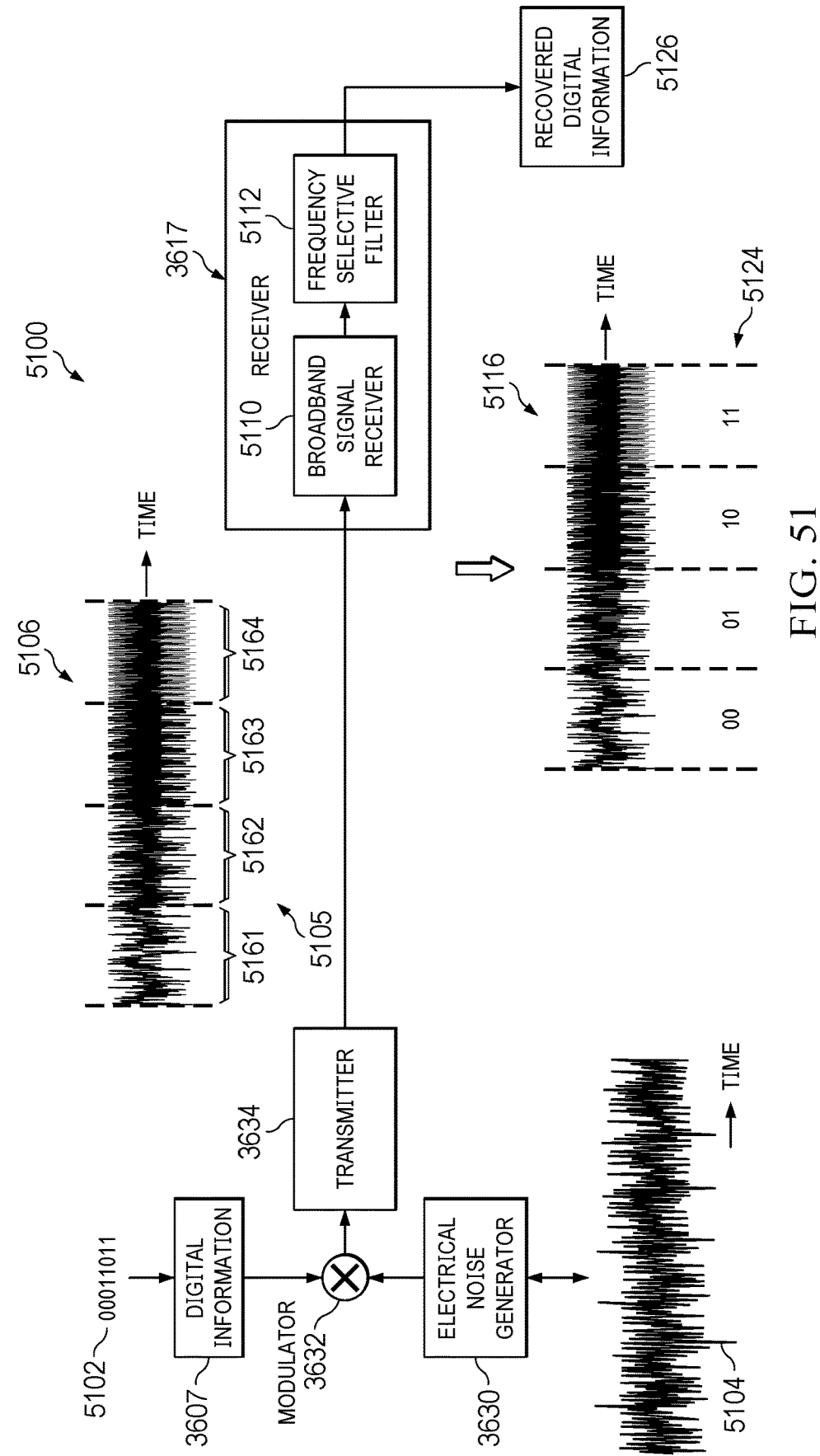
FIG. 51 is an illustration of information flow for transmitting digital information with digital frequency noise modulation using a noise transmitter in accordance with an illustrative embodiment.

Turning next to FIG. 51, an illustration of information flow for transmitting digital information with digital frequency noise modulation using a noise transmitter is depicted in accordance with an illustrative embodiment. In this example, information flow 5100 can be implemented using noise transmitter 3628 in signal transmission system 3619 for communications system 3602 in FIG. 47.

As depicted in FIG. 51 in this example, digital input information 5102 is an example of digital information 3607 that is to be transmitted using digital frequency noise shift keying. As depicted, digital input information 5102 is in the form of bits.

In this example, electric noise generator 3630 generates carrier noise-band signal 5104. In this example, modulator 3632 is a frequency modulator that modulates or digitally "shift keys" the frequency of carrier noise-band signal 5104 with digital information 3607. This modulation causes carrier noise-band signal 5104 to vary in frequency in a manner that results in modulated carrier noise-band signal 5106 that has changes in a frequency range of the frequency noise-band for carrier noise-band signal 5104 that is transmitted by transmitter 3634. This carrier noise-band signal with the frequency noise-band changes is transmitted by transmitter 3634 as modulated carrier noise-band signal 5106.

As depicted, modulated carrier noise-band signal 5106 is comprised of frequency noise-bands 5105 and is not a sinusoidal wave form. In this example, frequency noise-bands 5105 includes frequency noise-band 5161, frequency noise-band 5162, frequency noise-band 5163, and frequency noise-band 5164. As depicted, different discrete frequency range changes are present in these frequency noise-bands. The different discrete changes thereby modulate modulated carrier noise-band signal 5106 to correlate to digital input information 5102.

Modulated carrier noise-band signal 5106 is an example of carrier noise-band signal 5104 with frequency range changes in the frequency noise-bands 4702 in FIG. 47. This modulated transmission signal has a frequency noise-band that varies in a manner that corresponds to digital input information 5102.

As depicted, receiver 3617 includes broadband signal receiver 5110 and frequency selective filter 5112. Broadband signal receiver 5110 is at least one of a hardware device or software device that is configured to receive and process signals across a wide range of frequencies. In this example, broadband signal receiver 5110 receives modulated carrier noise-band signal 5106.

This reception of modulated carrier noise-band signal 5106 results in received signal 5116. As depicted in this example, received signal 5116 is the same or substantially the same as modulated carrier noise-band signal 5106. In this example, a noise floor can also be present in received signal 5116 from broadband signal receiver 5110. The noise floor can be from noise sources in broadband signal receiver 5110.

In this example, frequency selective filter 5112 can detect frequency changes in the frequency noise-band for received signal 5116 to generate a signal having a shape that resembles those frequency noise-band variations. Frequency selective filter 5112 detects frequencies of received signal 5116 to generate multiple discrete logic symbols 5124. In this example, the output signal from the frequency selective filter 5112 is multiple discrete logic symbols 5124 for recovered digital information 5126. As depicted in this example, multiple discrete logic symbols 5124 for recovered digital information 5126 is the same as digital input information 5102.

Turning next to FIG. 52, an illustration of a flowchart for communicating digital information is depicted in accordance with an illustrative embodiment. The process in FIG. 52 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 47.

The process identifies digital information for transmission (operation 5200). The process transmits noise-band signals with different discrete changes to a frequency range of frequency noise-bands for the noise-band signals that thereby modulate the noise-band signals to correspond to the digital information (operation 5202). The process terminates thereafter.

In FIG. 52, the noise-band signals can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

With reference next to FIG. 53, an illustration of a flowchart of a process for transmitting noise signals using a laser generation system is depicted in accordance with an illustrative embodiment. The process in this figure is an example of an implementation for operation 5202 in FIG. 53. In this example, the noise signals are radio frequency noise signals.

The process controls emission of a set of one or more laser beams from a laser generation system to control optical breakdowns that generate radio frequency noise-band signals having different discrete changes of the frequency noise-bands for the noise-band signals that thereby modulate the radio frequency noise-band signals to correspond to the digital information (operation 5300). The process terminates thereafter.

Figure 54:
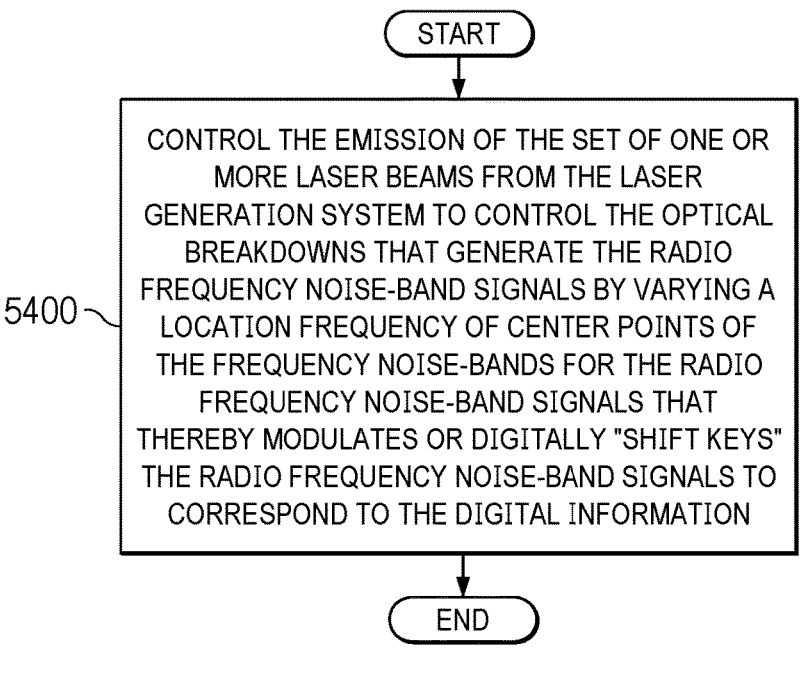
FIG. 54 is an illustration of a flowchart of a process for controlling emission of a set of one or more laser beams in accordance with an illustrative embodiment.

Next in FIG. 54, an illustration of a flowchart of a process for controlling emission of a set of one or more laser beams is depicted in accordance with an illustrative embodiment.

The process in this figure is an example of an implementation for operation 5300 in FIG. 53.

The process controls the emission of the set of one or more laser beams from the laser generation system to control the optical breakdowns that generate the radio frequency noise-band signals by varying a frequency location of center points of the frequency noise-bands for the radio frequency noise-band signals that thereby modulates or digitally "shift keys" the radio frequency noise-band signals to correspond to the digital information (operation 5400). The process terminates thereafter.

Figure 55:
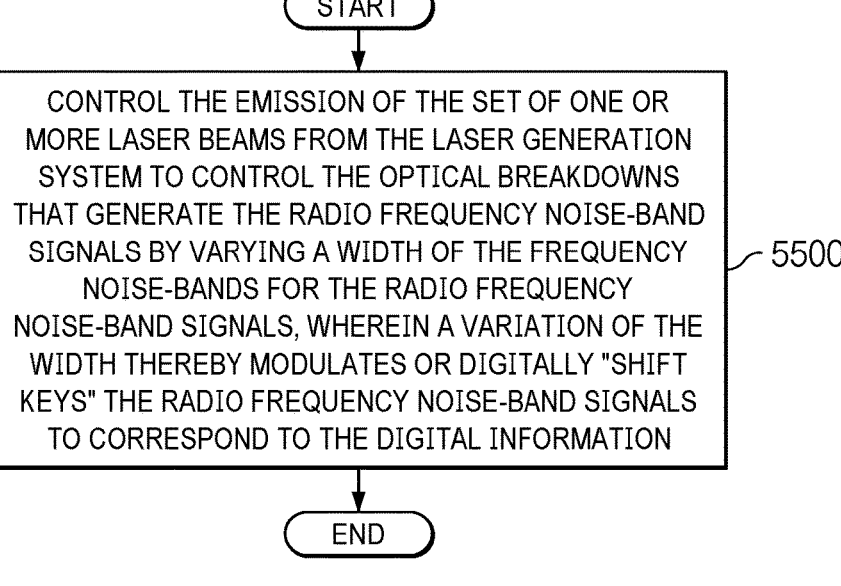
FIG. 55 is an illustration of a flowchart of a process for controlling emission of a set of one or more laser beams in accordance with an illustrative embodiment.

In FIG. 55, an illustration of a flowchart of a process for controlling emission of a set of one or more laser beams is depicted in accordance with an illustrative embodiment. The process in this figure is an example of an implementation for operation 5300 in FIG. 53.

The process controls the emission of the set of one or more laser beams from the laser generation system to control the optical breakdowns that generate the radio frequency noise-band signals by varying a width of the frequency noise-bands for the radio frequency noise-band signals, wherein a variation of the width thereby modulates or digitally "shift keys" the radio frequency noise-band signals to correspond to the digital information (operation 5500). The process terminates thereafter.

Figure 56:
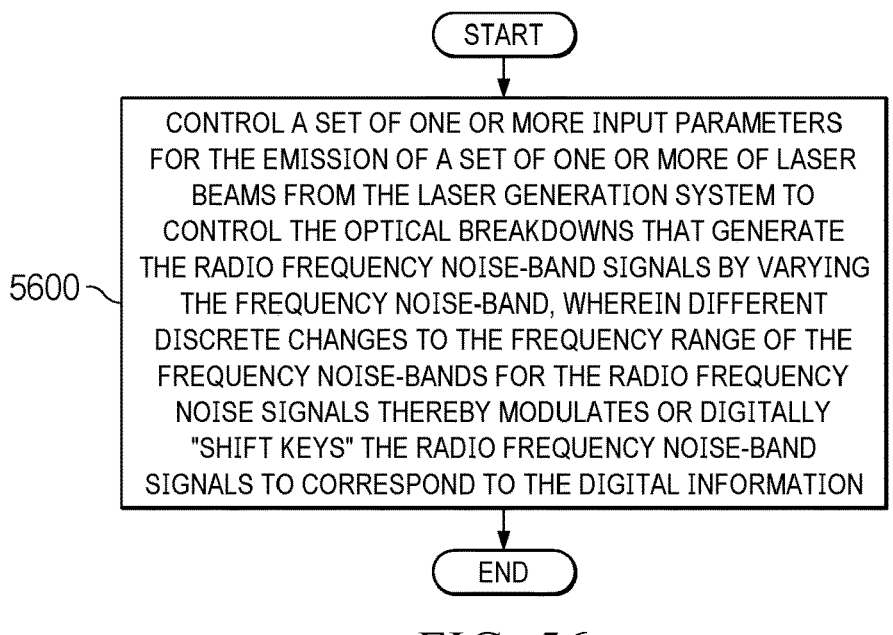
FIG. 56 is an illustration of a flowchart of a process for controlling emission of a set of one or more laser beams in accordance with an illustrative embodiment.

Turning now to FIG. 56, an illustration of a flowchart of a process for controlling emission of a set of one or more laser beams is depicted in accordance with an illustrative embodiment. The process in this figure is an example of an implementation for operation 5300 in FIG. 53.

The process controls a set of one or more input parameters for the emission of a set of one or more of laser beams from the laser generation system to control the optical breakdowns that generate the radio frequency noise-band signals by varying the frequency noise-band, wherein different discrete changes to the frequency range of the frequency noise-bands for the radio frequency noise signals thereby modulates or digitally "shift keys" the radio frequency noise-band signals to correspond to the digital information (operation 5600). The process terminates thereafter.

Figure 57:
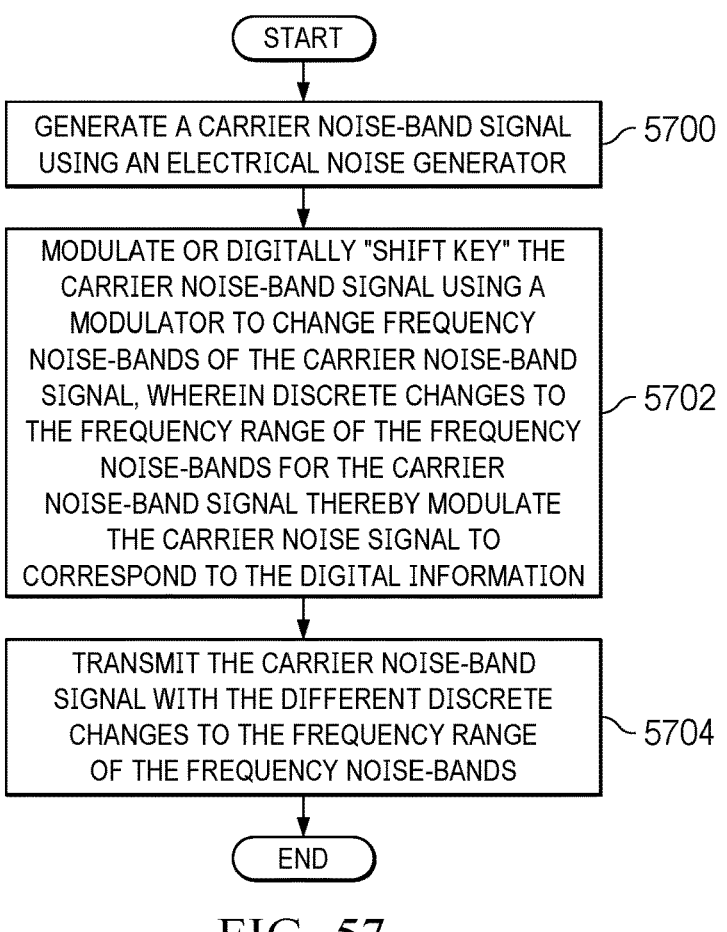
FIG. 57 is an illustration of a flowchart of a process for transmitting noise signals using a noise transmitter in accordance with an illustrative embodiment.

With reference now to FIG. 57, an illustration of a flowchart of a process for transmitting noise signals using a noise transmitter is depicted in accordance with an illustrative embodiment. The process in this figure is an example of an implementation for operation 5302 in FIG. 53.

The process begins by generating a carrier noise-band signal using an electric noise generator (operation 5700). The process modulates or digitally "shift keys" the carrier noise-band signal using a modulator to change frequency noise-bands of the carrier noise-band signal, wherein discrete changes to the frequency range of the frequency noise-bands for the carrier noise-band signal thereby modulate the carrier noise signal to correspond to the digital information (operation 5702).

The process transmits the carrier noise-band signal with the different discrete changes to the frequency range of the frequency noise-bands (operation 5704). The process terminates thereafter.

Figure 58:
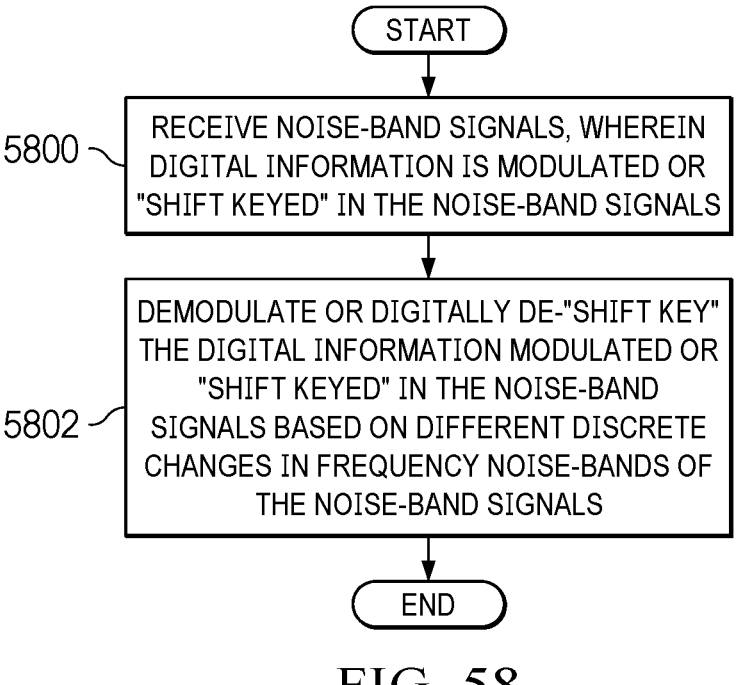
FIG. 58 is an illustration of a flowchart of process for communicating digital information in accordance with an illustrative embodiment.

Turning next to FIG. 58, an illustration of a flowchart of a process for communicating digital information is depicted in accordance with an illustrative embodiment. The process in FIG. 58 can be implemented in hardware, software, or both. When implemented in software, the process can take the form of program instructions that are run by one or more processor units located in one or more hardware devices in one or more computer systems. For example, the process can be implemented in receiver 3617 in FIG. 47.

The process begins by receiving noise-band signals, wherein digital information is modulated or "shift keyed" in the noise-band signals (operation 5800). The process demodulates or digitally de-"shift keys" the digital information modulated or "shift keyed" in the noise-band signals based on different discrete changes in frequency noise-bands of the noise-band signals (5802). The process terminates thereafter. In this example, the discrete changes in the frequency noise-bands are discrete changes in frequency ranges of the frequency noise-bands of the noise-band signals.

Some features of the illustrative examples for modulating digital information 3607 using digital frequency noise shift keying 3692 in communications system 3602 are described in the following clauses. These clauses are examples of features and are not intended to limit other illustrative examples.

1. A communications system comprising:
a computer system; and
a communications manager in the computer system, wherein the communications manager is configured to:
identify digital information for transmission; and
transmit noise-band signals with different discrete changes to a frequency range of frequency noise-bands of the noise-band signals that thereby modulate the noise-band signals to correspond to the digital information.

2. The communications system of clause 1, wherein the different discrete changes to the frequency range of the frequency noise-bands of the noise-band signals represent multiple discrete logic symbols.

3. The communications system of clause 1, wherein a first discrete change to the frequency range of the frequency noise-bands of the noise-band signals corresponds to a logic 0 and a second discrete change of the frequency noise-bands of the noise-band signals corresponds to a logic 1.

4. The communications system of clause 1, wherein the different discrete changes to the frequency range of the frequency noise-bands of the noise-band signals comprise four different discrete changes of the frequency noise-bands of the noise-band signals in which a first discrete change of the frequency noise-bands represents a logic "00," a second discrete change of the frequency noise-bands represents a logic "01," a third discrete change of the frequency noise-bands represents a logic "10," and a fourth discrete change of the frequency noise-bands represents a logic "11."

5. The communications system of clause 1, wherein the different discrete changes to the frequency range selected from at least one a position or a width of the frequency noise-bands of the noise-band signals correspond to multiple discrete logic symbols.

6. The communications system of clause 1, wherein the noise-band signals are radio frequency noise-band signals and further comprising:
a laser generation system configured to emit a set of one or more laser beams, wherein in transmitting the noise-band signals, the communications manager is configured to:
control an emission of a set of one or more laser beams from the laser generation system to control optical breakdowns that generate the radio frequency noise-band signals with the different discrete changes to the frequency range of the frequency noise-bands for the radio frequency noise-band signals that thereby modulate the radio frequency noise-band signals to correspond to the digital information.

7. The communications system of clause 6, wherein in controlling the emission of the set of one or more laser beams, the communications manager is configured to:
control the emission of the set of one or more laser beams from the laser generation system to control the optical breakdowns that generate the radio frequency noise-band signals by varying a frequency location of a center point of the frequency noise-bands for the radio frequency noise-band signals that thereby modulates the radio frequency noise-band signals to correspond to the digital information.

8. The communications system of clause 6, wherein in controlling the emission of the laser beams, the communications manager is configured to:
control the emission of the set of one or more laser beams from the laser generation system to control the optical breakdowns that generate the radio frequency noise-band signals by varying a width of the frequency noise-bands for the radio frequency noise-band signals that thereby modulates the radio frequency noise-band signals to correspond to the digital information.

9. The communications system of clause 6, wherein in controlling the emission of the laser beams, the communications manager is configured to:
control a set of one or more input parameters for the emission of a set of one or more of laser beams from the laser generation system to control the optical breakdowns that generate the radio frequency noise-band signals by varying the frequency noise-bands such that different discrete changes to the frequency range of the frequency noise-bands for the radio frequency noise signals thereby modulates the radio frequency noise-band signals to correspond to the digital information.

10. The communications system of clause 1 further comprising:
an electric noise generator configured to generate a carrier noise-band signal;
a modulator; and
a transmitter, wherein in transmitting the noise-band signals, the communications manager is configured to:
generate the carrier noise-band signal using the electric noise generator;
modulate the carrier noise-band signal using the modulator to change frequency noise-bands for the carrier noise-band signal, wherein different discrete changes to the frequency range of the frequency noise-bands for the carrier noise-band signal thereby modulate the carrier noise-band signal to correspond to the digital information; and
transmit the carrier noise-band signal with the different discrete changes in a frequency range of the frequency noise-bands for the carrier noise-band signal.

11. The communications system of clause 10, wherein the carrier noise-band signal is selected from at least one of electromagnetic frequency noise signals, radio frequency noise signals, microwave frequency noise signals, audio frequency noise signals, ultrasonic frequency noise signals, ultra-low frequency noise signals, very low frequency noise-band signals, underwater frequency noise signals, or optical frequency noise signals including at least one of visible light or non-visible light.

12. The communications system of clause 1, wherein the different discrete changes in the frequency noise-bands for the noise-band signals are made to at least one of a width or a position of the frequency noise-bands.

13. The communications system of clause 1, wherein the different discrete changes are made to a frequency range of the frequency noise-bands for the noise-band signals.

14. A communications system comprising:

a receiver configured to:

receive noise-band signals, wherein digital information is modulated in the noise-band signals; and demodulate the digital information modulated in the noise-band signals based on different discrete changes of frequency noise-bands of the noise-band signals.

15. A method for communicating digital information, the method comprising:

identifying the digital information for transmission; and transmitting noise-band signals with different discrete changes to a frequency range of frequency noise-bands for the noise-band signals that thereby modulate the noise-band signals to correspond to the digital information.

16. The method of clause 15, wherein the different discrete changes of the frequency noise-bands of the noise-band signals correspond to multiple discrete logic symbols.

17. The method of clause 15, wherein a first discrete change of the frequency noise-bands of the noise-band signals corresponds to a logic 0 and a second discrete change of the frequency noise-bands of the noise-band signals corresponds to a logic 1.

18. The method of clause 15, wherein the different discrete changes of the frequency noise-bands of the noise-band signals comprise four different discrete changes of the frequency noise-bands of the noise-band signals in which a first discrete change of the frequency noise-bands represents a logic "00," a second discrete change of the frequency noise-bands represents a logic "01," a third position of the frequency noise-bands represents a logic "10," and a fourth discrete change of the frequency noise-bands represents a logic "11."

19. The method of clause 15, wherein the different discrete changes selected from at least one a position and a width of the frequency noise-bands of the noise-band signals correspond to multiple discrete logic symbols.

20. The method of clause 15, wherein the noise-band signals are radio frequency noise-band signals and further comprising:

controlling emission of a set of one or more laser beams from a laser generation system to control optical breakdowns that generate the radio frequency noise-band signals having with the different discrete changes of the frequency noise-bands for the noise-band signals that thereby modulate the radio frequency noise-band signals to correspond to the digital information.

21. The method of clause 20, wherein said controlling the emission of the set of one or more laser beams comprises:

controlling the emission of the set of one or more laser beams from the laser generation system to control the optical breakdowns that generate the radio frequency noise-band signals by varying a frequency location of center points of the frequency noise-bands for the radio frequency noise-band signals that thereby modulates the radio frequency noise-band signals to correspond to the digital information.

22. The method of clause 20, wherein said controlling the emission of the laser beams comprises:

controlling the emission of the set of one or more laser beams from the laser generation system to control the optical breakdowns that generate the radio frequency noise-band signals by varying a width of the frequency noise-bands for the radio frequency noise-band signals, wherein a variation of the width thereby modulates the radio frequency noise-band signals to correspond to the digital information.

23. The method of clause 20, wherein said controlling the emission of the laser beams comprises:

controlling a set of one or more input parameters for the emission of a set of one or more of laser beams from the laser generation system to control the optical breakdowns that generate the radio frequency noise-band signals by varying the frequency noise-band, wherein different discrete changes to the frequency range of the frequency noise-bands for the radio frequency noise signals thereby modulates the radio frequency noise-band signals to correspond to the digital information.

24. The method of clause 15, wherein said transmitting the noise-band signals comprises:

generating a carrier noise-band signal using an electric noise generator;

modulating the carrier noise-band signal using a modulator to change frequency noise-bands of the carrier noise-band signal, wherein discrete changes to the frequency range of the frequency noise-bands for the carrier noise-band signal thereby modulate the carrier noise signal to correspond to the digital information; and transmitting the carrier noise-band signal with the different discrete changes to the frequency range of the frequency noise-bands.

25. The method of clause 15, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals.

26. A method for communicating digital information, the method comprising:

receiving noise-band signals, wherein the digital information is modulated in the noise-band signals; and demodulating the digital information modulated in the noise-band signals based on different discrete changes in frequency noise-bands of the noise-band signals.

27. The method of clause 26, wherein the different discrete changes in the frequency noise-bands are discrete changes in frequency ranges of the frequency noise-bands of the noise-band signals.

28. The method of clause 26, wherein the different discrete changes in the frequency noise-bands for the noise-band signals are made to at least one of a width or a position of the frequency noise-bands.

Figure 59:
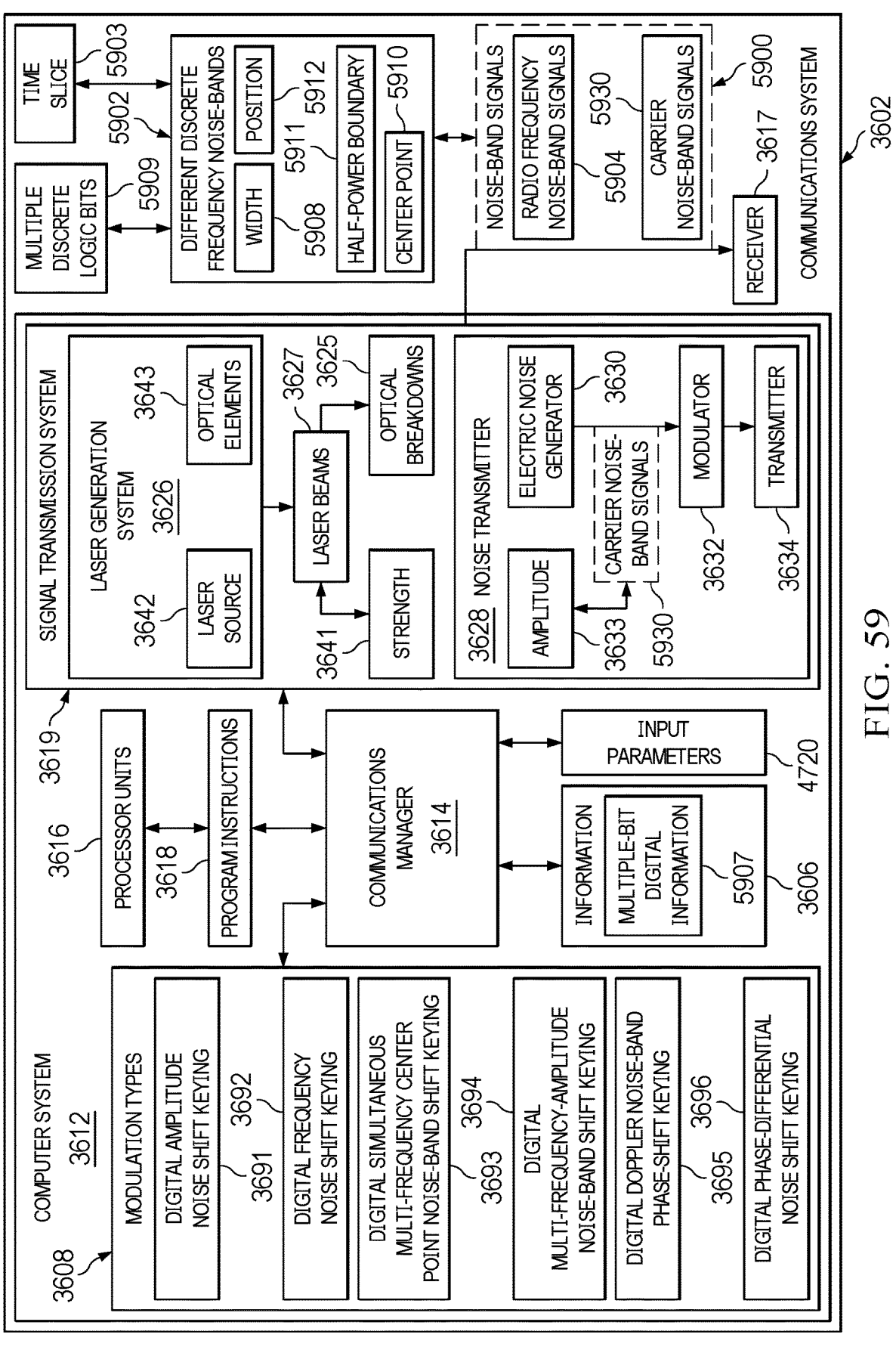
FIG. 59 is an illustration of a block diagram of a communication system for transmitting noise signals using digital frequency noise modulation in accordance with an illustrative embodiment.

Turning now to FIG. 59, an illustration of a block diagram of a communication system for transmitting noise signals using what may be variously called digital simultaneous multi-frequency noise-shift keying, digital simultaneous multi-frequency center point noise-shift keying, and/or digital simultaneous multi-frequency center point noise-band shift keying is depicted in accordance with an illustrative embodiment. In this illustrative example, communications system 3602 operates to modulate or "shift key" noise-band signals 5900 to correspond to information 3606 using digital simultaneous multi-frequency center point noise-band shift keying 3693. Noise-band signals 5900 can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, optical frequency noise signals including at least one of visible or non-visible light, or other types of noise signals.

In this illustrative example, communications manager 3614 identifies multiple-bit digital information 5907 for transmission. Communications manager 3614 transmits noise-band signals 5900 having different discrete frequency noise-bands 5902 in time slice 5903 wherein each discrete frequency-band in different discrete frequency noise-bands 5902 corresponds to a different bit in multiple-bit digital information 5907, whereby a simultaneous transmission of different discrete frequency noise-bands 5902 in time slice 5903 thereby modulates or digitally "shift keys" noise-band signals 5900 to correspond to multiple-bit digital information 5907.

In this illustrative example, simultaneous transmission means that the different signals are sent at the same time or as close as possible to the same time such that the transmissions occur within time slice 5903. Signals within time slice 5903 are considered to be simultaneous signals for purposes of transmission or receipt by receiver 3617 for demodulation to recover multiple-bit digital information 5907.

In this example, communications manager 3614 transmits multiple discrete logic bits 5909 in multiple-bit digital information 5907 at the same time. This transmission occurs at the same time with different discrete frequency noise-bands 5902 being transmitted in the same time slice. Multiple discrete logic bits 5909 can be, for example, 2 bits of information, 8 bits, 16 bits, 32 bits, or some other number of bits which can be all transmitted within time slice 5903 using transmissions of different discrete frequency noise-bands within time slice 5903. This is in contrast to transmitting a single frequency noise-band within time slice 5903 that can correspond to one or more discrete logic bits. In this example, each frequency noise-band within different discrete frequency noise-bands 5902 transmitted within time slice 5903 can represent a logic "0" or a "logic "1.""

In this example, different discrete frequency noise-bands 5902 are a grouping of noise-band signals 5900. For example, different discrete frequency noise-bands 5902 can be at least one of "clusters of noise," "noise spectra," noise spectrum," "a frequency band of noise," "a pass-band of noise," "a band-pass of noise," "a frequency range of noise," or a "noise frequency range" which can have a lower half-power boundary and an upper half-power boundary or other lower and upper boundary. Different discrete frequency noise-bands 5902 for noise-band signals 5900 can be changed in a manner that corresponds to multiple-bit digital information 5907. For example, noise-band signals 5900 can be modulated such that different discrete frequency noise-bands 5902 change in at least one of width 5908 (bandwidth or frequency bandwidth), position 5912, center frequency or center point 5910, or half-power boundary 5911.

In one illustrative example, this transmission can be performed using laser generation system 3626. With this example, communications manager 3614 controls an emission of a set of one or more laser beams 3627 from laser generation system 3626 to at least one of cause or control optical breakdowns 3625 that generate noise-band signals 5900 having different discrete frequency noise-bands 5902 in time slice 5903. Each frequency noise-band in the different discrete frequency noise-bands 5902 corresponds to a different bit in multiple-bit digital information 5907, whereby the simultaneous transmission of different discrete frequency noise-bands 5902 in time slice 5903 thereby modulates or digitally "shift keys" radio frequency noise-band signals 5904 to correspond to multiple discrete logic bits 5909 in multiple-bit digital information 5907.

In this example, at least one of width 5908, position 5912, or center frequency or center point 5910 of different discrete frequency noise-bands 5902 can be varied to have different discrete changes to cause radio frequency noise-band signals 5904 to correspond to multiple-bit digital information 5907. Position 5912 for each of different discrete frequency noise-bands 5902 can be identified using center frequency or center point 5910 of each of different discrete frequency noise-bands 5902. The change of a beginning, initial, or lower and ending, final, or upper of frequencies in different discrete frequency noise-bands 5902 can result in different discrete changes for at least one of width 5908 or position 5912 of different discrete frequency noise-bands 5902. Thus, in this example, the different discrete changes are present between the ranges of frequencies of different discrete frequency noise-bands 5902 for noise-band signals 5900 that thereby modulate noise-band signals 5900 in time slice 5903 to correspond to multiple-bit digital information 5907.

In one illustrative example, communications manager 3614 controls the emission of the set of one or more laser beams 3627 from laser generation system 3626 to at least one of cause or control optical breakdowns 3625 that generate radio frequency noise-band signals 5904 with discrete changes of center point 5910 of different discrete frequency noise-bands 5902 for radio frequency noise-band signals 5904. Discrete changes of center point 5910 of different discrete frequency noise-bands 5902 for radio frequency noise-band signals 5904 in time slice 5903 correspond to multiple discrete logic bits 5909 in the multiple-bit digital information.

In these examples, center point 5910 is different for different ones of different discrete frequency noise-bands 5902. The particular frequency location of center point 5910 for a frequency noise-band in different discrete frequency noise-bands 5902 can correlate to a bit represented by a frequency noise-band in different discrete frequency noise-bands 5902. The frequency location of center point 5910 can be different for a particular frequency noise-band relative to other center points for other frequency noise-bands in different discrete frequency noise-bands 5902.

These differences in the positions of center point 5910 for different discrete frequency noise-bands 5902 correlate to multiple discrete logic bits 5909 in time slice 5903 in which each bit can be a logic "0" or a "logic "1." A variation of the frequency location of center point 5910 of different discrete frequency noise-bands 5902 for radio frequency noise-band signals 5904 thereby modulates or digitally "shift keys" radio frequency noise-band signals 5904 to correspond to multiple discrete logic bits 5909 in multiple-bit digital information 5907.

Thus, in this example, center point 5910 can be moved back and forth as different discrete frequency noise-bands 5902 to modulate radio frequency noise-band signals 5904 to correspond to multiple-bit digital information 5907. In other words, the modulation of center point 5910 as different discrete frequency noise-bands 5902 for radio frequency noise-band signals 5904 is an example of one manner in which different discrete frequency noise-bands 5902 can be modulated to at least one of causing or controlling radio frequency noise-band signals 5904 to correspond to multiple-bit digital information 5907.

In another illustrative example, communications manager 3614 can control the emission of the set of one or more laser beams 3627 from laser generation system 3626 to at least one of cause or control optical breakdowns 3625 that generate radio frequency noise-band signals 5904 in time slice 5903 by varying width 5908 of different discrete frequency noise-bands 5902 for radio frequency noise-band signals 5904 in time slice 5903. Different widths of different discrete frequency noise-bands 5902 for radio frequency noise-band signals 5904 in time slice 5903 correspond to multiple discrete logic bits 5909 and thereby modulate radio frequency noise-band signals 5904 to correspond to multiple-bit digital information 5907. For example, a set of multiple discrete logic bits 5909 can be a group of 2 bits, 4 bits, 7 bits, 16 bits, or some other number of bits that are all transmitted within time slice 5903. In these examples, multiple discrete logic bits 5909 do not necessarily have to correspond to an even number of bits.

In this example, a variation in width 5908 thereby modulates or digitally "shift keys" radio frequency noise-band signals 5904 to correspond to digital information 3607 in FIG. 36 or multiple-bit digital information 5907 in FIG. 59. In other words, width 5908 of radio frequency noise-band signals 5904 in different discrete frequency noise-bands 5902 can be increased and decreased to modulate radio frequency noise-band signals 5904 to correspond to multiple-bit digital information 5907. In these examples, the change in width 5908 can occur by changing at least one of the boundaries lower, starting, or initial frequency, and at least one of the upper, ending, final frequency in a frequency noise-band by controlling or causing the manner in which optical breakdowns 3625 occur.

In another example, communications manager 3614 controls a set of one or more input parameters 4720 for the emission of a set of one or more of laser beams 3627 from laser generation system 3626 to at least one of cause or control optical breakdowns 3625 that generate radio frequency noise-band signals 5904 with discrete changes of different discrete frequency noise-bands 5902 in time slice 5903. Different discrete frequency noise-bands 5902 for radio frequency noise-band signals 5904 in time slice 5903 correspond to different sets of multiple discrete logic bits 5909 and thereby modulate radio frequency noise-band signals 5904 to correspond to multiple-bit digital information 5907.

With this example, the set of one or more input parameters 4720 can take a number of different forms. For example, the set of one or more input parameters 4720 can, for example, be selected from one or more of, a mirror orientation, a deformable mirror position, a lens position, lens, a deformable lens position or some other element that can be positioned in a manner that changes an optical path length (OPL) for the set of one or more laser beams 3627. In this example, the path length change can be both the optical path length and/or the physical path length. Another input parameter that can be changed in this example is the index of refraction (IoR). The optical path length is inversely proportional to the index of refraction.

These changes to input parameters 4720 can cause discrete changes of different discrete frequency noise-bands 5902 of radio frequency noise-band signals 5904. For example, changes can be made to at least one of width 5908 (bandwidth or frequency bandwidth) or position 5912 of different discrete frequency noise-bands 5902 for radio frequency noise-band signals 5904. In other words, different noise-bands can have different changes in at least one of position 5912 or width 5908.

In another example, communications manager 3614 can control noise transmitter 3628 in signal transmission system 3619 to transmit digital information 3607 in FIG. 36 or multiple-bit digital information 5907 in FIG. 59. For example, in generating noise-band signals 5900, communications manager 3614 can generate carrier noise-band signals 5930 using electric noise generator 3630.

In this example, communications manager 3614 modulates or digitally "shift keys" carrier noise-band signals 5930 using modulator 3632 to generate the carrier noise-band signals 5930 having different discrete frequency noise-bands 5902 in time slice 5903 wherein each discrete frequency noise-band in different discrete frequency noise-bands 5902 corresponds to a different bit in multiple-bit digital information 5907. Different frequency-ranges of different discrete frequency noise-bands 5902 for the carrier noise-band signals 5930 correspond to different sets of multiple discrete logic bits 5909 and thereby modulate the carrier noise-band signals 5930 to correspond to the multiple-bit digital information 5907.

Communications manager 3614 transmits carrier noise-band signals 5930 simultaneously with the different discrete frequency noise-bands in time slice 5903. In this illustrative example, the simultaneous transmission of carrier noise-band signals 5930 means that these signals are sent at the same time or as close to the same time such that the signals are sent during time slice 5903.

Figure 60:
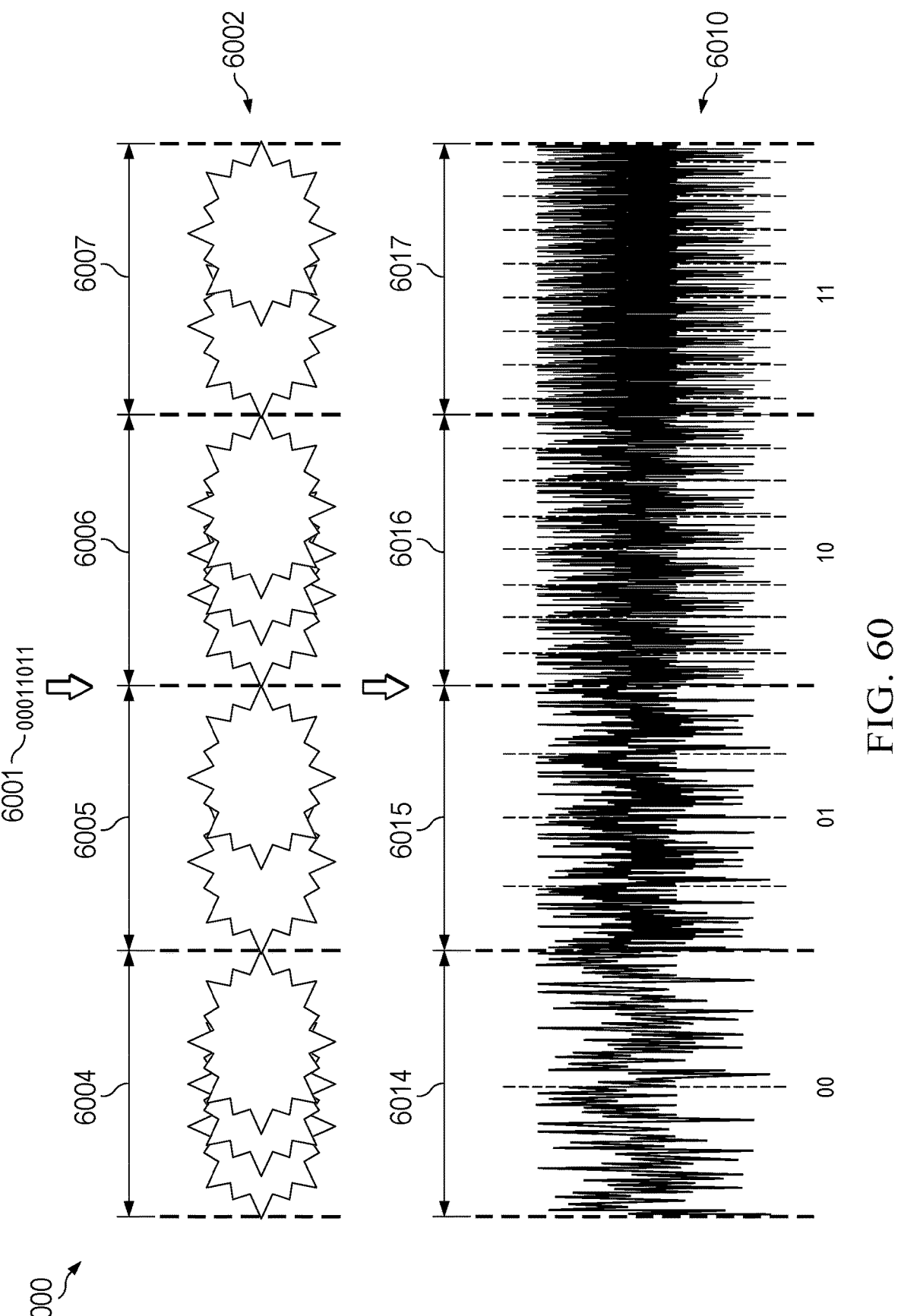
FIG. 60 is an illustration of an illustration of information flow for transmitting digital information with digital frequency noise modulation using a laser generation system in accordance with an illustrative embodiment.

Turning next to FIG. 60, an illustration of information flow for transmitting digital information with what is variously called digital simultaneous multi-frequency noise-shift keying, digital simultaneous multi-frequency center point noise-shift keying, and/or digital simultaneous multi-frequency center point noise-band shift keying using a laser generation system is depicted in accordance with an illustrative embodiment. In this example, information flow 6000 can be implemented using laser generation system 3626 in signal transmission system 3619 for communications system 3602 in FIG. 47 and FIG. 59. In this example, optical breakdowns 6002 are generated using digital information 6001 and are at least one of controlled or caused within time slices. In this example, the time slices include time slice 6004, time slice 6005, time slice 6006, and time slice 6007. In other words, groups of optical breakdowns 6002 occur within each of the time slices. In this example, time slice 6004, time slice 6005, time slice 6006, and time slice 6007, are present, in which optical breakdowns occur simultaneously within each of these time slices. These optical breakdowns result in noise-band signals 6010 with different discrete frequency noise-bands in the time slices. In this example, in noise-band signals 6010 these time slices include time slice 6014, time slice 6015, time slice 6016, and time slice 6017. As depicted, time slice 6004 corresponds to time slice 1614, time slice 6005 corresponds a time slice 6015, time slice 6006 corresponds the time slice 6016, and time slice 6007 corresponds to time slice 6017. In this illustrative example, the different discrete frequency noise-bands in each of these time slices correspond to multiple discrete logic bits in multiple-bit digital information 5907.

In this illustrative example, multiple bits can be transmitted in each time slice. As depicted, time slice 6014 contains logic symbol "00," time slice 6015 contains logic symbol "01," time slice 6016 contains logic symbol "10," and time slice 6017 contains logic symbol "11." In other examples, other numbers of bits can be present in a time slice. For example, 3 bits, 8 bits, 16 bits, 32 bits, or some other number bits can be present by transmitting different discrete frequency noise-bands within any time slice.

Figure 61:
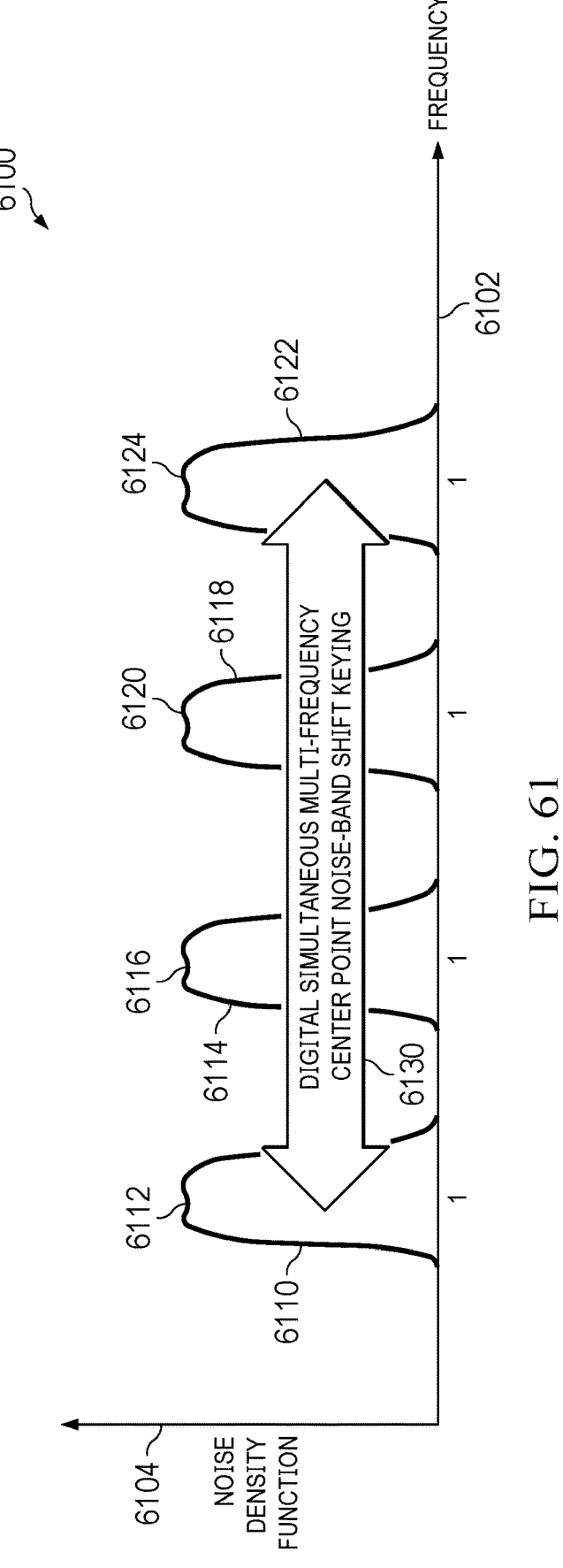
FIG. 61 is an illustration of frequency noise modulation of radio frequency signals through changing a frequency location of the center points of different discrete frequency noise-bands in radio frequency noise-band signals in accordance with an illustrative embodiment.

Turning next to FIG. 61, an illustration of frequency noise modulation of radio frequency signals through changing a frequency location of the center points of different discrete frequency noise-bands in radio frequency noise-band signals is depicted in accordance with an illustrative embodiment. In this illustrative example, in graph 6100, x-axis 6102 denotes frequency and y-axis 6104 denotes noise density, noise power density, and/or noise density function.

As depicted, four different discrete frequency noise-bands of noise-band signals are depicted with different center points in a time slice. In other words, these four different discrete frequency noise-bands are transmitted simultaneously in the same time slice or time slot to correspond to multiple-bit digital information.

In this illustrative example, first frequency noise-band 6110 has first center point 6112; second frequency noise-band 6114 has second center point 6116; third frequency noise-band 6118 has third center point 6120; fourth frequency noise-band 6122 has fourth center point 6124. The center points have different discrete changes in positions relative to each other in which each position represents a bit position for 4 bits of multiple-bit digital information. In this example, first frequency noise-band 6110 is in the position of least significant bit and the fourth frequency noise-band 6122 is in the position of the most significant bit, when read as least significant bit on the left and most significant bit on the right.

These different discrete noise-band signals are all transmitted within the same timeslot in this example. This type of transmission is considered a simultaneous transmission such that multiple-bit digital information can be transmitted simultaneously.

These different discrete frequency locations of the center points determine whether a bit is a logical "1" or "0" for each center point frequency location for digital simultaneous multi-frequency center point noise-band shift keying 6130. The different center points correlate to different bit positions. In this example, the existence of different discrete frequency noise-bands in all four center point frequency locations designates a "1111" for multiple-bit digital information.

Thus, in this example, digital simultaneous multi-frequency center point noise-band shift keying 6130 occurs by transmitting or not transmitting noise in frequency-band locations with center points for different discrete frequency-band noise signals resulting in different combinations of different discrete frequency noise-bands for the radio frequency noise-band signals in a timeslot. The original bits for transmission can be used to at least one of cause or control different discrete frequency noise-bands of radio frequency noise-band signals to correspond to the multiple-bit digital information being transmitted.

In another example, 16 frequency locations can be used for center points resulting in 16 bit positions for multiple discrete logic bits for different discrete frequency noise-bands in noise-band signals in the same timeslot. The frequency locations of these 16 center points for the different discrete frequency noise-bands correspond to 16 different bit positions in multiple-bit digital information, resulting in a logic "0" or a logic "1" for each of the 16 different bit positions. These noise-band signals are transmitted simultaneously by transmitting these noise-band signals with the different discrete noise-bands in a single timeslot.

Figure 62:
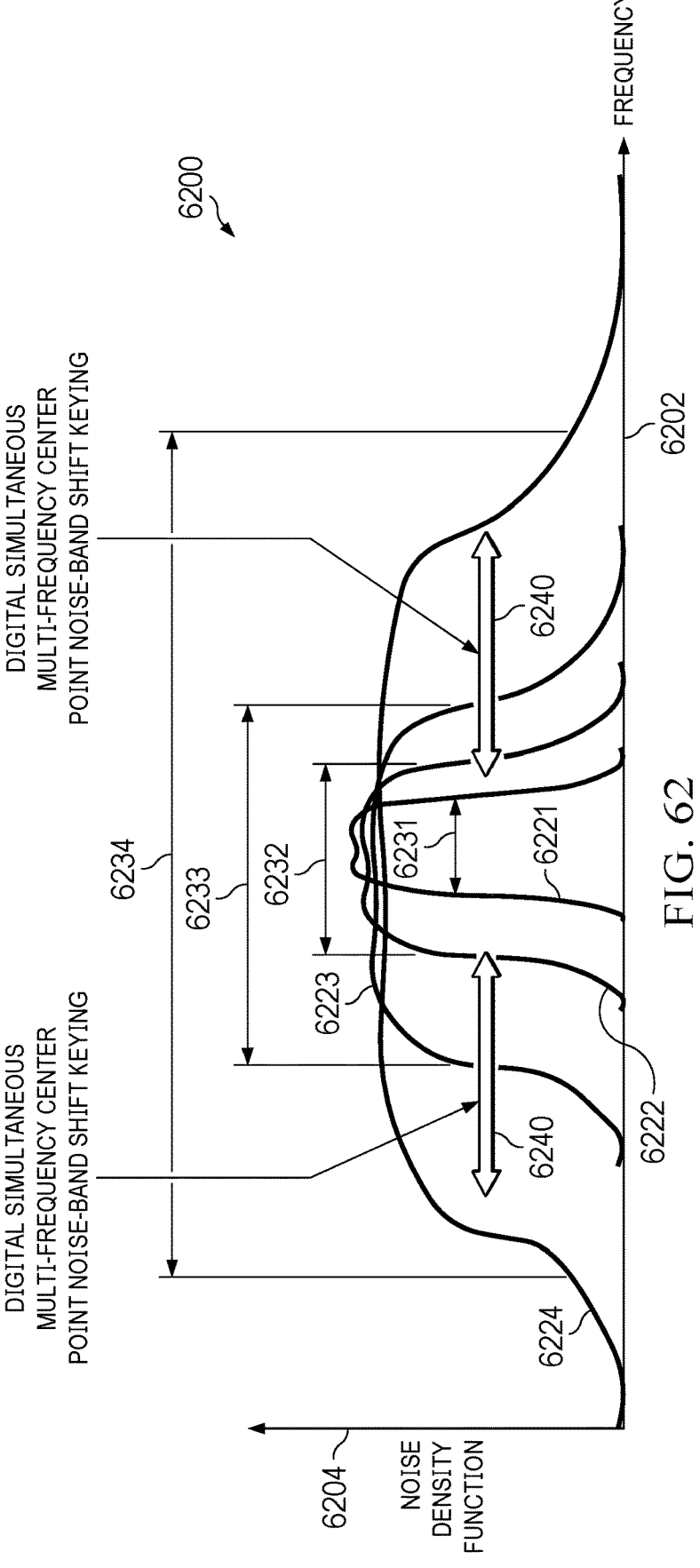
FIG. 62 is an illustration of frequency modulation of radio frequency signals through changing a width or bandwidth of different discrete noise-bands in noise-band signals transmitted in a timeslot in accordance with an illustrative embodiment.

In FIG. 62, an illustration of frequency modulation of radio frequency signals through changing a width or band-width of different discrete noise-bands in noise-band signals transmitted in a timeslot is depicted in accordance with an illustrative embodiment. In this illustrative example, in graph 6200, x-axis 6202 denotes frequency and y-axis 6204 denotes noise density function. y-axis 6204 can also denote noise amplitude in addition to or in place of noise density function.

As depicted, radio frequency noise-band for radio frequency noise-band signals have different discrete changes in the form of different widths. First frequency noise-band 6221 has first bandwidth or width 6231; second frequency noise-band 6222 has second bandwidth or width 6232; third frequency noise-band 6223 has third bandwidth or width 6233; and fourth frequency noise-band 6224 has fourth bandwidth or width 6234.

In this example, each of these widths correspond to a bit position or multiple-bit symbol. As depicted, when frequency noise-band 6221 having a narrow bandwidth or width 6231 is present or transmitted, it illustratively designates a multi-bit symbol such as a logical "00." When broader width 6232 of frequency noise-band 6222 is present or transmitted, it illustratively designates a multi-bit symbol such as a logical "01." When even broader bandwidth or width 6233 of frequency noise-band 6223 is present or transmitted, it illustratively designates a multi-bit symbol such as a logical "10." When maximally broad bandwidth or width 6234 of frequency noise-band 6224 is present or transmitted, it illustratively designates a multi-bit symbol such as a logical "11." Thus, every one of the different frequency noise-bands with different bandwidths designates a different multi-bit symbol. As would be clear to those skilled in the art, more frequency noise-bands with different bandwidths than are shown here can be used to transmit more multi-bit symbols.

In this example, digital multi-bandwidth noise-band noise-shift keying 6240 can be used to modulate frequency bandwidth ranges of these frequency noise-bands of the frequency noise-band signals to different widths that correspond to digital signals being transmitted. In these examples, the different bits correspond to multiple discrete logic bits or symbols that correspond to the digital information.

Each of the frequency noise-bands with different bandwidths represents a particular bit or symbol based on the width of the frequency noise-band. If only two different bandwidths were used, each bandwidth could represent a logical "0" or logical "1." As depicted, two bit positions or symbols are represented by the 4 widths.

Figure 63:
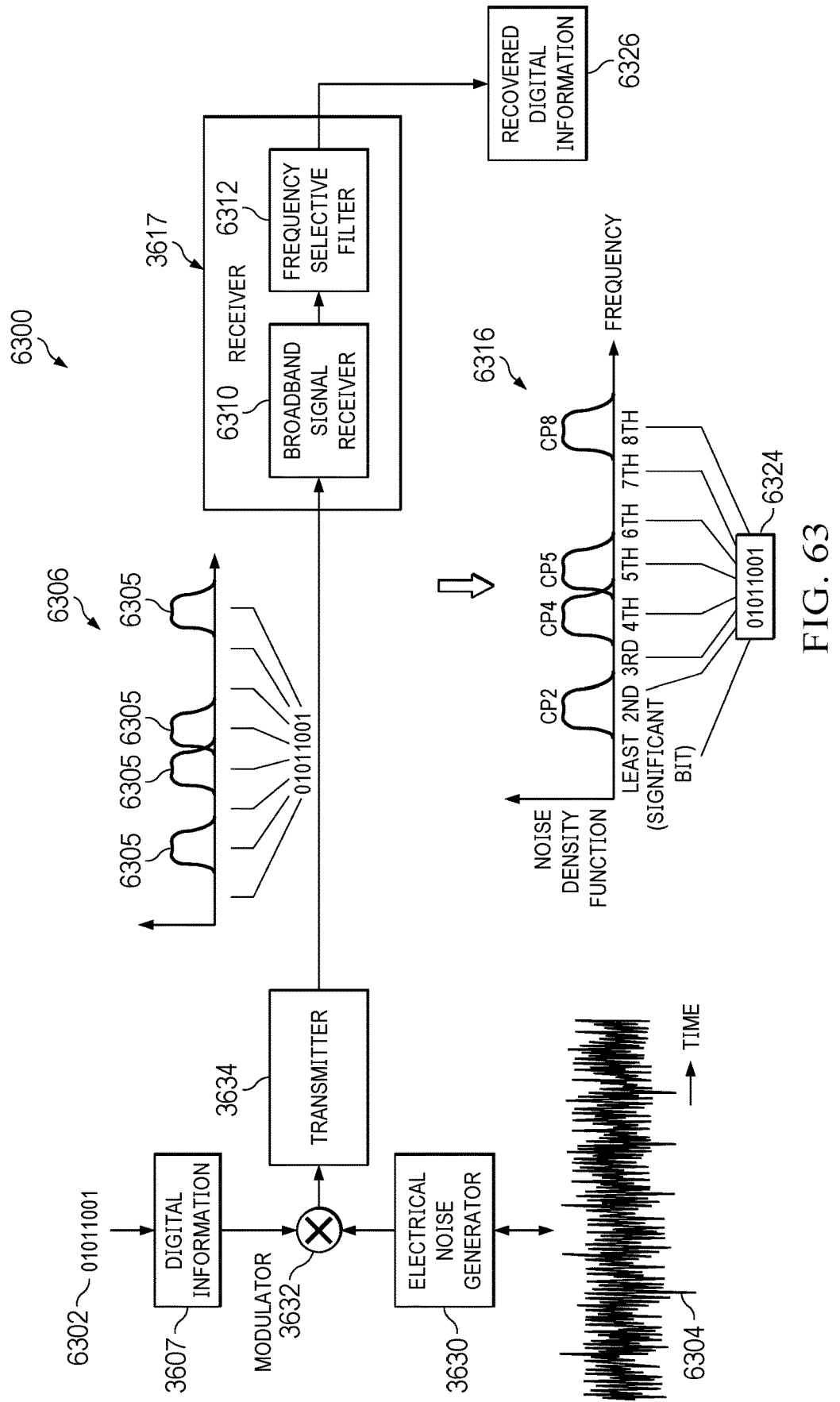
FIG. 63 is an illustration of information flow for transmitting digital information with digital frequency noise modulation using a noise transmitter in accordance with an illustrative embodiment.

Turning next to FIG. 63, an illustration of information flow for transmitting digital information with what is variously called digital simultaneous multi-frequency noise-shift keying, digital simultaneous multi-frequency center point noise-shift keying, and/or digital simultaneous multi-frequency center point noise-band shift keying using a noise transmitter is depicted in accordance with an illustrative embodiment. In this example, information flow 6300 can be implemented using noise transmitter 3628 in signal transmission system 3619 for communications system 3602 in FIG. 59.

As depicted in FIG. 63 in this example, digital information 6302 is an example of digital information 3607 that is to be transmitted using digital simultaneous multi-frequency noise-shift keying. As depicted, digital information 6302 is in the form of bits as follows "01011001."

In this example, electric noise generator 3630 generates carrier noise-band signals 6304. In this example, modulator 3632 is a frequency modulator that modulates or digitally "shift keys" different discrete frequency noise-bands in carrier noise-band signals 6304 to correspond to digital information 3607 by simultaneously passing different noise frequency-bands to correspond to the digital information 3607. This modulation causes carrier noise-band signals 6304 to have different discrete frequency noise-bands in a timeslot. In alternative examples, electric noise generator 3630 and modulator 3632 comprise separate noise generators for each of individually tuned carrier noise-band signals shown in modulated carrier noise-band signals 6306. In these alternative examples, modulator 3632 turns these tuned carrier noise-band signals on and off to correspond to digital information 3607 for digital information 6302.

As a result, modulated carrier noise-band signals 6306 with different discrete frequency noise-bands are transmitted by transmitter 3634 in the timeslot. In this example, modulated carrier noise-band signals 6306 is similar to the four different noise-band frequencies shown in FIG. 61, except that modulated carrier noise-band signals 6306 in FIG. 63 shows eight discrete noise-band frequencies. These complex carrier noise-band signals have different discrete frequency noise-bands that represent different bit positions in which each bit position can be a logic "0" or a logic "1." The transmission of different discrete frequency noise-bands for frequency noise-band signals as modulated carrier noise-band signals 6306 in time slots results in digital simultaneous multi-frequency center point noise-band shift keying.

As depicted, modulated carrier noise-band signals 6306 is comprised of frequency noise-bands 6305 and is not a sinusoidal wave form. The transmissions or lack of transmissions of the different discrete noise-bands thereby modulate the modulated carrier noise-band signals 6306 to correlate to digital information 6302.

Modulated carrier noise-band signals 6306 is an example of carrier noise-band signals 5930 with different discrete frequency noise-bands 5902 in FIG. 59. This modulated transmission signal has a frequency noise-band that varies in a manner that corresponds to digital information 6302.

As depicted, receiver 3617 includes broadband signal receiver 6310 and frequency selective filter 6312. Broadband signal receiver 6310 is at least one of a hardware device or software device that is configured to receive and process signals across a wide range of frequencies. In this example, broadband signal receiver 6310 receives modulated carrier noise-band signal 6306.

This reception of modulated carrier noise-band signals 6306 results in received signal 6316. As depicted in this example, received signal 6316 is the same or substantially the same as modulated carrier noise-band signals 6306. In this example, a noise floor can also be present in received signal 6316 from broadband signal receiver 6310. The noise floor can be from extraneous radio frequency noise sources or noise sources in broadband signal receiver 6310.

In this example, frequency selective filter 6312 can detect frequency changes in the frequency noise-band for received signal 6316 to recover multiple discrete logic bits from received signal 6316.

For example, frequency selective filter 6312 can be implemented using a frequency comb filter that is comprised of bandpass filters, amplitude detectors, and a frequency response analyzer. In this illustrative example, the bandpass filters pass selected ranges of frequencies. Each bandpass filter is configured to pass frequencies of a particular range. The amplitude detectors have inputs connected to the output of the bandpass filters. The amplitude detectors generate output signals in response to detecting signal amplitudes greater than a threshold. In this illustrative example, an amplitude detector is connected to each of the bandpass filters. As a result, amplitude detectors can indicate when different ranges of frequencies are detected from the received signal 6316. The amplitude detectors can output a logic "0" or logic "1" based on the amplitude of the signal received from an associated bandpass filter.

Thus, frequency selective filter 6312 can detect discrete frequency noise-bands of received signal 6316 to generate multiple discrete logic bits 6324. In this example, multiple discrete logic bits 6324 output from frequency selective filter 6312 forms recovered digital information 6326. As depicted in this example, multiple discrete logic bits 6324 for recovered digital information 6326 are the same as the multiple discrete logic bits in digital information 6302 in digital information 3607.

Turning next to FIG. 64, an illustration of a flowchart for communicating multiple-bit digital information is depicted in accordance with an illustrative embodiment. The process in FIG. 64 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 59.

The process begins by identifying the multiple-bit digital information for transmission (operation 6400). The process transmits at different discrete frequency noise-bands in a time slice wherein each frequency-band corresponds to a different bit in the multiple-bit digital information, whereby a simultaneous transmission of different discrete frequency noise-bands in the time slice thereby modulates or digitally "shift keys" the noise-band signals to correspond to the multiple-bit digital information (operation 6402). The process terminates thereafter. The different discrete frequency noise-bands have changes to at least one of a width or a position of the different discrete frequency noise-bands of the noise-band signals that thereby modulates or digitally "shift keys" the noise-band signals to correspond to the multiple-bit digital information.

With reference next to FIG. 65, an illustration of a flowchart of a process for transmitting noise signals using a laser generation system is depicted in accordance with an illustrative embodiment. The process in this figure is an example of an implementation for operation 6402 in FIG. 64. In this example, the noise signals are radio frequency noise signals.

The process controls emission of a set of one or more laser beams from a laser generation system to control optical breakdowns that generate noise-band signals having different discrete frequency noise-bands in the time slice, wherein each frequency-band corresponds to a different bit in the multiple-bit digital information, whereby the simultaneous transmission of different discrete frequency noise-bands in the time slice thereby modulate the radio frequency noise-band signals to correspond to multiple discrete logic bits in the multiple-bit digital information (operation 6500). The process terminates thereafter.

Next in FIG. 66, an illustration of a flowchart of a process for controlling emission of a set of one or more laser beams is depicted in accordance with an illustrative embodiment. The process in this figure is an example of an implementation for operation 6500 in FIG. 65.

The process controls the emission of the set of one or more laser beams from the laser generation system to control the optical breakdowns within the time slice that generate the radio frequency noise-band signals with different discrete changes of center point of the frequency noise-bands for the radio frequency noise-band signals, wherein different discrete changes of the center point of the different discrete frequency noise-bands for the radio frequency noise-band signals in the time slice correspond to the multiple discrete logic bits in the multiple-bit digital information (operation 6600). The process terminates thereafter.

In FIG. 67 an illustration of a flowchart of a process for controlling emission of a set of one or more laser beams is depicted in accordance with an illustrative embodiment. The process in this figure is an example of an implementation for operation 6500 in FIG. 65.

The process controls the emission of the set of one or more laser beams from the laser generation system to control the optical breakdowns that generate the radio frequency noise-band signals in the time slice by varying a width of the different discrete frequency noise-bands for the radio frequency noise-band signals in the time slice, wherein different widths of the frequency noise-bands for the radio frequency noise-band signals in the time slice correspond to different sets of multiple discrete logic bits and thereby modulate the radio frequency noise-band signals to correspond to the multiple-bit digital information (operation 6700). The process terminates thereafter.

Turning now to FIG. 68, an illustration of a flowchart of a process for controlling emission of a set of one or more laser beams is depicted in accordance with an illustrative embodiment. The process in this figure is an example of an implementation for operation 6500 in FIG. 65.

The process controls a set of one or more input parameters for the emission of a set of one or more laser beams from the laser generation system to control the optical breakdowns that generate the radio frequency noise-band signals with different discrete frequency noise-bands in the time slice, wherein the different discrete frequency noise-bands for the radio frequency noise-band signals in the time slice correspond to different sets of multiple discrete logic bits and thereby modulate the radio frequency noise-band signals to correspond to the multiple-bit digital information (operation 6800). The process terminates thereafter.

With reference now to FIG. 69, an illustration of a flowchart of a process for transmitting noise signals using a noise transmitter is depicted in accordance with an illustrative embodiment. The process in this figure is an example of an implementation for operation 6402 in FIG. 64.

The process begins by generating carrier noise-band signals using an electric noise generator (6900). The process modulates or digitally "shift keys" the carrier noise-band signals using a modulator to generate the carrier noise-band signals having different discrete frequency noise-bands in a time slice wherein each discrete frequency-band in the different discrete frequency noise-bands corresponds to a different bit in the multiple-bit digital information, wherein the different frequency ranges of the frequency noise-band for the carrier noise-band signals correspond to different sets of multiple discrete logic bits and thereby modulate or digitally "shift key" the carrier noise-band signals to correspond to the multiple-bit digital information (operation 6902).

The process transmits the carrier noise-band signals simultaneously with the different discrete frequency noise-bands in the time slice (operation 6904). The process terminates thereafter.

Turning next to FIG. 70, an illustration of a flowchart of process for communicating multiple-bit digital information is depicted in accordance with an illustrative embodiment. The process in FIG. 70 can be implemented in hardware, software, or both. When implemented in software, the process can take the form of program instructions that are run by one or more processor units located in one or more hardware devices in one or more computer systems. For example, the process can be implemented in receiver 3617 in FIG. 59.

The process receives noise-band signals in time slices, wherein the multiple-bit digital information is modulated in the noise-band signals (operation 7000). The process demodulates or digitally de-"shift key" the digital information modulated in the noise-band signals in the time slices based on different discrete frequency noise-bands in the noise-band signals in a time slice in the time slices wherein each discrete frequency-band in the different discrete frequency noise-bands corresponds to a different bit in the multiple-bit digital information, wherein the different frequency ranges of the different discrete frequency noise-bands for the noise-band signals correspond to different sets of multiple discrete logic bits and thereby modulate the noise-band signals to correspond to the multiple-bit digital information (operation 7002). The process terminates thereafter. In this example, the changes in the frequency noise-band are changes in a frequency-range of the frequency noise-band of the noise-band signals.

Some features of the illustrative examples for modulating digital information 3607 using digital simultaneous multi-frequency center point noise-band shift keying 3693 in communications system 3602 are described in the following clauses. These clauses are examples of features and are not intended to limit other illustrative examples.

A communications system comprising:

a computer system; and a communications manager in the computer system, wherein the communications manager is configured to:

identify multiple-bit digital information for transmission; and transmit noise-band signals having different discrete frequency noise-bands in a time slice wherein each discrete frequency-band in the different discrete frequency noise-bands corresponds to a different bit in the multiple-bit digital information, whereby a simultaneous transmission of different discrete frequency noise-bands in the time slice thereby modulates the noise-band signals to correspond to the multiple-bit digital information.

2. The communications system of clause 1, wherein the noise-band signals are radio frequency noise-band signals and further comprising:

a laser generation system configured to emit a set of one or more laser beams, wherein in transmitting the noise-band signals, the communications manager is configured to:

control an emission of a set of one or more laser beams from the laser generation system to control optical breakdowns that generate the radio frequency noise-band signals having different discrete frequency noise-bands in the time slice, wherein each frequency noise-band in the different discrete frequency noise-bands corresponds to the different bit in the multiple-bit digital information, whereby the simultaneous transmission of the different discrete frequency noise-bands in the time slice thereby modulates the radio frequency noise-band signals to correspond to multiple discrete logic bits in the multiple-bit digital information.

3. The communications system of clause 2, wherein in controlling the emission of the set of one or more laser beams, the communications manager is configured to:

control the emission of the set of one or more laser beams from the laser generation system to control the optical breakdowns within the time slice that generate the radio frequency noise-band signals with different discrete changes of a center point of the different discrete frequency noise-bands for the radio frequency noise-band signals, wherein the different discrete changes of the center point of the different discrete frequency noise-bands for the radio frequency noise-band signals in the time slice correspond to the multiple discrete logic bits in the multiple-bit digital information.

4. The communications system of clause 2, wherein in controlling the emission of the set of one or more laser beams, the communications manager is configured to:

control the emission of the set of one or more laser beams from the laser generation system to control the optical breakdowns that generate the radio frequency noise-band signals in the time slice by varying a width of the different discrete frequency noise-bands for the radio frequency noise-band signals in the time slice, wherein different widths of the different discrete frequency noise-bands for the radio frequency noise-band signals in the time slice correspond to multiple discrete logic bits and thereby modulate the radio frequency noise-band signals to correspond to the multiple-bit digital information.

5. The communications system of clause 2, wherein in controlling the emission of the set of one or more laser beams, the communications manager is configured to:

control a set of one or more input parameters for the emission of a set of one or more of laser beams from the laser generation system to control the optical breakdowns that generate the radio frequency noise-band signals with different discrete changes of the different discrete frequency noise-bands in the time slice, wherein the different discrete frequency noise-bands for the radio frequency noise-band signals in the time slice correspond to different sets of multiple discrete logic bits and thereby modulate the radio frequency noise-band signals to correspond to the multiple-bit digital information.

6. The communications system of clause 1 further comprising:

an electric noise generator configured to generate a carrier noise-band signal; and a modulator; and a transmitter, wherein in transmitting the noise-band signals, the communications manager is configured to:

generate the carrier noise-band signals using the electric noise generator;

modulate the carrier noise-band signals using the modulator to generate the carrier noise-band signals having different discrete frequency noise-bands in a time slice wherein each discrete frequency noise-band in the different discrete frequency noise-bands corresponds to a different bit in the multiple-bit digital information, wherein different frequency ranges of the different discrete frequency noise-bands for the carrier noise-band signals correspond to different sets of multiple discrete logic bits and thereby modulate the carrier noise-band signals to correspond to the multiple-bit digital information; and transmit the carrier noise-band signals simultaneously with the different discrete frequency noise-bands in the time slice.

7. The communications system of clause 6, wherein the carrier noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise-band signals, underwater frequency noise signals, or optical frequency noise signals.

8. The communications system of clause 1, wherein the different discrete frequency noise-bands have changes to at least one of a width or a position of the different discrete frequency noise-bands of the noise-band signals that thereby modulates the noise-band signals to correspond to the multiple-bit digital information.

9. A method for communicating multiple-bit digital information, the method comprising:

identifying the multiple-bit digital information for transmission; and transmitting at different discrete frequency noise-bands in a time slice wherein each frequency-band corresponds to a different bit in the multiple-bit digital information, whereby a simultaneous transmission of different discrete frequency noise-bands in the time slice thereby modulates the noise-band signals to correspond to the multiple-bit digital information.

10. The method of clause 9, wherein the noise-band signals are radio frequency noise-band signals and further comprising:

controlling emission of a set of one or more laser beams from a laser generation system to control optical breakdowns that generate noise-band signals having different discrete frequency noise-bands in the time slice, wherein each frequency-band corresponds to the different bit in the multiple-bit digital information, whereby the simultaneous transmission of different discrete frequency noise-bands in the time slice thereby modulate the radio frequency noise-band signals to correspond to multiple discrete logic bits in the multiple-bit digital information.

11. The method of clause 10, wherein said controlling the emission of the set of one or more laser beams comprises:

controlling the emission of the set of one or more laser beams from the laser generation system to control the optical breakdowns within the time slice that generate the radio frequency noise-band signals with different discrete changes of center point of the frequency noise-bands for the radio frequency noise-band signals, wherein the different discrete changes of the center point of the different discrete frequency noise-bands for the radio frequency noise-band signals in the time slice correspond to the multiple discrete logic bits in the multiple-bit digital information.

12. The method of clause 10, wherein said controlling the emission of the set of one or more laser beams comprises:

controlling the emission of the set of one or more laser beams from the laser generation system to control the optical breakdowns that generate the radio frequency noise-band signals in the time slice by varying a width the different discrete frequency noise-bands for the radio frequency noise-band signals in the time slice, wherein different widths of the frequency noise-bands for the radio frequency noise-band signals in the time slice correspond to different sets of multiple discrete logic bits and thereby modulate the radio frequency noise-band signals to correspond to the multiple-bit digital information.

13. The method of clause 10, wherein said controlling the emission of the set of one or more laser beams comprises:

controlling a set of one or more input parameters for the emission of a set of one or more of laser beams from the laser generation system to control the optical breakdowns that generate the radio frequency noise-band signals with different discrete frequency noise-bands in the time slice, wherein the different discrete frequency noise-bands for the radio frequency noise-band signals in the time slice correspond to different sets of multiple discrete logic bits and thereby modulate the radio frequency noise-band signals to correspond to the multiple-bit digital information.

14. The method of clause 9, wherein said transmitting the noise-band signals comprises:

generating carrier noise-band signals using an electric noise generator;

modulating the carrier noise-band signals using a modulator to generate the carrier noise-band signals having different discrete frequency noise-bands in a time slice wherein each discrete frequency-band in the different discrete frequency noise-bands corresponds to a different bit in the multiple-bit digital information, wherein different frequency ranges of the frequency noise-band for the carrier noise-band signals correspond to different sets of multiple discrete logic bits and thereby modulate the carrier noise-band signals to correspond to the multiple-bit digital information; and transmitting the carrier noise-band signals simultaneously with the different discrete frequency noise-bands in the time slice.

15. The method of clause 9, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals.

16. The method of clause 9, wherein the different discrete frequency noise-bands have changes to at least one of a width or a position of the different discrete frequency noise-bands of the noise-band signals that thereby modulates the noise-band signals to correspond to the multiple-bit digital information.

17. A method for communicating multiple-bit digital information, the method comprising:

receiving noise-band signals in time slices, wherein the multiple-bit digital information is modulated in the noise-band signals; and demodulating the digital information modulated in the noise-band signals in the time slices based on different discrete frequency noise-bands in the noise-band signals in a time slice in the time slices wherein each discrete frequency-band in the different discrete frequency noise-bands corresponds to a different bit in the multiple-bit digital information, wherein different frequency ranges of the different discrete frequency noise-bands for the noise-band signals correspond to different sets of multiple discrete logic bits and thereby modulate the noise-band signals to correspond to the multiple-bit digital information.

18. The method of clause 17, wherein the different discrete frequency noise-bands have changes in a frequency range of the different discrete frequency noise-bands of the noise-band signals.

Figure 71:
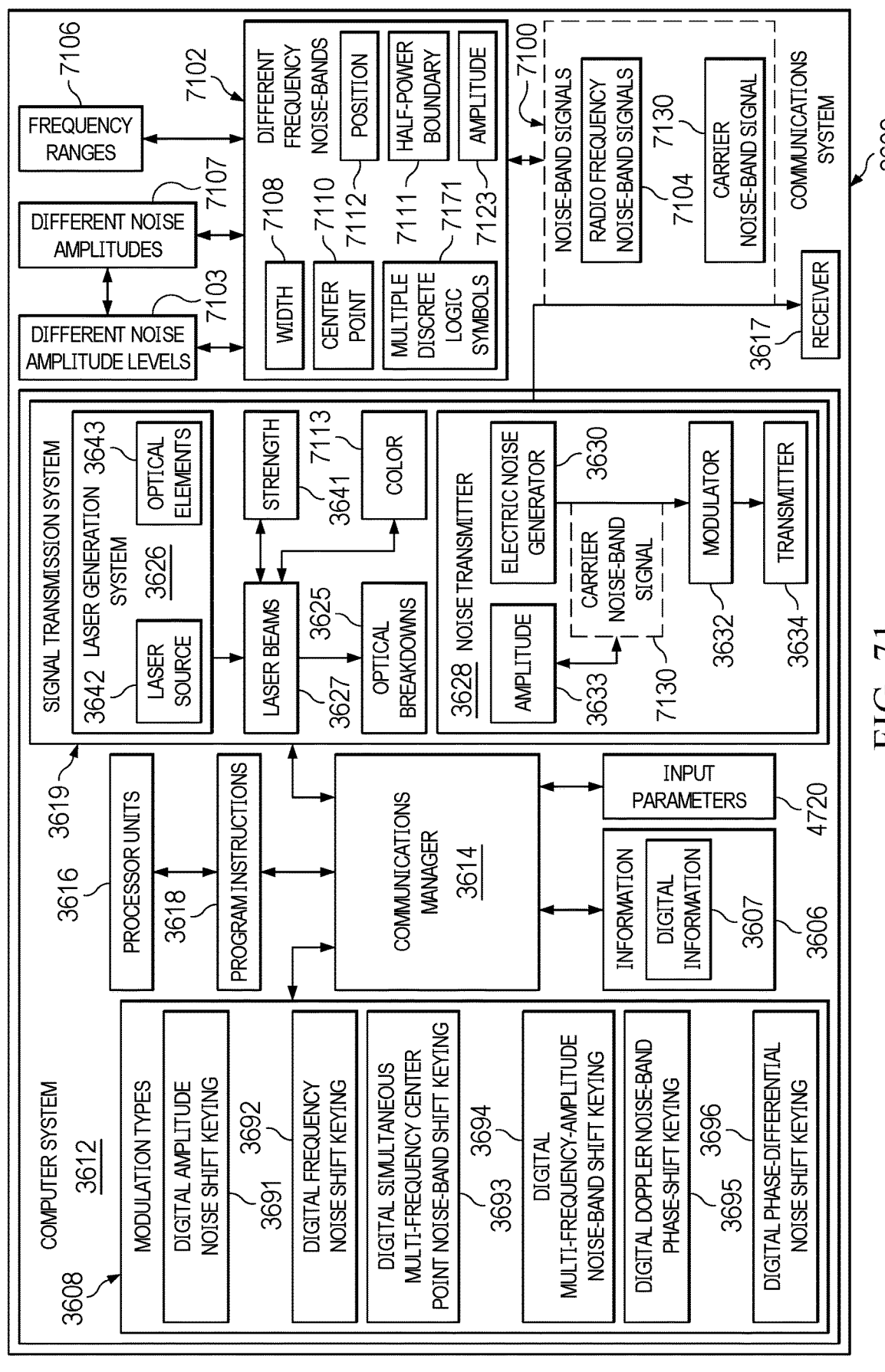
FIG. 71 is an illustration of a block diagram of a communication system for transmitting noise signals using digital frequency noise modulation in accordance with an illustrative embodiment.

Turning now to FIG. 71, an illustration of a block diagram of a communication system for transmitting noise signals using Digital Multi-Frequency-Amplitude Noise-Band Shift Keying (DMFANBSK) 3694 is depicted in accordance with an illustrative embodiment. In this illustrative example, communications system 3602 operates to modulate or "shift-key" noise-band signals 7100 to correspond to information 3606 using digital multi-frequency-amplitude noise-band shift keying 3694. Noise-band signals 7100 can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, optical frequency noise signals including at least one of visible or non-visible light, or other types of noise signals.

In this example, communications manager 3614 identifies digital information 3607 for transmission. Additionally, communications manager 3614 transmits noise-band signals 7100 with different discrete changes of different frequency noise-bands 7102 and different noise amplitude levels 7103 of different frequency noise-bands 7102 that thereby modulate noise-band signals 7100 to correspond to the digital information 3607.

Different discrete changes to at least one of different frequency noise-bands 7102 or to different noise amplitude levels 7103 means that the changes to at least one of frequencies or amplitudes of different frequency noise-bands 7102 have a shift that is considered to be instantaneous without gradual or continuous variation used with digital signals. For example, a change in bandwidth or width 7108, frequency location or position 7112, amplitude 7123 of different frequency noise-bands 7102 changes the noise-band characteristics from one noise-band to another noise-band in different frequency noise-bands 7102 with a sufficiently clear shift in these parameters such that electrical devices such as a receiver receiving noise-band signals with frequency noise-band having a discrete change can determine the point where the change occurs for use in identifying digital information.

In these examples, a discrete change means a change that is a distinct and detectable variation or difference in the noise-band signal which corresponds to discrete digital information, as opposed to a gradual change which typically corresponds to analog information. For example, a discrete change in the frequency of a noise-band means that a receiver can determine or detect that a distinct variation or difference in the noise-band signal frequency has occurred which corresponds to discrete digital information. In another example, a discrete change in the amplitude of a noise-band means that a receiver can determine or detect that a distinct variation or difference in the noise-band signal amplitude has occurred which corresponds to discrete digital information. In another example, a discrete change in the center-point of a noise-band means that a receiver can determine or detect that a distinct variation or difference in the center point of the noise-band signal has occurred which corresponds to discrete digital information. In another example, a discrete change in the bandwidth or width of a noise-band means that a receiver can determine or detect that a distinct variation or difference in the bandwidth or width of the noise-band signal has occurred which corresponds to discrete digital information. In another example, a discrete change in the slope, boundary, or half-power point of a noise-band means that a receiver can determine or detect that a distinct variation or difference in the slope, boundary, or half-power point of the noise-band signal has occurred which corresponds to discrete digital information.

In other words, different discrete changes to frequency ranges 7106 of different frequency noise-bands 7102 means that frequency ranges 7106 is changed for one or more of different frequency noise-bands 7102. These changes are made to have different frequency noise-bands 7102 correspond to digital information 3607. These different discrete changes made to frequency ranges 7106 of noise-band signals 7100 cause the different discrete changes to frequency ranges 7106 of different frequency noise-bands 7102 to correspond to or correlate to, either directly or indirectly, the same or similar pattern as digital information 3607.

The control of the different discrete changes to frequency ranges 7106 of different frequency noise-bands 7102 do not necessarily correlate exactly to the varying digital information 3607. In alternative examples, the control of the different discrete changes to frequency ranges 7106 of different frequency noise-bands 7102 may be modified in such a way that the final output noise-modulated signal most closely corresponds to digital information 3607 such that it may be received with minimum distortion by a receiver 3617 in FIG. 71.

In this example, different frequency noise-bands 7102 are groupings of noise-band signals 7100. For example, different frequency noise-bands 7102 can be at least one of "clusters of noise," "noise spectra," noise spectrum," "a frequency band of noise," "a pass-band of noise," "a band-pass of noise," "a frequency range of noise," or a "noise frequency range" which can have a lower half-power boundary and an upper half-power boundary. Different frequency noise-bands 7102 for noise-band signals 7100 can be changed in a manner that corresponds to digital information 3607. For example, noise-band signals 7100 can be modulated such that different frequency noise-bands 7102 change in at least one of width 7108 (bandwidth or frequency bandwidth), position 7112, center point 7110, or half-power boundary 7111.

For example, width 7108 of different frequency noise-bands 7102 can be changed by using different discrete changes to frequency ranges 7106 of different frequency noise-bands 7102. In this example, a change in a frequency noise-band in different frequency noise-bands 7102 means that the boundaries of frequencies encompassed by the different frequency noise-bands can change such that width of that frequency noise-band changes in size.

In this example, different frequency noise-bands 7102 can have different starting, initial, and/or lower frequency boundary changes and different ending, finishing, and/or upper frequency boundary changes. In this manner, noise-band signals 7100 can be modulated to have different discrete changes of different frequency noise-bands 7102 of noise-band signals 7100 in a manner that causes noise signals 7100 to correspond to or correlate to, either directly or indirectly, digital information 3607. In a similar fashion, changes to amplitude 7123 of different frequency noise-bands 7102 can result in different noise amplitude levels 7103 that also correlate directly or indirectly to digital information 3607.

In these examples, the different discrete changes of the different frequency noise-bands 7102 and the different noise amplitude levels 7103 of different frequency noise-bands 7102 correspond to multiple discrete logic symbols in digital information 3607. For example, the different discrete changes can be at least one of position 7112, width 7108, amplitude of the different frequency noise-bands 7102, or half-power boundary 7111.

In one illustrative example, the use of two different frequency noise-bands and two different amplitudes of the different frequency noise-bands can be used to represent multiple discrete logic symbols such as "00," "01," "10," and "11." In this example, different frequency noise-bands 7102 can have multiple frequency and multiple amplitude combinations to represent the multiple discrete logic symbols.

In one illustrative example, this transmission can be performed by laser generation system 3626. With this example, communications manager 3614 controls an emission of a set of one or more laser beams 3627 from laser generation system 3626 to at least one of causing or controlling optical breakdowns 3625 that generate noise-band signals 7100 in the form of radio frequency noise-band signals 7104 with the different discrete changes of different frequency noise-bands 7102 and different noise amplitude levels 7103 of different frequency noise-bands 7102 that thereby modulate the radio frequency noise-band signals 7104 to correspond to digital information 3607.

In this example, at least one of width 7108, position 7112, or center point 7110, of different frequency noise-bands 7102 can be varied to have different discrete changes to cause radio frequency noise-band signals 7104 to correspond to digital information 3607. Position 7112 for each of different frequency noise-bands 7102 can be identified using center point 7110 of each of different frequency noise-bands 7102. The change of a beginning, initial, and/or lower frequency boundary and/or the change of an ending, finishing, and/or upper frequency boundary in different frequency noise-bands 7102 cans result in different discrete changes for at least one of width 7108 or position 7112 of different frequency noise-bands 7102. Thus, in this example, the different discrete changes are present between the ranges of frequencies of different frequency noise-bands 7102 for noise-band signals 7100 that thereby modulate noise-band signals 7100 to correspond to digital information 3607.

Further in this example, different noise amplitude levels 7103 can be changed for different frequency noise-bands 7102 in combination with changing frequency ranges 7106 for different frequency noise-bands 7102 to thereby modulate noise-band signals 7100 to correspond to digital information 3607.

In one illustrative example, communications manager 3614 controls the emission of the set of one or more laser beams 3627 by controlling the emission of the set of one or more laser beams 3627 from laser generation system 3626 to at least one of cause or control optical breakdowns 3625 that generate radio frequency noise-band signals 7104 by varying the frequency location of center point 7110 of different frequency noise-bands 7102 for radio frequency noise-band signals 7104 and varying different noise amplitude levels 7103 of different frequency noise-bands 7102 for radio frequency noise-band signals 7104 that thereby modulates or digitally "shift keys" radio frequency noise-band signals 7104 to correspond to digital information 3607.

The particular frequency location of center point 7110 and amplitude 7123 for a frequency noise-band can correlate to a logic symbol in multiple discrete logic symbols 7171 for that frequency noise-band. At least one of the frequency locations of center point 7110 or the amplitude 7123 can be different for a particular frequency noise-band relative to other center points and other amplitudes for other frequency noise-bands.

These differences in the positions of the center points and amplitudes for the different frequency bands correlate to different discrete logic symbols in multiple discrete logic symbols 7171. In this example, a variation of the frequency location of center point 7110 of different frequency noise-bands 7102 and different noise amplitude levels 7103 for radio frequency noise-band signals 7104 thereby modulates or digitally "shift keys" radio frequency noise-band signals 7104 to correspond to digital information 3607.

In another illustrative example, communications manager 3614 can control the emission of the set of one or more laser beams 3627 from laser generation system 3626 to at least one of cause or control optical breakdowns 3625 that generate radio frequency noise-band signals 7104 by varying width 7108 of different frequency noise-bands 7102 for radio frequency noise-band signals 7104 and varying different noise amplitude levels 7103 of the different frequency noise-bands 7102 for radio frequency noise-band signals 7104 that thereby modulates or digitally "shift keys" the radio frequency noise-band signals 7104 to correspond to digital information 3607.

In other words, the width 7108 of radio frequency noise-band signals 7104 in different frequency noise-bands 7102 can be increased and decreased to modulate radio frequency noise-band signals 7104 to correspond to digital information 3607. In these examples, the change in width 7108 can occur by changing the starting, initial, and/or lower frequency boundaries and/or the ending, finishing, and/or upper frequency boundaries in a frequency noise-band.

In another example, communications manager 3614 controls a set of one or more input parameters 4720 for the emission of a set of one or more of laser beams 3627 from the laser generation system 3626 to at least one of cause or control optical breakdowns 3625 that generate radio frequency noise-band signals 7104 with the different discrete changes of different frequency noise-bands 7102 and different noise amplitude levels 7103 of the different noise amplitudes 7107 of different frequency noise-bands 7102 that thereby modulates or digitally "shift keys" radio frequency noise-band signals 7104 to correspond to or correlate with, directly or indirectly, digital information 3607.

With this example, the set of one or more input parameters 4720 can take a number of different forms. For example, the set of one or more input parameters 4720 can, for example, be selected from one or more of, a mirror orientation, a deformable mirror position, a lens position, a lens, a deformable lens position or some other element that can be positioned in a manner that changes an optical path length (OPL) for the set of one or more laser beams 3627. In this example, the path length change can be both the optical path length and/or the physical path length. Another input parameter that can be changed in this example is the index of refraction (IoR). The optical path length is inversely proportional to the index of refraction.

These changes to input parameters 4720 can change different frequency noise-bands 7102 of radio frequency noise-band signals 7104. For example, changes can be made to at least one of width 7108 (bandwidth or frequency bandwidth), position 7112, amplitude 7123, center point 7110, and half-power boundary 7111 of different frequency noise-bands 7102 for radio frequency noise-band signals 7104. In other words, different noise-bands can have different changes in at least one of position 7112, width 7108, amplitude 7123, center point 7110, and half-power boundary 7111.

In controlling the emission of the set of one or more laser beams 3627, communications manager 3614 can control color 7113 of the set of one or more laser beams emitted from laser generation system 3626 to control optical breakdowns 3625 that generate radio frequency noise-band signals 7104 by varying width 7108 of different frequency noise-bands 7102 for radio frequency noise-band signals 7104 and varying noise amplitude levels of different frequency noise-bands 7102 for radio frequency noise-band signals 7104 that thereby modulates or digitally "shift keys" radio frequency noise-band signals 7104 to correspond to the digital information 3607.

In another example, communications manager 3614 can control noise transmitter 3628 in signal transmission system 3619 to transmit digital information 3607. For example, in generating noise-band signals 7100, communications manager 3614 can generate carrier noise-band signal 7130 using electric noise generator 3630. Communications manager 3614 can modulate carrier noise-band signal 7130 using modulator 3632 to change different frequency noise-bands 7102 of carrier noise-band signal 7130.

In this example, different discrete changes can be made to different frequency noise-bands 7102. These different discrete changes to frequency ranges 7106 and different noise amplitudes 7107 of different frequency noise-bands 7102 for carrier noise-band signal 7130 thereby modulate carrier noise-band signal 7130 to correspond to digital information 3607.

In this example, communications manager 3614 transmits carrier noise-band signal 7130 with different discrete changes to frequency ranges 7106 of different frequency noise-bands 7102. In this example, these changes cause carrier noise-band signal 7130 to correspond to or correlate with, directly or indirectly, digital information 3607. This type of modulation of carrier noise-band signal 7130 can cause the different discrete changes that can be at least one of width 7108 or position 7112 of different frequency noise-bands 7102 for carrier noise-band signal 7130.

Figure 72:
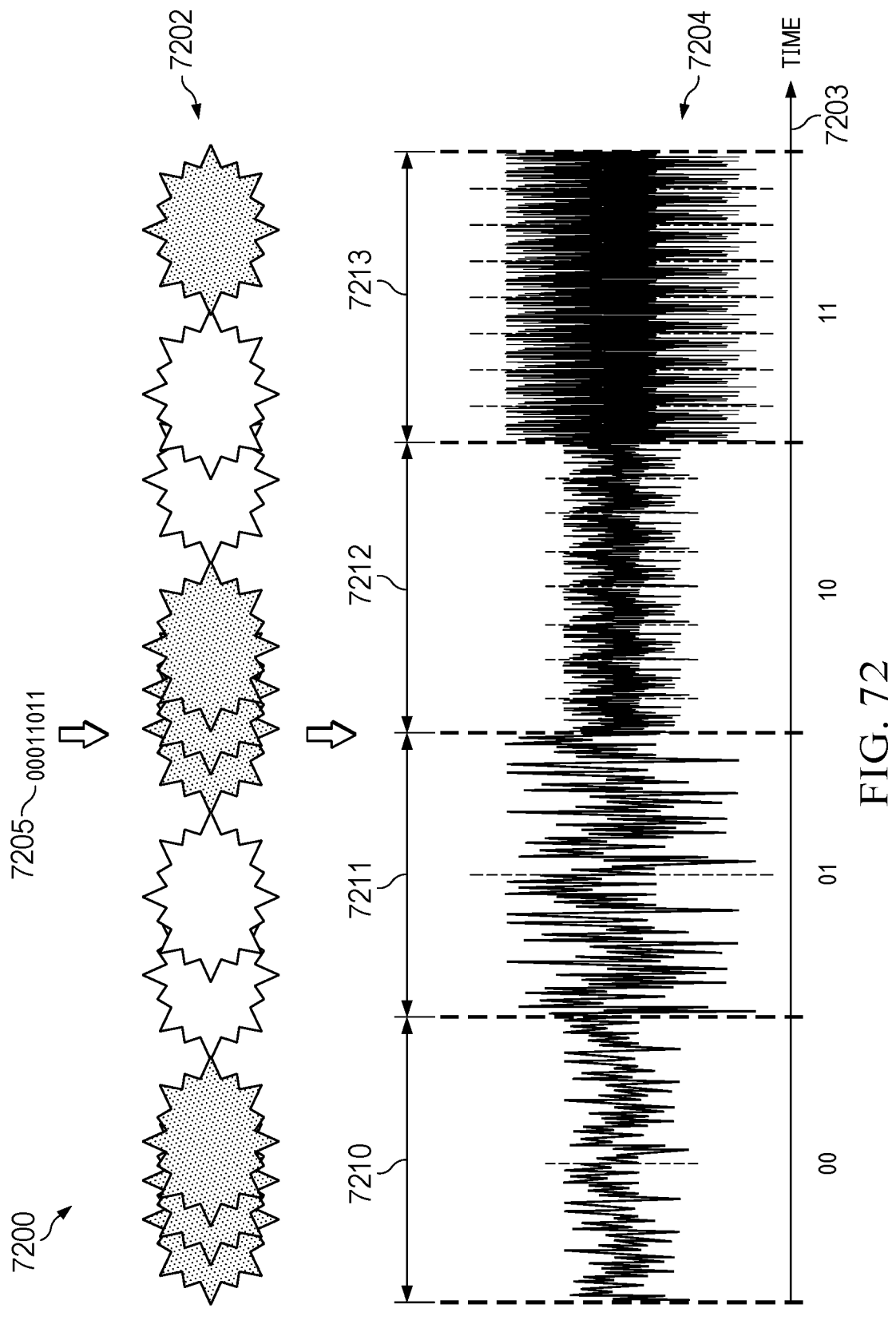
FIG. 72 is an illustration of an illustration of information flow for transmitting digital information with digital frequency noise modulation using a laser generation system in accordance with an illustrative embodiment.

Turning next to FIG. 72, an illustration of information flow 7200 for transmitting digital information with Digital Multi-Frequency-Amplitude Noise-Band Shift Keying (DMFANBSK) noise modulation using a laser generation system is depicted in accordance with an illustrative embodiment. In this example, information flow 7200 can be implemented using laser generation system 3626 in signal transmission system 3619 for communications system 3602 in FIG. 71. In this example, in FIG. 72, optical breakdowns 7202 are generated using digital information 7205. In this example, optical breakdowns 7202 are at least one of controlled or caused to generate radio frequency noise-band signals 7104 in FIG. 71 using digital information.

In this example, in FIG. 72, radio frequency noise-band signals 7204 resulting from optical breakdowns 7202 have different frequency noise-bands with different noise amplitude levels shown in the time-domain as shown by x-axis 7203. In this example, two different frequencies and two different amplitudes are generated in radio frequency noise-band signals 7204.

As depicted in this example, frequency noise-band 7210 has lower frequency characteristics and a lower noise amplitude level that corresponds to "00," frequency noise-band 7211 has lower frequency characteristics and a higher noise amplitude level that corresponds to "01," frequency noise-band 7212 has higher frequency characteristics and a lower noise amplitude level that corresponds to "10," frequency noise-band 7213 has higher frequency characteristics and a higher noise amplitude level that corresponds to "11." Thus, a logic symbol of two bits (four digits) can be transmitted with two different frequencies and two different amplitude levels. Clearly, multiple different frequencies and multiple different amplitudes can be used to transmit many more simultaneous bits and symbols.

Figure 73:
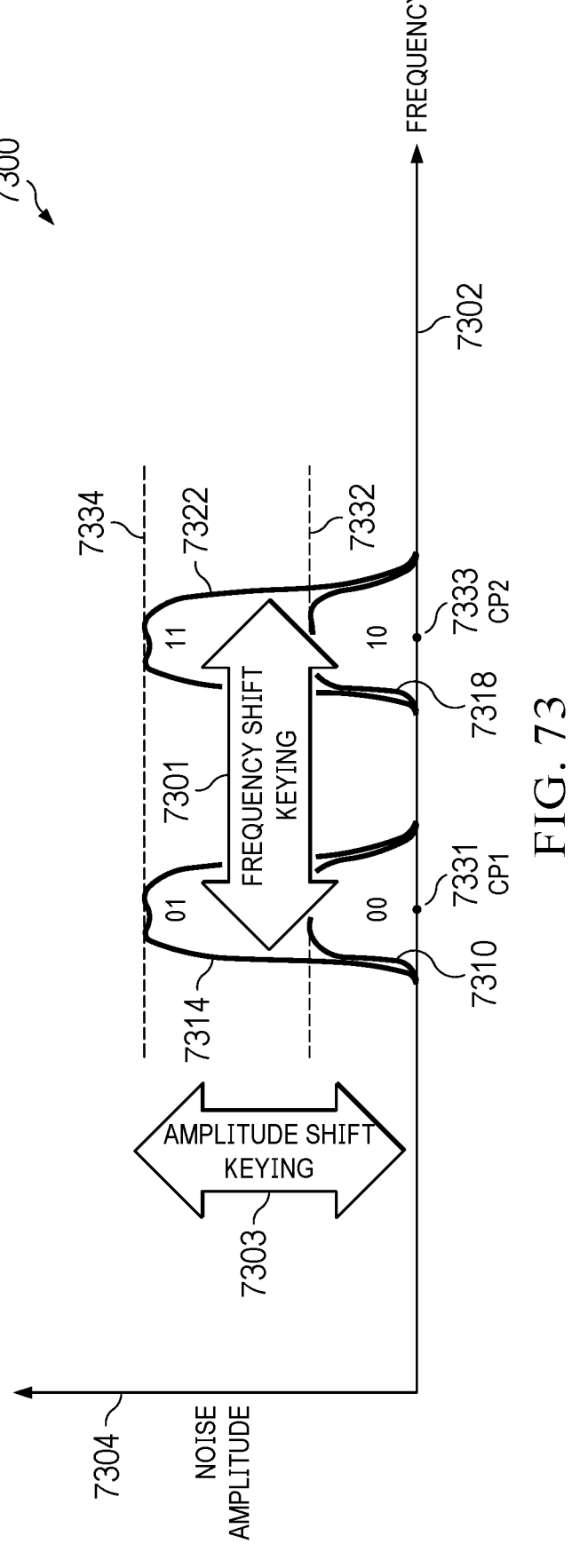
FIG. 73 is an illustration of frequency noise modulation of radio frequency signals through changing a frequency location of the center point and an amplitude of different discrete frequency noise-bands in radio frequency noise-band signals in accordance with an illustrative embodiment.

Turning next to FIG. 73, an illustration of Digital Multi-Frequency-Amplitude Noise-Band Shift Keying of radio frequency signals through changing a frequency location of the center point and an amplitude of different discrete frequency noise-bands in radio frequency noise-band signals is depicted in accordance with an illustrative embodiment. In this illustrative example, in graph 7300, x-axis 7302 denotes frequency and y-axis 7304 denotes noise amplitude, noise power, and/or noise power density.

In this example, two frequencies and two amplitude levels are used to modulate or digitally "shift key" different frequency and amplitude noise-bands with frequency noise-band signals to modulate or digitally "shift key" the frequency noise-band signals to correspond to digital information. In this example, frequency shift keying 7301 and amplitude shift keying 7303 are used to modulate or "shift key" these different frequency noise-bands for the noise-band signals.

As depicted in the example, first frequency noise-band 7310 has first center point CP1 7331 and first amplitude 7332 and second frequency noise-band 7314 has first center point CP1 7331 and second amplitude 7334. In this example, third frequency noise-band 7318 has second center point CP1 7333 and first amplitude 7332 and fourth frequency noise-band 7322 has second center point CP2 7333 and second amplitude 7334. The discrete changes between different center points and amplitudes represent different discrete logic symbols with different bit patterns. For example, first frequency noise-band 7310 represents "00," second frequency noise-band 7314 represents "01," third frequency noise-band 7318 represents "10," and fourth frequency noise-band 7322 represents "11."

Figure 74:
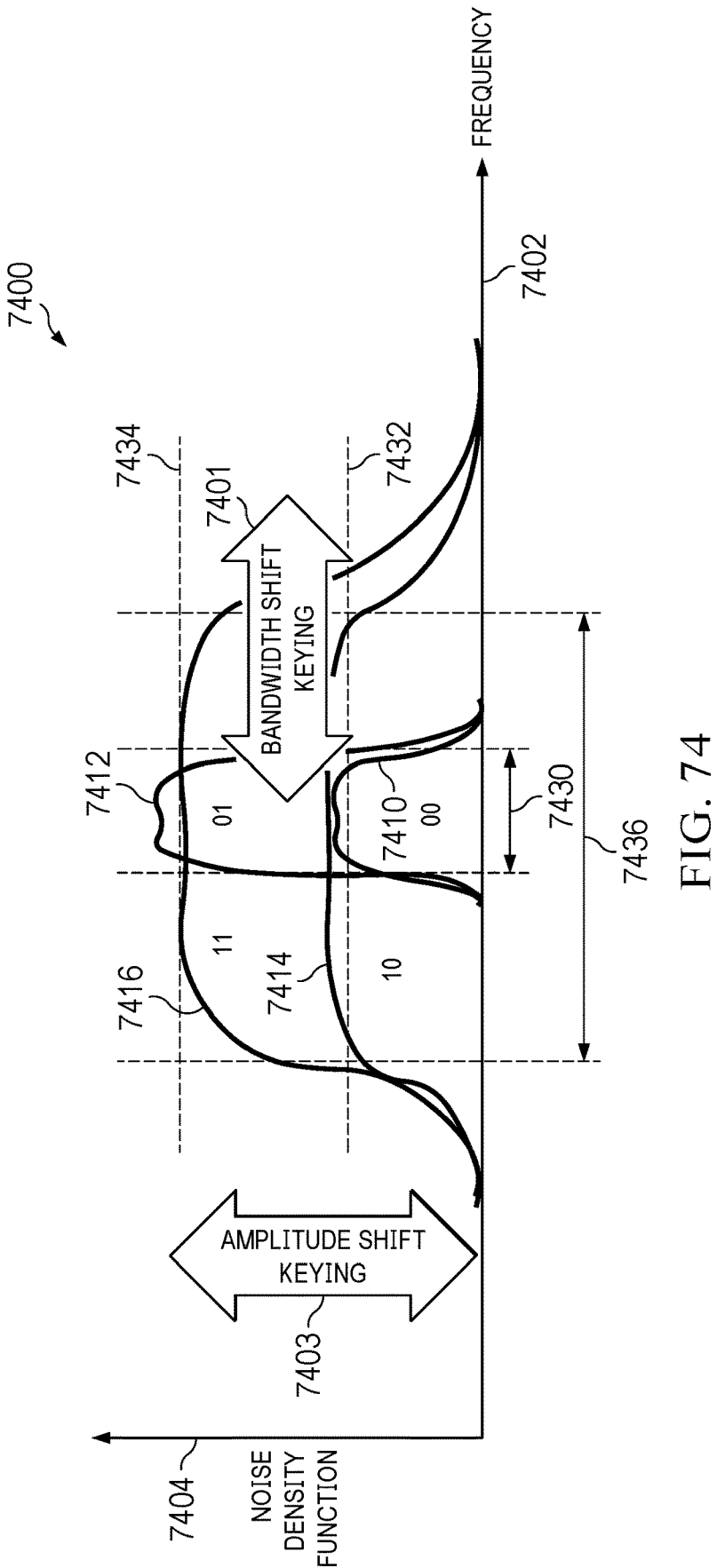
FIG. 74 is an illustration of frequency modulation of radio frequency signals through changing a width or bandwidth and an amplitude of different discrete noise-bands in noise-band signals transmitted in a timeslot in accordance with an illustrative embodiment.

In FIG. 74, an illustration of Digital Multi-Frequency-Amplitude Noise-Band Shift Keying of radio frequency signals through changing a width or bandwidth and an amplitude of different discrete noise-bands in noise-band signals transmitted in a timeslot is depicted in accordance with an illustrative embodiment. In this illustrative example, in graph 7400, x-axis 7402 denotes frequency and y-axis 7404 denotes noise, noise amplitude, noise power, and/or noise density function.

In this example, the width and the amplitude of different frequency noise-bands of noise-band signals are modulated or "shift keyed" to generate noise-band signals that correspond to digital information. This example, bandwidth shift keying 7401 is used modulate or digitally "shift key" the bandwidth of the different frequency noise-bands and amplitude shift keying 7403 is used to modulate the amplitude of the different frequency noise-bands.

As depicted, first frequency noise-band 7410 has first width 7430 and first amplitude 7432, and second frequency noise-band 7412 has first width 7430 and second amplitude 7434. Further, in this example, third frequency noise-band 7414 has second width 7436 and first amplitude 7432, and fourth frequency noise-band 7416 has second width 7436 and second amplitude 7434.

These discrete changes to the width and amplitude of the frequency noise-bands are used modulate or digitally "shift key" the noise-band signals to correlate to digital information. In this example, first frequency noise-band 7410 represents "00," second frequency noise-band 7412 represents "01," third frequency noise-band 7414 represents "10," and fourth frequency noise-band 7416 represents "11". In other examples, more than two frequencies and more than two amplitudes are used to simultaneously "shift key" many more bits in a single time slice.

Figure 75:
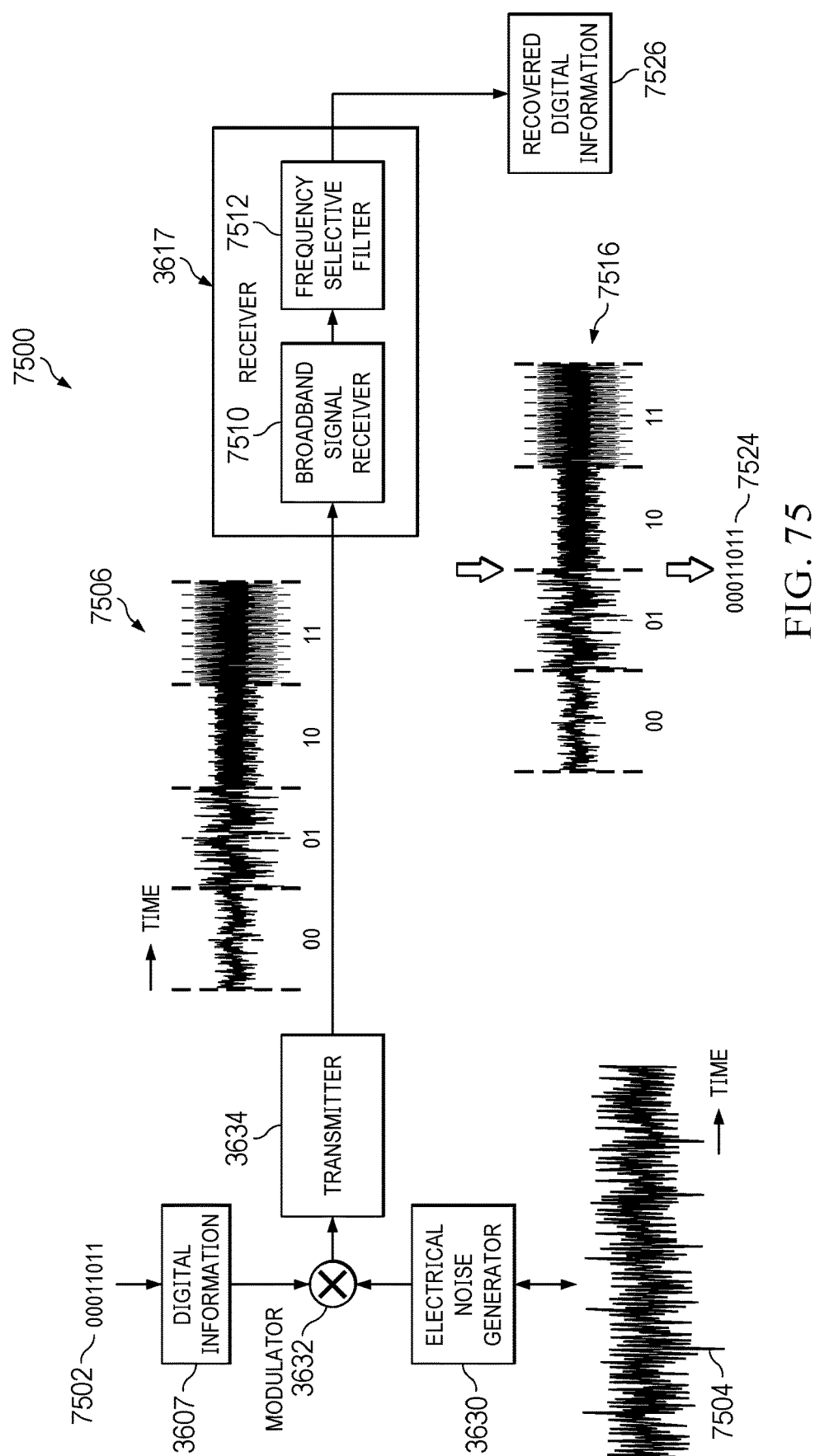
FIG. 75 is an illustration of information flow for transmitting digital information with digital multi-frequency-amplitude/band shift keying a noise transmitter in accordance with an illustrative embodiment.

Turning next to FIG. 75, an illustration of information flow for transmitting digital information with digital multi-frequency-amplitude noise-band shift keying using a noise transmitter is depicted in accordance with an illustrative embodiment. In this example, information flow 7500 can be implemented using noise transmitter 3628 in signal transmission system 3619 for communications system 3602 in FIG. 71.

As depicted in FIG. 75 in this example, digital information 7502 is an example of digital information 3607 in FIG. 71 that is to be transmitted using digital multi-frequency-amplitude noise-band shift keying 3694. As depicted, digital information 7502 comprises multiple discrete logic symbols in the form of bits having a bit pattern as follows "00011011."

In this example, electric noise generator 3630 generates carrier noise-band signal 7504. In this example, modulator 3632 can be implemented using a bandpass or bandwidth filter and an amplitude modulator that modulates or digitally "shift keys" different frequency noise-bands in carrier noise-band signals 7504 to correspond to digital information 3607. This modulation causes carrier noise-band signals 7504 to have different discrete frequency noise-bands at different discrete amplitude levels in a timeslot.

As a result, modulated carrier noise-band signal 7506 with different discrete frequency noise-bands at different discrete amplitude levels are transmitted by transmitter 3634. As depicted, modulated carrier noise-band signal 7506 is comprised of frequency noise-bands and is not a sinusoidal wave form. The different discrete changes thereby modulate or "shift key" carrier noise-band signal 7506 to correlate to digital information 7502.

As depicted, receiver 3617 includes broadband signal receiver 7510 and frequency selective filter 7512. Broadband signal receiver 7510 is at least one of a hardware device or software device that is configured to receive and process signals across a wide range of frequencies. In this example, broadband signal receiver 7510 receives modulated or "shift keyed" carrier noise-band signal 7506.

This reception of modulated or "shift keyed" carrier noise-band signal 7506 by broadband signal receiver 7510 results in received signal 7516. As depicted in this example, received signal 7516 is the same or substantially the same as modulated carrier noise-band signal 7506.

In this example, frequency selective filter 7512 can detect frequency and amplitude changes in the frequency noise-band for received signal 7516 to recover multiple discrete logic bits from received signal 7516.

For example, frequency selective filter 7512 can be implemented using a frequency comb filter. A frequency comb filter can be comprised of bandpass filters, amplitude detectors, and a frequency response analyzer. In this illustrative example, the bandpass filters pass selected ranges of frequencies. Each bandpass filter is configured to pass frequencies of a particular range. The amplitude detectors have inputs connected to the output of bandpass filters. The amplitude detectors generate output signals in response to detecting signal amplitudes greater than a threshold or within certain thresholds. In this illustrative example, an amplitude detector is connected to each of the bandpass filters. As a result, amplitude detectors can indicate when different ranges of frequencies are detected from input of received signal 7516 and what the amplitude levels or values are of noise in those different frequency ranges. In this example, each bandpass filter can be connected to multiple amplitude detectors such that the different noise-band amplitude levels can be detected for each center point or width for the different frequency noise-bands.

Thus, frequency selective filter 7512 can detect discrete amplitudes of discrete frequency noise-bands of received signal 7516 to generate multiple discrete logic bits 7524. In this example, multiple discrete logic bits 7524 output by frequency selective filter 7512 forms recovered digital information 7526. As depicted in this example, multiple discrete logic bits 7524 for recovered digital information 7526 are the same bits that were transmitted as digital information 7502.

Turning now to FIG. 76, an illustration of a flowchart for communicating digital information is depicted in accordance with an illustrative embodiment. The process in FIG. 76 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 71.

The process begins by identifying digital information for transmission (operation 7600). The process transmits noise-band signals with different discrete changes of different frequency noise-bands and different noise amplitude levels of the different frequency noise-bands that thereby modulate or digitally "shift key" the noise-band signals to correspond to the digital information (operation 7602). The process terminates thereafter.

In this example, discrete changes in the frequency noise-band for the noise-band signals are made to at least one of a width or a position of the frequency noise-band. Discrete changes can be made to an amplitude of the frequency noise-band for the noise-band signals.

With reference next to FIG. 77, an illustration of a flowchart of a process for transmitting noise signals using a laser generation system is depicted in accordance with an illustrative embodiment. The process in this figure is an example of an implementation for operation 7602 in FIG. 76. In this example, the noise signals are radio frequency noise signals.

The process controls an emission of a set of one or more laser beams from the laser generation system to control optical breakdowns that generate the radio frequency noise-band signals with the different discrete changes of the different frequency noise-bands and the different noise amplitude levels of the different frequency noise-bands that thereby modulate or digitally "shift key" the radio frequency noise-band signals to correspond to the digital information (operation 7700). The process terminates thereafter.

Next in FIG. 77A, an illustration of a flowchart of a process for controlling emission of a set of one or more laser beams is depicted in accordance with an illustrative embodiment. The process in this figure is an example of an implementation for operation 7700 in FIG. 77.

The process controls the emission of the set of one or more laser beams from the laser generation system to control the optical breakdowns that generate the radio frequency noise-band signals by varying one or more frequency locations of one or more center points of the different frequency noise-band for the radio frequency noise-band signals and varying the different noise amplitude levels of the different frequency noise-bands of the radio frequency noise-band signals that thereby modulate or digitally "shift key" the radio frequency noise-band signals to correspond to the digital information (operation 77A00). The process terminates thereafter.

In FIG. 78, an illustration of a flowchart of a process for controlling emission of a set of one or more laser beams is depicted in accordance with an illustrative embodiment. The process in this figure is an example of an implementation for operation 7700 in FIG. 77.

The process controls the emission of the set of one or more laser beams from the laser generation system to control the optical breakdowns that generate the radio frequency noise-band signals by varying one or more widths of the different frequency noise-bands for the radio frequency noise-band signals and varying the different noise amplitude levels of the different frequency noise-bands for the radio frequency noise-band signals that thereby modulates or digitally "shift keys" the radio frequency noise-band signals to correspond to the digital information (operation 7800). The process terminates thereafter.

Turning now to FIG. 79, an illustration of a flowchart of a process for controlling emission of a set of one or more laser beams is depicted in accordance with an illustrative embodiment. The process in this figure is an example of an implementation for operation 7700 in FIG. 77.

The process controls a set of one or more input parameters for the emission of a set of one or more of laser beams from the laser generation system to control the optical breakdowns that generate the radio frequency noise-band signals with the different discrete changes of the different frequency noise-bands and the different noise amplitude levels of the different noise amplitudes of the different frequency noise-bands that thereby modulates or digitally "shift keys" the radio frequency noise-band signals to correspond to the digital information (operation 7900). The process terminates thereafter.

Turning now to FIG. 80, an illustration of a flowchart of a process for controlling emission of a set of one or more laser beams is depicted in accordance with an illustrative embodiment. The process in this figure is an example of an implementation for operation 7700 in FIG. 77.

The process controls one or more colors of the set of one or more laser beams emitted from the laser generation system to control the optical breakdowns that generate the radio frequency noise-band signals by varying a width of the different frequency noise-bands for the radio frequency noise-band signals and varying a noise amplitude level of the different frequency noise-bands for the radio frequency noise-band signals that thereby modulate or digitally "shift key" the radio frequency noise-band signals to correspond to the digital information (operation 8000). The process terminates thereafter.

With reference now to FIG. 81, an illustration of a flowchart of a process for transmitting noise signals using a noise transmitter is depicted in accordance with an illustrative embodiment. The process in this figure is an example of an implementation for operation 7602 in FIG. 76.

The process generates the carrier noise-band signal using the electric noise generator (operation 8100). The process modulates or digitally "shift key" the carrier noise-band signal using the modulator to change different discrete changes of the different frequency noise-bands and amplitude levels of the different noise amplitudes of the different frequency noise-bands that thereby modulate or digitally "shift key" the carrier noise-band signal to correspond to the digital information (operation 8102).

The process transmits the carrier noise-band signal with changes to the different discrete changes of the different frequency noise-bands and the amplitude levels of the different noise amplitudes of the different frequency noise-bands for the carrier noise-band signal (operation 8104). The process terminates thereafter.

Turning next to FIG. 82, an illustration of a flowchart of a process for communicating multiple-bit digital information is depicted in accordance with an illustrative example. The process in FIG. 82 can be implemented in hardware, software, or both. When implemented in software, the process can take the form of program instructions that are run by one or more processor units located in one or more hardware devices in one or more computer systems. For example, the process can be implemented in receiver 3617 in FIG. 71.

The process receives noise-band signals, wherein digital information is modulated or "shift keyed" in the noise-band signals (operation 8200). The process demodulates or digitally de-"shift keys" the digital information modulated of "shift keyed" in the noise-band signals based on changes to the different positions of the different frequency noise-bands and the different noise amplitude levels of the different frequency noise-bands for the carrier noise-band signal (operation 8202). The process terminates thereafter.

Some features of the illustrative examples for modulating digital information 3607 using digital multi-frequency-amplitude noise-band shift keying 3694 in communications system 3602 are described in the following clauses. These clauses are examples of features and are not intended to limit other illustrative examples.

1. A communications system comprising:
a computer system; and
a communications manager in the computer system, wherein the communications manager is configured to:
identify digital information for transmission; and
transmit noise-band signals with different discrete changes of different frequency noise-bands and different noise amplitude levels of the different frequency noise-bands that thereby modulate the noise-band signals to correspond to the digital information.

2. The communications system of clause 1, wherein the different discrete changes of the different frequency noise-bands and the different noise amplitude levels of the different frequency noise-bands correspond to multiple discrete logic symbols in the digital information.

3. The communications system of clause 1, wherein the noise-band signals are radio frequency noise-band signals and further comprising:
a laser generation system configured to emit a set of one or more laser beams,
wherein in transmitting the noise-band signals, the communications manager is configured to:
control an emission of a set of one or more laser beams from the laser generation system to control optical breakdowns that generate the radio frequency noise-band signals with the different discrete changes of the different frequency noise-bands and the different noise amplitude levels of the different frequency noise-bands that thereby modulate the radio frequency noise-band signals to correspond to the digital information.

4. The communications system of clause 3, wherein in controlling the emission of the set of one or more laser beams, the communications manager is configured to:
control the emission of the set of one or more laser beams from the laser generation system to control the optical breakdowns that generate the radio frequency noise-band signals by varying a location of a center point of the different frequency noise-band for the radio frequency noise-band signals and varying the different noise amplitude levels of the different frequency noise-bands of the radio frequency noise-band signals that thereby modulates the radio frequency noise-band signals to correspond to the digital information.

5. The communications system of clause 3, wherein in controlling the emission of the laser beams, the communications manager is configured to:
control the emission of the set of one or more laser beams from the laser generation system to control the optical breakdowns that generate the radio frequency noise-band signals by varying a width of the different frequency noise-bands for the radio frequency noise-band signals and varying the different noise amplitude levels of the different frequency noise-bands for the radio frequency noise-band signals that thereby modulates the radio frequency noise-band signals to correspond to the digital information.

6. The communications system of clause 3, wherein in controlling the emission of the laser beams, the communications manager is configured to:
control a set of one or more input parameters for the emission of a set of one or more of laser beams from the laser generation system to control the optical breakdowns that generate the radio frequency noise-band signals with the different discrete changes of the different frequency noise-bands and the different noise amplitude levels of the different noise amplitudes of the different frequency noise-bands that thereby modulates the radio frequency noise-band signals to correspond to the digital information.

7. The communications system of clause 3, wherein in controlling the emission of the laser beams, the communications manager is configured to:
control one or more colors of the set of one or more laser beams emitted from the laser generation system to control the optical breakdowns that generate the radio frequency noise-band signals by varying a width of the different frequency noise-bands for the radio frequency noise-band signals and varying a noise amplitude level of the different frequency noise-bands for the radio frequency noise-band signals that thereby modulates the radio frequency noise-band signals to correspond to the digital information.

8. The communications system of clause 1 further comprising:
an electric noise generator configured to generate a carrier noise-band signal;
a modulator; and
a transmitter, wherein in transmitting the noise-band signals, the communications manager is configured to:
generate the carrier noise-band signal using the electric noise generator;
modulate the carrier noise-band signal using the modulator to change different discrete changes of the different frequency noise-bands and amplitude levels of the different noise amplitudes of the different frequency noise-bands that thereby modulate the carrier noise-band signal to correspond to the digital information; and
transmit the carrier noise-band signal with changes to the different discrete changes of the different frequency noise-bands and the amplitude levels of the different noise amplitudes of the different frequency noise-bands for the carrier noise-band signal.

9. The communications system of clause 8, wherein the carrier noise-band signal is selected from at least one of electromagnetic frequency noise signals, radio frequency noise signals, microwave frequency noise signals, audio frequency noise signals, ultrasonic frequency noise signals, ultra-low frequency noise signals, very low frequency noise-band signals, underwater frequency noise signals, or optical frequency noise signals.

10. The communications system of clause 1, wherein changes in the frequency noise-band for the noise-band signals are made to at least one of a width or a position of the frequency-noise-band.

11. The communications system of clause 1, wherein changes are made to an amplitude of the frequency noise-band for the noise-band signals.

12. A method for communicating digital information, the method comprising:

identifying digital information for transmission; and transmitting noise-band signals with different discrete changes of different frequency noise-bands and different noise amplitude levels of the different frequency noise-bands that thereby modulate the noise-band signals to correspond to the digital information.

13. The method of clause 12, wherein the noise-band signals are radio frequency noise-band signals and further comprising:

controlling an emission of a set of one or more laser beams from the laser generation system to control optical breakdowns that generate the radio frequency noise-band signals with the different discrete changes of the different frequency noise-bands and the different noise amplitude levels of the different frequency noise-bands that thereby modulate the radio frequency noise-band signals to correspond to the digital information.

14. The method of clause 13, wherein said controlling the emission of the set of one or more laser beams comprises:

controlling the emission of the set of one or more laser beams from the laser generation system to control the optical breakdowns that generate the radio frequency noise-band signals by varying one or more locations of one or more center points of the different frequency noise-band for the radio frequency noise-band signals and varying the different noise amplitude levels of the different frequency noise-bands of the radio frequency noise-band signals that thereby modulates the radio frequency noise-band signals to correspond to the digital information.

15. The method of claim 13, wherein said controlling the emission of the laser beams comprises:

controlling the emission of the set of one or more laser beams from the laser generation system to control the optical breakdowns that generate the radio frequency noise-band signals by varying one or more widths of the different frequency noise-bands for the radio frequency noise-band signals and varying the different noise amplitude levels of the different frequency noise-bands for the radio frequency noise-band signals that thereby modulates the radio frequency noise-band signals to correspond to the digital information.

16. The method of clause 13, wherein said controlling the emission of the laser beams comprises:

controlling a set of one or more input parameters for the emission of a set of one or more of laser beams from the laser generation system to control the optical breakdowns that generate the radio frequency noise-band signals with the different discrete changes of the different frequency noise-bands and the different noise amplitude levels of the different noise amplitudes of the different frequency noise-bands that thereby modulates the radio frequency noise-band signals to correspond to the digital information.

17. The method of clause 13, wherein controlling the emission of the laser beams comprises:

controlling one or more colors of the set of one or more laser beams emitted from the laser generation system to control the optical breakdowns that generate the radio frequency noise-band signals by varying a width of the different frequency noise-bands for the radio frequency noise-band signals and varying a noise amplitude level of the different frequency noise-bands for the radio frequency noise-band signals that thereby modulates the radio frequency noise-band signals to correspond to the digital information.

18. The method of clause 12, wherein said transmitting the noise-band signals comprises:

generating the carrier noise-band signal using the electric noise generator;

modulating the carrier noise-band signal using the modulator to change different discrete changes of the different frequency noise-bands and amplitude levels of the different noise amplitudes of the different frequency noise-bands that thereby modulate the carrier noise-band signal to correspond to the digital information; and transmitting the carrier noise-band signal with changes to the different discrete changes of the different frequency noise-bands and the amplitude levels of the different noise amplitudes of the different frequency noise-bands for the carrier noise-band signal.

19. The method of clause 12, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

20. A method for communicating digital information, the method comprising:

receiving noise-band signals, wherein digital information is modulated in the noise-band signals; and demodulating the digital information modulated in the noise-band signals based on changes to the different positions of the different frequency noise-bands and the different noise amplitude levels of the different frequency noise-bands for the carrier noise-band signal.

21. The communications system of clause 1, wherein changes in the frequency noise-band for the noise-band signals are made to at least one of a width or a position of the frequency-noise-band.

22. The communications system of clause 1, wherein changes are made to an amplitude of the frequency noise-band for the noise-band signals.

Figure 83:
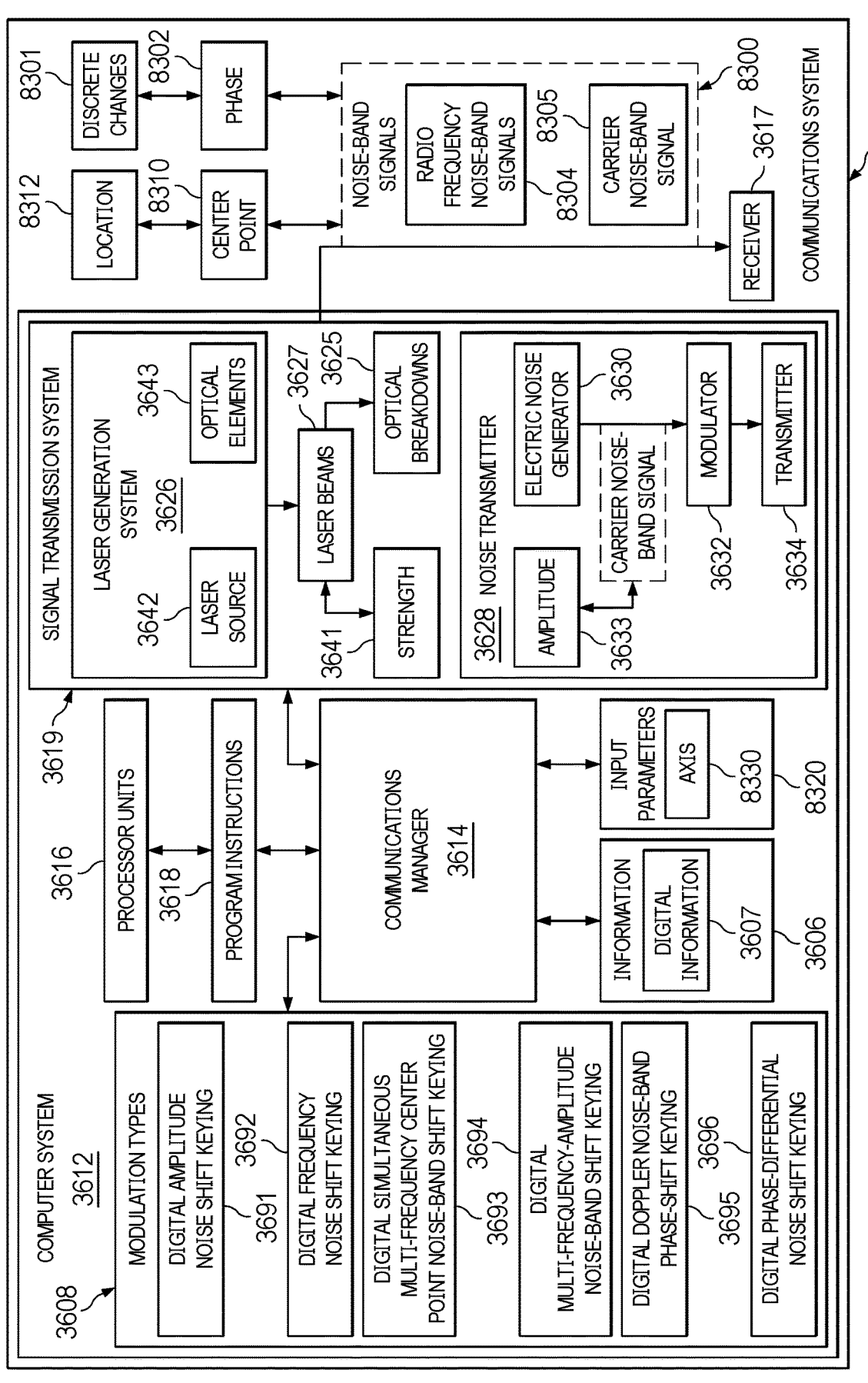
FIG. 83 is an illustration of a block diagram of a communications system 3602 for transmitting noise-band signals 8300 using digital phase noise modulation in accordance with an illustrative embodiment.

Turning now to FIG. 83, an illustration of a block diagram of a communications system 3602 for transmitting noise-band signals 8300 using digital phase noise modulation or digital doppler noise-band phase-shift keying 3695 is depicted in accordance with an illustrative embodiment. In this illustrative example, communications system 3602 operates to modulate or digitally "shift key" noise-band signals 8300 to correspond to information 3606 as digital information 3607 using digital doppler noise-band phase-shift keying 3695.

In this illustrative example, noise-band signals 8300 can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

In this illustrative example, communications manager 3614 identifies digital information 3607 for transmission. Communications manager 3614 transmits noise-band signals 8300 with discrete changes 8301 from phase 8302 of the noise-band signals that thereby modulates or digitally "shift keys" noise-band signals 8300 to correspond to digital information 3607.

In one illustrative example, communications manager 3614 uses laser generation system 3626 to transmit noise-band signals 8300 in the form of radio frequency noise-band signals 8304. With this example, communications manager 3614 controls an emission of a set of one or more laser beams 3627 from laser generation system 3626 to at least one of cause or control optical breakdowns 3625 that generate radio frequency noise-band signals 8304 with discrete changes 8301 in phase 8302 that thereby modulates or digitally "shift keys" radio frequency noise-band signals 8304 to correspond to digital information 3607.

In controlling the emission of the set of one or more laser beams 3627, communications manager 3614 can control the emission of the set of one or more laser beams 3627 from laser generation system 3626 to at least one of cause or control optical breakdowns 3625 that generate radio frequency noise-band signals by varying a position or frequency location 8312 of center point 8310 on the spectrum of radio frequency noise-band signals 8304. In this example, variation of position or frequency location 8312 of center point 8310 on the spectrum of radio frequency noise-band signals 8304 thereby modulates or digitally "shift keys" phase 8302 of radio frequency noise-band signals 8304 to correspond to digital information 3607.

In this illustrative example, the variation in position or frequency location 8312 of center point 8310 on the electromagnetic spectrum can be performed in a number of different ways. For example, communications manager 3614 controls a set of one or more input parameters 8320 for an emission of a set of one or more laser beams 3627 from laser generation system 3626 to at least one of cause or control optical breakdowns 3625 that generate radio frequency noise-band signals by varying frequency location 8312 of center point 8310 on the electromagnetic spectrum of radio frequency noise-band signals 8304. A variation of frequency location 8312 of center point 8310 on the electromagnetic spectrum of radio frequency noise-band signals 8304 thereby modulates or digitally "shift keys" phase 8302 of radio frequency noise-band signals 8304 to correspond to digital information 3607.

In controlling input parameters 8320, communications manager can control directing the set of one or more laser beams 3627 along axis 8330 such that optical breakdowns 3625 vary in space along axis 8330 to generate radio frequency noise-band signals 8304 with discrete changes 8301 in phase 8302 occurring along axis 8330 that thereby modulates or digitally "shift keys" the radio frequency noise-band signals 8304 to correspond to the digital information 3607.

In this example, discrete changes 8301 in phase 8302 caused by a changed frequency location 8312 of center point 8310 results in a phase shift. Discrete changes 8301 in phase 8302 can be implemented through change in a laser position or mirror position using optical elements 3643 in laser generation system 3626 to cause a discrete shift in the physical location of the optical breakdowns 3625. These optical elements can include mirrors, lenses, and other devices. The change can occur through changing a focal length of a mirror or other components to at least one of cause or control a phase shift in the electromagnetic spectrum by physically shifting the position of the optical breakdowns 3625. In other cases, a mirror or lens can move to pivot a laser beam.

Additional examples of input parameters 8320 that can be controlled to perform phase shifting include varying a frequency location of a lower half power point of radio frequency noise-band signals 8304, varying a frequency location of an upper half power point of radio frequency noise-band signals 8304, as well as other parameters that can be adjusted to perform phase shifting of radio frequency noise-band signals 8304.

In another illustrative example, communications manager 3614 can use noise transmitter 3628 to transmit noise-band signals 8300 in the form of carrier noise-band signal 8305 with discrete changes 8301 in phase 8302. In this example, communications manager 3614 modulates or digitally "shift keys" carrier noise-band signal 8305 using modulator 3632 to form carrier noise-band signal 8305 with discrete changes 8301 in phase 8302 of carrier noise-band signal 8305 that thereby modulates or digitally "shift keys" phase 8302 of carrier noise-band signal 8305 to correspond to digital information 3607.

In this example, the discrete changes 8301 in phase 8302 can take a number of forms. For example, for a Doppler phase shift the carrier noise-band signal can be a discrete shift in a bandpass range of frequencies. In another example, discrete Doppler phase shift of a bandpass range of colored noise frequencies, slope, or curvature of range of noise frequencies can occur using noise transmitter 3628. In yet another example, a discrete Doppler shift of modulation of white, pink, red (Brownian), purple, or gray noise can occur using noise transmitter 3628. Also, discrete multi-color noise Doppler shifts (electronic approach as opposed to lasers) can occur using noise transmitter 3628.

Figure 84:
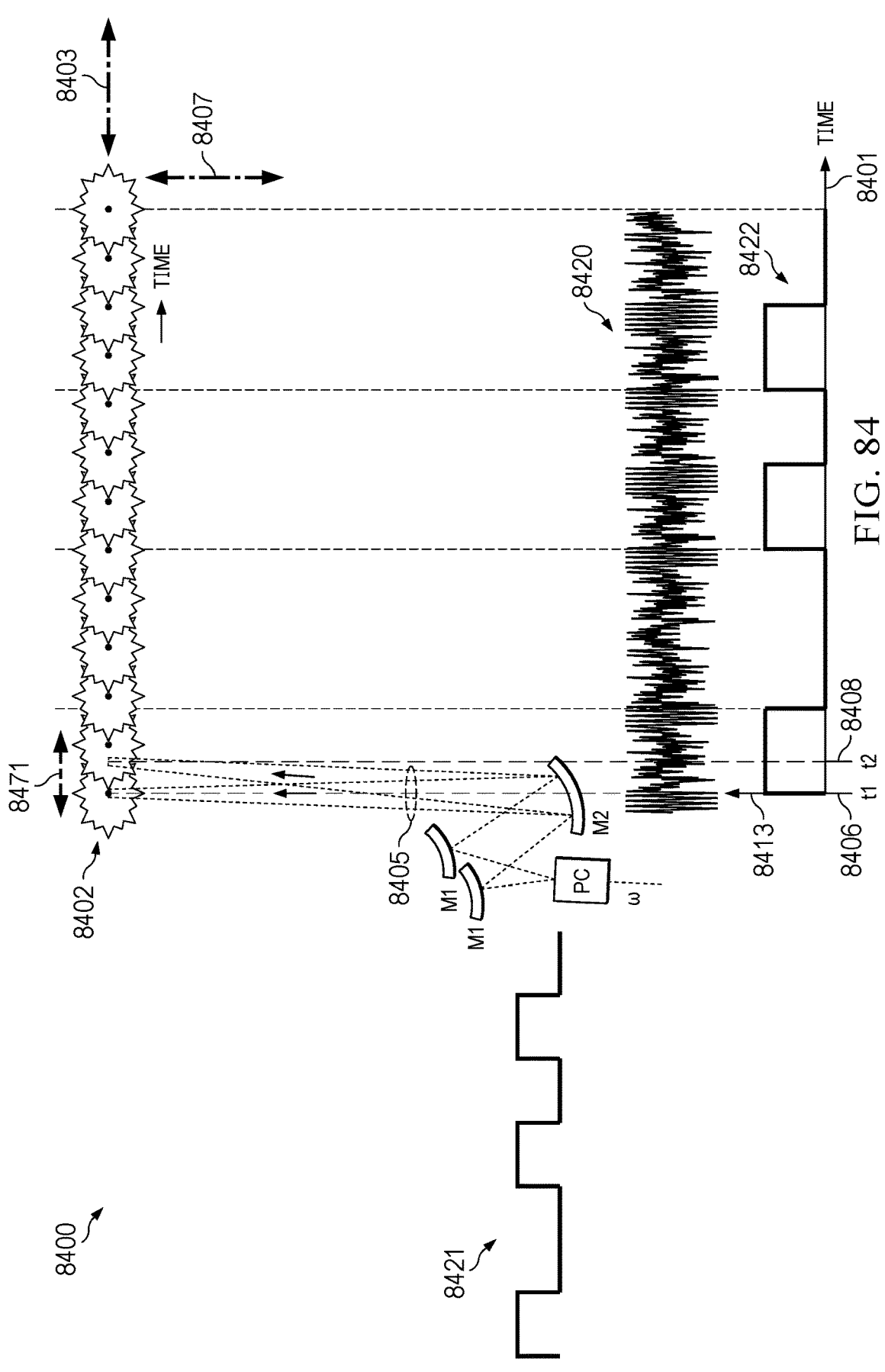
FIG. 84 is an illustration of information flow in transmitting digital information with digital phase noise modulation using a laser generation system in accordance with an illustrative embodiment.

Turning next to FIG. 84, an illustration of information flow in transmitting digital information with digital phase noise modulation using a laser generation system is depicted in accordance with an illustrative embodiment. In this example, information flow 8400 can be implemented using laser generation system 3626 in signal transmission system 3619 for communications system 3602 in FIG. 83. In this example in FIG. 84, x-axis 8401 represents time for optical breakdowns 8402 and noise signals 8406 in information flow 8400. Y-axis 8413 for radio frequency noise-band signal 8420 and output digital information 8422 represents amplitude or signal strength of these noise signals and digital signals.

As depicted, optical breakdowns 8402 are generated with varying phase based on input digital signal 8421 to be transmitted. As previously described, these optical breakdowns are plasma generated using laser generation system 3626 emitting laser beams 3627 in FIG. 83 to modulate radio frequency noise-band signal 8420 in FIG. 84 to correspond to input digital signal 8421. Each optical breakdown in optical breakdowns 8402 is a plasma event generated by the set of one or more laser beams 3627 emitted by laser generation system 3626 in FIG. 84.

As depicted, the act of pivoting laser beam 8405 in the direction of arrow 8471 during the generation of optical breakdowns 8402 results in a respective positive or negative Doppler phase shift in a lateral direction causing a Doppler noise-band phase shift along lateral axis 8403. This phase shift can be likened to the Doppler audio phase shift. The temporary discrete movement of the pivoting laser beam 8405 to the right in the direction of arrow 8471 during the generation of optical breakdowns 8402 results in a positive phase shift to a receiver on the right side of the optical breakdowns 8402. Returning the pivoting laser beam 8405 to the left in the direction of arrow 8471 during the generation of optical breakdowns 8402 results in a negative phase shift for a receiver on the right side of the optical breakdowns 8402. Thus, discrete movements to the right and left of the pivoting laser beam 8405 results in detectable phase shifts in the optical and RF spectrum in receivers in the direction of receivers along lateral axis 8403.

In this example, the phase of optical breakdowns 8402 can change along lateral axis 8403. As depicted, laser beam 8405 can generate optical breakdowns 8402 at time t1 8406.

As long as laser beam 8405 does not pivot as this timing is used, the phase of optical breakdowns 8402 does not change. In this example, laser beam 8405 can move or pivot in the direction of arrow 8471 such that optical breakdowns 8402 are continuously generated from time t1 8406 to time t2 8408. When this pivot occurs between time t1 8406 and time t2 8408, the change in position of the generation of optical breakdowns 8402 during time t1 to t2 results in a phase shift in the lateral direction along lateral axis 8403.

In this illustrative example, the change in timing and optical breakdown physical location can be performed by changing the position of the laser or a mirror. This change can at least one of cause or control a phase shift in one or both of lateral axis 8403 and vertical axis 8407. As depicted in FIG. 84, vertical axis 8407 is perpendicular to lateral axis 8403. In this illustrative example, the phase shift will be along the lateral axis 8403, with almost no phase shift along the vertical axis 8407.

As depicted, these optical breakdowns result in radio frequency noise-band signal 8420 with changes in phase. These discrete changes in phase encode digital information that can be recovered. In this example, processing of radio frequency noise-band signal 8420 results in output digital information 8422 which corresponds to or correlates with, directly or indirectly, input digital signal 8421.

Figure 85:
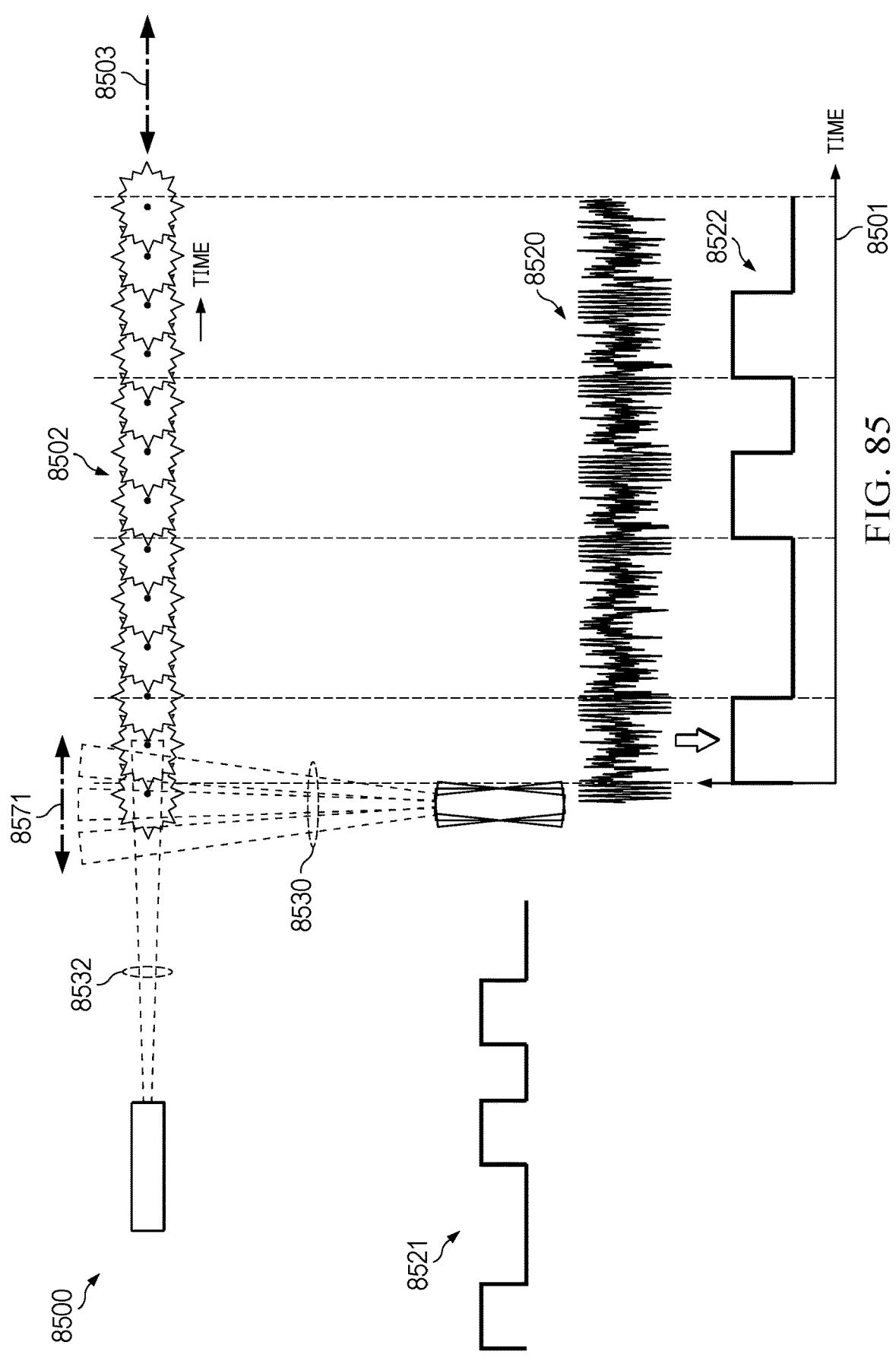
FIG. 85 is an illustration of information flow in transmitting digital information with digital phase noise modulation using a laser generation system in accordance with an illustrative embodiment.

Turning next to FIG. 85, an illustration of information flow in transmitting digital information with digital phase noise modulation using a laser generation system is depicted in accordance with an illustrative embodiment. In this example, information flow 8500 can be implemented using laser generation system 3626 in signal transmission system 3619 for communications system 3602 in FIG. 83. In this example in FIG. 85, x-axis 8501 represents time for optical breakdowns 8502, radio frequency noise-band signal 8520, and output digital signal 8522 in information flow 8500.

In this example, optical breakdowns 8502 are generated using laser beam 8530 and laser beam 8532 where the energy from both lasers creates optical breakdown at the intersection point of the lasers. In this example, laser beam 8532 is emitted in a direction along axis 8503. Laser beam 8530 is emitted in one or more directions to intersect laser beam 8532. In this illustrative example, laser beam 8530 can be pivoted relative to laser beam 8532 in the direction of arrow 8571 to shift the timing and physical locations at which optical breakdowns 8502 are generated. This discrete change in timing and physical locations of optical breakdowns 8502 generates a phase shift in a direction along axis 8503. The phase shift is generated based on input digital signal 8521. The discrete phase shift in this example can also be referred to as a Doppler noise-band shift, or Doppler noise-band phase shift, resulting in digital doppler noise-band phase-shift keying.

As a result, radio frequency noise-band signal 8520 is generated with discrete changes in phase to at least one of correspond or correlate with, directly or indirectly, the digital information in input digital signal 8521. In this example, radio frequency noise-band signal 8520 can be received and decoded to generate output digital signal 8522.

In this illustrative example, the axes for laser beam 8532 and laser beam 8530 are at or near right angles (i.e., 90 degrees). The movement of laser beam 8530 along axis 8503, thus causes optical breakdowns 8502 to also shift along axis 8503. This means that the directionality of the phase shift will also be along axis 8503. However, if, in another illustrative example, the axes for laser beam 8532 and laser beam 8530 are not at or near right angles (e.g., at 45 degrees), then the directionality of the phase shift would be in the direction of the change in physical location of the optical breakdowns 8502. This would generally be along the axis of the stationary laser beam but controlled by the moving or pivoting intersecting laser beam. However, both lasers can pivot as long as the lasers continue to intersect. The result is that the direction of the change in physical location of the optical breakdowns 8502 moves as the intersection point moves, causing the phase shift to be along the axis of the moving optical breakdowns 8502.

Figure 86:
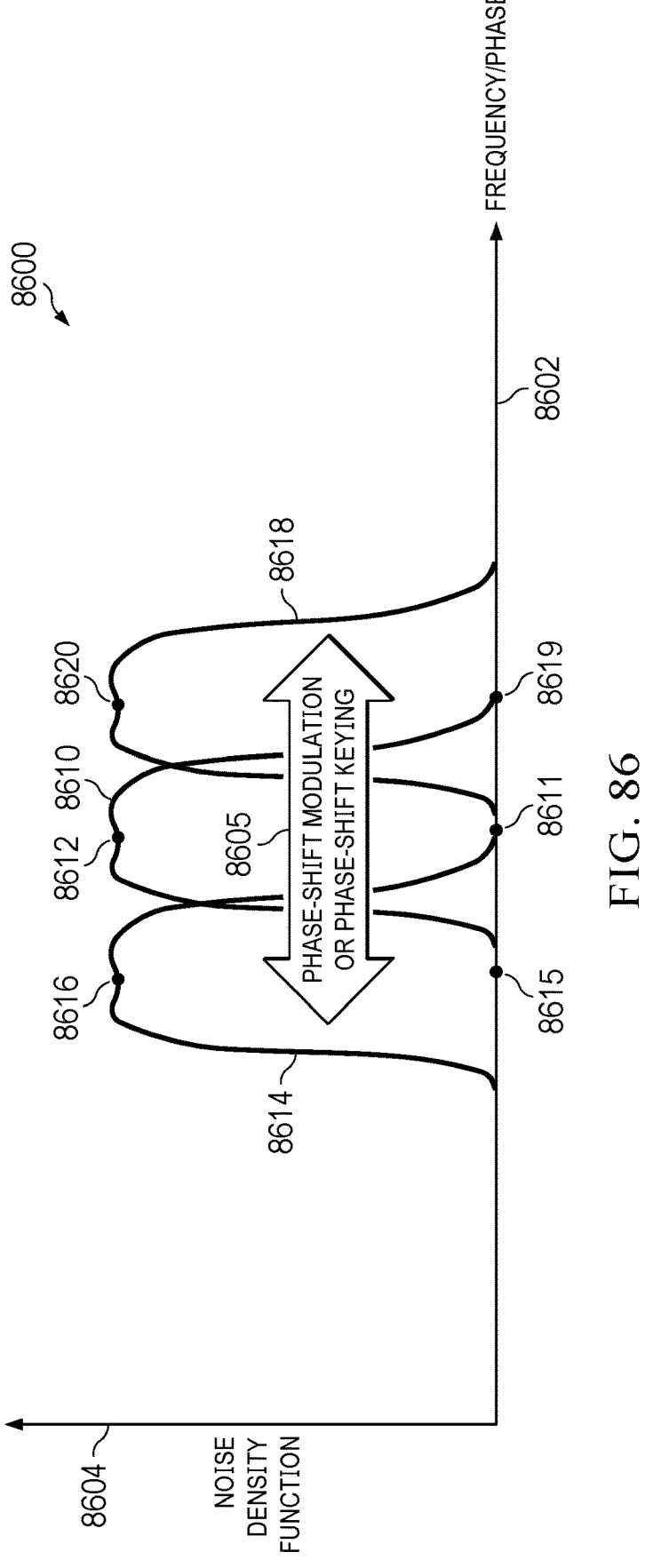
FIG. 86 is an illustration of digital phase noise modulation in accordance with an illustrative embodiment.

In FIG. 86, an illustration of digital phase noise modulation, digital phase-shift noise modulation, digital noise-band phase-shift keying, or digital doppler noise shift keying is depicted in accordance with an illustrative embodiment. As depicted in graph 8600, x-axis 8602 represents frequency and/or phase and y-axis 8604 represents a noise density function and/or noise amplitude. In this example, the modulation or "shift keying" of noise-band signals is performed using phase-shift modulation or phase-shift keying 8605.

In this illustrative example, noise-band signal 8610 has phase 8611 and center point 8612, and noise-band signal 8614 has phase 8615 and center point 8616. Noise-band signal 8618 has phase 8619 and center point 8620.

As depicted in this example, the phase of noise-band signal 8614 and noise-band signal 8618 are shifted relative to phase 8611 of noise-band signal 8610. These shifts are discrete changes that can be detected by a receiver. These discrete changes enable the receiver to determine the digital information modulated by the phase shifts in the noise-band signals. These phase shifts are performed by changing the center points in this example.

As depicted, noise-band signal 8610 with center point 8612 has phase 8611 and is considered to be a normal bandpass noise. Noise-band signal 8614 with center point 8616 has phase 8615 with a Doppler phase shift to a lower bandpass noise relative to noise-band signal 8610. Noise-band signal 8618 with center point 8620 has phase 8619 with a Doppler phase shift to a higher bandpass noise relative to noise-band signal 8610.

In one example, noise-band signal 8610 with center point 8612 and phase 8611 makes a discrete shift to noise-band signal 8618 with center point 8620 and phase 8619 resulting in a positive Doppler phase-shift. In this example, the positive Doppler phase-shift indicates a digital change from a logical "0" to a logical "1." In this example, when noise-band signal 8618 with center point 8620 and phase 8619 shifts back to noise-band signal 8610 with center point 8612 and phase 8611 the negative Doppler phase-shift indicates a digital change from a logical "1" to a logical "0."

In another illustrative example, the logical "1" and logical "0" are inverted from the previous example. In another example, the positive or negative Doppler phase-shift indicates a change in logical state from the previous logical state such that a previous logical "0" shifts to a subsequent logical "1," or a previous logical "1" shifts to a subsequent logical "0." In another example, noise-band signal 8610 with center point 8612 and phase 8611 makes a discrete shift to noise-band signal 8614 with center point 8616 and phase 8615 resulting in a negative Doppler phase-shift. In this example, the negative Doppler phase-shift indicates a digital change from a logical "0" to a logical "1," or inversely from a logical "1" to a logical "0" or a digital change from an existing logical state to a different logical state from the previous logical state.

In yet another illustrative example, the noise-band signal 8610 with center point 8612 and phase 8611 makes a momentary discrete shift to noise-band signal 8618 with center point 8620 and phase 8619 and then momentarily shifts discretely back, resulting in a complete positive and negative Doppler phase-shift. In this example, the complete positive and negative Doppler phase-shift indicates a digital change from a logical "0" to a logical "1," or a digital change from a logical "1" to a logical "0," or a digital change from a previous logical state ("0" or "1") to a different subsequent logical state ("1" or "0"). Thus, the set of center points of the noise-band signals are shifted in frequency to create a phase-shift with discrete changes in relative phase that thereby modulates or digitally "shift keys" the noise-band signals to correspond to the digital information.

In other words, the shifting in the phase of noise-band signals can be used to at least one of cause or control, directly or indirectly, the shift or change in phase of the noise signals to correlate to the digital information being transmitted. As depicted, this shift in phase is Doppler shift and can be performed using either or both laser generation system 3626 and noise transmitter 3628 in signal transmission system 3619 in FIG. 83.

Figure 87:
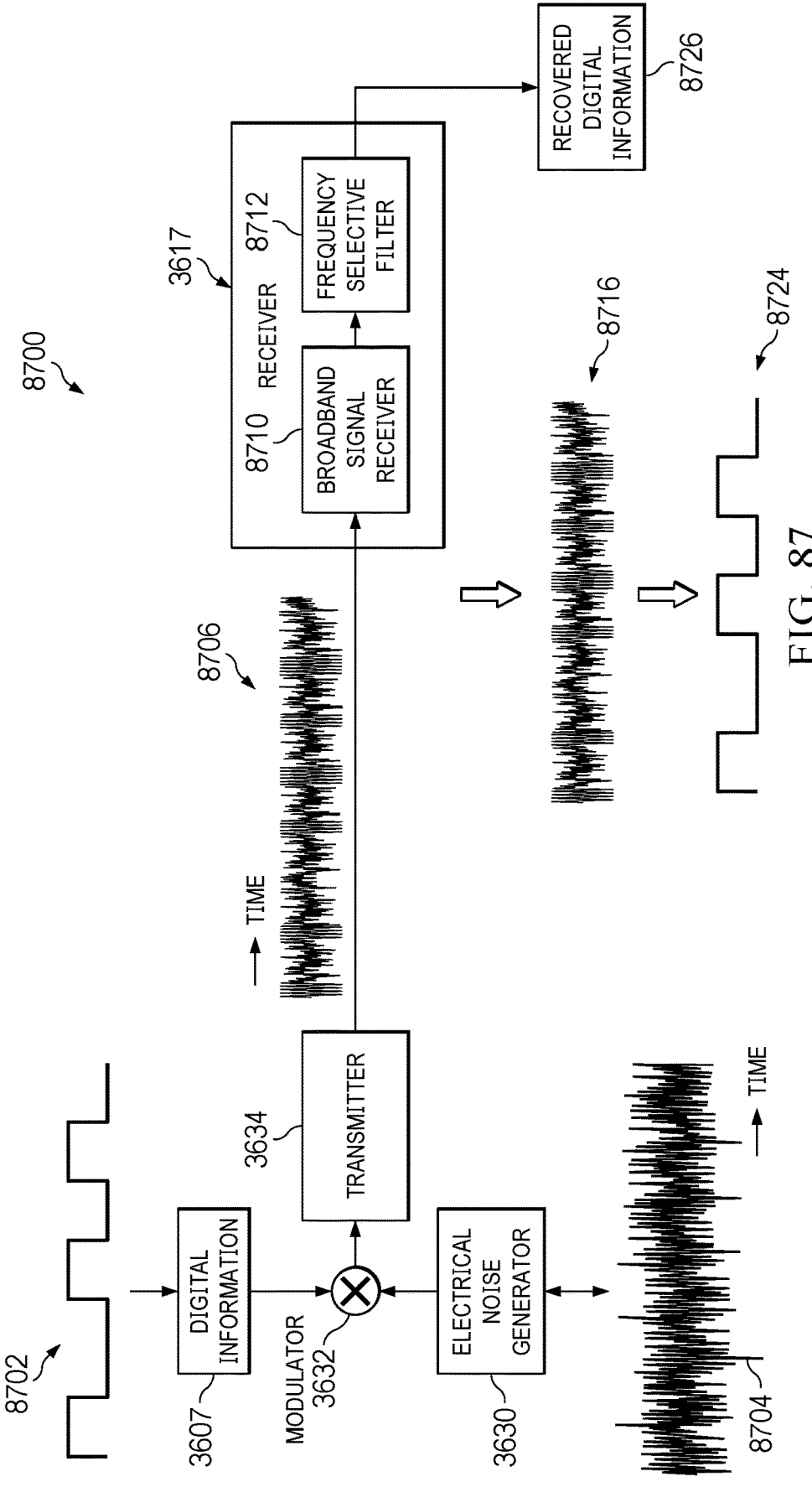
FIG. 87 is an illustration of information flow for transmitting digital information using digital doppler noise shift keying in a noise transmitter in accordance with an illustrative embodiment.

Turning next to FIG. 87, an illustration of information flow for transmitting digital information using digital doppler noise shift-keying or digital doppler noise-band phase-shift keying in a noise transmitter is depicted in accordance with an illustrative embodiment. In this example, information flow 8700 can be implemented using noise transmitter 3628 in signal transmission system 3619 for communications system 3602 in FIG. 83.

As depicted in FIG. 87 in this example, input digital signal 8702 is an example of digital information 3607 that is to be transmitted using digital doppler noise shift keying or digital doppler noise-band phase-shift keying 3695 in FIG. 83. In this example in FIG. 87, electric noise generator 3630 generates carrier noise-band signal 8704. In this example, modulator 3632 can be implemented using phase shift modulation that modulates or digitally "shift keys" the phase of noise-band signals in carrier noise-band signal 8704 to correspond to digital information 3607. This modulation or "shift keying" causes carrier noise-band signal 8704 to shift to different phases relative to a reference phase to form modulated carrier noise-band signal 8706. These changes in phases are discrete Doppler shifts for carrier noise-band signal 8704.

As a result, modulated carrier noise-band signal 8706 with the noise-band having different phase-shifts are transmitted by transmitter 3634. As depicted, modulated carrier noise-band signal 8706 is comprised of frequency noise-bands and is not a sinusoidal wave form. The different phase-shifts in modulated carrier noise-band signal 8706 correlate to input digital signal 8702.

As depicted, receiver 3617 includes broadband signal receiver 8710 and frequency selective filter 8712. Broadband signal receiver 8710 is at least one of a hardware device or software device that is configured to receive and process signals across a wide range of frequencies. In this example, broadband signal receiver 8710 receives modulated carrier noise-band signal 8706.

This reception of modulated carrier noise-band signal 8706 results in received signal 8716. As depicted in this example, received signal 8716 is the same or substantially the same as modulated carrier noise-band signal 8706. A noise floor can also be present in received signal 8716 from transmission noise and from broadband signal receiver 8710. The noise floor can be from noise sources in the transmission system, the transmission medium, or in broadband signal receiver 8710.

In this example, frequency selective filter 8712 can detect phase changes or phase-shifts in received signal 8716 to recover a digital signal in a form of multiple discrete logic bits 8724 from received signal 8716. Frequency selective filter 8712 can be implemented using a frequency comb filter. In this example, frequency selective filter 8712 can detect phases or phase-shifts in discrete frequency noise-bands of received signal 8716 to generate multiple discrete logic bits 8724. In this example, multiple discrete logic bits 8724 output by frequency selective filter 8712 forms recovered digital information 8726. As depicted in this example, the bits in multiple discrete logic bits 8724 for recovered digital information 8726 is the same as the bits in input digital signal 8702.

Turning next to FIG. 88, an illustration of a flowchart for communicating digital information is depicted in accordance with an illustrative embodiment. The process in FIG. 88 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 83.

The process begins by identifying digital information for transmission (operation 8800). The process transmits noise-band signals having discrete changes in a phase or phase-shifts of the noise-band signals that thereby modulates or digitally "shift keys" the noise-band signals to correspond to the digital information (operation 8802). The process terminates thereafter.

With reference next to FIG. 89, an illustration of a flowchart of a process for transmitting noise signals using a laser generation system is depicted in accordance with an illustrative embodiment. The process in this figure is an example of an implementation for operation 8802 in FIG. 88. In this example, the noise signals are radio frequency noise signals.

The process controls emission of a set of one or more laser beams from a laser generation system to control optical breakdowns that generate the radio frequency noise-band signals with the discrete changes in the phase or phase-shifts of the radio frequency noise-band signals from varying a center point of the radio frequency noise-band signals that thereby modulates or digitally "shift keys" the radio frequency noise-band signals to correspond to the digital information (operation 8900). The process terminates thereafter.

Next in FIG. 90, an illustration of a flowchart of a process for controlling emission of a set of one or more laser beams is depicted in accordance with an illustrative embodiment. The process in this figure is an example of an implementation for operation 8900 in FIG. 89.

The process controls the emission of the set of one or more laser beams from the laser generation system to control the optical breakdowns that generate the radio frequency noise-band signals by varying a frequency location of a center point of the radio frequency noise-band signals, wherein a variation of the frequency location of the center point of the radio frequency noise-band signals thereby modulates or digitally "shift keys" the phase of the radio frequency noise-band signals to correspond to the digital information (operation 9000). The process terminates thereafter.

In FIG. 91, an illustration of a flowchart of a process for controlling emission of a set of one or more laser beams is depicted in accordance with an illustrative embodiment. The process in this figure is an example of an implementation for operation 8900 in FIG. 89.

The process controls input parameters for an emission of a set of one or more laser beams from the laser generation system to control optical breakdowns that generate the radio frequency noise-band signals by varying a frequency location of a center point of the radio frequency noise-band signals, wherein a variation of the frequency location of the center point of the radio frequency noise-band signals thereby modulates or digitally "shift keys" the phase of the radio frequency noise-band signals to correspond to the digital information (operation 9100). The process terminates thereafter.

In FIG. 92, an illustration of a flowchart of a process for controlling emission of a set of one or more laser beams is depicted in accordance with an illustrative embodiment. The process in this figure is an example of an implementation for operation 8900 in FIG. 89.

The process controls controlling input parameters for an emission of a set of one or more laser beams from the laser generation system to control optical breakdowns that generate the radio frequency noise-band signals by varying a position of an upper half-power point of the radio frequency noise-band signals, wherein a variation of the position of the upper half-power point of the radio frequency noise-band signals thereby modulates or digitally "shift keys" the phase of the radio frequency noise-band signals to correspond to the digital information (operation 9200). The process terminates thereafter.

Figure 93:
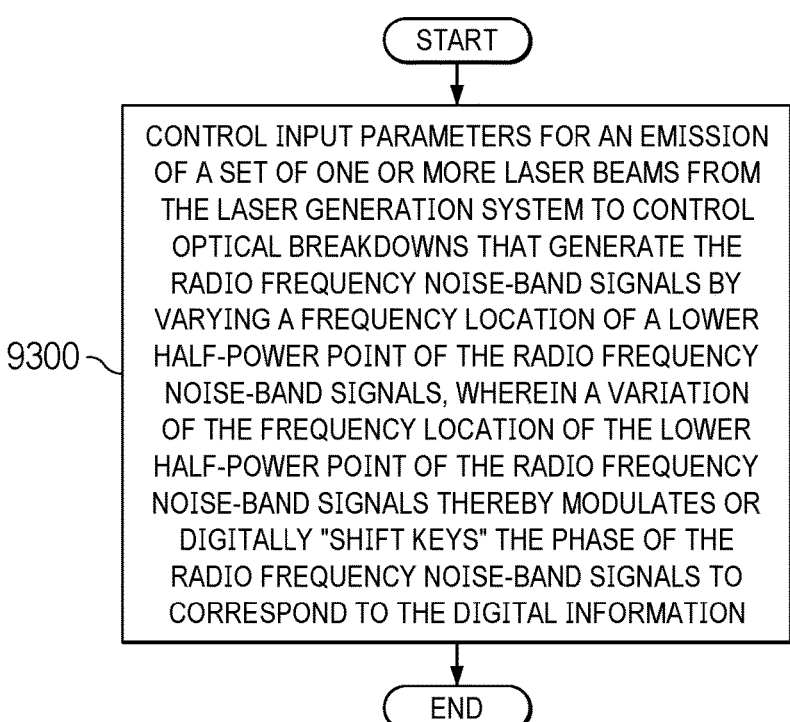
FIG. 93 is an illustration of a flowchart of a process for controlling emission of a set of one or more laser beams in accordance with an illustrative embodiment.

In FIG. 93, an illustration of a flowchart of a process for controlling emission of a set of one or more laser beams is depicted in accordance with an illustrative embodiment. The process in this figure is an example of an implementation for operation 8900 in FIG. 89.

The process controls input parameters for an emission of a set of one or more laser beams from the laser generation system to control optical breakdowns that generate the radio frequency noise-band signals by varying a frequency location of a lower half-power point of the radio frequency noise-band signals, wherein a variation of the frequency location of the lower half-power point of the radio frequency noise-band signals thereby modulates or digitally "shift keys" the phase of the radio frequency noise-band signals to correspond to the digital information (operation 9300). The process terminates thereafter.

Figure 94:
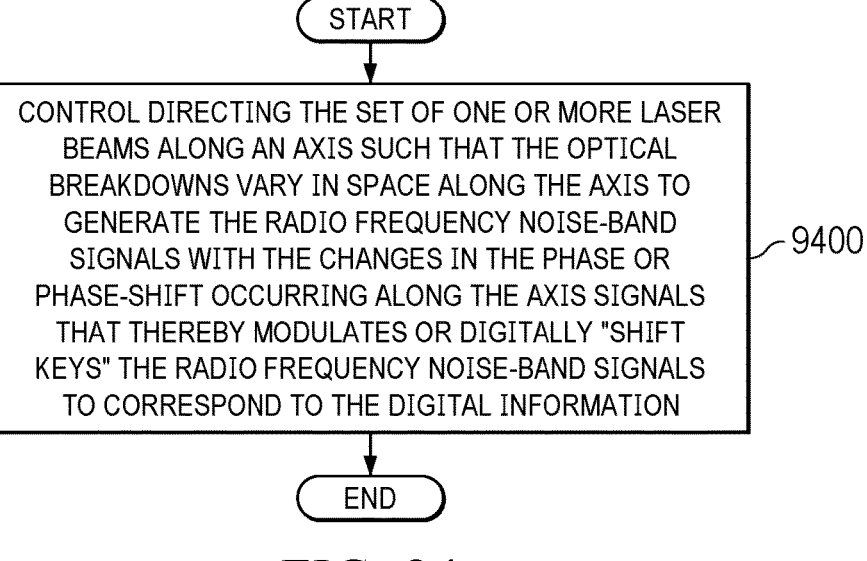
FIG. 94 is an illustration of a flowchart of a process for controlling emission of a set of one or more laser beams in accordance with an illustrative embodiment.

Next in FIG. 94, an illustration of a flowchart of a process for controlling emission of a set of one or more laser beams is depicted in accordance with an illustrative embodiment. The process in this figure is an example of an implementation for operation 8900 in FIG. 89.

The process controls directing the set of one or more laser beams along an axis such that the optical breakdowns vary in space along the axis to generate the radio frequency noise-band signals with the changes in the phase or phase-shift occurring along the axis signals that thereby modulates or digitally "shift keys" the radio frequency noise-band signals to correspond to the digital information (operation 9400). The process terminates thereafter.

Turning next to FIG. 95, an illustration of a flowchart of process for communicating digital information is depicted in accordance with an illustrative embodiment. The process in FIG. 95 can be implemented in hardware, software, or both. When implemented in software, the process can take the form of program instructions that are run by one or more processor units located in one or more hardware devices in one or more computer systems. For example, the process can be implemented in noise transmitter 3628 in FIG. 83.

The process modulates or digitally "shift keys" the carrier noise-band signal using the modulator to form the noise-band signal with changes in the phase of the carrier noise-band signal that thereby modulates or digitally "shift keys" the carrier noise-band signal to correspond to the digital information (operations 9500). The process transmits the carrier noise-band signal with the changes in the phase or phase-shift of the carrier noise-band signal that thereby modulates or digitally "shift keys" the carrier noise-band signal to correspond to the digital information that modulates or digitally "shift keys" the digital information (operation 9502). The process terminates thereafter.

Turning next to FIG. 96, an illustration of a flowchart of process for communicating digital information is depicted in accordance with an illustrative embodiment. The process in FIG. 96 can be implemented in hardware, software, or both. When implemented in software, the process can take the form of program instructions that are run by one or more processor units located in one or more hardware devices in one or more computer systems. For example, the process can be implemented in receiver 3617 in FIG. 83.

The process receives noise-band signals, wherein the digital information is modulated or "shift keyed" by discrete changes in phase in the noise-band signals (operation 9600). The process demodulates or digitally de-"shift keys" the digital information modulated or digitally "shift keyed" in the noise-band signals based on the discrete changes in the phase of the noise-band signals (9602). The process terminates thereafter.

Some features of the illustrative examples for modulating digital information 3607 using digital doppler noise-band phase-shift keying 3695 in communications system 3602 are described in the following clauses. These clauses are examples of features and are not intended to limit other illustrative examples.

1. A communications system comprising:
a computer system; and
a communications manager in the computer system, wherein the communications manager is configured to:
identify digital information for transmission; and
transmit noise-band signals with discrete changes in a phase of the noise-band signals that thereby modulates the noise-band signals to correspond to the digital information.

2. The communications system of clause 1, wherein the noise-band signals are radio frequency noise-band signals and further comprising:
a laser generation system configured to emit a set of one or more laser beams, wherein in transmitting the noise-band signals, the communications manager is configured to:
control an emission of a set of one or more laser beams from the laser generation system to control optical breakdowns that generate the radio frequency noise-band signals with the discrete changes in the phase that thereby modulates the radio frequency noise-band signals to correspond to the digital information.

3. The communications system of clause 2, wherein in controlling the emission of the set of one or more laser beams, the communications manager is configured to:

control the emission of the set of one or more laser beams from the laser generation system to control the optical breakdowns that generate the radio frequency noise-band signals by varying a frequency location of a center point of the radio frequency noise-band signals, wherein a variation of the frequency location of the center point of the radio frequency noise-band signals thereby modulates the phase of the radio frequency noise-band signals to correspond to the digital information.

4. The communications system of clause 2, wherein in controlling the emission of the laser beams, the communications manager is configured to:

control a set of one or more input parameters for the emission of a set of one or more laser beams from the laser generation system to control the optical breakdowns that generate the radio frequency noise-band signals by varying a frequency location of a center point of the radio frequency noise-band signals, wherein a variation of the frequency location of the center point of the radio frequency noise-band signals thereby modulates the phase of the radio frequency noise-band signals to correspond to the digital information.

5. The communications system of clause 4, wherein in controlling the set of one or more input parameters, the communications manager is configured to:

control directing the set of one or more laser beams along an axis such that the optical breakdowns vary in space along the axis to generate the radio frequency noise-band signals with the discrete changes in the phase occurring along the axis that thereby modulates the radio frequency noise-band signals to correspond to the digital information.

6. The communications system of clause 1 further comprising:

an electric noise generator configured to generate a carrier noise signal;

a modulator; and a transmitter, wherein in generating noise-band signals, the communications manager is configured to:

generate a carrier noise-band signal using the electric noise generator; and modulate the carrier noise-band signal using the modulator to form the carrier noise-band signal with discrete changes in the phase of the carrier noise-band signal that thereby modulates the phase of the carrier noise-band signal to correspond to the digital information.

7. The communications system of clause 1, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

8. A method for communicating digital information, the method comprising:

identifying digital information for transmission; and transmitting noise-band signals having discrete changes in a phase of the noise-band signals that thereby modulates the noise-band signals to correspond to the digital information.

9. The method of clause 8, wherein the noise-band signals are radio frequency noise-band signals and, wherein said transmitting the noise-band signals comprises:

controlling an emission of a set of one or more laser beams from a laser generation system to control optical breakdowns that generate the radio frequency noise-band signals with the discrete changes in the phase of the radio frequency noise-band signals from varying a center point of the radio frequency noise-band signals that thereby modulates the radio frequency noise-band signals to correspond to the digital information.

10. The method of clause 9, wherein said controlling the emission of the set of one or more laser beams comprises:

controlling the emission of the set of one or more laser beams from the laser generation system to control the optical breakdowns that generate the radio frequency noise-band signals by varying a frequency location of a center point of the radio frequency noise-band signals, wherein a variation of the frequency location of the center point of the radio frequency noise-band signals thereby modulates the phase of the radio frequency noise-band signals to correspond to the digital information.

11. The method of clause 9, wherein said controlling the emission of the laser beams comprises:

controlling input parameters for the emission of a set of one or more laser beams from the laser generation system to control the optical breakdowns that generate the radio frequency noise-band signals by varying a frequency location of a center point of the radio frequency noise-band signals, wherein a variation of the frequency location of the center point of the radio frequency noise-band signals thereby modulates the phase of the radio frequency noise-band signals to correspond to the digital information.

12. The method of clause 9, wherein said controlling the emission of the laser beams comprises:

controlling input parameters for the emission of a set of one or more laser beams from the laser generation system to control the optical breakdowns that generate the radio frequency noise-band signals by varying a position of an upper half-power point of the radio frequency noise-band signals, wherein a variation of the position of the upper half-power point of the radio frequency noise-band signals thereby modulates the phase of the radio frequency noise-band signals to correspond to the digital information.

13. The method of clause 9, wherein said controlling the emission of the laser beams comprises:

controlling input parameters for the emission of a set of one or more laser beams from the laser generation system to control the optical breakdowns that generate the radio frequency noise-band signals by varying a frequency location of a lower half-power point of the radio frequency noise-band signals, wherein a variation of the frequency location of the lower half-power point of the radio frequency noise-band signals thereby modulates the phase of the radio frequency noise-band signals to correspond to the digital information.

14. The method of clause 9, wherein said controlling the emission of the laser beams comprises:

controlling directing the set of one or more laser beams along an axis such that the optical breakdowns vary in space along the axis to generate the radio frequency noise-band signals with the changes in the phase occurring along the axis signals that thereby modulates the radio frequency noise-band signals to correspond to the digital information.

15. The method of clause 8, wherein said transmitting the noise-band signals comprises:

generating a carrier noise-band signal using an electric noise generator;

modulating the carrier noise-band signal using the modulator to form the noise-band signal with changes in the phase of the carrier noise-band signal that thereby modulates the carrier noise-band signal to correspond to the digital information; and transmitting the carrier noise-band signal with the changes in the phase of the carrier noise-band signal that thereby modulates the carrier noise-band signal to correspond to the digital information that modulates the digital information.

16. The method of clause 8, wherein the noise-band signal is selected from at least one of electromagnetic frequency noise signals, radio frequency noise-band, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

17. A method for communicating digital information, the method comprising:

receiving noise-band signals, wherein the digital information is modulated by discrete changes in phase in the noise-band signals; and demodulating the digital information modulated in the noise-band signals based on the discrete changes in the phase of the noise-band signals.

Figure 97:
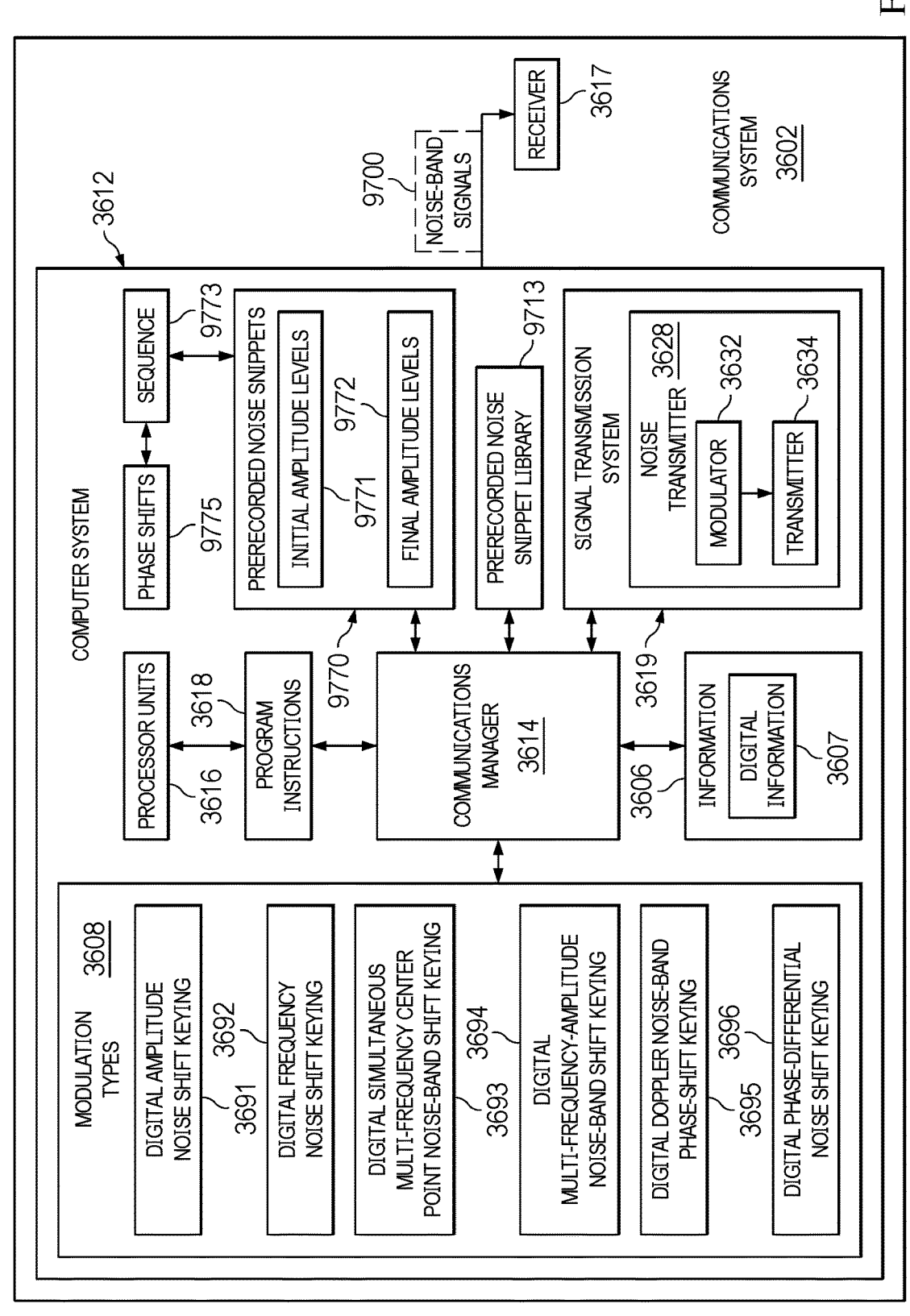
FIG. 97 is an illustration of a block diagram of a communications system for transmitting noise-band signals using digital phase noise modulation or digital phase-differential noise shift keying in accordance with an illustrative embodiment.

Turning now to FIG. 97, an illustration of a block diagram of a communications system for transmitting noise-band signals using digital phase noise modulation or digital phase-differential noise shift keying is depicted in accordance with an illustrative embodiment. In this illustrative example, only a portion of the components in communications system 3602 are used to transmit information 3606 as digital information 3607 using digital phase-differential noise shift keying 3696. Other components not used are omitted in this figure to avoid obscuring the description of this illustrative example in which digital phase-differential noise shift keying 3696 is used to transmit digital information 3607. In this illustrative example, laser generation system 3626 and electric noise generator 3630 are not used for this type of modulation or "shift keying" and are not shown in this figure depicting communications system 3602.

In this illustrative example, communications manager 3614 identifies digital information 3607 for transmission. Communications manager 3614 generates a sequence 9773 of prerecorded noise snippets 9770 with initial amplitude levels 9771 and final amplitude levels 9772.

This sequence of prerecorded noise snippets 9770 can be generated using modulator 3632 in noise transmitter 3628. For example, modulator 3632 can select particular ones of prerecorded noise snippets 9770 to form sequence 9773. In this illustrative example, prerecorded noise snippets 9770 can be stored in a physical or virtual location such as prerecorded noise snippet library 9713. In other illustrative examples, these prerecorded noise snippets can be generated on the fly based on the desired initial amplitude levels and desired final amplitude levels for prerecorded noise snippets 9770 to form sequence 9773 to have phase shifts 9775 that correlate to digital information 3607.

In this example, initial amplitude levels 9771 and final amplitude levels 9772 from one prerecorded noise snippet to another prerecorded noise snippet in the sequence of prerecorded noise snippets 9770 corresponds to phase shifts 9775 between prerecorded noise snippets 9770 which correspond to the digital information 3607.

In this illustrative example, prerecorded noise snippets 9770 are prerecorded noise having initial amplitude levels 9771 and final amplitude levels 9772.

For example, one prerecorded snippet can have an initial amplitude of +1 and a final amplitude of +1. Another prerecorded snippet can have an initial amplitude of 0 and a final amplitude of 0. As yet another example, another prerecorded snippet can have an initial amplitude of +1 and a final amplitude of 0. In yet another example, a prerecorded snippet can have an initial amplitude of −1 and a final amplitude of +1.

These and other combinations of initial amplitude levels 9771 and final amplitude levels 9772 can be placed into sequence 9773 such that phase shifts 9775 resulting from the sequence 9773 of prerecorded snippets can correspond to digital information 3607.

These prerecorded snippets can be comprised of prerecorded noise-band signals that can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including at least one of visible or non-visible light.

Communications manager 3614 transmits the sequence 9773 of prerecorded noise snippets 9770 corresponding to digital information 3607. In this example, this transmission is performed using signal transmission system 3619 with the prerecorded noise snippets being transmitted as noise-band signals 9700.

This transmission can be received by receiver 3617 which is a hardware system and can include processes implemented in hardware or software that recover digital information 3607 from sequence 9773 of prerecorded noise snippets 9770 transmitted by transmitter 3634.

In this illustrative example, receiver 3617 receives the transmission of sequence 9773 of prerecorded noise snippets 9770 with initial amplitude levels 9771 and final amplitude levels 9772 in which initial amplitude levels 9771 and final amplitude levels 9772 from one prerecorded noise snippet to another prerecorded noise snippet in sequence 9773 of prerecorded noise snippets 9770 corresponds to phase shifts 9775 between prerecorded noise snippets 9770 which correspond to the digital information 3607. Receiver 3617 demodulates or digitally de-"shift keys" digital information 3607 from sequence 9773 of prerecorded noise snippets 9770 and phase shifts 9775 for sequence 9773 of prerecorded noise snippets 9770. In this manner, receiver 3617 can recover digital information 3607 transmitted in sequence 9773 of prerecorded noise snippets 9770.

Figure 98:
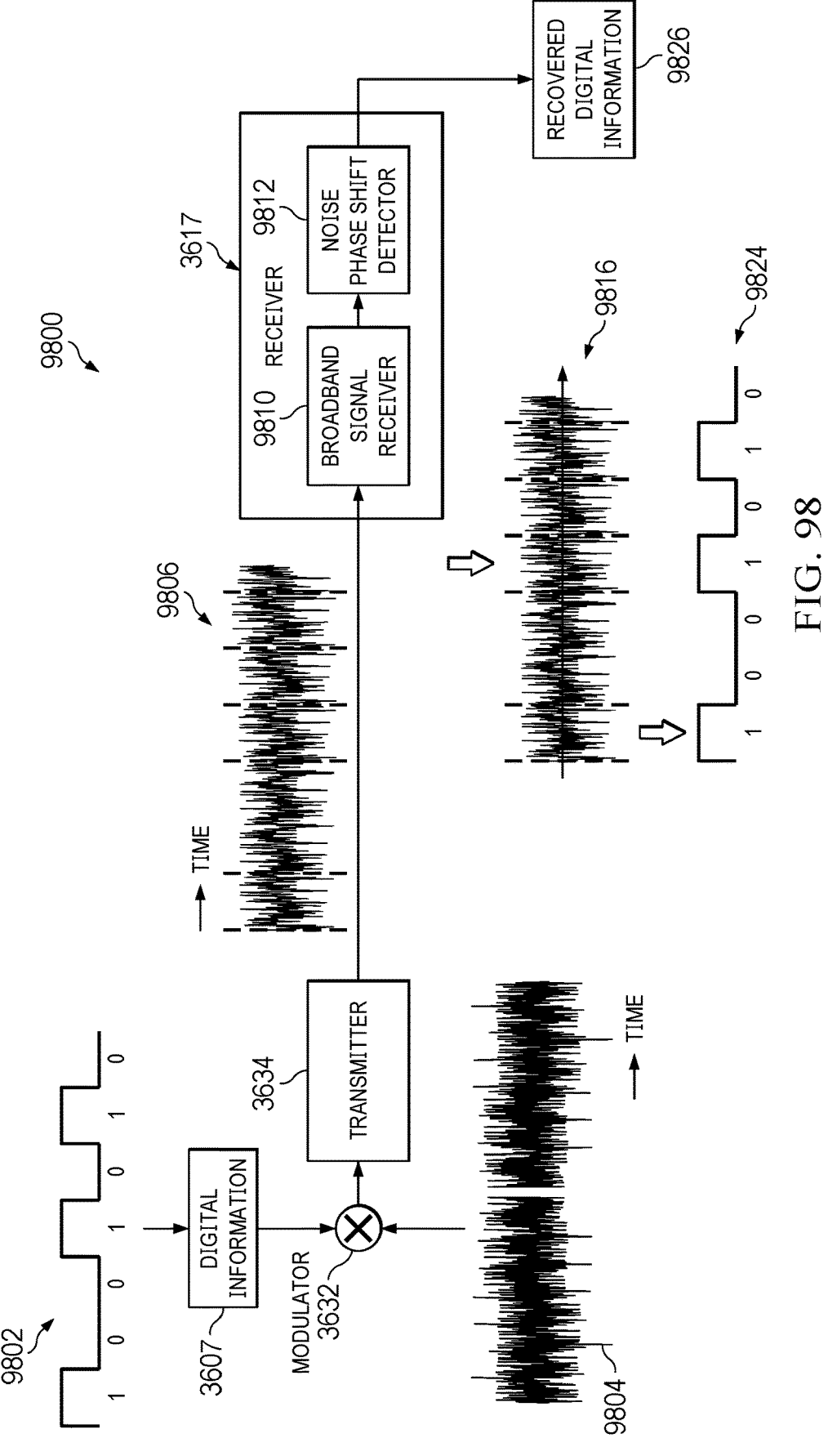
FIG. 98 is an illustration of information flow for transmitting digital information using digital phase-differential noise shift keying in a noise transmitter in accordance with an illustrative embodiment.

Turning next to FIG. 98, an illustration of information flow for transmitting digital information using digital phase-differential noise shift keying in a noise transmitter is depicted in accordance with an illustrative embodiment. In this example, information flow 9800 can be implemented using noise transmitter 3628 in signal transmission system 3619 for communications system 3602 in FIG. 98.

As depicted in FIG. 98 in this example, input digital signal 9802 is an example of digital information 3607 that is to be modulated using digital phase-differential noise shift keying 3696 in FIG. 97.

In this example in FIG. 98, modulator 3632 operates as a phase shift modulator for prerecorded noise. For example, modulator 3632 performs modulation by selecting snippets from prerecorded noise snippets 9804 in a sequence that corresponds to input digital signal 9802. Modulator 3632 generates a sequence of prerecorded noise snippets 9804 with initial amplitude levels and final amplitude levels. The initial amplitude levels and the final amplitude levels from one prerecorded noise snippet to another prerecorded noise snippet in the sequence of the prerecorded noise snippets 9804 corresponds to phase shifts between prerecorded noise snippets 9804 which correspond to digital information 3607.

In this example, transmitter 3634 transmits the sequence of prerecorded noise snippets 9804 selected by modulator 3632 to correlate to input digital signal 9802 for digital information 3607. This sequence is transmitted as modulated carrier noise-band signal 9806.

Modulated carrier noise-band signal 9806 is received by receiver 3617. As depicted, receiver 3617 includes broadband signal receiver 9810 and noise phase shift detector 9812. Broadband signal receiver 9810 is at least one of a hardware device or software device that is configured to receive and process signals across a wide range of frequencies. In this example, broadband signal receiver 9810 receives modulated carrier noise-band signal 9806.

This reception of modulated carrier noise-band signal 9806 results in received signal 9816. As depicted in this example, received signal 9816 is the same or substantially the same as modulated carrier noise-band signal 9806. A noise floor can also be present in received signal 9816 from transmitter 3634, the transmission medium, and/or broadband signal receiver 9810. The noise floor can be from noise sources in transmitter 3634, the transmission medium, and/or broadband signal receiver 9810.

Figure 98A:
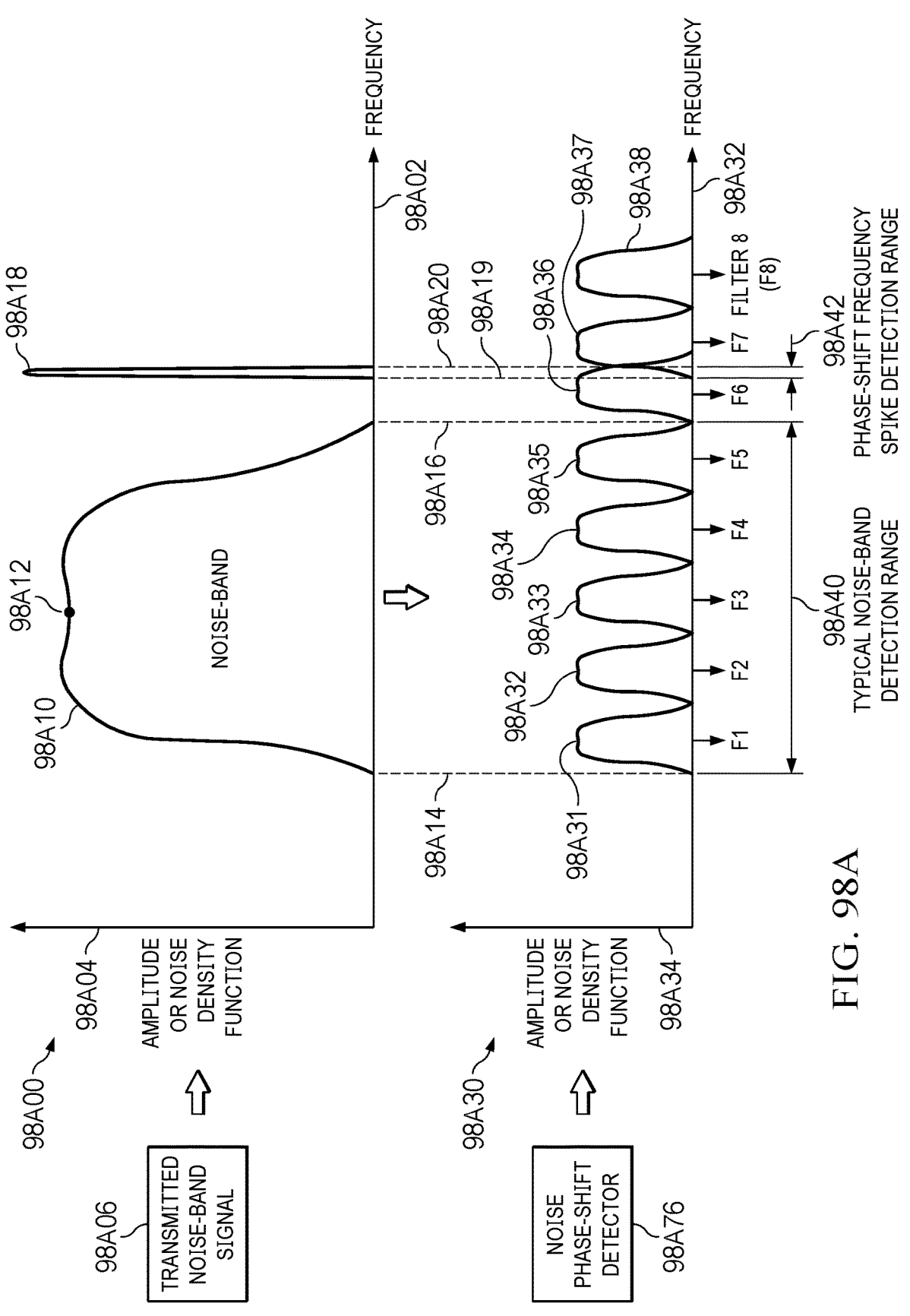
FIG. 98A is an illustration of a typical transmitted noise-band signal with a discrete phase shift that thereby creates higher frequencies outside of the typical noise-band, including an illustration of a noise phase-shift detector using a comb filter array in accordance with an illustrative embodiment.

In this example, noise phase shift detector 9812 can detect phase shifts in received signal 9816 to recover digital signal 9824 from received signal 9816. Noise phase shift detector 9812 can be implemented using electronic techniques to detect spurious high frequency transitions that shift more rapidly than the noise frequencies in the noise-band itself. Alternatively, bandpass filters or passband filters can be used which will detect spurious high frequency signals outside of the range of the noise-band itself. For example, FIG. 98A shows an array of passband filters which will detect higher frequencies outside of the noise-band caused by these sudden phase shifts. Returning to FIG. 98, in this example, noise phase shift detector 9812 can detect phase shifts in received signal 9816 to generate digital signal 9824 that is output as recovered digital information 9826. As depicted in this example, the bits in digital signal 9824 for recovered digital information 9826 is the same as the bits in digital information 3607 as shown in input digital signal 9802.

Turning now to FIG. 98A, this figure shows an illustrative example of how noise phase shift detector 9812 in FIG. 98 may function. Other means may be used, but for purposes of illustration, FIG. 98A is one illustrative example. At the top of FIG. 98A is a graph of transmitted noise-band 98A00 which plots transmitted noise-band signal 98A06 with the x-axis 98A02 showing frequency and the y-axis 98A04 showing amplitude, power, or noise density function. Graph of transmitted noise-band 98A00 contains noise-band 98A10 with center point 98A12, having lower frequency boundary 98A14 and upper frequency boundary 98A16, as indicated by the vertical dashed lines for 98A14 and 98A16. Graph of transmitted noise-band 98A00 also shows the frequency spike 98A18 which occurs temporarily at a higher frequency than noise-band 98A10 when a phase shift occurs in the noise signal in noise-band 98A10. Graph of transmitted noise-band 98A00 with frequency spike 98A18 has a lower frequency boundary 98A19 and upper frequency boundary 98A20, as indicated by the vertical dashed lines for 98A19 and 98A20.

At the bottom of FIG. 98A is a graph 98A30 showing receiving bandpass filters comprising noise phase-shift detector 98A76. Graph 98A30 of receiving bandpass filters has an x-axis 98A32 indicating frequency and a y-axis 98A34 indicating amplitude, power, or noise density function. Graph 98A30 of receiving bandpass filters for noise phase-shift detector 98A76 comprises a series of illustrative bandpass or passband filters. In this depicted example, these filters are illustratively designated as filter 1 98A31, filter 2 98A32, filter 3 98A33, filter 4 98A34, filter 5 98A35, filter 6 98A36, filter 7 98A37, and filter 8 98A38. When transmitted noise-band signal 98A06 in noise-band 98A10 is present, that noise is detected by receiving bandpass filters: filter 1 98A31, filter 2 98A32, filter 3 98A33, filter 4 98A34, and filter 5 98A35 across typical noise-band detection range 98A40. Filter 6 98A36, filter 7 98A37, and filter 8 98A38 do not detect any signals from noise-band 98A10. However, when transmitted noise-band signal 98A06 in noise-band 98A10 undergoes a phase-shift, then frequency spike 98A18 caused by the phase-shift temporarily occurs at a higher frequency than noise-band 98A10. When that phase-shift occurs, frequency spike 98A18 is detected by filter 6 98A36 and filter 7 98A37 across phase-shift frequency spike detection range 98A42. Thus phase-shifts are detected in this example by a series of comb filters, bandpass filters, notch filters, or other types of filters. These filters may be implemented in hardware and/or software, and may be analog or digital filters, although in this example, these discrete phase-shifts are used to detect digital signals.

Figure 99:
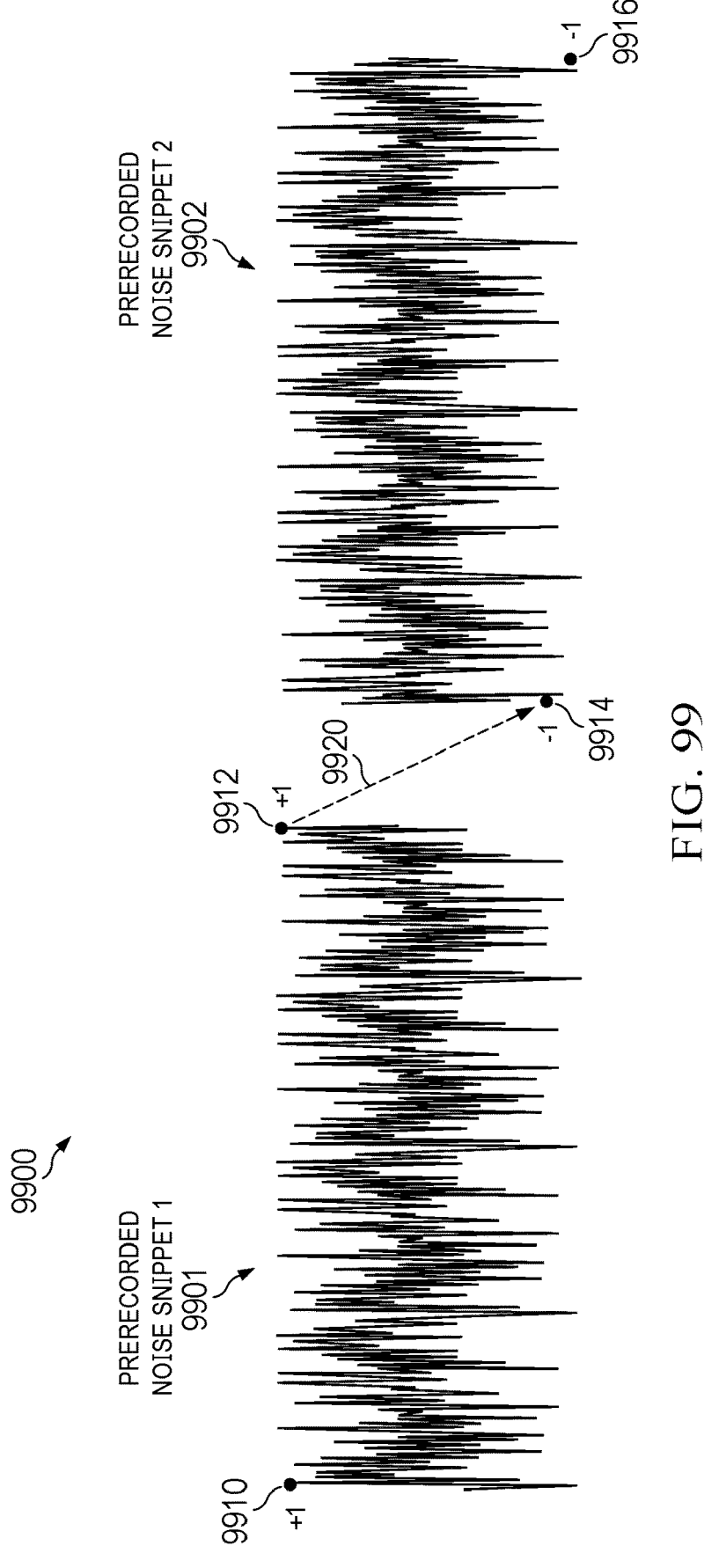
FIG. 99 is an illustration of prerecorded noise snippets in accordance with an illustrative embodiment.

Reference next to FIG. 99, an illustration of prerecorded noise snippets is depicted in accordance with an illustrative embodiment. In this illustrative example, prerecorded noise snippets 9900 are examples of prerecorded noise snippets 9770 in FIG. 97.

In this illustrative example in FIG. 99, prerecorded noise snippets 9900 comprise prerecorded noise snippet 1 9901 and prerecorded noise snippet 2 9902. As depicted, prerecorded noise snippet 1 9901 has initial amplitude level 9910 of +1 and final amplitude level 9912 of +1. Further in this example, prerecorded noise snippet 2 9902 has initial amplitude level 9914 of −1 and final amplitude level 9916 of −1.

Placing these two prerecorded noise snippets next to each other in a sequence results in a rapid or discrete shift in phase of 180-degrees (from +1 to ~1, or from −1 to +1). Phase shift 9920 is drawn to artificially expand the distance between prerecorded noise snippet 1 9901 and prerecorded noise snippet 2 9902 to show the sudden 180-degree phase shift. Phase shift 9920 occurs from final amplitude level 9912 in prerecorded noise snippet 1 9901 and initial amplitude 9914 in prerecorded noise snippet 2 9902. This shift in phase can be detected by a receiver for determining a phase shift between these two prerecorded noise snippets.

These two examples of the recorded noise snippets are only some of the illustrative examples. Other types of noise snippets can be used in addition to or in place of these two examples.

Figure 100:
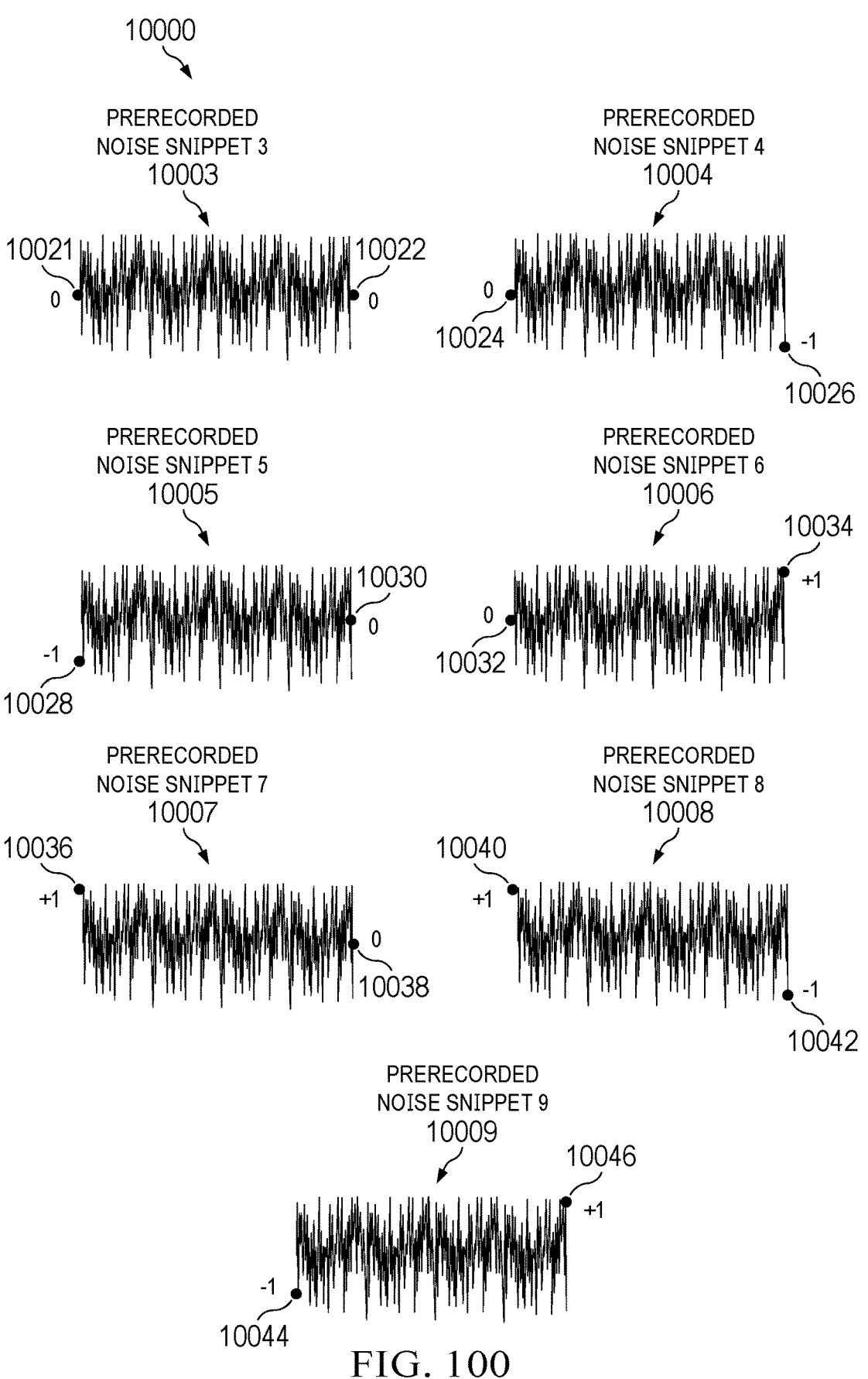
FIG. 100 is an illustration of additional prerecorded noise snippets in accordance with an illustrative embodiment.

Turning to FIG. 100, an illustration of additional prerecorded noise snippets is depicted in accordance with an illustrative embodiment. In this figure, prerecorded noise snippets 10000 are examples of prerecorded noise snippets 9770 in FIG. 97. Prerecorded noise snippets 10000 in FIG. 100 are additional examples that can be used in addition to or in place of prerecorded noise snippets 9900 in FIG. 99.

In this example, prerecorded noise snippets 10000 comprise prerecorded noise snippet 3 10003, prerecorded noise snippet 4 10004, prerecorded noise snippet 5 10005, prerecorded noise snippet 6 10006, prerecorded noise snippet 7 10007, prerecorded noise snippet 8 10008, and prerecorded noise snippet 9 10009.

The different noise snippets have different initial and final amplitudes. These amplitude changes between the snippets result in phase differences to provide different phase shifts. With additional phase shifts based on the initial and final amplitudes, many combinations of phase shifts including at least one of phase shift direction and phase shift amplitude can be used to correspond to the sequence of prerecorded noise snippets to multiple discrete logic symbols.

In this example, prerecorded noise snippet 3 10003 has initial amplitude level 10021 of 0 and final amplitude level 10022 of 0; prerecorded noise snippet 4 10004 has initial amplitude level 10024 of 0 and final amplitude level 10026 of −1; prerecorded noise snippet 5 10005 has initial amplitude level 10028 of −1 and final amplitude level 10030 of 0; prerecorded noise snippet 6 10006 has initial amplitude level 10032 of 0 and final amplitude level 10034 of +1; and prerecorded noise snippet 7 10007 has initial amplitude level 10036 of +1 and final amplitude level 10038 of 0. Additionally, in this example, prerecorded noise snippet 8 10008 has initial amplitude level 10040 of +1 and final amplitude level 10042 of −1 and prerecorded noise snippet 9 10009 has initial amplitude level 10044 of −1 and final amplitude level 10046 of +1. Note that a change in amplitude between snippets from +1 to ~1 or from −1 to +1 is a phase shift of 180-degrees. A change in amplitude from 0 to +1, from +1 to 0, from 0 to −1, or from −1 to 0 is a phase change or phase shift of 45-degrees. These discrete shifts are detectable because of their sudden high frequency spikes.

The illustration of the different prerecorded noise snippets in FIG. 99 and FIG. 100 are examples of some implementations for prerecorded noise snippets 9770 in FIG. 97. In other illustrative examples, other amplitudes can be used such as +0.5, −0.5, +0.25, or −0.25 in addition to the amplitudes shown in these examples. These different amplitudes and the direction of phase shifts can result in many combinations of phase shifts and magnitudes of phase shifts for use in generating sequences of prerecorded noise snippets to correspond to multiple discrete logic symbols for digital information.

These prerecorded snippets are chosen to interact between each other such that transitions or phase shifts between the prerecorded snippets will cause discrete and detectable symbols at the receiver. As an example of single-bit (binary) phase shift keying, FIG. 99 shows that a shift from prerecorded noise snippet 1 to prerecorded noise snippet 2 comprises a change in value from +1 to −1 or 180-degree phase shift which can indicate a logical "1," a logical "0." or a logical shift from the previously existing logical state of "0" or "1" to the opposite state. In FIG. 100 a change between prerecorded snippets of +1, +0.5, 0, −0.5, and −1 can be used in ways to designate a quadrature scheme of two bits per symbol for each phase shift. In this manner, multiple-discrete logic symbols are defined.

Figure 101:
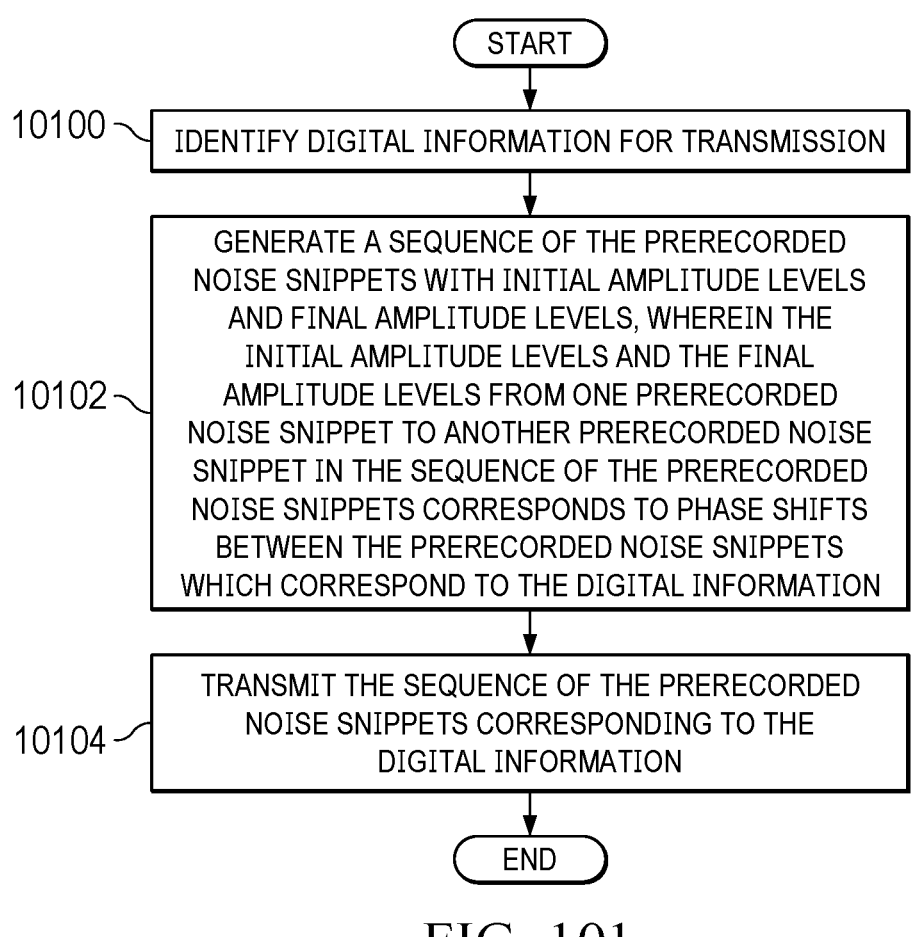
FIG. 101 is an illustration of a flowchart of a method for communicating digital information in accordance with an illustrative embodiment.

Turning now to FIG. 101, an illustration of a flowchart of a method for communicating digital information is depicted in accordance with an illustrative embodiment. The process in FIG. 101 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 to transmit digital data in communications system 3602 as depicted in FIG. 97.

The process begins by identifying digital information for transmission (operation 10100). The process generates a sequence of the prerecorded noise snippets with initial amplitude levels and final amplitude levels, wherein the initial amplitude levels and the final amplitude levels from one prerecorded noise snippet to another prerecorded noise snippet in the sequence of the prerecorded noise snippets corresponds to phase shifts between the prerecorded noise snippets which correspond to the digital information (operation 10102).

The process transmits the sequence of the prerecorded noise snippets corresponding to the digital information (operation 10104). The process terminates thereafter.

Figure 102:
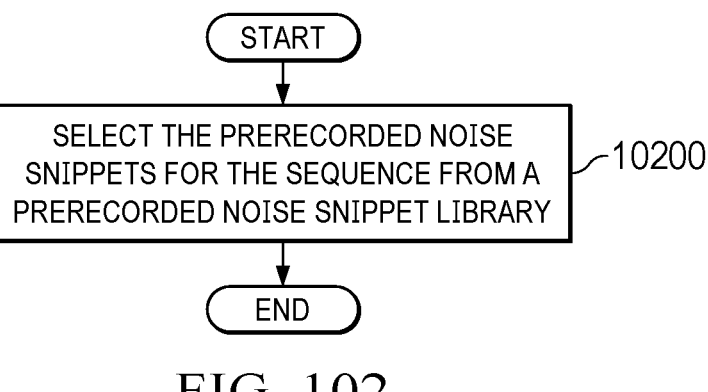
FIG. 102 is an illustration of a flowchart of a process for generating a sequence of prerecorded noise snippets in accordance with an illustrative embodiment.

Turning next to FIG. 102, an illustration of a flowchart of a process for generating a sequence of prerecorded noise snippets is depicted in accordance with an illustrative embodiment. The process illustrated in this figure is an example of an implementation for operation 10102 in FIG. 101.

The process selects the prerecorded noise snippets for the sequence from a prerecorded noise snippet library (operation 10200). The process terminates thereafter.

Figure 103:
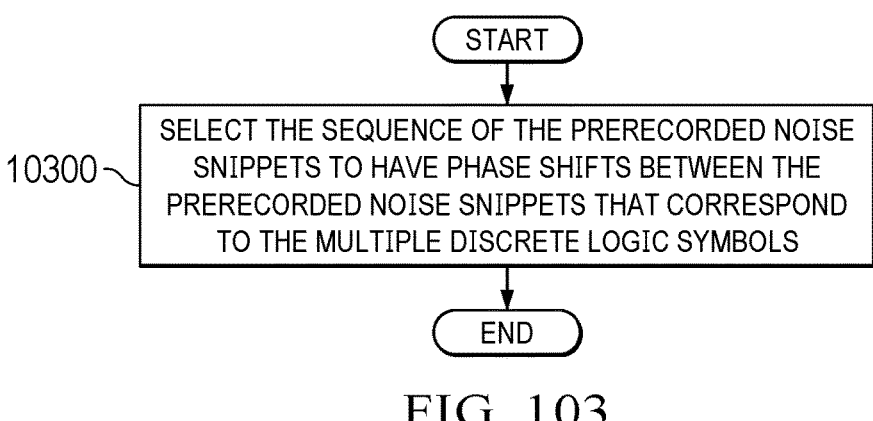
FIG. 103 is an illustration of a flowchart of a process for generating a sequence of prerecorded noise snippets in accordance with an illustrative embodiment.

In FIG. 103, an illustration of a flowchart of a process for generating a sequence of prerecorded noise snippets is depicted in accordance with an illustrative embodiment. The process illustrated in this figure is an example of an implementation for operation 10102 in FIG. 101. In this example, digital information is comprised of multiple discrete logic symbols.

The process selects the sequence of the prerecorded noise snippets to have phase shifts between the prerecorded noise snippets that correspond to the multiple discrete logic symbols (operation 10300). The process terminates thereafter.

Figure 104:
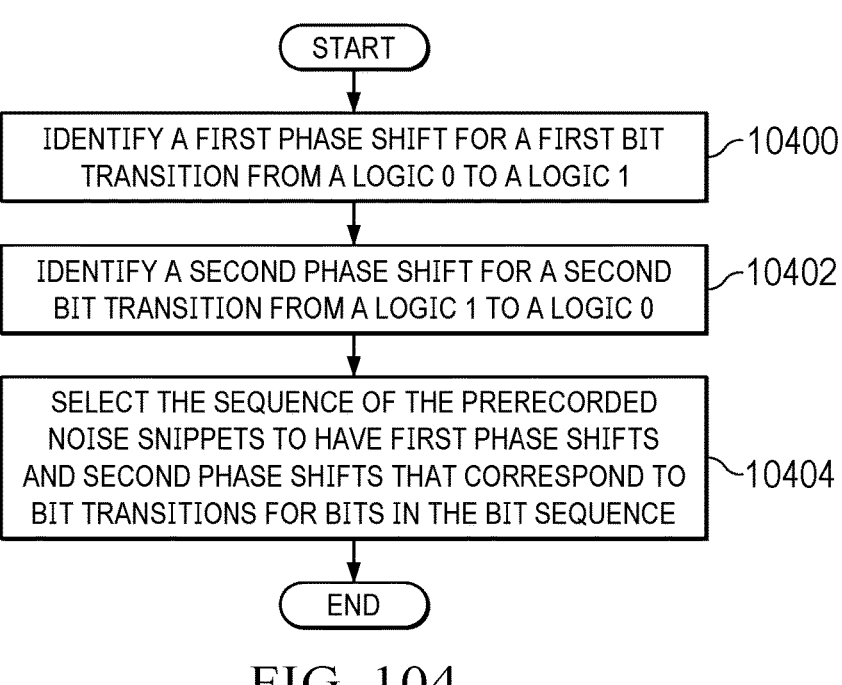
FIG. 104 is an illustration of a flowchart of a process for generating a sequence of prerecorded noise snippets in accordance with an illustrative embodiment.

Turning now to FIG. 104, an illustration of a flowchart of a process for generating a sequence of prerecorded noise snippets is depicted in accordance with an illustrative embodiment. The process illustrated in this figure is an example of an implementation for operation 10102 in FIG. 101. In this example, digital information is a bit sequence.

The process identifies a first phase shift for a first bit transition from a logic 0 to a logic 1 (operation 10400). The process identifies a second phase shift for a second bit transition from a logic 1 to a logic 0 (operation 10402).

The process selects the sequence of the prerecorded noise snippets to have first phase shifts and second phase shifts that correspond to bit transitions for bits in the bit sequence (operation 10404). The process terminates thereafter.

In these different illustrative examples, the phase shifts have directions and amplitudes (equivalent to phase angles or phase shifts). In one example, a first phase shift in the phase shifts has first direction and amplitude (equivalent to first phase angles or phase shifts) and wherein a second phase shift in the phase shifts has a second direction and amplitude (equivalent to second phase angles or phase shifts). As shown in the different examples, these amplitudes and direction of change can include positive and negative values, equivalent to phase angles or phase shifts.

Figure 105:
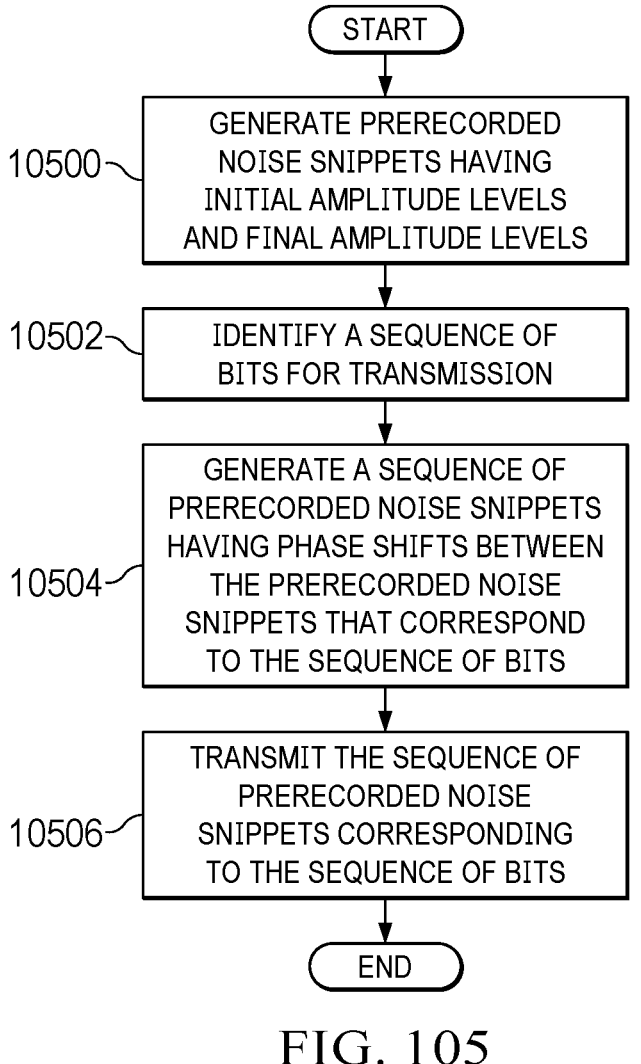
FIG. 105 is an illustration of a flowchart of a method for communicating digital information in accordance with an illustrative embodiment.

Turning now to FIG. 105, an illustration of a flowchart of a method for communicating digital information is depicted in accordance with an illustrative embodiment. The process in FIG. 101 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 to transmit digital data in communications system 3602 as depicted in FIG. 97.

The process begins by generating prerecorded noise snippets having initial amplitude levels and final amplitude levels (operation 10500). In this example, the prerecorded noise snippets in operation 10500 are noise snippet 1 and noise snippet 2. Noise snippet 1 has an initial amplitude of +1 and a final amplitude of –1, and noise snippet 2 has an initial amplitude of –1 and a final amplitude of +1. In an alternative example, noise 1 snippet has an initial amplitude of +1 and a final amplitude of –1, while noise snippet 1 has an initial amplitude of 0 and a final amplitude of 0. In other words, multiple snippets can be defined and used to create the sequence of bits for transmission.

The process continues by identifying a sequence of bits for transmission (operation 10502). In this example, the sequence of bits has a bit pattern in which transitions between different bits occur. The process generates a sequence of prerecorded noise snippets having phase shifts between the prerecorded noise snippets that correspond to the sequence of bits (operation 10504). In operation 10504, to transmit a digital shift from 0 to 1 or from 1 to 0 in the digital information, the sequence can be noise snippet 1 followed by noise snippet 2 snippet. The phase shift from +1 for the final amplitude at the end of the noise snippet 1 to –1 for the initial amplitude at the beginning of noise snippet 2 indicates a shift in the digital information from either 0 to 1 or 1 to 0.

In this example, when the same bit is to be included, the current prerecorded noise snippet is added to the sequence. For example, if the first bit is 1 and current prerecorded noise snippet being transmitted is noise snippet 1 (+1 to +1) and if the second bit is also 1, the noise snippet 1 (+1 to +1) is selected as the next prerecorded noise snippet in the sequence. In this case, phase shift does not occur. As a result, the second bit is also 1.

In another example, if the first bit is 1 and the current prerecorded noise snippet being transmitted is noise 2 snippet (–1 to –1) and if the second message bit is also 1, then the noise snippet 2 (–1 to –1) is selected as the next prerecorded noise snippet in the sequence. As result, a phase shift does not occur. Thus, in this example, the second bit is also a 1.

When a shift in the sequence of bits occurs, a different prerecorded noise snippet other than the current prerecorded noise snippet is selected for the sequence. For example, the sequence of prerecorded noise snippets can be from noise snippet 1 (+1 to +1) to noise 2 (–1 to –1), or from noise snippet 2 (–1 to –1) to noise snippet 1 (+1 to +1).

With respect to a bit transition from 1 to 0, in this example, if the first bit is 1 and the current prerecorded noise snippet in the sequence prerecorded noise snippets is noise snippet 1 (+1 to +1), and the bit transitions to 0, then the noise snippet 1 (+1 to +1) is followed by the next prerecorded noise snippet, noise snippet 2 (–1 to –1). This sequence of prerecorded noise snippets results in a phase shift that corresponds to a transition of the first bit to the second bit as 1 to 0 in this example.

In the case of a message bit transition from 0 to 1: If the first message bit is 0 and the current noise snippet being transmitted is noise snippet 2 (–1 to –1), the next prerecorded noise snippet in the sequence from noise snippet 2 (–1 to –1) would change to noise snippet 1 (+1 to +1). Thus, the sequence of prerecorded noise snippets results in a phase shift that corresponds to a bit transition from 0 to 1.

The process transmits the sequence of prerecorded noise snippets corresponding to the sequence of bits (10506). The process terminates thereafter.

The selection of these two snippets is for purposes of illustrating an implementation and not meant to limit the manner in which other illustrative examples can be implemented. In other illustrative examples, different initial and final amplitudes can be selected, and different numbers of prerecorded snippets can be used. Further, in other examples the digital information takes other forms other than a sequence of bits. In other illustrative examples, other types of multiple discrete logic symbols can be used in addition to a series of bits. For example, a symbol can represent groupings of two or more bits. In yet another illustrative example, a symbol can represent an integer or character.

Some features of the illustrative examples for modulating digital information 3607 using digital phase-differential noise shift keying 3696 in communications system 3602 are described in the following clauses. These clauses are examples of features and are not intended to limit other illustrative examples.

1. A communications system comprising:
   a computer system; and
   a communications manager in the computer system, wherein the communications manager is configured to:
   identify digital information for transmission;
   generate a sequence of prerecorded noise snippets with initial amplitude levels and final amplitude levels, wherein the initial amplitude levels and the final amplitude levels from one prerecorded noise snippet to another prerecorded noise snippet in the sequence of the prerecorded noise snippets corresponds to phase shifts between the prerecorded noise snippets which correspond to the digital information; and
   transmit the sequence of the prerecorded noise snippets corresponding to the digital information.

2. The communications system of clause 1, wherein in generating the sequence of the prerecorded noise snippets, the communications manager is configured to:
   select the prerecorded noise snippets for the sequence from a prerecorded noise snippet library.

3. The communications system of clause 1, wherein the digital information is comprised of multiple discrete logic symbols and wherein in generating the sequence of the prerecorded noise snippets, the communications manager if configured to:
   select the sequence of the prerecorded noise snippets to have phase shifts between the prerecorded noise snippets that correspond to the multiple discrete logic symbols.

4. The communications system of clause 1, wherein the digital information is a bit sequence and wherein in generating the sequence of the prerecorded noise snippets, the communications manager if configured to:
   identify a first phase shift for a first bit transition from a logic 0 to a logic 1;
   identify a second phase shift for a second bit transition from a logic 1 to a logic 0; and
   select the sequence of the prerecorded noise snippets to have first phase shifts and second phase shifts that correspond to bit transitions for bits in the bit sequence.

5. The communications system of clause 1, wherein the phase shifts have directions and amplitudes.

6. The communications system of clause 1, wherein a first phase shift in the phase shifts has first direction and wherein a second phase shift in the phase shifts has a second direction.

7. The communications system of clause 1, wherein a first phase shift in the phase shifts has a first magnitude and wherein a second phase shift in the phase shifts has a second magnitude.

8. The communications system of clause 1, wherein the prerecorded snippets are comprised of noise-band signals selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

9. A communications system comprising:

a receiver configured to:

receive a sequence of prerecorded noise snippets with initial amplitude levels and final amplitude levels, wherein the initial amplitude levels and the final amplitude levels from one prerecorded noise snippet to another prerecorded noise snippet in the sequence of the prerecorded noise snippets corresponds to phase shifts between the prerecorded noise snippets which correspond to digital information; and demodulate the digital information from the sequence of the prerecorded noise snippets and the phase shifts for the sequence of the prerecorded noise snippets.

10. A method for communicating digital information, the method comprising:

identifying digital information for transmission;

generating a sequence of prerecorded noise snippets with initial amplitude levels and final amplitude levels, wherein the initial amplitude levels and the final amplitude levels from one prerecorded noise snippet to another prerecorded noise snippet in the sequence of the prerecorded noise snippets corresponds to phase shifts between the prerecorded noise snippets which correspond to the digital information; and transmitting the sequence of the prerecorded noise snippets corresponding to the digital information.

11. The method of clause 10, wherein said generating the sequence of the prerecorded noise snippets comprises:

selecting the prerecorded noise snippets for the sequence from a prerecorded noise snippet library.

12. The method of clause 10, wherein the digital information is comprised of multiple discrete logic symbols and wherein said generating the sequence of the prerecorded noise snippets comprises:

selecting the sequence of the prerecorded noise snippets to have phase shifts between the prerecorded noise snippets that correspond to the multiple discrete logic symbols.

13. The method of clause 10, wherein the digital information is a bit sequence and wherein said generating the sequence of the prerecorded noise snippets comprises:

identifying a first phase shift for a first bit transition from a logic 0 to a logic 1;

identifying a second phase shift for a second bit transition from a logic 1 to a logic 0; and selecting the sequence of the prerecorded noise snippets to have first phase shifts and second phase shifts that correspond to bit transitions for bits in the bit sequence.

14. The method of clause 10, wherein the phase shifts have directions and amplitudes.

15. The method of clause 10, wherein a first phase shift in the phase shifts has first direction and wherein a second phase shift in the phase shifts has a second direction.

16. The method of clause 10, wherein a first phase shift in the phase shifts has a first magnitude and wherein a second phase shift in the phase shifts has a second magnitude.

17. The method of clause 10, wherein the prerecorded snippets are comprised of noise-band signals selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

18. A method for communicating digital information, the method comprising:

receiving a sequence of prerecorded noise snippets with initial amplitude levels and final amplitude levels, wherein the initial amplitude levels and the final amplitude levels from one prerecorded noise snippet to another prerecorded noise snippet in the sequence of the prerecorded noise snippets corresponds to phase shifts between the prerecorded noise snippets which correspond to the digital information; and demodulating the digital information from the sequence of the prerecorded noise snippets and the phase shifts for the sequence of the prerecorded noise snippets.

19. The method of clause 18, wherein the phase shifts have directions and amplitudes.

20. The method of clause 18, wherein a first phase shift in the phase shifts has first direction and wherein a second phase shift in the phase shifts has a second direction.

21. The method of clause 18, wherein a first phase shift in the phase shifts has a first magnitude and wherein a second phase shift in the phase shifts has a second magnitude.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications system comprising:

a computer system; and a communications manager in the computer system, wherein the communications manager is configured to:

identify digital information for transmission; and transmit carrier noise signals with different noise amplitudes that thereby modulate the carrier noise signals to correspond to the digital information.

2. The communications system of claim 1, wherein the different noise amplitudes comprise amplitude levels that represent multiple discrete logic symbols.

3. The communications system of claim 1, wherein the different noise amplitudes comprise two discrete amplitude levels in which a first discrete amplitude level corresponds to a logic 0 and a second discrete amplitude level corresponds to a logic 1.

4. The communications system of claim 1, wherein the different noise amplitudes comprise four discrete amplitude levels in which a first discrete amplitude level represents a logic "00," a second discrete amplitude level represents a logic "01," a third discrete amplitude level represents a logic "10," and a fourth discrete amplitude level represents a logic "11".

5. The communications system of claim 1, wherein the different noise amplitudes comprise multiple discrete amplitude levels in which the multiple discrete amplitude levels represent multiple discrete logic symbols.

6. The communications system of claim 1, wherein the carrier noise signals are radio frequency carrier noise signals, and further comprising:

a laser generation system configured to emit a set of one or more laser beams, wherein in transmitting the carrier noise signals, the communications manager is configured to:

control an emission of the set of one or more laser beams from the laser generation system to control optical breakdowns that generate the radio frequency carrier noise signals with the different noise amplitudes that thereby modulate the radio frequency carrier noise signals to correspond to the digital information.

7. The communications system of claim 6, wherein in controlling the emission of the set of one or more laser beams, the communications manager is configured to:

control a strength of the set of one or more laser beams emitted from the laser generation system to control the optical breakdowns that generate the radio frequency carrier noise signals with the different noise amplitudes that thereby modulate the radio frequency carrier noise signals to correspond to the digital information.

8. The communications system of claim 7, wherein in controlling the strength of the set of one or more laser beams, the communication manager is configured to:

control the strength of the set of one or more laser beams emitted from a laser source in the laser generation system.

9. The communications system of claim 7, wherein in controlling the strength of the set of one or more laser beams, the communications manager is configured to:

control the strength of the set of one or more laser beams emitted from the laser generation system using a set of optical elements.

10. The communications system of claim 7, wherein in controlling the strength of the set of one or more laser beams, the communication manager is configured to:

control the strength of the set of one or more laser beams emitted from the laser generation system using an amplitude modulator in the laser generation system.

11. The communications system of claim 1, further comprising:

an electric noise generator configured to generate the carrier noise signals;

a modulator; and a transmitter, wherein in generating the carrier noise signals, the communications manager is configured to:

generate the carrier noise signals using the electric noise generator; and modulate an amplitude of the carrier noise signals using the modulator to vary the carrier noise signals with the different noise amplitudes that thereby modulates the carrier noise signals to correspond to the digital information.

12. The communications system of claim 1, wherein the carrier noise signals are selected from at least one of electromagnetic frequency carrier noise signals, radio frequency carrier noise signals, microwave frequency carrier noise signals, audio frequency carrier noise signals, ultrasonic frequency carrier noise signals, ultra-low frequency carrier noise signals, very low frequency carrier noise signals, underwater frequency carrier noise signals, or optical frequency carrier noise signals including at least one of visible or non-visible light.

13. A communications system comprising:

a receiver configured to:

receive carrier noise signals, in which digital information is modulated in the carrier noise signals using different noise amplitudes; and demodulate the digital information previously modulated in the carrier noise signals based on different noise amplitudes in the carrier noise signals.

14. A method for communicating digital information, the method comprising:

identifying the digital information for transmission; and transmitting carrier noise signals with different noise amplitudes that thereby modulate the carrier noise signals to correspond to the digital information.

15. The method of claim 14, wherein the different noise amplitudes comprise discrete amplitude levels that represent multiple discrete logic symbols.

16. The method of claim 14, wherein the different noise amplitudes comprise two discrete amplitude levels in which a first discrete amplitude level corresponds to a logic 0 and a second discrete amplitude level corresponds to a logic 1.

17. The method of claim 14, wherein different amplitudes comprise four discrete amplitude levels in which a first discrete amplitude level represents a logic "00," a second discrete amplitude level represents a logic "01," a third discrete amplitude level represents a logic "10," and a fourth discrete amplitude level represents a logic "11".

18. The method of claim 14, wherein the different noise amplitudes comprise multiple discrete amplitude levels in which the multiple discrete amplitude levels represent multiple discrete logic symbols.

19. The method of claim 14, wherein the carrier noise signals are radio frequency carrier noise signals, and wherein said transmitting the carrier noise signals comprises:

controlling emission of a set of one or more laser beams from a laser generation system to control optical breakdowns that generate the radio frequency carrier noise signals with the different noise amplitudes that thereby modulate the radio frequency carrier noise signals to correspond to the digital information.

20. The method of claim 19, wherein said controlling the emission of the set of one or more laser beams comprises:

controlling a strength of the set of one or more laser beams emitted from the laser generation system to control the optical breakdowns that generate the radio frequency carrier noise signals with the different noise amplitudes that thereby modulate the radio frequency noise signals to correspond to the digital information.

21. The method of claim 20, wherein said controlling the strength of the set of one or more beams comprises:

controlling the strength of the set of one or more beams emitted from a laser source in the laser generation system.

22. The method of claim 20, wherein said controlling the strength of the set of one or more beams comprises:

controlling the strength of the set of one or more beams emitted from the laser generation system using a set of optical elements.

23. The method of claim 20, wherein said controlling the strength of the set of one or more beams comprises:

controlling the strength of the set of one or more laser beams emitted from a laser source in the laser generation system using an amplitude modulator in the laser generation system.

24. The method of claim 14, wherein said transmitting the carrier noise signals comprises:

generating a carrier radio frequency noise signal;

modulating the carrier radio frequency noise signal to form the noise signals with the different noise amplitudes that thereby modulates the carrier radio frequency noise signal to correspond to the digital information; and transmitting the carrier noise signals with the different noise amplitudes that thereby modulate the carrier noise signals to correspond to the digital information.

25. The method of claim 14, wherein the carrier noise signals are selected from at least one of electromagnetic frequency carrier noise signals, radio frequency carrier noise signals, microwave frequency carrier noise signals, audio frequency carrier noise signals, ultrasonic frequency carrier noise signals, ultra-low frequency carrier noise signals, very low frequency carrier noise signals, underwater frequency carrier noise signals, or optical frequency carrier noise signals including at least one of visible or non-visible light.

26. A method for communicating digital information, the method comprising:

receiving carrier noise signals, wherein the digital information is modulated in the carrier noise signals using different carrier noise amplitudes; and demodulating the digital information modulated in the carrier noise signals based on the different carrier noise amplitudes in the noise signals.

27. The method of claim 26, wherein a receiver receives the carrier noise signals and demodulates the carrier noise signals.

* * * * *